US00RE35314E

United States Patent [19]

Logg

[11] E Patent Number: Re. 35,314

[45] Reissued Date of Patent: Aug. 20, 1996

[54] MULTI-PLAYER, MULTI-CHARACTER COOPERATIVE PLAY VIDEO GAME WITH INDEPENDENT PLAYER ENTRY AND DEPARTURE

[75] Inventor: George E. Logg, Los Altos, Calif.

[73] Assignee: Atari Games Corporation, Milpitas, Calif.

[21] Appl. No.: 254,482

[22] Filed: Jun. 6, 1994

Related U.S. Patent Documents

Reissue of:

[64] Patent No.: 4,738,451
Issued: Apr. 19, 1988
Appl. No.: 865,387
Filed: May 20, 1986

U.S. Applications:

[63] Continuation of Ser. No. 473,262, Jan. 31, 1990, abandoned.

[51] Int. Cl.[6] ..... A63F 9/22

[52] U.S. Cl. ..... 463/2; 463/15

[58] Field of Search ..... 273/153 R, 433, 273/434, 437, 85 G, DIG. 28, 138 A

[56] References Cited

U.S. PATENT DOCUMENTS

| | | |
|---|---|---|
| 3,793,483 | 2/1974 | Bushnell . |
| 4,016,362 | 4/1977 | Bristow et al. . |
| 4,045,789 | 8/1977 | Bristow . |
| 4,054,919 | 10/1977 | Alcorn . |
| 4,116,444 | 9/1978 | Mayer et al. . |
| 4,477,069 | 10/1984 | Crudgington, Jr. . |
| 4,504,055 | 3/1985 | Wells . |
| 4,572,509 | 2/1986 | Sitrick . |

FOREIGN PATENT DOCUMENTS

| | | |
|---|---|---|
| 54-40744 | 3/1979 | Japan . |
| 55-122577 | 9/1980 | Japan . |
| 57-211381 | 12/1982 | Japan . |
| 58-1483 | 1/1983 | Japan . |
| 58-81064 | 5/1983 | Japan . |
| 58-121091 | 7/1983 | Japan . |
| 58-185284 | 12/1983 | Japan . |
| 59-57397 | 4/1984 | Japan . |
| 59-141976 | 8/1984 | Japan . |
| 2153189 | 8/1985 | United Kingdom . |

OTHER PUBLICATIONS

"Dandy", (©)1983 John Howard Palevich.
"Mario Bros." instruction booklet, ©1986 Nintendo.
"Balloon Fight" instruction booklet, ©1986 Nintendo.
Stern Goes Berzerk ad; Stern Electronics, Inc.
Warlord video game ad, Stern–Seeburg Entertainment Guide, Vol. One, Issue One, Atari Games Corporation.
Tutankham, Video game ad, Kjonami Industry Co., Ltd.
Claim Your Treasures With Exidy's Venture™, Exidy, Inc.

*Primary Examiner*—Jessica J. Harrison
*Attorney, Agent, or Firm*—Knobbe, Martens, Olson & Bear

[57] ABSTRACT

A multi-player, multi-character video game where the games rules force the players to cooperate in negotiating the maze at least until the characters reach a portion of the maze where a specific objective is located. Certain limited resources to change the attributes of the characters or to increase their longevity are displayed in a maze. The players may compete to obtain possession of these limited resources when the characters have cooperated in their movements sufficiently to move to the location of the limited resources. Cooperation among the characters is forced by forcing all characters active in the game to remain visible in the displayed window. Players may enter the game at any time, and they may leave the game at any time without affecting the status of the game or the status of the other characters in the game. All active players may simultaneously, independently control their characters so long as they do not attempt to move their characters outside the currently displayed window.

62 Claims, 5 Drawing Sheets

MAIN LOOP

MAIN LOOP

ATTEMPT TO RESPOND

START A PLAYER

COLLISION ROUTINES

MAZE EXIT COLLISION PROCESSING

MULTI-PLAYER, MULTI-CHARACTER COOPERATIVE PLAY VIDEO GAME WITH INDEPENDENT PLAYER ENTRY AND DEPARTURE

Matter enclosed in heavy brackets [ ] appears in the original patent but forms no part of this reissue specification; matter printed in italics indicates the additions made by reissue.

*This is a continuation of 07/473,262, filed Jan. 31, 1990, now abandoned, which is a Reissue of 06/865,387 filed May 20, 1986, now U.S. Pat. No. 4,738,451.*

BACKGROUND OF THE INVENTION

The invention pertains to the field of video games, and, more particularly, to the field of video games where multiple players may simultaneously control multiple characters and are encouraged by the game to cooperate in defeating a maze populated by longevity decreasing entities to obtain limited resources in the form of longevity increasing resources.

In prior video games, multi-player games have been available where each player controls a character independently and without being forced to cooperate by the game. One example is Dandy. In this game, each player may control his particular character in a maze, but the characters are not forced by the game to cooperate in negotiating the maze in the sense that each player may independently move his character off the screen to wander blindly, while the other players are manipulating their characters on the screen. In another game, Ali Baba, the players are also allowed to independently control the actions of their characters, but each player is assigned a time slice during play of the game and may control his character only during this time slice. The time slice is rotated so that each player may take a turn, but the players may not all simultaneously control their characters at the same time to independently or cooperatively negotiate the maze or defeat longevity decreasing entities in the maze. The characters do not need to be all in the same portion of the maze. Each character's portion of the maze is displayed independently during the character's time slice. Thus no cooperation between characters to negotiate the maze is forced by the game.

It is useful in a multi-player video game to allow any player to enter the game or leave at any time. This makes the game more social in the sense that a game may be started by any player or players and other players may join at will and begin cooperating or competing with the other players by simultaneously controlling his charater while the other players are manipulating their respective characters. Neither of the aforementioned games allows simultaneous control of all characters, independent entry and departure of players at will and forced cooperation between players. In Ali Baba, the players may enter and leave at any time, but may not all simultaneously control their characters. Further, there is no restriction on the characters wanderings through the maze in the sense that the display changes during each player's time slice to show the particular portion of the maze in which that player's character is located. The characters do not have to all be visible at all times in the same portion of the maze. In Dandy, there is no restriction which prevents the characters from leaving the visible area, and the players must all start at the same time. Thus, no current video game of which the applicants are aware provides the features of allowing the players to join the game or leave at any time and simultaneously control their characters. Further, the games known to the applicants do not encourage the players to cooperate in defeating the maze.

SUMMARY OF THE INVENTION

In accordance with the teachings of the invention, an apparatus and method are provided to fill the above described need. The invention includes known video game apparatus including a computer, typically a microprocessor, which runs a program implementing the rules of the game and which causes the computer to read the controls at each player station and determine how many players are in the game and which characters each player is controlling. The computer provides for multiple characters, each of which may have different attributes such as speed of movement, fighting abilities, magical powers, shot power, shot width and/or other attributes. Each character has a longevity attribute which the computer individually calculates based upon events which happen to that character in the game. In arcade versions of the game, each player may add to the longevity of his character by adding more coins at any time during play of the game. The computer also provides a maze (some embodiments provide multiples mazes with exits between mazes which may be opened if the player's character obtains possession of a key) in which the computer places certain limited resources. Such limited resources may include such things as longevity increasing resources, e.g., food, or other attribute affecting items such as potions which may enhance certain attributes such as magical powers or keys which allow a player to leave one maze through an exit and enter another maze. In some embodiments of the invention, when a character obtains possession of a key, that character may open a door in the maze through which all the characters may pass to enter another maze. In some embodiments, the characters have their longevity attributes increased as they pass through the door. In still other embodiments, the character which first obtains possession of the key gets bonus longevity points added to that character's longevity which is greater than any longevity points, if any, added to the other character's longevity attribute. In still other embodiments, the other characters receive longevity points in accordance with the order in which they exit through a door in the maze to another portion of the maze or to another maze. All these embodiments are equivalent in that they encourage competition among the players to increase their longevity.

The computer also populates the maze with one or more types of longevity decreasing entities which detract from a character's longevity unless the character successfully avoids the effects of the entity. Typically, these entities are monsters which attack the characters but which may be destroyed by the character's actions in fighting the monster or monsters. In some embodiments, there are more than one maze or levels of the same maze, and the monsters may act differently in different mazes or on different levels or in different portions of the same maze. The entities may also be traps, poisoned food or other things. The players move their controls and the computer responds by causing the characters to move through the maze. The players may cause their characters to fight attacking monsters, and to attempt to obtain possession of the limited, longevity enhancing or attribute affecting resources. All of the above action is displayed by the computer on a video display by accessing graphic data stored in a memory, typically a ROM, and causing standard video display driver circuitry to use the graphic data to display the maze, the characters, their shots or other fighting action, the monsters and the limited resources.

The computer allows any player to join the game at any time regardless of how many other players are in the game provided there is an unused character available for a new player to manipulate. Entry of a new player or departure of a player may occur regardless of how long the game has been played or when other players leave the game. In arcade versions of the game, players are forced to depart in the sense that their control inputs are ignored when the player's character dies, i.e., the longevity attribute for that character falls to zero. However, in these embodiments any player may extend the longevity of his character indefinitely by adding more coins to the coin slot dedicated to his character. The computer reads the coin accepting apparatus as a peripheral device and takes the number of coins dropped for each character into account when computing the longevity attribute of each character. Other factors taken into account during the longevity attribute calculation for each character are the number of successful attacks on each character by monsters, and/or the number and magnitude of other longevity decreasing events which have happened to that character during the game. When a particular character's longevity attribute reaches zero, that character is out of the game until more coins are dropped or other revival actions are taken to bring the character back to life. Control of the characters is simultaneous in that all players may simultaneously move their controls and the computer will update the positions or actions of their respective characters on the next video frame or as soon as possible after all computations and comparisons have been made and the proper video data has been accessed and sent to the video driver circuitry.

The computer also encourages the players to cooperate during play by comparing the player's character position or desired position with the current displayed screen limits. The current displayed screen may be thought of as a window on the maze (sometimes herein also called the "playfield") which is larger than the displayed window. The current window is scrolled over the playfield based on the center of the currently active characters or by any other suitable measure which keep all the active characters displayed in the current window. The characters are not allowed to leave the current window. Thus, if three characters are cooperating to fight monsters and move in the same direction toward a longevity enhancing resource, but one player wants his character to go in a direction which would take the character out of the current window where the other characters are, the window will not scroll further when the four characters have reached the window limits and are attempting to move in directions which would require expansion of the window to keep them all on the screen. This feature causes the movements of the other three cooperating players/characters to be stymied until the fourth, non-cooperating player decides to move in a direction which will allow the other players to move their characters in the direction toward their objective or vice versa.

DETAILED DESCRIPTION OF THE PREFERRED EMBODIMENT

Figure 1:
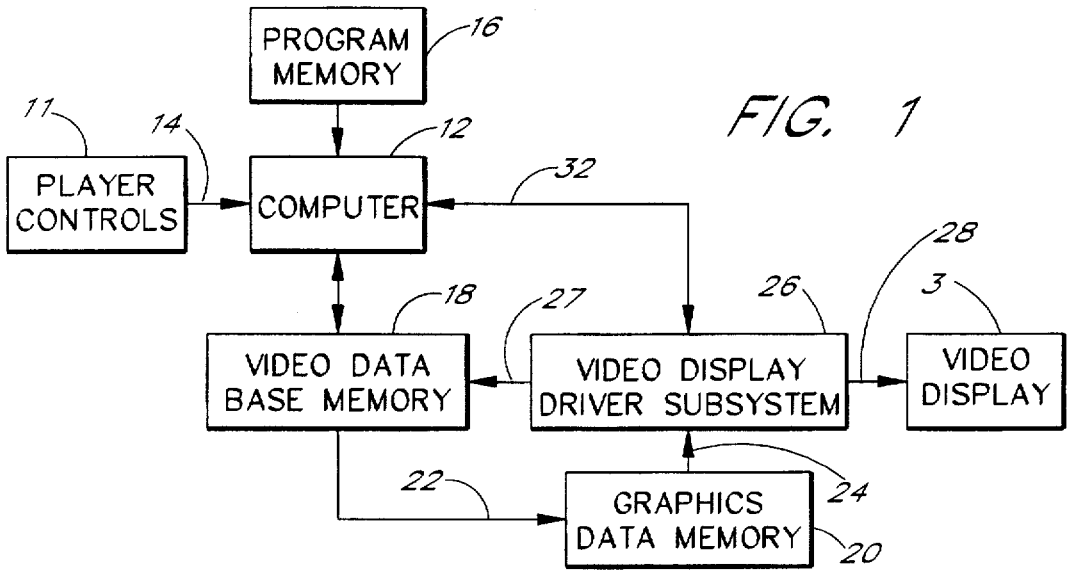
FIG. 1 is a block diagram of a standard video game system which may be used to implement the invention.

Referring to FIG. 1 there is shown a block diagram of a typical video game system which may be used to implement the video game of the invention. Such systems are known in the art of video game hardware design and the exact implementation details will be known to practitioners in this art. Other systems will also work to implement the video game apparatus of the invention in other embodiments. For example, the GAUNTLET (trademark of Atari Games Corporation of Milpitas, Calif.) game hardware will work with the object code software of the appendices hereto to implement the invention.

In FIG. 1, various player controls 11 such as joysticks for controlling movements of characters, fire buttons, magic buttons and coin accepting apparatus are coupled to computer 12 by bus 14. In the preferred embodiment, the computer 12 is a Motorola 68010, and the program memory 16 stores the programs of the appendices hereto. Typically, the player controls will be treated as peripheral devices and will either be periodically read in polled systems or will generate interrupt signals to the computer 12 in interrupt systems. In the latter, the service routines for the interrupts will cause the computer 12 to determine which player control caused the interrupt and will cause the computer 12 to read the data from the player control that caused the interrupt. The routines to read the player controls are stored in a program memory 16, and are well known.

The program memory 16 stores the program which controls the actions of the computer 12 and which implements the rules of the game. The control flow of the program to implement the novel features of the video game of the invention will be described in more detail below in connection with the discussion of other figures.

The program in program memory 16 establishes a cast of several characters each of which may have different attributes such as speed of movement, magical powers, fighting ability, movement ability, shot power, shot width, etc. Each character also has its own longevity attribute which is changed by an independent calculation of the computer for each character based upon events which happen affecting that character during play of the game. The program also establishes a maze populated by attribute affecting entities. Some entities adversely affect any character's longevity attribute upon which the entities act and are typically monsters, traps or other things which the characters should avoid to prolong their lives. Hereafter these adverse entities will be called monsters, but this term is to be understood as meaning any entity which reduces longevity of characters it affects. Other attribute affecting entities increase longevity and may take the form of food, resting places, healers, energy sources or any other thing which increases longevity. The longevity attribute might also be expressed to the players by the computer in terms of health, power or some other measure of vitality of a character. Hereafter longevity increasing entities will be referred to as food, but this term is to be understood as meaning any entity which increases a character's longevity attribute.

There are also established by the program certain other attribute affecting entities in the game. Such entities change or enhance an attribute or attributes of any character which comes into possession of same, and may affect the attributes of some characters more than others. Such entities may take the form of keys allowing exit from one maze to another, potions to change or enhance magical powers, objects found in the maze or which have fallen into it, treasures etc. All such attribute affecting entities which affect character attributes in a positive manner in the sense of helping the character in some way to negotiate the maze, defeat monsters or increase longevity will sometimes hereafter be referred to as limited resources. In the preferred embodiment, these limited resources will be limited in the sense that there are not enough of them present in the maze to allow all the characters to have as much of them as they want. In other embodiments, these "limited resources" may not be limited at all.

The computer uses a video data base memory 18 to keep track of all the attributes, positions and longevity of the characters and the positions of monsters, shots and other entities in the maze. The graphics data is stored in a graphics data memory 20. The particular graphics data used in the preferred embodiment is given in the appendices hereto. The graphics data for all moving and nonmoving objects in the game such as maze walls, traps, exits, treasures, limited resources, monsters characters, shots, etc. are stored in the memory 20. Some equivalent embodiments may use a separate memory for maze graphics data and another memory for the character graphics. Separate routines performed by the computer 12 or some dedicated logic would be used to access and display each of the sets of graphic data for the maze and non-moving objects therein and for the characters, their fighting actions, movements, shots, etc.

The computer 12 performs the routines stored in the program memory 16 (see appendices hereto for exact object code of preferred embodiment) to read the player controls, compute longevity attributes for each character, cause the characters to move, determine collisions of the characters with monsters, limited resources, maze walls, exits, and the perimeter of the currently displayed window, or collisions of character shots with monsters, exits or other characters etc. Calculations of attributes affected by these events if any are made, and the computer 12 updates the data records in the data base memory 18.

The proper graphic data is then accessed when it is time to display the objects in the current window at their proper positions in the window. The proper addresses for the desired graphic data are sent to the graphics data memory 20 via the bus 22 from the video data base memory 18 under the control of a video display driver subsystem 26. This control is exercised by the video display driver subsystem 26 via addresses sent to the video data base memory 18 over the bus 27. The 65 addresses of the desired graphics objects to be displayed are then sent to the graphics data memory 20 via the data bus 22. The desired graphics data is output at the proper time on a bus 24 to the video display driver subsystem 26. This is a conventional system which generates the proper raster scanning and synchronization control signals on a bus 28 to control a conventional video display 30. Typically, the video subsystem 26 includes logic to convert the graphic data from the graphics data memory 20 to pixel data suitable for creating a bit mapped display of the desired image. The video subsystem also typically contains a line buffer in which the bit mapped pixel data is stored prior to being displayed. Some embodiments may include one or two frame buffers, the purpose of which is to assemble and store the bit map for the current or next frame's displayed window image. The video subsystem also usually contains counters for keeping track of the current row and column position in the raster scanned image of the electron beam in the video display 30 for purposes of properly accessing the corresponding pixel data for that row and column position. The computer 12 may control or read some of the operating parameters of the video display driver subsystem via the bus 32. All of the foregoing is well known technology and further details will not be given here. Typical hardware systems that will work for the tangible elements of the system are taught in U.S. Pat. No. 4,116,444 to Mayer et al. Other patents which describe hardware systems and subsystems which may be used in implementing the invention are U.S. patents: Nos. 4,054,919; 4,045,789; 3,793,483; and 4,016,362. The disclosures of these patents are hereby incorporated by reference.

Figure 2:
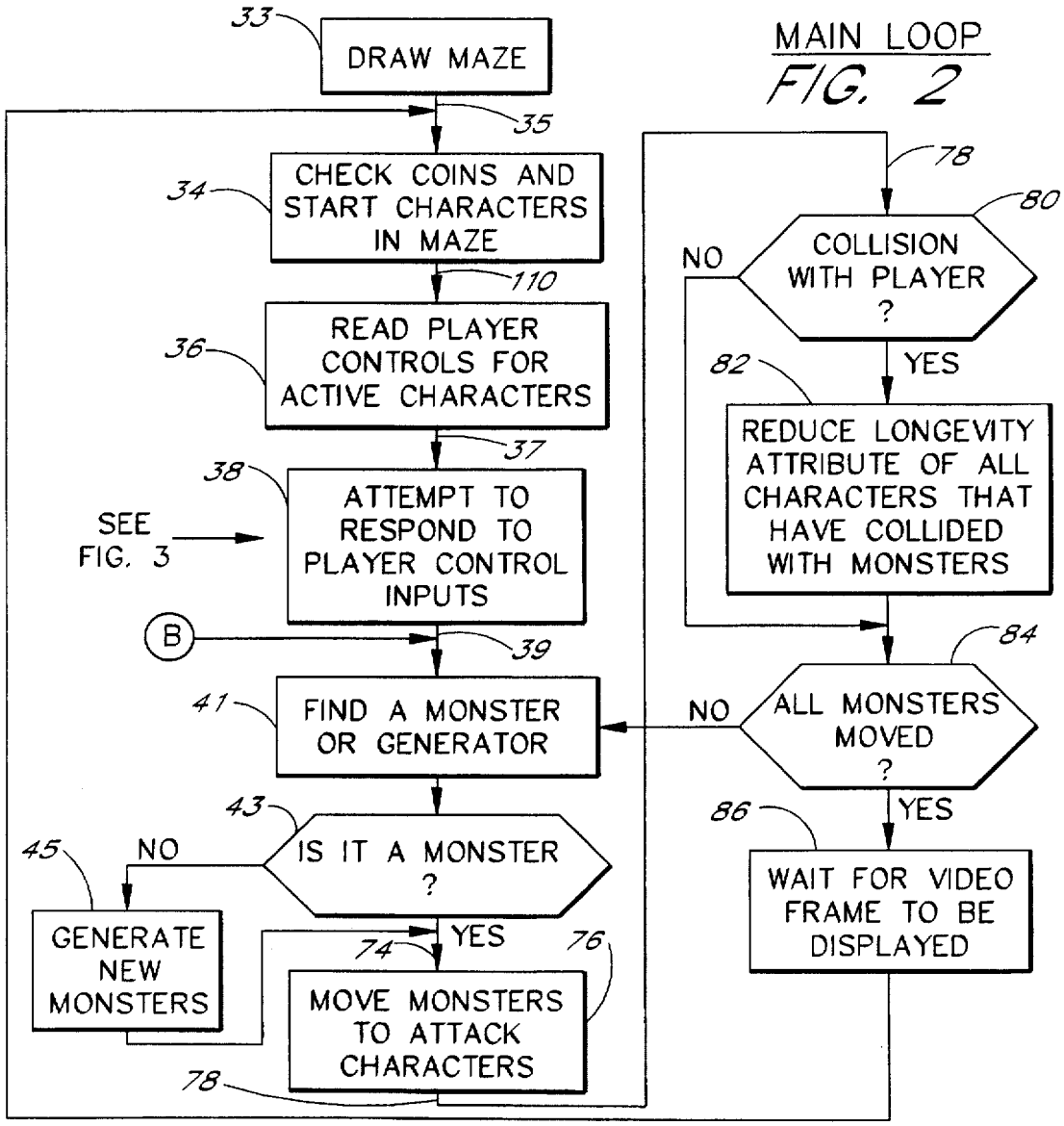
FIG. 2 is a flow diagram of the main loop of the program.

Referring to FIG. 2 there is shown a block diagram of the program run by the computer 12 in implementing the preferred, coin operated video game of the invention. The game is started when the first player drops a coin to bring his character to life in an arcade version the game or when a player presses his start button in a home version of the game. The computer first draws a maze and places certain limited resources therein, such as longevity increasing food, keys, potions to affect certain character attributes such as magic, etc., treasures and so on as symbolized by block 33. Such routines are well known and need not be detailed here. The computer 12 does not draw in enough of the limited resources for all the characters in the game to have unlimited extensions of their longevity attributes. Only enough longevity increasing resources are drawn in the maze for some of the characters thereby encouraging competition among the players to obtain possession of these limited resources.

After the maze is drawn, the character or characters which have been brought to life are placed in the maze somewhere in the visible window as symbolized by block 34. The details of this process will be supplied below in connection with a discussion of the flow chart of FIG. 3.

Typically, the graphics data memory 20 has stored therein graphic data for a maze which is larger than the window which can be displayed on the screen. The computer 12 keeps track of where the characters are in the maze by updating the x and y coordinate fields (which define the position of the character in the current window) of each character in the database memory 18. The computer 12 then scrolls the window so as to keep all the characters visible in the window at all times. Only so much of the maze as is visible through the current window location is displayed. In the preferred embodiment, when a game is started, the window is located at some known position in the maze and the characters which have been activated are placed somewhere in the window.

Next, the computer 12 polls the player controls 10 to determine what the first player currently playing is doing with his character in terms of desired movements, fighting action, etc. This is symbolized by block 36 where controls for currently active characters are read. The routines to read player controls are well known to those skilled in the programming of video games. Block 36 represents the process of either polling all controls for all players and storing the data read in memory for processing in block 38 or the process of servicing interrupts from player controls as they occur and storing the data read during the interrupt service routines in menory to await processing by the computer 12.

Figure 3:
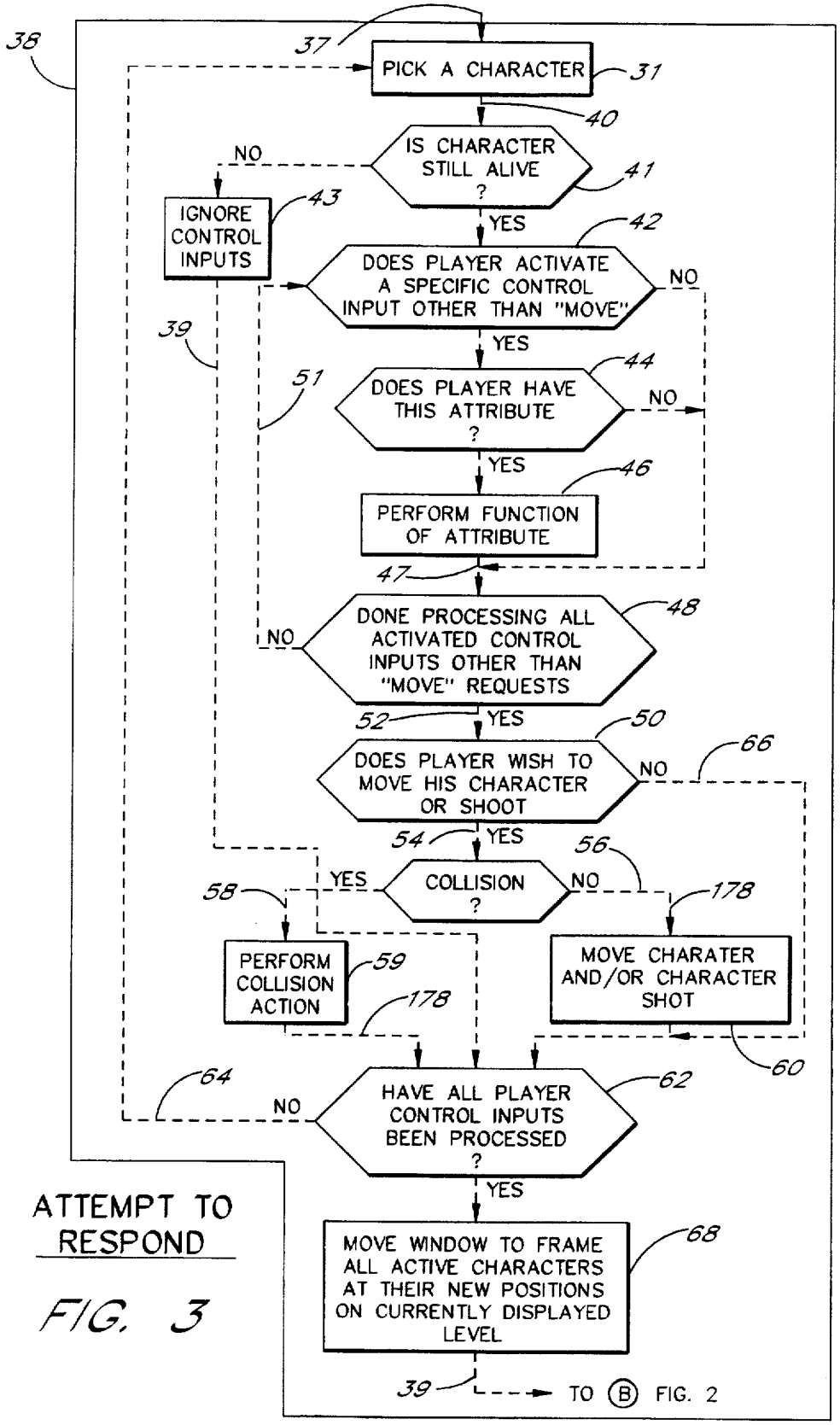
FIG. 3 is a flow diagram of the substeps in the process of responding to player control inputs in the main loop of the program.

The computer then attempts to respond as symbolized by block 38. This is a task which involves several sub-tasks which are detailed in FIG. 3. Referring to FIG. 3, the first sub-task the computer 12 performs as indicated by control flow line 37 to block 31 is to pick a character which has not been processed yet. Control then flows on path 40 to a test 41 to determine whether that character is still alive, i.e., in the game. The test of block 41 represents a process of accessing the data record for the character picked in block 31 and reading the longevity attribute field and determining if the character is still in the game. If the character is not still in the game, the control inputs from the player attempting to control the dead character are ignored as symbolized by block 43. Control then flows on path 39 to a block 62. If the the character is still active in the game per the test of block 41, the control inputs from the corresponding player must be processed.

The first step in this process is to decide whether the player has manipulated any special control other than a move control, e.g., is trying to exercise a special attribute of his character. The computer 12 provides predefined characters which the players are allowed to manipulate with controls to cause them to shoot, move, excercise their magical powers, etc. Each character, in the preferred embodiment, has different attributes such as speed, magic powers, shot power, shot width, armor strength, etc. In other embodiments, all characters have the same attributes. Either situation will suffice to practice the invention claimed, and each situation is eqivalent to the other in terms of what is critical to the practice of the invention. In embodiments where all players have the same attributes, the computer 12 need not check for whether a particular player is attempting to exercise an attribute which his character may not have so the next step, test 44 may be skipped. In the preferred embodiment, the computer 12 does check to see whether the player is requesting an action other than move, and does check whether the corresponding character has the attribute the player wants to exercise as symbolized in blocks 42 and 44. If the answer to both questions is yes, then block 46 is entered to cause the character to perform the requested function, e.g., shooting, increasing longevity by receiving new coins, starting a new player's character in the maze or exercise of magic powers. Typically, special attributes would include magical powers that not all characters have. The computer 12 keeps a data base of records defining character attributes and the status of each character in terms of his or her position in the maze, longevity of the character, possession of any limited resources such as keys or potions and other necessary information. Step 42 is merely a reading of the player controls 11 to determine what action, if any, has been requested by the player currently being processed. Step 44 is an access to the data record for the particular character to determine if the special attribute is present or to obtain any other information needed to perform the requested function. Step 46 symbolizes the process of actually carrying out the requested function, and involves accessing the proper graphic data to display the exercise of the special attribute or to place the character in the maze or to show shots or to increase the character's longevity attribute in accordance with the number of new coins received for that character.

Either ater performing block 46, or if the answer to the test of block 42 was no, the computer 12 tests to determine if all the active players requested actions other than move have been processed as symbolized by path 47 and block 48. If not, flow goes back to step 42 to process the control inputs from the next player as shown by line 51. If the answer is yes, control flows to block 50 as shown by line 52.

Block 50 symbolizes the action of the computer 12 polling the current player's movement controls to see if the player is requesting movement of his character or shots from his character. If yes, control flows on line 54 to block 56 to determine if the desired movement would cause a collision. The collision test is to determine if the character's movement or shots would cause collision of the character or his or her shots with walls of the maze, monsters, attribute affecting items such as limited resources, the boundaries of the current window or an exit to another maze or another level of the same maze. If the answer to this test is yes, then control flows on path 58 to a collision action routine 59 which will be detailed below in connection with discussion of FIG. 5. If there is no collision, the computer 12 moves the character or his shot to the desired position by calculating the amount of the desired movement in known fashion and updating the character's record or the shot's record in the data base by changing the x and y coordinate fields in the data record for that character or shot as symbolized by block 60.

After the character or shot has been moved or the collision action routine has been performed, control flows to the test of block 62 to determine whether all the active players have had their control inputs processed. Block 62 is also entered if the answer to the test of block 50 was that the player did not desire to move his character. If all player's control inputs are found in block 62 to have not been processed, control flows on path 64 back to block 31 on FIG. 3 to pick the next character and process the corresponding player's control inputs. Processing then proceeds as described above.

If the answer to the test of block 62 is yes, control flows to a block 68 which will be described below.

Although the computer services only one player's inputs at any particular time, this process is invisible to the players since the processing is so fast that it appears simultaneous to them. There are no assigned time slots for each player during which he or she may operate the character controls where at all other times the controls are "dead". Each player may move his controls at any time, and the computer will appear to respond instantaneously. Of course there are situations to be described in the description of the collision routine where the player may wish to move his character but his character will not move because of a collision with a wall, the screen limits, etc. However, even when this occurs the character may still do whatever other things the character can be controlled to do, and the controls are not "dead".

After all player control inputs have been processed, control flows to block 68 where the window is moved to a new location, if required, corresponding to the new locations of all the active characters, i.e., those characters whose longevity attributes have not been reduced to zero. In the preferred embodiment, the new window location is determined by calculating the center of all the active characters and placing the window such that all the active characters are displayed in the window. However, in other embodiments any other method of determining the new window position will suffice for practicing the invention. It is only critical that whatever method is used be such that all the active characters be visible in the window after it is moved.

After the window has been moved or scrolled across the maze to its new position, the processing of block 38 on FIG. 2 is complete, and control flows on path 39 to point B, block 41 on FIG. 2, This step is to find a monster or a monster generator which has not been destroyed by the characters which may be used by the computer 12 to attack the players. Once a monster or a generator has been found, the computer 12 tests in block 43 whether what has been found is a monster or a generator. If it is not a monster, control flows to block 45 to generate new monsters. If it was a monster, control flows on path 74 to routine 76 to move the monsters to attack the nearest character or characters. The routine at 76 may be any one of several different processes, e.g., the positions of the monsters may be compared to the position of all the characters to determine the closest character and the monsters may be moved only toward the closest character, or the positions of the monsters may be compared to all the characters and the monsters may be split up such that some attack each active character. The process of moving monsters by updating their data records in the video data base and calling up the corresponding graphic data for the monster at the appropriate time is well known and any known code to accomplish this task may be used to practice this aspect of the invention.

Referring again to the main loop flow chart of FIG. 2, after the process of block 76 is performed, control flows on path 78 to the process of block 80. Block 80 represents a test of whether any of the monsters have collided with any of the characters being attacked. If the answer is yes, then control flows to block 82 where the longevity attribute of any character which collided with a monster is reduced. This is a process of accessing the data record for each character which suffered a collision with a monster and updating the longevity field by subtracting some assigned number of longevity units thereform and then rewriting the record in the data base.

After the process of block 82 is performed, control flows to the test of block 84 where it is determined whether all the monsters have been moved to attack characters. If not, control flows back to block 41 to find the next monster or generator, and processing then proceeds as described above. If all the monsters have been moved, then control flows to block 86 where the computer 12 waits for the video display driver subsystem 26 to signal that the current frame has been displayed. This fact may be determined by an interrupt from the video display driver subsystem 26 or by polling of the video display driver subsystem 26 by the computer 12. After the frame is displayed, processing returns to block 34 on FIG. 2, and processing proceeds as described above.

Figure 4:
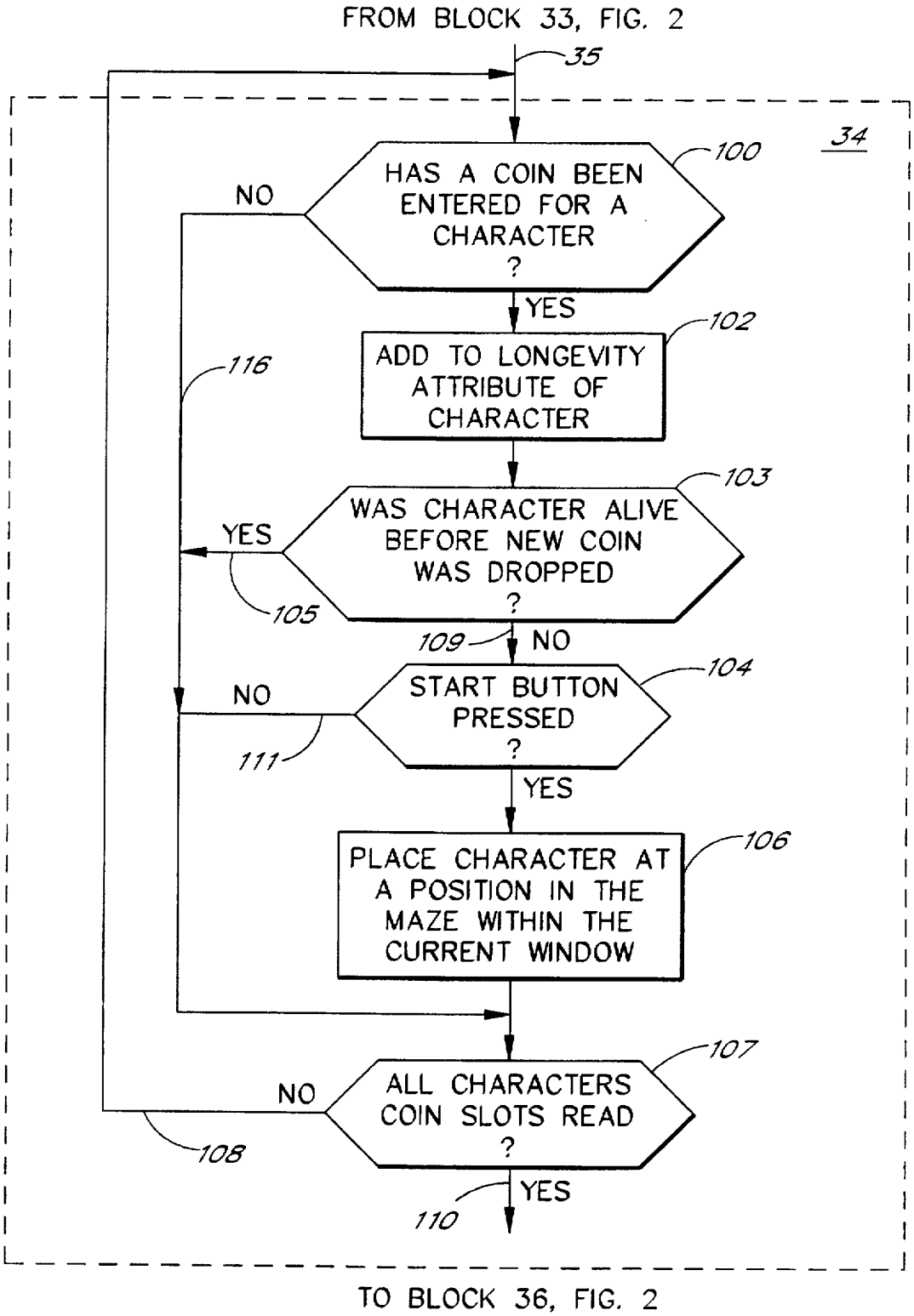
FIG. 4 is a flow diagram ofthe substeps in the process for checking for the addition of new coins by existing or new players and for starting new players in the game by placing their characters in the current maze.

Referring to FIG. 4, there is shown a flow chart for the processing sequence the computer 12 follows for starting a player. The flow chart of FIG. 4 is an expansion of the process represented by block 34 in FIG. 2. Block 34 is the process the computer 12 implements in allowing any one of a plurality of players to enter the game at any time and bring an unused character to life and control that character. This process may occur regardless of how many other players are playing (providing there is an unused character available), regardless of how long they have been playing or when they elect to leave the game or when their characters die. The computer 12 loops through the process of FIG. 4 once for each character.

The first step in the process of FIG. 4 is a test shown at block 100 to determine whether a coin has been dropped for the first character for which the loop is performed. In the preferred embodiment, adding coins allows a character to start or increases the longevity of a currently active character. Accordingly, if the answer to the test of block 100 is yes, block 102 is performed to add to the longevity attribute of the character for which a coin or coins was received. The longevity of the character is increased in proportion to the number of coins which were received. This is done by accessing the character's data record and adding some number of longevity units to the longevity attribute field of the data record.

In the preferred embodiment, the test of block 103 is performed to account for the case where a coin is dropped for a character which is alive and whose player wishes to extend the life of that character. In such a case there is no need to place the character in the maze or to wait for the player to press the start button, so subsequent steps in the process of FIG. 4 will be skipped and control will flow along the path 105 to the test of block 107 to determine if all coin slots have been read to detect the presence of new coins. If the character whose coin slot received a coin was not previously alive before the new coin was received, control flows along the path 109 to the test of block 104.

In block 104, a determination is made whether the start button has been pushed by the player corresponding to the character whose coin slot received the new coin. If it has not, there is no need to place the character on the screen, and control flows along the path 111 to the test of block 107. If the start button has been pressed, the computer 12 accesses the graphics data for the character and creates a data record for that character placing it somewhere in the current window and writing the fields of the data record to reflect its current longevity attribute and position and assigning it the attributes that said character has. This process is symbolized by block 106. The initial values of attributes assigned to the character may be stored in a look up table. In some embodiments, some or all of the attributes of all or selected ones of the characters may have their values changed by the computer 12 based upon prior events which happened in the game, e.g., collisions with treasures, potions, keys, thieves, etc.

After the process of block 106 is performed, the test of step 107 is performed to determine if all the coin slots for all the characters have been processed. If they have not, control flows along path 108 back to block 100. If all coin slots have been read, control flows on path 110 to block 36 in FIG. 2, and processing continues as previously described.

In embodiments suitable for use in the home, steps 100, 102 and 103 are not present as coins are not customarily used in the home environment. In such embodiments the test of block 104 is performed as the first step of the process of FIG. 3.

Figure 5:
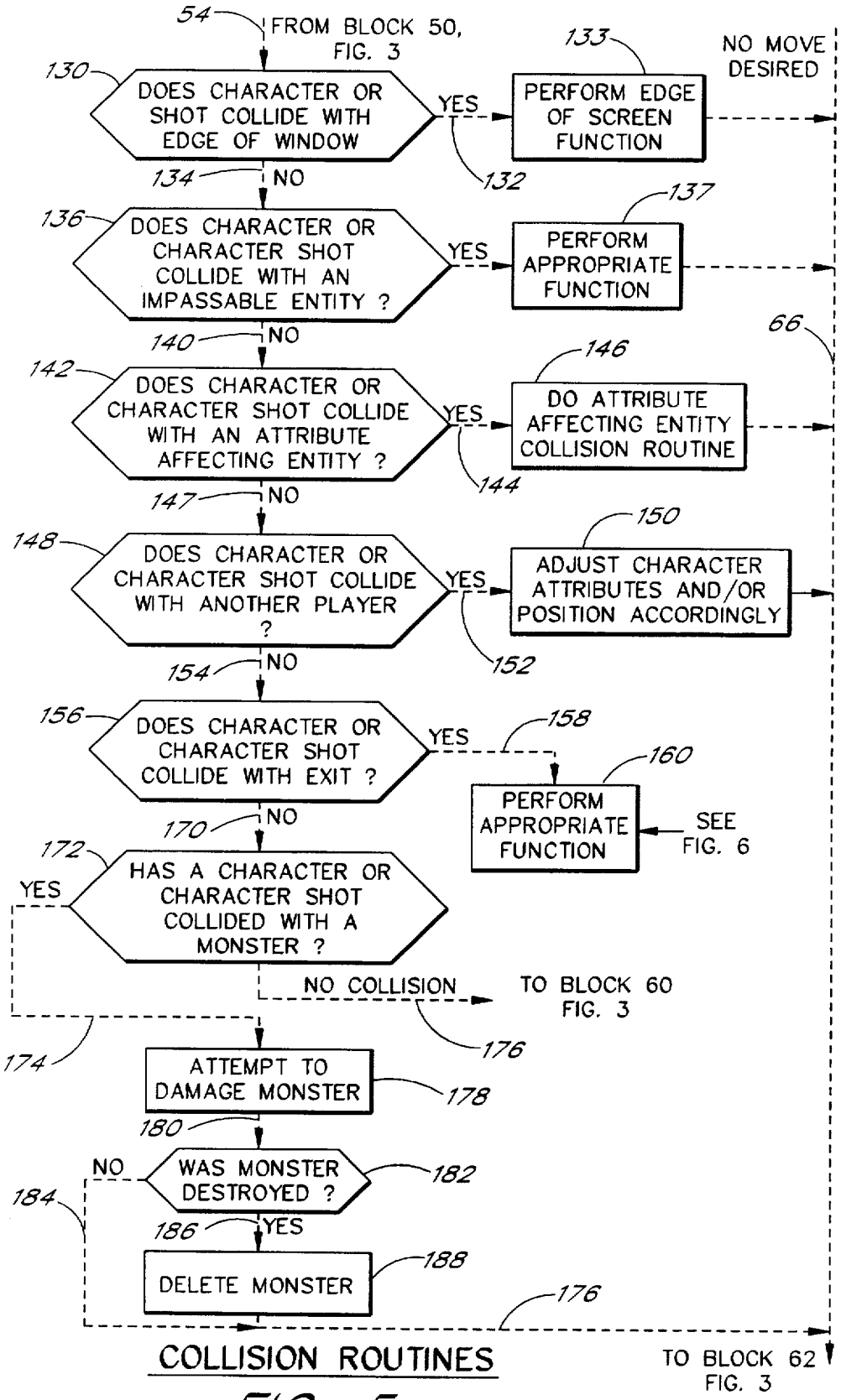
FIG. 5 is a flow diagram of the substeps in the process of checking for and processing of collisions of characters or character shots with monsters, walls, attribute affecting entities, exits, etc.

Referring to FIG. 5 there is shown a flow diagram of the collision processing performed in blocks 56 and 59 on FIG. 3. It is this processing which causes attributes to be affected both positively and negatively and which forces the players to cooperate to at least some extent. If the result of the test of block 50 is that the player does not desire to move his character, then control bypasses block 56, and control flows to block 62 on FIG. 3. If the result of the test of block 50 in FIG. 3 is that the player desires to move the character currently beng processed, control passes along path 54 to a collision test in block 130. If the test of bock 130 indicates that a collision with the edge of the window would result, then control flows on path 132 to block 133 where an appropriate edge of window routine is performed. The exact details of the edge screen routine as to processing of collisions of shots with the edge of the screen is not critical to the invention. In some embodiments, the shots may be allowed to continue past the edge of the screen, and in other embodiments, the shots are caused to disappear when they collide with the edge of the screen, i.e., the window edge. However, if the collision was between s character and the edge of the screen, the character is not allowed to move until the current window position is moved except in certain circumstances. After the process of block 133 is performed, processing flows to block 62 on FIG. 3 along path 66. There, processing proceeds as described earlier. Block 130 is the portion of the program run by the computer 12 which encourages the players to cooperate in the sense that all the active characters must move through the maze toward their objective in such a manner that they all remain simultaneously visible in the current window. For example, assume that one character's longevity is getting low, and thus that player needs to get his or her character to a longevity increasing entity. Such an entity could be food, a power source, a healer, etc. located elsewhere in the maze at a place not currently visible on the screen. Because of the processing at block 130, the character whose longevity is low may not move further than the edge of the current window or screen edge toward the longevity increasing entity until the other characters decide to move with him toward his or her objective. Actually, in the preferred embodiment, the character desiring to move toward the off screen food may only move until the character reaches the current edge of the window and then will be blocked from further movement until the edge of the window moves. Sinde the window center is recomputed every frame based upon the center of the characters, If the characters are cooperating and moving in the general direction of the objective, the window will continue to scroll over the playfield until the objective is within the perimeter of the window. In other embodiments, one character may cause the current window to move by his movements alone in certain circumstances. Those circumstances can be defined to exist when the center of the currently active characters is such that there is room for the window to be scrolled without causing the edge of the window to collide with another character. In such a circumstance, the character may move to the edge of the current window and continue to move thereby causing the edge of the window to move with him or her until the window has moved to a point where another character has collided with an edge of the window. When the window can no longer be moved without causing an active character to disappear from the current window, the characters are under constraints in that they may only move in directions which will keep them in the perimeter of the current window. The foregoing situation persists until cooperation among the players cause them to move in the same general direction such that their collective center is located so as to allow the current window to be moved to a new position with all characters still visible in the window.

After the players have cooperated enough that the current window contains the desird attribute affecting entity within its perimeter, then cooperation is not longer necessary. At that time, the players may begin competing against each other to take possession of the attribute affecting entity for themselves. Each player can decide on an individual basis whether to continue to cooperate and subjugate his self interest to the interest of the group or to act solely in his own self interest.

Other forms of cooperation in the game include the ability of the characters to simultaneously move as a group and to protect each other flanks by fighting all monsters approaching in their assigned zones of defense for the group. Another form of cooperation is the decoy strategy. This strategy relies upon the fact that the monsters are attracted to player's position to attack them, and generally are attracted to the closest player. The decoy strategy is to use one character as a decoy or magnet to attract the monsters while the other characters ambush the monsters from positions further away. Another form of cooperation in the game is the ability of the players to share the limited resources. The players may decide among themselves to allow the weakest character, i.e., the character with the least longevity left, to have all the limited resources. Or, in the case of multiple piles of limited resources, the players may divide them among themselves to best utilize the longevity enhancement effect for the good of the group. Another form of cooperation is to allow the character with a particular attribute to obtain possession of a particular limited resource if that character may use the resource more effectively for the good of the group than the other characters in the group. An example of this would be to let any character with extensive magical powers to obtain a possession of a magic anhancing resource as opposed to having a character with limited or no magical powers take possession of the resource. The portions of the program which implement these other possible forms of cooperation will be described below in connection with, inter alia, block 146, 150, 160 and 178. Certain other aspects of this cooperation feature of the game are implemented by portions of the program described above, e.g., blocks 80, 82, 42, 44 and 46. This cooperation aspect of the game provides for very exciting action and interesting social interplay among the players.

If the test of block 130 indicates no collision with the edge of the window would result from the move (in some embodiments the character is moved, a collision is found, and the character is moved back), then control flows on the path 134 to a test symbolized by block 136. This test determines whether the move would cause the character or his or her shot to collide with an impassable entity such as a wall in the maze. If the answer is yes, control flows on a path 138 to a block 137. There an appropriate routine is performed to implement the effects of the collision. The details of this block 137 are not critical to the invention, and the processing performed in block 137 may cause any type of action the game designer desires. For example, the character my be stopped, the shot hitting a wall or trap may destroy th wall or trap or may cause a cloud of poisonous gas to be released. Any imaginable action may be performed by the block 137. After the processing of block 137, process control flows to block 62 in FIG. 3 via the path 66.

If the answer to the test of block 136 is no, control flows on a path 140 to the test of block 142. This is test to determine if the move would cause a collision between the character or the character's shot with an attribute affecting entity. Such entities may be any typical video game entity such as traps, black holes, time warps, keys, potions, objects which have fallen into the maze, treasures, food, energy or power sources, healers, etc. Neither what the entity [or] *is* nor its affect on attributes is critical to the invention. Typically collisions with such entities do any of the following things: increase longevity; decrease longevity; enhance other attributes such as magical powers; decrease attributes; add new attributes such as different movement abilities, e.g., jumping or flying; change fighting ability; change armor capacity; and/or provide the ability to leave the maze through an exit.

If the answer to the test of block 142 is yes, control flows on a path 144 to a block 146 where the attribute is changed accordingly by accessing the data record for the character and adjusting the field of the attribute affected to implement the change. After this process is completed, control flows on path 66 to block 62 on FIG. 3.

If the answer to the test of block 142 is no, control flows on path 147 to the test of block where a determination is made of whether the proposed move would cause a collision of the character or character shot with another player. In the preferred embodiment, one character may push another character and move that character's position in the maze until such a time as the pushed character begins to push back. In other embodiments, the characters may be able to shoot and damage or destroy each other or otherwise hinder the progress of other characters toward their objectives. This feature provides for the competitive aspects of the game once a desired attribute affecting entity is located within the perimeter of the current window. If the answer to the test of block 148 is yes, control flows to a block 150 along path 152 where the characters have their attributes and/or positions changed in accordance with whatever competitive rule is adopted for the particular embodiment implemented. Of course player competition can take many other forms as well. For example, one character may refuse to move when that character is preventing movement of the current window toward the objective of another player. Further, one character may refuse to cooperate in shooting or fighting monsters which are attacking another character. Also some characters may be faster or be able to jump or fly, and these characters may speed ahead of another character which is headed for a longevity increasing entity and take possession of the entity for itself.

If the answer to the test of block 148 is no, control flows on a path 154 to a block 156. There the proposed move is tested to determine if it would cause the character or character shot to collide with an exit. If the answer is yes, control flows on a path 158 to a block 160. There the appropriate action for the rule adopted for the particular embodiment at hand is performed. The particular rule adopted for processing in block 160 is not critical to the invention. The processing for block 160 in the preferred embodiment is shown in more detail in FIG. 6.

Figure 6:
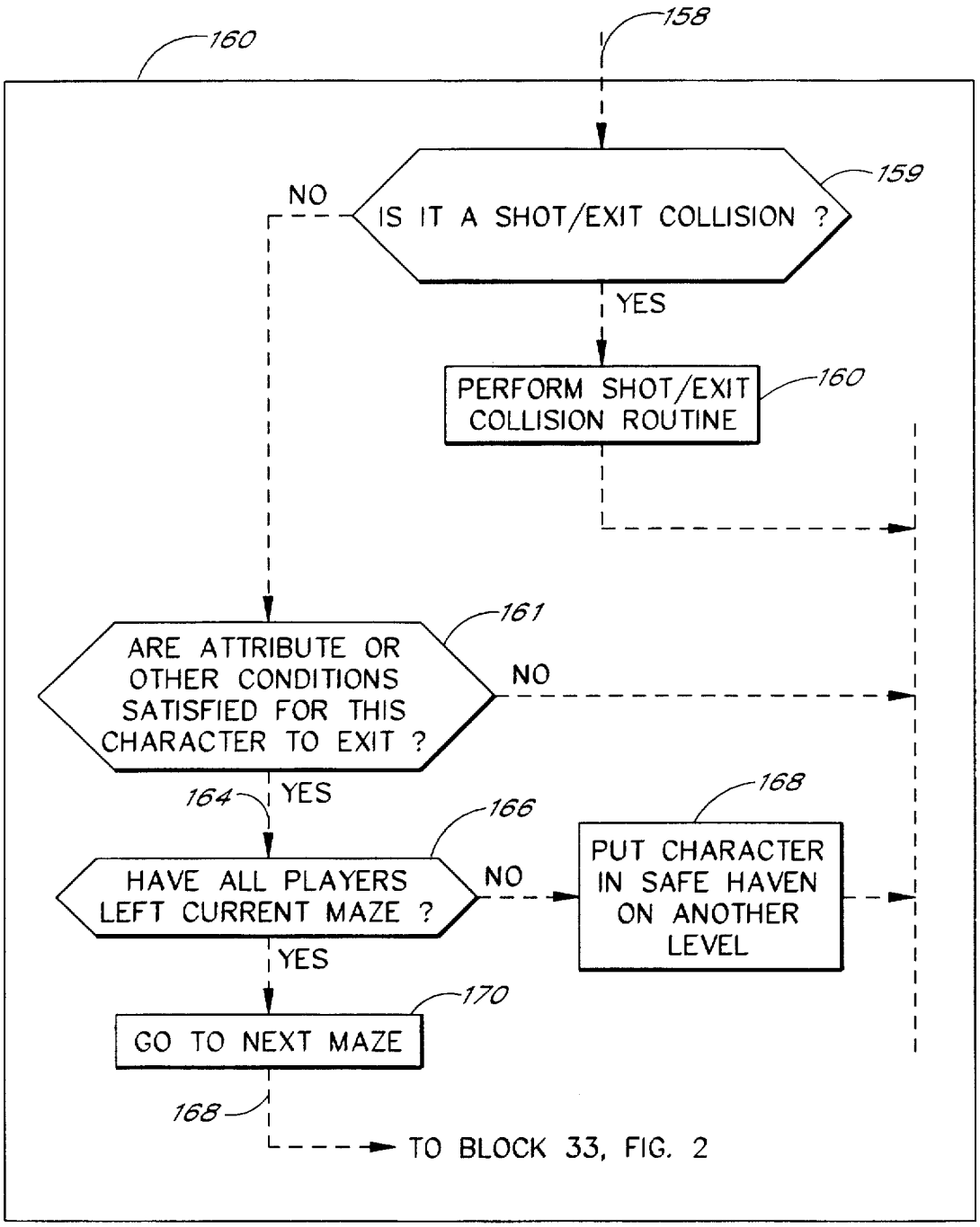
FIG. 6 is a flow diagram of the substeps in the collision processing routine for processing collisions with exits.

Referring to FIG. 6, the processing of collisions between characters or character shots and exits is detailed for the preferred embodiment. The processing of FIG. 6 is to determine if the game conditions, e.g. attribute status of the character such as possession of a key, are such that the character may pass through the exit, and to determine what to do for a shot/exit collision. Accordingly, the first step in the processing is to determine if a shot/exit collision has occurred as symbolized by block 159. If the answer is yes, processing proceeds to block 160 where an appropriate shot/exit collision routine is performed. In some embodiments, the shot may disappear, and in other embodiments, the exit may be destroyed. The possibilities are numerous, and any may be used in equivalent embodiments of the invention. If the answer is no to the test of block 159, control flows to a test symbolized by a block 161 to determine if predefined conditions for exit by a character are satisfied. The predefined conditions may be anything the game designer desires, and the exact conditions selected are not critical to the invention. For example, in some embodiments a character may not be allowed to leave through an exit until a particular monster holding the key for that exit is destroyed and the character picks up the key. If the answer to the test of block 161 is no, control flows on a path 66 to block 62 of FIG. 3, and now movement of the character through the exit results. If the answer to the test of block 161 is yes, control flows on a path 164 to a block 166 where a test is made to determine if the other characters have left the maze. If the answer is no, the character desiring to exit is allowed to exit and is placed on another level in a safe haven where the character cannot be attacked by monsters as symbolized by block 168. There the character awaits the arrival of the other characters.

If the answer to the test of block 166 is yes, then processing proceeds to block 170 where a new maze is drawn. In some embodiments, the new maze will have different kinds of monsters and attribute affecting entities therein and usually will have exits, monsters and entities placed differently. The character exiting is then placed in the next maze. In some embodiments, the characters may only move forward to new mazes which they have not previously occupied. In other embodiments, the characters may move back to levels or mazes which they have previously occupied. Control then flows on a path 168 to block 33 on FIG. 2 and processing continues as previously described for the new maze. In some embodiments the characters attributes remain the same in the new maze, and, in some other embodiments, the character's attributes are changed. The order of exit may be determine in some embodiments the position the characters will assume in the new maze.

Returning to FIG. 5, if the answer to the test of block 156 is no, control flows on a path 170 to a block 172 where a test is performed to determine whether a character's shots or character have collided with a monster. If the answer is yes, control flows on a path 174 to a block 178 where an attempt is made to damage the monster. In embodiments where the characters have different attributes, often the shots of one character may not be powerful enough to kill a monster whereas the shots of another character may be powerful enough to kill a monster. Further, some monsters may be stronger than others. To account for these embodiments, the process of block 178 is implemented to perform damage routines to monsters which have collided with characters or shots. After the process of block 178 is performed, control flows along path 180 to the test of block 182 to determine if the monster was destroyed. If not, then control flows to block 62 in FIG. 3 along path 184/176 to path 66. If the answer to the test of block 182 was yes, control flows along path 186 to a routine symbolized by block 188 which deletes the monster. Control then flows on a path 176/66 to block 62 and processing continues as described above.

Although the invention has been described in terms of the preferred embodiment herein and the other alternative embodiments, those skilled in the art will appreciate still other equivalent embodiments which may be implemented. All such embodiments are intended to be included within the scope of the claims appended hereto.

```
%4E6A4800038000000380320000000AB000382DE0003FDA0000000000000000000000000000000
%4E69C80003802000000000000000000000000000000000000000000382DE0003833D0003839F0003
%4E612800038040840300038497000385010003857100038 5CE0003868C0003879700038915 0003
%4E650800038060 8ABE00038BA000038CE600038DBA00038F3600039 0B900039 23C000393730003
%4E646800038080942300039 50D0003966400039 7E600039BB00003999C00039AE400039BF60003
%4E6388000380A09D2600039E320003800000038 18F0003997200039A7C00039C1500039CBD0003
%4E6548000380C09E4B0003B30D0003846F000385F00003873E000388AF000389D600038A830003
%4E6498000380E08B7E00038C2300038DA500038EBD00038FBD0003915C0003924700038000003
%4E60C8000381008 10B000381B7000383170003845700038595000392EB0003938800039433 0003
%4E6518000381209 4FF0003961E0003971C000397BB0003989000039991 00039A5E00039B4B0003
%4E64A8000381409BD900039CE200039DC700039E7C0003800000038686000387700003888B0003
%4E6198000381608A0700038B0A0003810700038 1E7000382A2000383810003 84B80003858D0003
%4E6398000381808 66C0003874100038842000388FD0003897C00038A4D00038B0000038B820003
%4E65F8000381A08C1700038D1900038CB800038DC800038EB900038FAE0003906900039228 0003
%4E6378000381C08E3000038EE600038FBD0003905400039110000392020003 92FF000393BE0003
%4E6008000381E09509000395A1000396350003970300039 7C6000398650003990A000000000000
%4E62D8000382000000000000000000000000000000000000000000000000000000000000000000000
%4E62F8000382200000000000000000000000000000000000000000000000000000000000000000000
%4E6318000382400000000000000000000000000000000000000000000000000000000000000000000
%4E6338000382600000000000000000000000000000000000000000000000000000000000000000000
%4E6C7800038280000000000000000000000000392F5000393540003 93DA0003947600039501 0003
%4E64A8000382A09651000396E3000398100003993D00039A1F00039B1D00039BD500039CBA0000
%4E64E8000382C000000000000000000000000000000000000000000000000000000000000006564
%4E6D08000382E07A000000000000000B5A5B49D51B53C208C205C528DFCC2BDFDFDFDC1B5251DF
%4E6A0800038300DFDFDFDFDFDFDFC1BF71717 1C23FDFC24FCF4FCF4FCF4FC8A2B40391DD35DA1A
%4E6068000383 20D91ADFDA28CB2BC719D11AD91ADFD1B9D01AC3BE06C035C40466CC070065647A
%4E6818000383400000000000511009A8595A2880C22CA04570C32BCA06E54679CC044570CD1BC6
%4E6D98000383 60350446D70446C66FC046DFDFDFDFDFDFDFD1BFCBBFCABFDFDFDFD8BFD1BF
%4E6778000383 80DFDFDFDFC86FDFCBBACABA6FD705535153DFCEBEC4B9C564BAC11BC51BC10065
%4E6A98000383A0647A000000000101359 5A0468DE35DFC4057741E141DFDFE260D72AFA75E060
%4E6658000383C0DFD22841DFE7F9DFDFCBA1E8E440D328D1BFF54CE542EBE9DFC12A77614DF360
%4E6608000383E0EB41EAEADFE8EC76EF61EFDFE061E66C73DFD0A4F170C01BEF60F203BE35D952
%4E6908000384 00E0060065647A000000000003216 85E5B5A7A2849CD192859C32ACBAFA646D01B
%4E61D8000384206CC82A57DF1BC62A2844AFA1288169DFDA1E61C5A859CB35C52CC01C6FDA2881
%4E64E8000384 40DFC21DD61ADFBF60CC05CCA2DD08C2BFCEB8C5BFC1BF1AD3040CDD040CDD040C
%4E6358000384 60521C21CC8BFC30CC30CC1040CC1BF2845C9BDAC7679CF1CDE28C9B3AFA2B74A1D
%4E6C5800038480471D6EDFC0BAAFA8BA2881CB195CC3BE06627FC80065647A000000000020044F
%4E6378000384A05F686B1F825A506AB27D70D1ABB2AB56D628D320DFD5AF6F7EDFD2A645F8D10F
%4E68C8000384C0ECDC2047DFD306CEBFOF8140D30F4182DFC9B8DFD7BFD6BFCFA7B8D0BFFE1F6D
%4E6408000384E0CEAFA0BF4BD40F48D40F6541D40F61C4B7A9C2A9B743DC0F40DC0FBE0FCD054D
%4E67B8000385000065647A000000000310368 5AA5662C804440C5542840C4272AFC65FFDB1AD3
%4E68B8000385 20B4EAC3B5DFD52840D7ABD82840DFDF7976CEA8B9C4B9A8DFDFC2BF5D05CD5FDF
%4E6538000385 40D3A9C5A87E76DF49DAABD728C02BDFD4A5C119E3D51A66DFE1C5B9C4B9C5A663
%4E67B8000385600828DB1B41BE0445B528C453286B62A460065647A000000000102168595A5B2B
%4E6418000385 80A0DC06C218D11B2848DEABC5AB52D92843DFC62ADA1B4E70DFC32CC5AFAADFC2
%4E6958000385A02A5841DFDF534259DDBF4AD3AFA9DFC2BFD2196FDFDF496ADF41C6AFA8B5DFDF
%4E6D5800038 5C018CF056FDC28DE28DE28BFDD2800636C650737000008009 8D15D046876A0067B
%4E6FF8000385E0A02A3A81C618E421CCA4CC43CDA11DA11DC153C748E6C1A2CE2AE1117AA3CE41
%4E6238000386 00C414C7A8E711F5C7A2F4C9A2D2A226680A62ACDA5C81CA660EC7AC2A6C9A5CF
%4E6CF8000386 2044C81FA1D242C8A5C3C9FA4240C811A0F1E011C811ADC64163F0C7A5D1A16AA8
%4E6C6800038 6450286280C4A3D0A5C214C311A072D01FA2C511ABCB20A0CA14C5A1E0CB20A4EE3B
%4E6FD800038660A5C726A9C21AC03981E3D0191AA2CA3BA3CE2AA4C4B2A128C1A5CD2CA2CB2AA0
%4E6828000386 8035C31ACA18C03BA0C41AC20065647A063302010024 57587B984A2A806241C206
%4E6AC8000386A028C02A60C019C02A0A811A81C206CC19D22866DB1970814 1400A81286877B4AC
%4E67A8000386C0286040404 2C0194070803 28C32A708228AFA31A40C3513BC12AC25019C25028
%4E6A0800038 6E009C0502844D03BC1094CC21881CA196163C4A5288340 83C0094A444C0942A760
%4E6DA8000387006 5C8A628C35A533B5028C35DAB28616344C218B142C02A708028BF28CBBFA4BF
%4E6ED8000387 2041C1BFDF4CC3523BCE5328A6B267C2513B18A72BC31838CBA52CC3513BC338C1
%4E6A9800038740054842C6BFC6A52842C619620647180618 28A64C43C2522AC2562843A76864C1
%4E6AE800038760A6C41A4CC2502 8C3513BC438A428B3A60A4CC01840Z0B47081 71627E8475D228
```

Appendix A - MAZES ©1985 ATARI GAMES, CORP.

```
%4E6A6B0003878084a1C1BE2A0A8140B82843B961C1BE3B0B82BE2CC21A00636C650814071B0020
%4E67FB000387A0455B7517BB6440A01B8164C12180C113A02B1BB0A01EB1C121A04680A721E035
%4E6BFB000387C0C8A641A0E721C1A47221C703A0C1A1E0E1C317C10E7C04A02BE11BA0C80E72A0
%4E69BB000387E0E2C4041BA1C21E60C1B3520EB27C04C005C6B2C1A30E780B80C00604C8040304
%4E69FB000388000C9A2C103A3B2C7041804C303A0C82ACOB9C503C1B4C00381C8216BC1B51180A0
%4E6A8B000388200EBC128AAE11180A0C3584B8004C02AC01281E21180A2B81143C028C3BBC4B2A1
%4E6BDB000388400B735E260C12811BB17510B81C21369A0C828C2BF7135BBA028A81AC0A928C017
%4E6E3B000388600C0722880A0C2B3C21A1BA0E6C60BBFE1C404C42AA0E1C7B341E3C2A2C428AA2A
%4E680B000388800C1732880C027B144A0C01180A0C004C1041B40A0C1B2C2A1B5C4B5C0B2A0C011
%4E6A3B000388A0A0C204600403E1C104CE11A0C0A443E235B5A5B4A645A1E1C1A1E143E2C12862
%4E6D0B000388C0A0E040A0C12AC52842A01BE4E2E01BE0C7A503A8E0E12CA011A0E8C013E5E3E1
%4E6DDB000388E02DA0E043C1B2E0E0C0B2C12061E2E2E7E620A11EA5E2C0A6C4A1E0E0C0B2A0C3
%4E68FB000389000C80E4C4BBC1BE20A02ACA0C811BA0E51EC004C100636C65021F0000001138 7B
%4E6688000389200B5284338862A3828A020A01AA020A01AA020A025A22545A7414040E0E0C01984
%4E6AF800038940CE0E0E0E0E0401CC01FC025C206C3A342E040404040C01985E5170EA0E3E0E0
%4E6D4800038960E0E04025541F541C5446800B3BA1E2E040E0E0E5B346A1B2A1CFA1ECC1A1CAA1
%4E6D2800038980E91828E31DC653C1A12AC518E138A03828C23BC0A1C1A61AC028C22E70E22AA0
%4E68F8000389A0E526C0A1C010E3C02051C1A13504C02838A038A0C6A1E1E4C12AC0A1033504C0
%4E6818000389C028E0C6A1C810A01AA11AC035043504C339B6A0C1A10380A0E1C5A110A1033503
%4E6988000389E03504C23918A1E061A1E242A0E1BF2A0435043504C13981A1C105C1A1E438C0A1
%4E6678000038A002B703503350365A1E228A144A0C0B2A135043504662DA1C0A1E1C5A110A10335
%4E6818000038A20036AA1C22AC110C128C0A11AC035046AA1C6A1038028C1A103673BC1A1C020A0
%4E6AE800038A40C5B213C3A165A6C1A1C4280380A1C313C13BC1A11AC03B1839E0C21AA0C328C0
%4E6EB800038A60B2632851E32A3983C4A1C0B6A0CA28C0A12C3ACDA1C91A2AA0B2A0C3A9C1A1E9
%4E6CB800038A80C03BC41888C2A1C3601DC104C013C418A618C4A3E5C03BC0B3C21888CC10C0A2
%4E688B00038AA0C2B40AB20DA210B216B4C9BEC1A1C33BC0043504350435043504350468006 36C
%4E6A5B00038AC065173B0C1F008019684B396A388AA035A04F70A8C1381081C3A7641B810B7040
%4E6ABB00038AE0E2211073C0152615C03B65806080E61080C2B2C2154EE54364B14AE6681BC9A6
%4E6D5B00038B00C2A6B2A5038146C02110E577CD1080E6F3CD17C23BCB13AD2617CDB2A0CB1726
%4E608B00038B20D21013C917C4BBCC2110DCBDA1C1A446C4BFCE05C7172615C7BFDC28D6A4C21A
%4E6CEB00038B40C2A80382C935C91B434DCC1841CC1021104EC239C53B73C7398242C21BC5A5B5
%4E6F0B00038B60C83B8139835239D73935704CD028CB0E270E4A43C8BF4881C03A812BC039EBC9
%4E6EB800038B80E01BC13A3981C01BEBD11BC6BF61B3C13BC2BE06C1BDC2355B1B53681B810BC500
%4E6B5B00038BA0616161033800040014446 85B39BB2E80D339C0752BC221C451C2A6715169C451
%4E6AE800038BC0E2C124C01EE1C251CD51E2C051398351E0C2511380C951E244E4C2511480C751
%4E6D3800038BE0E2C2A6E2C251C751E2E242E2E2C251C33B8051E2E2C339E3E2C2511880C03951
%4E6D8800038C00E2C119A0C2A11BA1E2E2C2513A81E2E2E2C0523952E0E2E2C251C3E2E219E5E2
%4E6138000038C20E2C43BA0E2E2C2A2E2E2E2C439E5E240E0E2C539EAE2E4E2CA24C439C4A2C439
%4E6A3800038C4064C1BF45C024E40C41C224404066C3523952C33AA0B2C1B2C0523952C324F4C1
%4E61D800038C6019A0C9B63956ECE2C2B6C05639B6E3CBA1E2E2E27FC319A0E2E2D239E1E2E24B
%4E6E5800038C80C7B71830A1E219E1C351E4BBC7523952E2E2C35173A1C13AC2BA42E2E2C351C4
%4E6CF800038CA0A1E2BBC2A6E2C35143A1C2A12AA03A43E4C351C4A1C2A1C12CA0C13984E0C351
%4E6B9800038CC063A1C2A1E451C02160C051A0C351C31EC4A145A6C351C324C1BE05C0A106CF39
%4E69A800038CE051C327C12A00636C650700071B0014276851 4B58DE18DAA2C00670D62CC105A3
%4E6CB800038D005FA8622AC21BCB1B810BC335126312C2AB5280C3A1B4C1B40381C11B42DFDF62
%4E6D7800038D20CDA66821A8C535C12A356BC22CC0196921117040C12A4AC60ED5B8A2C41D0ED4
%4E6C6800038D4011C6B50E4C66211145622111BF6F46C1B7DB2841C4BFD3A703C917BB17491C11
%4E6D8800038D608174C71727A6C3A7CA1781521BC4352B112111485981C2BCA9DD28DFD2285E80
%4E6D5800038D80CDA6C81B0B4049C0352C0E80C20EB3C6A9C0A3B8A71E0E73402A4024C01B0B80
%4E6AF800038DA00435CC0E804371B252810435CE0E81BE28BC55810435CF0E1D00636C65081407
%4E65D800038DC01B0000135B7517046440A01B8164C12180A0C013A01B81A01EB1C121A04680A1
%4E6C9B00038DE0E1C0A12161C8A641A0E1E1E121C1A40BC221C703A0E0E0E1C517C10E0BCB2BA1
%4E6E7B00038E00E21BC90E0BE2E2C518A1C21EC3B3520E820BCE05C6B3C50E0BC80B80C0067369
%4E6C2B00038E20C92BA2C103A3B2C90384A0CAB9C503C1B5C218C8216BC1B51180A0C0720372E7
%4E6A5B00038E40C128AAE11180A0C12A80584B8004C21281E21180A2B81143C028C3BBC4B2A1B7
%4E6C9B00038E6035E260C12811C017510B81C213CB2B35A0C828BCC1BF0B61BBA028A9C0A928C0
%4E6DF800038E8017C00BC22880A0C2B3C21A1B80A0E5C4A10BBFE1C404E5E1E72840E3C2A2E2C0
%4E6AC800038EA028C0A92AC10BC32880C027B1C1B4C221A01180A0C41840A0C1B2C2A1B5E528A1
%4E6B3800038EC011C371607103E1C104CDB211C0A543E235B5A5B4A4E144A1E1C1A1E143E2E261
%4E6D6800038EE0A0E040A0C12AC52842A01BE4E2E01BE0C7A503A6E2E12CA011A0E8C013E5E3C1
```

%4E6D1800038F00282DA0E043C1B2E0E0C0B2C12081E2E2E7E620A11EA5E3C0A6C441E0E0C0B2A0
%4E6C1800038F202BC30CA0E3C4BBC1BE1AA01ACC0C18A0E51EC004C100636C65C81BC71A092044
%4E687800038F40034E0449417 5C31976C8402404E07380C1197780E52B0141E1C0197081C34219
%4E680800038F607180C219E0E0402BA0E2C01970 81C20406047280E360C0A161B0E0C01970 80C2
%4E680800038F80421972C019E060826060E272EC6080616281E171E3C117C119E061608060616 0
%4E6CF800038FA0E2C21228A0E028C012E1CBA2E5C128A0E228E1E7E16360E0E0E428A00E8061E3
%4E688800038FC0C12B638228A035C435A028126081C32BE1B362801228A0C141C042E0280E6083
%4E68AB00038FE0B3A0C21862B028A0C22404C0042404E1280E12C31BC22C82B20E28A0C25241C0
%4E6A0800039000 42E22860B22C821883B40E12A0C605E60E80C0B4C6B60E80C028A0C242C042E2
%4E6728000390202812 61B6C4B30EC328A0C035042451C004240435E0280E8060 60B3C0B2B2B30E
%4E696800039040C41228A142C042A128126063B3E928C828A0608060EEC046E00E60F0C2280FA0
%4E6F08000390600F28E20EB061ECE0C10FA00FA00FE1E00E62EAE40F240FA0E40E80EBE2C10FA0
%4E6FA8000390800FA00FE1E2EBC6280FA00F28E661E6C6554455E6E3E2E5C21580E3E5C22BA0E0
%4E6B48000390A0C91582EAE041CA1584EA402404C91586CA0441C81588C94000636C650E2D071A
%4E6938000390C000001768D1584E2C80C0212844C121A0CB2AA01B504344E2E2E41BB0C711A61B
%4E6978000390E0E228A012A1C0A1C0A34381C20AE5E2E14421A103C80AE3C01EE0C121C1354250
%4E6858000391004 52A2843A0E1C021A07C8143C00AE2C311C1A4C1B31B71B1C10541E3C01E2860
%4E6728000391205 12A1BB0A0E27180B5C703A0E1C0B211C0B351547160A0C5B6214141E040562A
%4E6768000391407 0C02111A1E2118 0E542A1C0A272B211A0EC035E011E1B2A3C2A1C021A0E2C1
%4E6A3800039160351 1A0C21160E1E7C304C21EE5E011E1C1A1E9C21EC51160C0A328C1A1C5A140
%4E6AA8000391B0C3BFC0B2E3E11124A1C2A246C411A0E0E1E111A021A1C8B8E0C21160C1A1E141
%4E6B5B000391A0C0A155A2C11EE640E04249C31EA1E3E2C3A2C2068050C02AC3A12AA0E1E2C021
%4E66DB000391C0E111C1A1B7A1B5A4E011C020C0A1E22041A0C12049E0112 3C20440E035A040C3
%4E6B58000391E0A147E211C204E1C020E0C420C3B3C02780A2C2A128814240C10380B2C020E4E4
%4E6BE800039200EAC5A1C5A3EB1B80C120E7411EC11E54B3E11B51B3C62A60A040C3B274A118A0
%4E6A5800039220038 0A01BA5B5601C11A518748135CCA21BC7BE2C280EB235D02AC500636C6508
%4E67F8000392400607150014466 89E09842C80C03544C31928CD0681C02144C319A0038BC435C0
%4E69C800039260354 2C319A0CC722745C319A0E235C0038470722A4083C319A0E2C20D800E827E
%4E69A800039280 19A0E2C020C1180E28820403 82C219C51BA0E2C3B30D0E28431481C2A8E1E042
%4E6A1800039200D0E28352A803528148 0C611BEBC220410D800E810D0EB01824C02AC2ADB3AC
%4E6C0800039200 4D0EB161288008801B800983C8AFA6C90FB111B020CA2A1BE6C303A311AB1BC4
%4E60D800039 2E0A11AC927C924C52ABFC4B4C7A6C555BFD020C22A18CFA2B4C503C2A1B2EBC11F
%4E6BB800039300D1288054C2621ACAB4C5A3B5034245 83C035C2641D0DB4D0A1C7A3BAD0606A78
%4E6C4800039320288 4C2A2C30DC105E8C21BC01BC3660DC8611AC21B81C2BBA141C20DC33543C3
%4E6F4800039340BFE0E0C16435C3B5A3B3CDBBA4BA03C21DC00D80C1752AC11E81C10FB175B9A7
%4E6B9800039360BC62A0C0B2ABCEBEC01CC072727335BD2CCB0065647A022B071500035268645B
%4E6138000393 80 7ACA1A2AA0552CA01E46C105C5A4C0A7EED9AFAAC42A7324465CBAFAA444DD1
%4E61C8000393A0A153A0C3B2A2C21EA0DF46C4AFAB6467CD1A2AC4AFABE7C42AD5A1C2A1E228C1
%4E63B8000393C0A128E1E22841E6D5DFAFAA4463C619CA75AFAADFDF42C4AFABE472A02BA0E21E
%4E6B18000393E0C17822DFE57328A01E42B1C22AC12642AFAA56A024C5B242804080C02AA02880
%4E6F6800039400A056A059B2C4B3EBE3E2C019A0C2B4CF06E11BA0FB1BE1D6BEE351A0C319E161
%4E6668000394206828006 36C6508040401004124110B68A1E5C52AA062E34452C21AC90463C344
%4E6E0800039440 54A25DC071A063C80E83C3A4B2A6B2AA0E81C41AD40E83E4C72A7A0E81A0FD41
%4E6C9800039460 03A2C3AE22C743C11E50C81BA1C743E1F4C243F640A0C143C7A6CC43C9350450
%4E6038000394B0EAC13581C01EC705C004C01C55C263E256C6BFC762B4A3C827A2CA64CCBF18A0
%4E6038000394A050C003A1BFC32A6353EBC7BBA9B7E940E9E6FC5AC522C01BC61BA0C620A1C2A1
%4E6048000394C0E2C1B4AFA1BF2752C62C7622C3355DC0B2AFA5E3C827CF04C37A28A035C527C4
%4E6F28000394E004C6AFA9BAA128C204C31FC012C91CC012EAC4B2A0B2C2A2C3B2A0B2E2C3BE06
%4E6B5800039500A02AC819A012A02AC72AA052006 36C6518000714000 4264B680D06E8CC2AE1C1
%4E6DE8000395202A82C92CC1A41CA0C4A6C51AC11A66A0C1B21CE251CAB31AE960A01CC352C91A
%4E6B98000395 40A2B4A4E160A21361CB1A6381EC1C60C01E0FA0C135C7B5A4C1A2B2E160A228C3
%4E6D78000395 6055CB1AE51C60C01E0FA063C2B6A6E860A228C0B50360CB1AC3A360C01E0FA0C7
%4E69D800039580A4C31A6856A12881C818CCA4132124C4A6C31AE6242124212421 0FB2C0DC4180
%4E6E7800039 5A028EE180FB1C20F4481C0054BE00F86C2BF350BC9B942E1068572C3A1B2C2B6C5
%4E6BE800039 5C01AA10BC10D80C10DC20DB1CAB7A341C072C272C272C006D1B91A0B80C5520D82
%4E6A78000395E0F1C27206B1720681C076D50F86CBA4C6242124214A81C11A0BB11AC5B3A324B1
%4E6918000396007 3448341A5C1B463C0122881448341C01C0D82C2A50B2C0B2844 8341A7E4B30B
%4E6AC8000396208228438341C71E43832880C4A20380B60BC4A3438228C4A2C20ECA1E422B85C6
%4E6BD8000396400E81C0B654C3A3621BC6BE28830E80C3B52AB32AA02AC11EC0B628C051515153
%4E65C8000396605353C000636C650814071B00320A5B6817757440A01B8174C12180C113A01B81

```
%4E6928000396B0A01E81C121A046B0A721A035B0C8A641A0E721A60BC221C703A0E160A0E1C317
%4E6CB8000396A0C10E0BE52BC32B04A02BE040A0C80E0BE2C80418A1E0C01E70C1B3520E820BCC
%4E6BD8000396C004C005C6B2C1A30E0BC6A10B80C00604C8040304E9C303A3B2C7041804C303A0
%4E6CB8000396E0CAB9C503C1B4C00381C8217BC1B41180A0EBE128B9A8E11180A0C3584B8004C2
%4E66E8000397001281 71A011B0A2B8114360E2E2C1B2A1B7E3706111C017510B8143A013E0C32B
%4E6BF8000397203528 68BCC1BF0B71BBA040A121A41AAA28C017C00B6280A028C51A1BA0E6C4A1
%4E6AD8000397400BBFE160A3214328E1E72840E3E4C0B3E060AA2AC10B6381E221E11BA0C01180
%4E67D800039760A0C004C1041840A0C1B2C2A1B3C3A2E0C011A0C204700403E1C104CE11A0C0A4
%4E6B8800039780 43E235B5A4B3A745A1E1C1A1E143E26172A0E040A0C12A6542A01BE4E2E01BE0
%4E6DF8000397A0C7A503A8E0E12CA011A0E8C013E5E3E12DA0E043C1B2E0E0C0B2C12071E6E7E6
%4E6E28000397C020A11EA5E2C0A6C4A1E0E0C0B2A02BC20C80A0E3C4BBC1BE28A028CA0C8118A0
%4E6958000397E0E51EC004C100636C650B2C00000002100BD47544068 0A0DAA318FBE203ABC5A1
%4E6008000398 0079C9191BC5A1E4D019C4A1E4EF42C2A1C31EA0EF43C1A1E45EA044C61EA05EA0
%4E6408000398 20ECEFECC32AA0E9ECE4E9F2E9F2D20380BBA02AA6D30455C7A1BFC1BBAAC005C1
%4E6078000398 4003AAB2E9E2517ACAB2C32AA2B379C2A2C3B376EBC2A2E2F3C314E3F314A0E6E4
%4E60C800039860C918E0E014C014A0E4E45CA0E2E4E4EB35A0C320A0E8C4B6E7C006E2E8E4E7E6
%4E6BCB800039880C114E3E4E714E5E2E2E4E714E7C114A024A0E42AC40380A0E014A020A0E0E414
%4E6928000398A0A024F0E0E0E0C0A1BE61605BBBCCA100636C650914000000002A85B0B59C542
%4E6A7800039BC01B282B401BA028A02BA028A01BC01A28B32B6CC10BC00BC00BC00BC10B85C042
%4E6E68000398E01BDFA4C314170EC20E1714CD4143B4A303A3B4A3D219807274D84FC3B4A3CCB3
%4E6E7800039900CC23C123C04F6E66C044454B55C3B3A7D10ACA4523CB0ACF5ABAA574C00970E0
%4E6198000399 2019A219A0D21BC00960C0A6C1BFAACC242824C44FDFDFDFBFC0BFC85151DC5260
%4E6A2800039940C020C021C121C020C3402CC035C235C02CC403A5C2A6BFA2B2C0B2A2B871C235
%4E62E8000399 6076C728A006C006A04FDFE806C206A0CBA2B4DFDFD31BBEEBE4ECC4BE1B2A2880
%4E6768000399 801BA019A021A019A028A02AA028B405B428A02AA028A019A019A02100636C6517
%4E6978000399A03B0C1F80746D495A04A80680C02AC12A6041C2A1710961C271066741E2351AA0
%4E6868000399C04261C72A6341E20B82A07109616A41E20A84A04261C2741A41E20986A0710961
%4E67E8000399E0C42A60C20381A0E9038261644 1D309616241D5096143C153C2A40380A5C15341
%4E6B3800039A0044E2C235C935E2710942E2C519C519E542E409C7A347A075A00A09C704C10447
%4E697800039A200AA0E40B0A09C2B5C203A0E103C2B5420A0BA028A21A0B0A09C905480A0B35A1
%4E6A0800039A40BFA0350B0A09C251C435C551420A0B1AA0BF2880A00B0A09C5B303A0E103B345
%4E6B5800039A600A0BA0E40A09C704C104470AA0C528A009C7A347A044E2C519C519E54242E2C2
%4E687800039A8035C935E24244C4B5A40380A4B5446341D50961624152D20961C2701AC10382A0
%4E682800039AA0E903815361C02A6441E20986A042616841E20A84A042616A41C128A00B82A042
%4E692800039AC061C32AC1741A41E21A35A04261C70672701A41C128A14261C02AC12AC00680BE
%4E6B0800039AE0AFADBE00636C650A0A00000080500E5E6854A61EC34006C02A561EA814E140C4
%4E6CD800039B004150E971E4B2C041A8C1A4C2B2A0C4A1C2A11B6BA1C2A6C2A1CD41A1C2A3B540
%4E6B1800039B20C1A1C2A3C2A442A1C2B56141A1C2A14252C2A140C1A161E4C2A1C042C7A1E2CA
%4E6D6800039B40A1C2A4E1C2A161EAC2A151C2A1E2D0A1C7A161674060E4C4BBA0E2CA4265C1A1
%4E6E9800039B60C1A1C12AD02AE4E3C11BD01E54D1BFC542C40551C71B60C0BFC642C1B3A0E3B3
%4E6FD800039B806C40C9A150A1CD42C4B7A0C2A3E2B7D2A1C7A1CFBBA0C2A11E53A142A0BB69C1
%4E6AA800039BA0A1C2A742A1411EC6BFA0C140A1CA40A142A0BF63C040A142A168A1C140A16144
%4E6FB800039BC0C0A140C1ABC2A1E6C2A1C81B2AC4A1C2A6C2A11ECCA1C2A5E0C240AFE374C241
%4E6C9800039BE0D414A81E64286264A6BEB6A1B3B2AFA3B2B3A1B6BE00636C65043601020863A0
%4E660800039C000351046121 80C20477C00421C70473C343C543C543C641C141C341C141C341C0
%4E674800039C202A41C441C341C14161C041C14160C141C24171C243C54363C043C0046464CC2A
%4E68A800039C4004C34162D111C041C44160C044A041A044C335417BC42A73CE51D551C641C428
%4E683800039C60C728C6417341C641A041A04165C141705CC004C454C10435C135C104C155C535
%4E684800039C8004C142E4C041C541E0C642704160C4356AC34170C241C2512A51C7512A51C441
%4E6A0800039CA0EAC041C40541E0CD5160C30435C404C751C641C541A041A041C7417341C628C6
%4E6A4800039CC028C741C241D311C33543C65421C42A7354C604C944A041A04463C0416ECC41C3
%4E67C800039CE00661DC54606060D151C4412AC44362C14361C041C441C341C141C341C141C341
%4E686800039D00C441C02A41C341C141C341C128C041C05F217A73C9287004C251C151C551C151
%4E6BF800039D20C551C451C000636C650A34071A00029C0C680B5B45C42C0B82620BB1C40B8128
%4E607800039D40C2AFAB28C444281C40640B63636 0C444A8D11C421C7BEF7ECE1C60E8EEC2A377
%4E6C1800039D60A0678054C5B21CB2284573A0CF1CA01CC0B64472A0D40444E26EE544C22B5152
%4E6DC800039D8052525252C22BC4AA0B54C2A10381A6C344C80FBAC00F67C4410641E80FA0CBBF
%4E6D4800039DA06143E70F230FA0CCBFAC12A00FA0C9BF636066A0228012DB352A22A0D028E935
%4E6D9800039DC0A012C00F80F91280C00FB0DA2A1EC0206ECC2AC00FA0C552C1B5C3A3EB20A074
%4E6C6800039DE0C104C30A82CD20A0E6C30A84C8B8C020A0C451A4C10A80190A81E70FA0768056
```

```
%4E699800039E0004C2BA0AB4E60F240FA0C50B60A052C22A0AB2606261A00FA0740B1B58280428
%4E6AC800039E2063A2B4A7E0C0AA28BE05D50BC00B8160B000636C650803071A0021DEA85B0C0B
%4E6DD800039E40DC4042AFAB24C20CB1C41CD04044AFABC31CC21CC20B81C128800B1D2C2AC10B
%4E617800039E60812882C5AFA0B261CA4E1B0BCFAFA1CF0CC10C80C874C473CAA3C1A5D30CC00C
%4E6F6800039E808064D154C3A3B2E1D21CC32881C32AD451C2B2A3B2CD54C054C82AC20F82CABF
%4E642800039EA0EBC106D0BFC94FCDB41BA3B2D0BFC94DBFEBC1B4A0C0A3C14DBFC3440F8042A0
%4E658800039EC0BDC0BFC0BFCEB2A6BAC0BC0B80CEBFC50FB3626CB2C2BEC0AAC572CD2881C535
%4E625800039EE0C2284C5A2B2A3B2A9B3A0B4A0B41BC5B7CA0C850B82C6BAC2AFA7B871CF0CB6
%4E629800039F0060C10B814105C1AFA928BECE0C86C30B8128000000000000000000000000000
%4E63D800039F2000000000000000000000000000000000000000000000000000000000000000
%4E63F800039F4000000000000000000000000000000000000000000000000000000000000000
%4E641800039F6000000000000000000000000000000000000000000000000000000000000000
%4E643800039F8000000000000000000000000000000000000000000000000000000000000000
%4E645800039FA000000000000000000000000000000000000000000000000000000000000000
%4E647800039FC000000000000000000000000000000000000000000000000000000000000000
%4E649800039FE000000000000000000000000000000000000000000000000000000000000000
%4E67B80003A000636C65070D071A00849711 0B176842C421C03570CD04C226C02140AFA3C2A128
%4E6BC80003A020C341C41E72C21DC00E80C11DA003A02AC0A1C4AD2B180EC11DA0E0C21AC92772
%4E69280003A040C004352CA5C2A2607061AE28C20442C1356235C01AEAC74120C1A2B3C160E635
%4E69180003A060A0E27035C01C43E018C403E526A026A9E244C160E618A071C41CE2422035C260
%4E6C980003A080E4C5A5E2C043A0C260C5A221C01BEDC31AA1C442A51B76A02873E1C34121B5CB
%4E6AE80003A0A0B2A0E1C22AC113A0C241A0402BA5E3E228C003BFA0BAA62140A0C30577A0C1B7
%4E6B380003A0C028C01828740642A1C235C203B2E173C02A75B1C2A4B70CC00E80E0C3A2C71AC6
%4E6CA80003A0E00C811CBC0E80A0742AC21AC5B3A90E80A0C51B81C61AA01E0E81651CA022A2C3
%4E68480003A1001B81C51DA00E8103B60EA170C41B81C420A0C3041B8404350EE028C46222C226
%4E6B180003A120A0C403B6A1E12CC362C2A1C926E4E1C362C1A127AEC026A0C3576370A227C024
%4E67E80003A1402AC0212AC01E2AC01B2A70A0E1C21863E028C31814C01841180EC018607080A0
%4E68D80003A160E1C0B9A0BA6270A0525251148143 0E806270A01BA0E165E228A0B4A028B4A028
%4E6AC80003A180B4A028B4A028B4C21BA0C6BE1BDD00636C650530071B0004F35B68178BC43540
%4E68780003A1A0A01B81C435C1218 0C113A01B81A01E81C121A04680A721E035C8A641A0E721C1
%4E6B880003A1C0A47221C703A0C1A1E0E1C317C10E7B2B04A0E21BA0C80E72A0E2C40418A1C21E
%4E69A80003A1E0C035C183520E827C04C005C6B2C1A30E780B80C00604C8040304C82BA2C103A3
%4E6A280003A200B2C7041B04C303A0CAB9C503C1B4C00381C821CB35C1B51180A0EB61AAE11180
%4E68C80003A220A0C3584B8004C21281E21180A2B8114360C3BBC4B2A1B735E2C0356111BB1751
%4E6BC80003A2400B81C213C82B35A068C2BF7135BBA028A81AC0A928C017C07228B0A0C2B3C21A
%4E6BC80003A2601BA0E6C60BBFE1C40444A0E1C7B341E3C2A264AA2AC17328B0C0278144A0C011
%4E68680003A28080A0CC04C1041840A0C1B2C2A1B5C4B5C0B2A0C011A0C204C0350403E1C104CE
%4E6A0B0003A2A011A0C0A443E235B5A5B4A645A1E1C1A1E143E261C235A0E040A0C12A6542A01B
%4E6D4B0003A2C0E4E2E01BE0C7A503A8E0E12CA011A067A0C013E5E3E12DA0E043C1B2E0E0C0B2
%4E6F280003A2E0C120C135E2E2E7E620A11EA5E2C0A6C4A1E0E0C0B2A02BC20C80E4C4BBC1BE28
%4E67A80003A300A028CA0CB118A0E51EC004C100636C65002A071A0920A5685BD061E1218041A0
%4E6DE80003A3202A4EE206E321E0E6E2E1E2E34180E040E8E4C02CE0C105C0A1C7A3E11EA0E4E2
%4E6A780003A340F3C31D0D80A0C110A07482E7E2C10D8128C010B1A06BC8B60DA00D708051A0C1
%4E6E380003A360B3E328E1C1A6E2C0A110828A0C3B5C61DE5E221A021E7EA42E128E5E2C51EE3
%4E69F80003A380E0F1E041A2E02A80E0C01F1EA2E041A040C0A121A071A040E0C018E2CB2A72A0
%4E6FB80003A3A0E141E128E3C2BBC2B6E2E21FA028E2C2A1E5E0E221A0E2E2E1E0C21EA0E3E2E2
%4E6A580003A3C010E1C31FA1C01FE0E1E344E01081A0C12CA0702871E128A0C51DA01DE11081A0
%4E6DF80003A3E0E2C11FA2C01EC20FA0C31DA0E01DA0E0108028E1E2E2E2220FA0E2E2C2A4E2C4
%4E6B880003A400A20F80A042A02840A028E4E2E240E2EFE21F2140E0E1666260E2E2E01FA0E2E1
%4E6D480003A4241A5B2A328A0E2E2E064481B82E342E2C02AC5274460E4E2E4C6204CE3E0E9E2
%4E6AA80003A440E2C1A7C2A3B4A028A12840BB2A1B2840C02A4720B14346C027C4B8E24280B2E4
%4E68080003A460C2B942C2B427C426A02668A0C11800636C65161D071900100868B5040EC121E0
%4E68580003A480C72AE121106704 0B62C20462A0E22CC00410AA0B82E2E2C020E0E210C01B0E80
%4E67D80003A4A00C0E0C0E800CC00B82C3A2C0A2C0A21080C10382A00380A30341E0C40A84C010
%4E68780003A4C0CA2AC30D2804C126A0C00A84C010E2285120A06320C0350D80A0630A84B228E2
%4E6A980003A4E0E2E3C1AC03A040C3A2E5C46E204006C3204821C9560384C235A0C10D81C0671B
%4E6A080003A500C11240A00C0E0C18C157A1E203A603A0B4E0C3A5B335A0C220C02AC221E1C8BB
%4E6A980003A52044E46704E22042 80C020C22AE5C11BCCB6E20F2040C320C1BFE041C035A7C0A2
%4E6A480003A540C0A6BE35A0C26228C0B2C163A0C535A0C22EA0C60DC104E220C104C20F20C104
%4E6D980003A560CB1EC10A0DE02AE52CC10FE27272E6C1AAC0A6C0A7C36628E143C10EC3211181
```

%4E69D80003A580CE0440441EC33511C00D82C821C4722BC0720EB0C133E303A0C305C362A2C0A3
%4E6F080003A5A0E1CFB5E6601240A02CE1C21EC804C604C30DE2C20DC00DBFE672CA0DE10F4281
%4E6A280003A5C0ACC3727172B4A2E7C4610DB1B640CB11C112C004C12028C30DB104C01BCA1180
%4E69080003A5E0BEE2C4610D81A0C02AC0B4C711211100636C651333071709 02EC0B512860DB18
%4E6C480003A600C328E0C651C62AC118C0A706A1C619A903A2C9A740D0A5C12AC12A40C041CBA4
%4E6CF80003A620C128C1AFA6C2288051C01BA019A0E419C419E019E119C251A4E0E2E2E219E2E2
%4E6CC80003A640C1A2C619A01BE7C8A2C5AFA735E6C01BC11BC01B2841C040C14228C1282A28C0
%4E69C80003A66052E440C02843C328C01BAC03A340C041C12BC1281BA3C242C71BC12835C01BC0
%4E6C080003A6801BA51281C144C0A3C31BA62AC7A241E0C027E152E11281C9A32780A3C3A4CE28
%4E6AE80003A6A017C028C017C028C027C017CC12812AC027C517C217C017C82AA6B3C428C017C0
%4E68F80003A6C0275117C01752C3A52884C15328C053C053C05328A503A1C5A1178227C127C2A3
%4E6CD80003A6E046C81780A5178027C028C246C1A9C3A3B2C340A7D3A42881C4A5C51CA6288173
%4E6548 0003A70060C135C8A328811174608060 82C935628272741 1C505E103A0B2638020117411
%4E67D80003A7208161C6B467827175 11C704678274 1181C256B635C304672072C028873500636C
%4E69480003A740651012071708505EA1680EB561C140A0E0C214A0E7E0C00E82C003A1E2E2C2A1
%4E6DA80003A76003A1E2C040A0C2A1E2C076A0E4E6E0E5E6E6C12AE365E0E460E4C074A0E0C140
%4E6B580003A780A0C2A103A0E3C040A0C2A4E2E1E3E7E0C151E0E2C02AC1A1C404C640A0C15161
%4E6B380003A7A0C10E04C2510EE0C12AE0525252E4E0C12AE0C052E0E340A0C2A135A0B42CE1C0
%4E6E480003A7C040A0C2A4E263E0E460E4E0E4C075A0C12AE3E6E6E5E064E0C4707470A0C1A2E2
%4E6B980003A7E0E2C2A4E2C040A0E3E1E3E0E376A0E0C506C004C240A0C04204C005C40EE0C046
%4E6E380003A800A0E3E0E3C45151E0E0C5A2E2E2C154A3B4E2E2C2B4A0E260E4E0E4E0C20E60E0
%4E6BE80003A820E5E6C32CE1C10EE365E0E460C470A0C1520EE0C07140A0C2A135A0E3C040A0C2
%4E6E680003A840A103A0E3E1C12AE0C42CE1E0C12AE0C42AC1A1C404E8C404E9E3E7E0C0520EE0
%4E6D880003A860C051E540A0C2A3B4C152A0C040A0C2A3B4E2E3E0E4C074A0E0E460E5E6E6C10E
%4E6A580003A88081E1E560C470A0E4C07428E0C103A1E2E2C2A103A1E2C040A0C2A161C140A0E0
%4E69180003A8A0C214A0C00EC004C00E80E0E063C000636C650D3B071708047A68B5044304C21F
%4E6DE80003A8C0C263192AC4192AC6351BC5AFA303C31BCC044541E6C7A303AACF3582C66324C0
%4E6C080003A8E0631BC121C3B2C005C2B2C1A5C1A2B4C21BC604C71BC16604E273A403B4A2B2C1
%4E6C680003A900A1C2B4C1A1CE04C522C62104CA1BC2A6C31E4474E3E2610441A1B5A2B3C2BAA0
%4E6FA80003A920C71BD51BCDA2C0B5A8B3A0C5BD43E321C022C304D453C2B3A303A679C26FC5BF
%4E6FB80003A940C2BF73A6C0B2A5CD61B2D0B5CABBC6B2A528C06A21C351C0B3C204C6B3C32C75
%4E6B180003A96080B8A0C8A2C321E3BAC40B82C020C61940C321C3650B82B2A4B3C3A303A003C3
%4E6A180003A98021C40B812BC020C01942C01940C31BE4C40B82C3A3B4A3CE0B8242186421A0C0
%4E6D480003A9A0B7C621C40BB14035B6038EE24180B80B82C11E28C31E28CF5E18C00B81C41E28
%4E6B580003A9C0D2A1B203B0B5AFA1BF03B9A103BD06A0692AC52AC900636C650406071A00505D
%4E6E280003A9E02862041BDFC40394C92AC12AC02AC02AA02284A0C01B83C8B2AFA4B2A0DFD151
%4E6D280003AA00D1A80383A9C70B87D60B81C00381C119C1A867C20B82A4C13567D219EACA420B
%4E6F780003AA20DB42E4C0B468CA420BEFCA4156C075567558E1D2BFA50381A2C20564CEA435C7
%4E65A80003AA4035D1066D66CB35C735C6BFC6A5B4A9BBA0DFD0226465C1BFEBF1CBAFA3DFDF6E
%4E60380003AA606465CCB8AFA7B8DFC3A3C0A4C0A3E0C0A2C0A7C0BE2CE32B81E140E241A041A0
%4E6A280003AA8042C400636C65173B0C1F0230150368049B2880DFC7453545608 6C019CD35D1B2
%4E6EB80003AAA0C1A1C2712C523551C17028CE19C2A540A6EA65CA35CDA4CD1CC01CC01CC01CC1
%4E6DE80003AAC019DE28C41AD8A3C51AC81AC1A542C17528606660 6965A3B4A042A0B3A3C21DC4
%4E60D80003AAE0A2C0A4286AC5B362C135C22CDA35C07FC8BF1AC135CA05CD2AC335C21BDFC019
%4E6DF80003AB00C819C0BFC0B4A628C054C054E2C135C635C41DC542C043A3B4A4B4A3C835C735
%4E6F780003AB20C22AC31C61A6C24A6B67C71EB3CAB4C21E64C11EC235D735C543C11D61CAB449
%4E6DB80003AB407728C1B36BC218C177286EC151C243CA1DC843352AC07155C11DCCA4C243D0B4
%4E6C980003AB60C61EC71DC4B867C31DC0BE06C15128805A3560B23560C21CC0B328C82A006564
%4E67180003AB807A0000000000051600BA84A7535804 3C06604D044C804C91DC006C12B45C804D0
%4E62280003ABA044C9AFA044C94F40DFCE471B47DF5EBFD42AC02CC02AC56B60098EA80380A4D0
%4E63680003ABC06B6FD835C91AE3D6BFC5A1DCA1FDC3B3C01AC16F2AC163A135C2BFA2CDA3B203
%4E6EA80003ABE080A1B2A41AC004CD6F04FE6FC91AADD0A1C10452E0C042D404E250E0C0B2D80A
%4E6E880003AC00E050C004C61AC31AC505E450E075D30AE0C042D33570DBB6A3B4CCBE6FC828B4
%4E66680003AC20601900636C650A36071B0062915B6817757440A01B8174C12180C113A01B81A0
%4E6A480003AC401E81C121A04680A721A070C8A641A0E721A60BC221C703A0C1A1E0E1C317C10E
%4E6CB80003AC600BCB2B04A02BE11BA0C80E0BE2E2C40418A1C21E70C1B3520E820BCC04C005C6
%4E6A980003AC80B2C50E0BC80B80C00604C8040304C82BA2C103A3B2C7041804C303A0CAB9C503
%4E6A680003ACA0C1B4C00381C8217BC1B51180A0EB61AAE11180A0C3584B800435C11280C02AE1
%4E6B980003ACC01180A2B8114360C3BBC4B2A1B735E2706111BB17510B81C213C82B28A266C2BF
%4E6E580003ACE00B71BBA028AB1AC2A728C017C00B6280A0C2B3C21A2BA2E4C60BBFE14A40A0C8

%4E67380003AD008341E3C2A22863AA2AC10B6380C027806024B441A0C01180A0C004C1041840A0
%4E67380003AD20C1B2C2A1B5621128IBB2A0C011A0C204700403E1C1C46911A0C111A0C0A443E2
%4E6CC80003AD4035B5A5B4A2E245A1E1C1A1E143E2E172A0E040A0C12A6542A01BE4E2E01BE0C7
%4E6DB80003AD60A503A6E2E12CA011A0E8C013E5E3E12DA0E043C1B2E0E0C0B2C12071E2E2E7E6
%4E6EF80003AD8020A11EA5E2C0A6C4A1E0E0C0B2A02BC20C80E4C4BBC1BE28A028CA0C8118A0E5
%4E6A280003ADA01EC004C100636C65173B0C1F000000A85A06602A80C52882C544452AC91BC84D
%4E6C780003ADC020C452C85219C14FC2537FD506D91AD756C5464740068266C156C328570681C1
%4E6AB80003ADE00683C0494FC14A0680540681C24E1BC54219C2540680C106B1C72881C24E421A
%4E67FB0003AE00C40681C0068156C4534FC0471A2851C20641474155068 9C4068251C154C10681
%4E69480003AE20BFC72819C40565C61961068 9C60681C106B1C106C0454540424840068 9C20681
%4E6B880003AE40C04A2881C84151C04051C351C6401BD154CB4F67440686CF06815 4C056C14FC0
%4E6F680003AE604FDFCA281A421AC84D5506B155C1062855C64220D720D656DFCABE2AC72B5A28
%4E64480003AE808052281B2851412852C1432A0065647A0000000000510303680 49AC53584CA04
%4E6A880003AEA063C12AC2713584C019C619C041C178523583526 2C0754162C246C04AC441C17F
%4E6A280003AEC0C454C319C04162C205C251C47219C041C541D641C541C24F41C141C319C041D2
%4E6BEB0003AEE041C141C542C12AC71BC41B41C141676260CB41C141C4196EC441C01A41C54FC4
%4E6B280003AF0041C141D235C41BC041C141C042CD35C741C1422ABFCA71355F61C441C242C519
%4E6AE80003AF20C05CC435041B60C12AC241E6C44761C02CC21BC004C21BD228C541C142C119C0
%4E6AB80003AF4044C17B41C141E1E1D241C141CDA1C61BC041C14160C170A0D1417041EEE1C541
%4E6B080003AF60C14160C0772AC319C41BC041C141E7E6E3C241C01A4160C0792BC135C45BC041
%4E69C80003AF80C141C542C01BE0C11BC135C0A1C142C14160C0714167C135CB41C54160C935C0
%4E69B80003AFA073704160C07141C2BE28C25AC02AC05C3581C252C104C604C01BC0060065647A
%4E69980003AFC00D2F0002B1301BC3680475358063E0C2A160E4E22873C203A0E0C019E0C3A1C0
%4E6A880003AFE0A1C0202AA0E20380A0C2511BE1E0C0A1E003A0C01AE003A0E2E02C25A0E2E0C2
%4E6B380003B00004E7E2E003EBC0A2E003A0E0E003C551A0C0A1C0A128A1F0E0E01F63C02AE4E0
%4E6CF80003B020E0E0E0E0C052C004E0C22AA0E0E1E003C904E2E0C2A1C9B2E0E4E0E0E4C551C1
%4E6B980003B0401AA1C505C50419A0E025A0E0E0E1E7E4E0E0C204C425E4E003C904E2E0E028A0
%4E6D480003B060C041A0C5B2E0E0E0E0E0E0C004E2C418C3A1EEE0C2A1E2E5E003C203A0E0E0E4
%4E6CC80003B080C7BFA0E0E2C251E403A0C051E0E01F8058E7C252E0E00351E4E2C352E21AA1E0
%4E6A380003B0A00380C51BA0E0E2C4A1C204E4E0E0E103A0E203835362E1E2E203A1E061C3182A
%4E6AC80003B0C0E028E2C352E0C11D61A0E20352A0C05103A0E2E3C0A1C30380A0E2E9C1B2A0C4
%4E6BD80003B0E01E2AA0C0B2E3E2E00385A0E5E0E0C2A1C25163E5C0A1E8E0E1E0C0510380A003
%4E69180003B10080A0E0C204C5A1E0C11CA0C0041DC904E0E0C0A12852E604C00381A0E0C052C0
%4E6A780003B120A1E0E072A3C0A1E3C504E0C11BC40382C31CA0C053A0E2E0C0A1C251E003A0C7
%4E69F80003B14003A02AE1E1E0E4C0A161A0C4BE355128E1E21EC251E0E57153C1060065647A00
%4E64C80003B160000000021280B5E04682A803571C443E07C356270B07342647170C11D7080C0
%4E6C880003B1802A66C0402841C051CFA30380AFA563CC2CC02AD31BCA1B461BC051C11C6CC035
%4E6C280003B1A04ACDA741A54172B1C72C35C32AB5C53542C31C696AC141D451C7417180CDA103
%4E6C380003B1C081A2C341C11CD435C3B5416AC4B2C6B2C241C31BD841C02BC3BFC303B0A20381
%4E6CD80003B1E0C205C30380A503A2C72AC152C652C12AC235C206C51BDCBFC735CB1BD0B2A103
%4E62580003B20081A1B2CCBFDF66C45164C4BFCABF2C35C32AC5352CE319C5B4C2AFB8E2D135B2
%4E6F980003B220C71BC951C01BD451E667C15160E835C3B6AFAABCC32B756078617B727375C8BE
%4E66880003B240617160756 16B0065647A0000000000040155D5A28AA2C80CD04CD72056443E4C3
%4E6F580003B2600641F6D93543D37FD21A4BE0CDB6C6B46EC1701AC104EDC01ECC3504C53540CB
%4E6F580003B280AA41CA288255DFC2A6DFC1B3A3BB0384BCA60344C30E8B0B8562CA0E41C00E83
%4E63EB0003B2A00B8360C4BFCF0E810B83DF4445C57FCAB7AFA2B6E0C87FCB2CC6194E446ED21D
%4E64780003B2C0CF1BDFCA7719CB711BD31AD6B8CC1B4AC404C37FD31ABAC61BCE19C604C9BE76
%4E68580003B2E035B2C4BA35E2C11BC5350065647A00000000004007A8A7049E2780C742272AC9
%4E6F780003B300436 46C4268410397D726C44F2A26D5AFA4C5444FC04026C86FD5777FC4ABCB48
%4E6D680003B32025DA7FC22AC06FC035C47426D0A3D37425C90B81C6BF6B06C205C1110B81C72A
%4E6D880003B340D2110B81C56FB4A2B8110B81C25FCB25C51184 0B81D60B86C026D50B86BF2AC4
%4E62980003B360435FC6B8ABC96D26D37FCFBF4126CD28566245AFA4D47FC1422A7F67560396CD
%4E6A580003B3806E63BE644C6B280065647A0E1D0002000125A8AA61651B80D4406221A04FECC9
%4E6F880003B3A0281D7CA0E2C7A367A0E3E220E0F120E6CB05D84064B2F1C8A2C6B2E9C266A0E6
%4E65180003B3C05AE2E7E4EE21C3B7E3E21DEDEED219E9F04AA0C2A4C5D527C4A974E9C3BFC11F
%4E60980003B3E0D1BFE4D541A053A0C96DA0C5424AA0C040D5E2D625A2E2CB4FE457C6A4E8C3A2
%4E6FC80003B400B4C2441FE3C242A0F7E4C506F2E227C518ED1EE3E0C7A2CBB4E2C31DA0C46326
%4E6A980003B420EEFFD326C56227A0D3BEEAC51EC2B9C06428 0065647A0000000000011000E686A
%4E6F480003B4409A4BD52848E1741EA0E51BC441182AC32560A02CE328CC42E8E2E4C842E9E0E9
%4E60280003B460C442EACB1CC342D52AC542C420A1C205E7D128A0E3C572A0EFE1E7CE19B9C2A1

```
%4E61BB0003B4B0C3B9E0CFA269CEA2E4E4C6A22857A0E4E2E2C526A0C71CA050C21EA221CDBFC3
%4E62C80003B4A0A1E5ECE828C3A1E9CC1AA0E253C61EC0B4E2C4B6E269B764A21FE9E3C41CA0D2
%4E64D80003B4C020E365A0E7C3A1C706A0E6E1E7E1E71DE61FE7E3E7E3E2F5E8E2E4C4B5E5E8E8
%4E60080003B4E021C01BA0E672B2E4C8A2E8E356D021A0B9E221FEE3C2BE28C9BB28E962C20065
%4E6AB80003B500647A000000000020760E4B1168C42AF527C41BE0E8E8E7E021A043E8E21EE9E1
%4E67E80003B52041A0C021A421C211A0E0E2E4C12AE0C11BA01180C01180A0C111A0C12EA2C527
%4E6A080003B540C0A11B1BA0E0E611A0C011B04462E1C1A1E02AC62AA0C351B24262E1C5A2C2A2
%4E60280003B560E4C4A10BC252A0F61E60E2E0717373C6A1C3B5E01BD1B2E9E1F1E8C3B2CCB2E2
%4E696B0003B580426280E0F5416280E173C30573C52CA040C1BF0B80E0D3522AA0416280A0C154
%4E60080003B5A0D127A0E7E1F1E91BC1B2CCB2E0C106C218E42AA0717373C21EA7E0E2F0EBC4A2
%4E6B080003B5C0C2A2E4C041C340E1C3A1E8E441C340E52A1BA0E61BA011E340C340C25211A0C2
%4E6B380003B5E018C011A01182E2515151E0C440C0B227C81EE0E57241E5E3272CB2C4B2E0C2A2
%4E6C980003B6002841C6A3C0A1C0A4C842D60B81C242E3C644E50B80E4C1BEC8446581C7006564
%4E66A80003B6207A000000000010C111A0685A44C52AA02AC318A0C662A143E5C127A0E3C12754
%4E61580003B640A02A42A2E3E9E2E2C4A12CE2C2A435E2E458E1E7C91EE7E2C7A1E3E2C2431DC6
%4E6D980003B6601CC460A0E12CA0C543E3C1A2E31BC0A1E2C443C463A0C76128A0E8C719A0C7A3
%4E61080003B680C869A0D1B9E376A0E1C41CE8C31DB61BE0E31DE5E4E3C02AE5D02BA1E20383E2
%4E60180003B6A0CAA3BFC135A0C6B2C21B7B72E1651BA0EEE2C2A1E50382C1B4C2B7C22AC426E2
%4E6F980003B6C075E0C0B371A0C11FA3E450A01EEAE2C3612BE4C6B2A019E2C219A0CFB6C4A1E2
%4E61880003B6E0E3EDE0E571A0C106A051B4E9E11BC8A2E2E9C3A9CC1DD625C7B521CD6228A0E1
%4E6E980003B700C1A20E80C0AFA3C80EB6D70E86C11853C22BE5C105C0BE0E86F1C30065647A0F
%4E6C480003B720040002003180A8AA665D0580D31FC74FE9C01BC14D2665A2E3B24FC027C2A1DC
%4E61B80003B740A143A0B2D5A1C520D5A1E1E1B2E2D1A1C54FECB2DD1EF9E1B2E1C2A1DD1DF4B2
%4E6FF80003B760DFE0C019A2B3C1632658CB1AE2BFC269604BA0C3ACBEA8E2C020C327C121CF42
%4E62980003B780A07CEFCDACD2491DE6CE6C1EA0C14020C246ABB9A1C1A259C627CA25C26A4FD4
%4E63480003B7A0A9DFC3A2BBCB451EC81BC6B6C4B6A8D2B4CFBEC7BBC41FCDB5060065647A0000
%4E6B080003B7C000000030066860D95D20B0282A69C00660C71862C518E22CE3E4E3E9E3E2E0C1
%4E6E280003B7E02CA0E319A0E719A0E32AA035C035A02AA0E3E2E5E2C219A0E419D519A0E619C4
%4E6F580003B800B244C3B2E3E84AE7EA4740E661E262E146E7E528A0E52A44E641E2E242E1CA19
%4E60C80003B820A0E5E4E519C719A061E2E662E119E6E5E8E5E541E2EA42E1C1BF03A0E5C505E5
%4E6FC80003B840E5034143A0284CA02B4342C3A8C1A743CE26C226DFDFD21DE0EE70EB4CE279E0
%4E60180003B860F270E7C7A128A1E775E0E7194050A0E770E3E7C019B9C0B9192AA0E7E3EAE246
%4E6A080003B880E2EDE44CA0E8E6CABE28A0696449C00065647A000000000023660 3B504683580
%4E6A080003BBA0C025D416842BCF05C71684C125C225C0526962355216843544AA43A9417083C0
%4E6B680003B8C01DC41DC7601B77B4D935288035285 2C5651D52C063521B2B3542A643A843A5C1
%4E6B080003B8E018C0168 3C61DC91DC341C10A83D62C0435520A350A3552C01DC2631D521DC562
%4E6BA80003B900A343A443A743A270C019C41CCB1DC12579D626C52B281BC33552C51EC26052C2
%4E6A680003B9206327BFA843A342A243A42628DB26DE2A81C062265226C526C26152C126C33542
%4E6DD80003B940AFADDD6028DE2073205220287320762 0C42AAFAC42707A1EC41E71C01EC61ECA
%4E6DD80003B9602AC82AC16528C21EC36052286652 28C61EA541A842A742A106C16F766FCD43BE
%4E65980003B980C1521852615261 1BC81BC22A04C01828006564 7A000000000000369A866A06A35
%4E61380003B9A080C74726634426C052A0F5E3E35A46A0E52BE2C55AA0E7E3EFE3E4E368E3E3E6
%4E6E180003B9C0E3EBE3C3420453A0E9E3C80380A0E3C20380BBE1E363C318E2E374A0E3C3410E
%4E6EB80003B9E081E4C540A1E3C70EB1E5C25045A0C8060E80C1422AA3BBA2C74226ADCAA7CA04
%4E60980003BA00D2BFCA04C205C549AB35C335A1B4A7037BA75F26E277CA58A0E8E3EEC3B4C103
%4E63580003BA2081E0E369E1E3E7E3C543A0E3C635E1E3E8E3C752A0E3E6E3EDE3E4E3EFE32A70
%4E60A80003BA40A0E3F1C3A2E366C2BFE7C244A0EBC551A0E6ECE9C1BE2666C04135BA4E006564
%4E69280003BA607A023200008011 4059A85A6ADF47A06405C528A01958A419A4C2A519A3194542
%4E6B480003BA80A019C12CA41942A01941F2190619766F42AAC161631AA41BD91942A163A219F6
%4E6BB80003BAA055A11942B5C365A22AC2B345A41A4CA319C36519C8B4198045A01941A0197D19
%4E6CD80003BAC0A11A45A319A319C7BA194180A4C22C46A156A0C16FC7BF427542B219C1A31A42
%4E69E80003BAE0B569A219A2191B44A4194842A01940A01949C363B519C0616119A01970D119A3
%4E6B280003BB001A43A94B41A2D36319C06B19A01942B4D1B2C1A319A419CAA619C1611AA01961
%4E6DF80003BB2019C8B4191A19C20640A01A6F42A819AAD21940D0BC19D619B42AC31BA9C4A91B
%4E69780003BB40CF281A506CBECD28B46D0065647A000000000200756859 6A58E42880C8202A20
%4E60380003BB604751C105E1D821E5D721E6515AE1C6A1E419ED47E0E4EC48E1E4EA4169A0E419
%4E63980003BB80F8E444F3E4D819A0E419D02AE6E447C720E7E4CF2067A0E419F8E4CCBF42E7E4
%4E64480003BBA04F67A0E419F8E4F9E4476FA0E41945F1E4EF47A0E45AE1EAE419EA6BA0E4E941
%4E6DB80003BBC0EBC4A2E5F0DE19A075DFDFD8B2C5BE2A2180284D8075C2060065647A00000000
%4E6BF80003BBE00030405DE09ADF2B80D304C706E840E040E042A040C0A140E91FA0E01FA0E01F
```

```
%4E606B0003BC00A0E12CA0E0E1E045E0E2E2C261E1E32BA0E3E0EC20EC35A0EAE2EB21FA0E51FE3
%4E6E280003BC20E2E2E0E2E0E0E7E2C328A02AA0C050A0E2C128A056A028A0E419A0E4E4E1E62A
%4E60080003BC40E3E4E2E2E3E6E2E6E0E0E2E3E42AA0E4E4C050A0E2C253A0402AA0E2C1A1E2E2
%4E63D80003BC60E2C30380A0C319E1E1E9E2EBE1E3E2E2E2C0BF1DCD05E1E2E4E2E1EEE2E2C9B4
%4E62C80003BC80E1E1E8E2EBE1E1E2E2281FE0E3E3E2E2E1E0E2E035A0E320E41DA0E0E9E2E3E7
%4E64580003BCA0E1E2EDECE219A019A0E2E4ECC051A0E0E2E2E8E3E1E7ECE320E2E2E1E2E8E3E3
%4E62780003BCC0E2C0A140E0EDE7E3E0E1E4E4E7E5E3E220EAE5E7E020C1BE20A0E51DE520E1C8
%4E65A80003BCE035006564 7A0000000000434868 9F040E1F80C12BC906C620C020C020C020C020
%4E6F480003BD00CB0388CA691B884DC61B88C42AC46454E32885A22AC52AC1A3C1A40388CA6735
%4E6F480003BD20C01BC61BC32AC12A47C51BC61BCB67AA57D71BC21BC10382C76228C71BC21BD4
%4E6B780003BD40A3C11BC21BCD6628805BA056A057A057A056A052CB1A44DA6903B1C00383C254
%4E6F080003BD60C01AC4BF0387C03582C235C135CA6228C4ABD31ECB1ECA6FD1A22840D028C464
%4E60680003BD80A54DC4A2C1B22BD86228DFDA6228D028D277C8774046C067BF1EA15BA05BA05A
%4E60580003BDA0A11EBF47A340C3A15CC65CA1C96735C235C635DFC42BC2BE622BC335B3C305C3
%4E67E80003BDC0B335C11AC41A0065647A000000008021130368045D1D8073C72A7A80C02A06DF
%4E605B0003BDE0C34F4871C02AC219CD1979C435C4196267C11974DFC44F42CA2BC11F35C51FC0
%4E62A80003BE002CC41F61DF62C94C69C825C825CE19D128C1196BC445CC2CCB35DFD0BF63C42B
%4E609B0003BE20C30569CB1FCE1FD355D55FC74555C75FC719D12B67C75A2561C435255AC319C2
%4E6FF80003BE402AC94C77C65FD05F60C22A64C0041FC22EC21F62C21FCD4F4151DF76C21963C0
%4E6D580003BE601963C219C335195773C1584F47DFDFC2BE0671B061C32C76C72A1D0065647A00
%4E66780003BE800000008050780 3B504160680C13580C219C01AC63526C028C118C228C006C344
%4E6C680003BEA0C444C444C628C165612BC628C620D519C119C220C426C826C32BCB42C3544354
%4E6FC80003BEC0C44355C355436FCC3581DC632BC71685C328CA44C445C344C6683584DE73D774
%4E60380003BEE0C52A1683C526C426C15444C35D45C020DA68BFC15FCB05C46FCE3557CA5144C4
%4E6FA80003BF004AC2584328C318C474168976DFC51AC752C22AC952C6354C5CC8496FCE20C820
%4E6EB80003BF20C66020C819C06E2A566A2A43C84F43DFDD2AC020D845D06CBE06C0551928C019
%4E6F180003BF405835196054C2281828C2543519355 1C020C006000000000000000000000000
%4E64380003BF600000000000000000000000000000000000000000000000000000000000000000
%4E64580003BF800000000000000000000000000000000000000000000000000000000000000000
%4E64780003BFA000000000000000000000000000000000000000000000000000000000000000000
%4E64980003BFC000000000000000000000000000000000000000000000000000000000000000000
%4E64B80003BFE000000000000000000000000000000000000000000000000000000000000000000
%4E6A0B0003C000636C65173B0C1F0010020 90C1566C106C5040F83C61FC41FC135C505C1AFA42A
%4E6D4B0003C020C90416837CC5B335C304168376EA19A02BC2AFA42AE319A2C00444CC1AE4E0E2
%4E6F680003C0400444C61AEEB219AFA528727BC035C22CC01ACBB435E1C71FC21FD4A2C80387C6
%4E6BF80003C060B2A03570CD6143D96143CBB335CB6143D96142BF28AEB8A2038065437277C504
%4E6BB80003C0B0C561437776C104C0356543C1AFA1C56143C220C720C504C56143C720C620C104
%4E6E580003C0A0C56143C1AFA1C56143C21DC71DC504C1BF6443C71DC61DC104C56143C1AFA1C5
%4E6B380003C0C06143C52A2880C118C028802AC204C4BF61BF42C52A288018C228802AC204C25F
%4E6F480003C0E05F6243C1AFA1CE1AC71AC504C4B2C1B2D504C1B6C22880C2BEC71AC61AC104C1
%4E64DB0003C10028C128C128C10065647A000000000020236 85A045D3580C02BC73540C02CC235
%4E6EC80003C120C12A70746A2AC01FC01FC01F2AC21BDA1F4242C753D5286EC61FC11BDE28CA05
%4E6DB80003C140C9B6C6B6CF19C119CB1F77C72B455145 73C12CC3A90381A74244A428C7272880
%4E6DA80003C160256C60827046C554D72C4EC206CA26C42540C22162766EC8BFD22AC2BFDA2641
%4E6A380003C180CBBD351CC11C401EB7C2262A2635C11BC0214760A50383A4B6C02A636161 42C0
%4E6C180003C1A019C719D328D91AC32ADOB5C1BF40806A63D11ADF72D51A8064C0354062804170
%4E6C280003C1C0407028534 8C1B8AFA4B44770C92C26C126434EC62644D12841C22643C7BE7742
%4E64E80003C1E0C326C12643C40065647A171A000100400568670466188027606035C221C035C0
%4E6DC80003C2001E65622CC01182D935CC21446AC42AC02AC02AC02AC81ED8282CCA1AC71EC01E
%4E6FA80003C220C01EC01E4970D31AD42B414040D327DFD026DFDF4370D5286ECC1AD705DB18BF
%4E60280003C240C65F41705FC55FC11AC25FC106D326C918DFDA27CC1ADF47704B40404074DFD3
%4E6C680003C2601BC01BC01BD327D726C92BC021C021C021C021C01ACD1AD71ECE2AC02AC02AC0
%4E6D380003C2802A422C1D43DFC0216544DDBE181BC01BC01B355E61C15E1EC3355E27622C5E11
%4E66F80003C2A0810065647A111100028273015668040DC121C4108763C4066080C3AFA5C1A3D5
%4E6D180003C2C02BC40660C41981AFA2C1A12AD62BC406C025C02AC619AFA061C21A6881C11FC5
%4E6EE80003C2E01FD4038CF11CC81CA0CC26C01A62CA35C01FD2038460C12AD52862CF26DA16C8
%4E62E80003C3001FD416DA25B140BFCE05C8BF4381BFDABF16DE16C3BFC0BFC63562C51FC1BF41
%4E6F580003C320CC5803835968 40C22683BF1F69496ACA2A46C95FA01CC81CA05E45C9038D45D1
%4E6F180003C34021C51F6042C9AFB9C71A84C326C52AC525C82A82C0AFA1B8C50683C026C226CE
%4E6E480003C36025C3BCA0BAA0BAA0C1AFA3BCC0BE7EC01AC12A06B90A821A0A83C61B3504118 1
```

%4E6D880003C38000636C65081F0000885376B8DB687BC31D54D019D43BCB19C51DC9
%4E62480003C3A0B21DF5E538A32A72CEA5C4B4A3463BD61EB6A9EA28C61EC82A60C8A728A01EC9
%4E68680003C3C0B26A606012A13BA2E8E01B60A028A028C0404060E1C2A238A1C34042403BA0E0
%4E6C180003C3E0E0E0E81AC0A1E0E0E0E0E0E1C04040B4A0C81AE1E0C040A0E0E040A0E0C041A2
%4E69FB0003C400C61AE1E02BA0C04041A014A0E0C01BA01881A5E2E0E01BA0E0C0A1E0E0523981
%4E67280003C420C41AA0E0C040404040A0C01B60A0C01B3BC8B2A0C0404060A0E0E01BA04041A2
%4E6CE80003C440E9E0C0A2C0404041A0C0403BECE0C11BA0E0E0C0A112A0C7A5E8E0E0C4B355E4
%4E61480003C460CDA3C2B6C9A2C0A9C421A0EDEEC3B33A80A2CFA4C0A13BA028C32AA2C41EA6C0
%4E6CB80003C4801E59A2C2A52AC8A252E1C31EC42C58A071A0398170C31EC506B206C5A1E31881
%4E6A480003C4A0B3C0ABC0A6C6A2E0CA06A006C91EE070C31EC82AA02AC50065647A0000000000
%4E6B680003C4C0543068D9A0A7A11980404A5028515151511 9A01980E8EEC219A01980E8ECC419
%4E6E380003C4E0A019B0E848E0C07419A01980E8E8C81960E9E640E94044E2C118E1C07BA044E4
%4E6EE80003C500E2C42A48A0EA28A0D028A02C48A0C07FE1E8F5E640D42AA0C118E1C07818CC2A
%4E63C80003C520A0E2CE05EDCA18C006BFEE2A7FEDDA2AA0E2CB18CB2AA0C118E1C07FE5E640F3
%4E60380003C540E8D228A04047A0C07E28A0EA2CA0EFEAE2CC1960E9C118E1C07819A01980E8E6
%4E6FE80003C56040C619A01980E8E8C619A01980E8EAC07219A01980E8ECC219A01980E8EEC0BE
%4E63880003C580A019804C2028805150285150006 5647A0000000000011510AA8616AC7622C6318
%4E6ED80003C5A06C2A525BA61AA3C1A72A82E1E0C028A821C2A7C92881B2B2C0B2A0C0B2E0EFE0
%4E6FB80003C5C0C02880B3C6A1C7B3B373C0622AC2A4C9B4D3A556C028ACE0C961A3B8B7B2B2B2
%4E6C680003C5E0B2B2B2B2B7B2A5C6B3A31AC14AC21AA3CC28432B4366B2CA60442144C06421C2
%4E61380003C6001BA2507378C320CAA8C3A7D32A82C8B5C2BFC1A2D51BC51EC0A6CAA6C7A5CA1B
%4E62680003C620C4B5DE21E7DBB3C4A21BA0C6B4B4CB1B52C705E9C0B2C7A1B2E1CE2CA01EEBE0
%4E61080003C640C0BAA2BAA5B4ECE4C106A02AF261A0C628A0E261A0EAE3E4E4F5D2B6A21EA71B
%4E68080003C660A91EA0B5DFC1BE6B6865280065647A00000000002070A85104AA21804E113567
%4E61180003C6807006C2AFABC3214F6645AFA9B3C3214FCFAFA9C5214F6448AFA7C7710E802881
%4E62E80003C6A0C00E8128820E81CCAFA5C9214FCFA8C0ABDD20CBA5CC20CD4073AB28BFD82885
%4E62D80003C6C0C0BFCA41B5ABBBA0E1C30EC41D4FC10EA00EBD0EBB0EB7C428AEC20E83D511C1
%4E6F080003C6E01EC00385C156C04072A9C12881C8A4B861C9B3A2C2A3CBA5C9700BC01BA7B3C8
%4E6E580003C700B3A2C135C20B81C128801AE862C90B1BCBB3C12BC2A2C7A1B4DB1BC474A1B2C1
%4E60E80003C720B3C31AC321C2B6A5C3A2C41AC1B6C448B6A4C2A1B2C1B5E2B4C2BE05EFCAB72A
%4E69380003C7400065647A0000000000035259A85D5AC4062A52E6E266601FC2062AE7E0E1E1CC
%4E62680003C760062A1A74A052A0CCAFAAC46B1DC06FCC6FDF5ED3A6C51FCD621A707055B6E4E0
%4E6DC80003C780E0E0E0E0F31DA01DA01DA01DA01DA01D5D2A53A01DA01DA01DA01DA01DA0CE2A
%4E6AE80003C7A0E319A019A019A019A019A0195DC26019A019A019A019A019A019A0CDA4B7A0E0
%4E6E780003C7C0E0C0A5BF41B2C26F48A0C2A1B8D619A0C31FC21B681D612064A041A8C12AAAC2
%4E6D380003C7E01C42A0C1671DD019A0FD43407AC81FE14440C22BC5ABE2414053C82AC11CC262
%4E6B180003C80019A04240CC6819A042407AC3A144A04440B5C7B4EB4440A0C1BD2882C02AC11F
%4E60180003C820C30552C42CBB40C11FA0D4A3E478C1B4C0A1C0B4C1BEC7B2C6BCC02CB2C22AC5
%4E6C180003C84028006 5647A000000000060D05A681FD942A0C91FC01FC01FF0E4D41AE3E4EEE9
%4E65380003C860E4C653E4EBE4EAE7E4E4C3B5E3C452E3E441A0E0E6E5E4E62AE1E4E5E6E4E4E2
%4E60480003C880E5E2E4E22864A02BA0E5E4E4E028C620E644E0E4ECCC21C021A06BA0CDA22AC6
%4E61980003C8A0A3B3A569202CA0D6BFC320E24DCAB32BE328E4F2E4E319A0E143EAE420E2E3EF
%4E66C80003C8C0E4E843EA63E9CA19E3C3B6E2E543EAE7E56EA0E7E564C419E3E7E5EF42E3E5EF
%4E60180003C8E0E7E54AE342E3E5EFE7E7E2E942E3C4BE70A00670A02C4362A0E7C2050065647A
%4E6C480003C900000000000013117A8605A9F35B020A0C94F0560E2FAC81942A07FFFE3DFEDD42B
%4E63C80003C920A0EEC441A020A0DB4FC2424FE0F6C14319D41AA0E7DFE0E6D77FC12BECCBBFE8
%4E64B80003C940FE20E1E7C0427FDFC04FD54CA1EBD020A0DFECD41A57E2E6E9D32EC103A4ECCD
%4E6CE80003C9601EC006E3C4482BA0FD6EE1F0C1B4D228A066BE2004C2B54FE420350065647A00
%4E66D80003C980000000000500A0368045B2CB062202BC1196560C21F62A0C106D22BE6C120F3E5
%4E6F780003C9A0E3D01C70A0E3E32862AAC0A1B4E1E6C420606660E5E465DA1F6B70E76B64EA19
%4E6CC80003C9C0A0C81FC02068E719A0E265F219A0E27A6070C235E5E4D057C057706175A02B28
%4E6E880003C9E064C6A1E0C9A5C2BA47A0D028BF63C435C205C0B247B2C947A0C435641169C6A2
%4E6CE80003CA00E0487B60716BD5357171DFE962656761C720C2A2F8627C62648061796 7D911D2
%4E6EC80003CA20BA6160635828582862 61CAA2B3A6C0A8BAE6E0C42A81C52A607BE21B61C92BC9
%4E68080003CA40BEC82AB31EC51EB328C52182006 5647A0000000002024D5AA80409358 0C311C1
%4E6AB80003CA606535C2630CC00DC00EC006C511D10CC00DC00E5103C22BC11145CA0CC00DC00E
%4E6B680003CA8082C411CC1BC30CC00D530382C411D10C540D84C46FC10C0384C01183651ACA0C
%4E63780003CAA086D6570386DFDF4143DFC32EC51BC81BCF5CD0038DD035CD055E038CBF038DCE
%4E65380003CAC035D0038EDFDFD21AC9601ADFE0E1E0E14EDFDFC61BE0C11BE1DFCEA3C165A249
%4E62180003CAE0C42CC01EC62BE6DFCC1EC43580C71BE0CBB4C4BE3580C3657D5E355DC2683500

```
%4E65C80003CB0065647A000000000000B0505F0668C8806665644ED01073C421DB212846D0107F
%4E6E680003CB20D71041C1A7C1A840404A40404440407943 4FDF64474F66DF454FDFCCB8D1B865
%4E62E80003CB40DC1FBFCE05DFDFDF6F454FDF64474FDF4D4FDF48C12B41404044404 0C2068235
%4E6AB80003CB60C6B9A6C2A7BA1184C52BD111762142D11177D511C20380BE656764C15311C204
%4E69280003CB802A0065647A0000000000305E5D5A0E6835B0C40C91C42A72E644E473C90C9176
%4E65D80003CBA0EBE577DFDFC7B260E040E040E040E060CB2CDDA2E8FAE66FE1EC61DFD42AE8C9
%4E65F80003CBC0A2DFD7DF44E0C12AC305C22A44DCB2DFCBA2C72AE8DFC55DF3626AE1DFE2E2E2
%4E6EC80003CBE0E3C5A4F3C51EE2D85EC40462E040E040E040E060CA04DEA4C1A2C0A2C0A2C1A1
%4E69680003CC0072C61EFAC303817FC12CC1BE1EC40406B3C10E8DC3350065647A000000000110
%4E6C080003CC20570A5A040B2A81C119C006C419CB430BC72AC55103C51BC340C9B2C072CE52C1
%4E6AA80003CC40417262C51B73C5520385A061C01BA641B2A0CE0435C72AC0A14375C40386A0CB
%4E6D580003CC60A141B2A0CD35C628C2284519C152C51BC051C577C5B2A00381B2ACCDA235CB35
%4E62B80003CC806861 61C719DFDFEFE0E0E0C60382C728FEBEC2BFE0E0E0E0C119C305C319C42B
%4E61180003CCA0D153C13553C6BFA2BFC128E2C2B8C30383F3CFBAA363E2D104EDC719C435C0A2
%4E6D580003CCC0C0A1B261E2C25335CD40C328E7C00383A8035140B2C1B262E2E9C542ECE0E0E0
%4E6F480003CCE064C1B2A141B2C1B261E2E9C42AC143EAE0E0E0C8B242B2A328ED6169C12861E8
%4E6A780003CD00C72AC0B2C62AEDCEBEC12A28C028606060E063C5B260C12C0065647A00000000
%4E69380003CD20802038597 5C344C22BC01BA01BC006C11BA019C02840A006C12840A019C02BE7
%4E69880003CD40E5E4E5C52860716172617161726 1C028DFC01B4B4245404252545555554A206C4
%4E6E880003CD601BC51AC21AC01B4542C5B4CBB4CC28607162C1B5617162C1B561C0287C7BDFC5
%4E6C380003CD801BC21BC51BC01AC21AC51BC0064252555454 55A2194443CB1AC41AC5B5C5B461
%4E6A980003CDA0C1B5C5B4C4BF28607161 72C1057162716 1C028DFC0064240434 6C91A52555455
%4E6E180003CDC054A21A44434042CB1AC5B4CBB4CC28607162C1B5617161C2B561C0287C7BDFC5
%4E6B780003CDE0064240 43C61AC31A81C2065254555455A219C21AC01BC51AC41AC31BC41AC5B5
%4E6DB80003CE00C5B4C4B5C5B4C52B607161726171617261C02BE5E5E4E5C4BEC128E106C028C1
%4E66D80003CE201BA006C028C01BA0C128C106A01AC30065647A000000008010CB6859049A2C80
%4E6DC80003CE40DC35C006E01DA0C12AE01B4273A06543DEABC1A3C1A941DE06E01DA0E31B4273
%4E61280003CE60A065C32ADEABC1A3C1A941DE28E01DA0C12AE01B4273286543DEABC1A3C1A9DF
%4E6F780003CE80C106E01EA0E31B4273A065C32CDDBFABC1A3C1A85F0540DE28E01CA0C22AA01B
%4E61080003CEA04273A06543DEABC1A3C1A9DFE31EA0E31B4273A065C32ADEABC1A3C1A941DE06
%4E6E880003CEC0E01DA0E31B4273A065C32ADEABC1A3C1A941DE28E01CA0C22AA01B42732865C2
%4E69380003CEE0BE28DB5EC00065647A000000000060A76850605F1082EA1FA06840C005DA1048
%4E60280003CF00E81FA02867C8AFA44AD128DFDFCEA11FAAD120A2060475D3B2A0B20304C6B2D2
%4E6EE80003CF2028E3E152F4C12171C1B2D520C72BF557D51FC1B2C5B3C9BF1082C835C1B352C5
%4E62280003CF40BFC6BF5BC1B264C10F82D220D5B3C1B2C5B2C2BFD6B2D62BC82BD4A341A3B3D3
%4E61C80003CF602B20A0DBBECFB410817ACB1EB150EDB2ADB2A0D310CD0F82C02B41674BC7BBAF
%4E6A080003CF80A6BC63C90FD2BE10C90FD1280065647A0000000000 2033A85A045DC335C11BC0
%4E6D280003CFA02BC11BA071D005E9D6B2C6442A602AC24904E61BCD401AA303A0E672D2A1C544
%4E61480003CFC0A5C0451BC3A11BE31BD7A1E372CE2BC41BA1C24D411AC8A1C72A602AC72DE9CE
%4E6F380003CFE0451BC72BA21AD1A128A128A128A0B2A135C25C7DC21BC11B6135B4AFA0CEAFA0
%4E61E80003D000C0BFCDB22B80D11D72C6B3A0CE038EA1CF2AC42AC7A1DEA14C1A64C9A1CC2AC4
%4E6E180003D0202ACAA11A616061C5B4CEA135D6441DA10386D535A1CE4EA1C74D441DC2A1D91D
%4E69180003D040C3A1DFA1DEA1C0BE63C52B60C1431DC055C5060065647A0000000001715 35A5B
%4E6F980003D060046 8C50663EED41BC02A42C1A1C10562D5A1FDCC2A68D92AC2A4C2A14CCEA1E3
%4E6058 0003D0804DC735A1E4B2B3D11BC1A1FDE5C32A40C10383E7BAE5D5A1E5C21967E9C219C1
%4E62180003D0A0A74BDFE975BF67E3BAE643CFA1C6AA42C456C0A17F0BC5573581A2E67B0BA603
%4E6E480003D0C080A1E742750BC035C5A1C219C3AEE040C1A1D028C32AC5A1E7C7B2E7C1A1E741
%4E6CC80003D0E0C435046 3C4A1C7AFA2C1A1D31A70C02A2C2AC003A1E7C8B2F361C604C32A6145
%4E69C80003D100C2AFA2B5F2E7C5BE35E562E740758000 65647A0000000000 2920E5E9B6A4228
%4E6D980003D12068C72CC0521EC12B42286EC0A2C841A2CDA1CA421E61C850A11ACA43B2A6C528
%4E6C780003D140CC0A86C154A02880C6540D86C6A16C411B411B42C5A158A2C20D85A768C647C0
%4E60280003D1601AC104C51A76CF04CEA370807080C4A26ECD1DCC5FC1B2A0CAA2D0A11969C2BF
%4E6CD80003D180C81AC4A1C4BFD0A2B2A0C2A164C3A32880C12882C3A1C2A1357660CD19A160C0
%4E6E980003D1A0A1D2BFC5A1C2A152BFA27A5319A1C2A263CB352CC5A1E2C9A20382B2A1B3C419
%4E60180003D1C0A1C2B673A3F1690665CB1A6062C0541CC2AEB2ABC41DC71CC81CCCB2A01CC5B2
%4E6DE80003D1E0A01CD4A1C1A1C2A1C1A1C505E6C51BA1C51BA150B9C4BEC01DC0B2A056A056A0
%4E66F80003D200C70065647A0000000000300A0E0D285EC3A170E072C0351C2ACF0535A142A0DA
%4E6D280003D220044204E5C62AE7C0A243E5EF03A2C4A17875C244E0D843B379C1352CCB4272E1
%4E6C580003D240C1A162B7A30380A475EA0C83C3610CC303A3C135E664C363C243B2A2B7C3BA0C
%4E6F780003D260B5C30C82E2CB67C36372CB0380ACB5CF0CB1C16DE6C0A1410CB1C16A1E60BF78
```

```
%4E6B780003D280800CB50CB1C3ABC80C85C42A412B402B412B42ADB5C01CC44E70CD[illegible]28
%4E6BC80003D2A04051285146C1B2C7A1B40380A5461E40C204C3A4CD45C435A1CF1C46C2A3C3A4
%4E6C980003D2C0B32835A6D04C1D77C61D42A5B242CFA2B342C542C428D00383A32A81D347A345
%4E6C580003D2E0C1B7C5A3B4491E467848B340A042BE421E35BD2CC4B5C147B342A01E40060065
%4E69680003D300647A0000000000010579E6A0E04CE35D6A14D4C28C052CAA90381C428A0C0A7D1
%4E6F280003D3205252522ADB2882DF66F2E8C04FDFECC0A2D01E80B2CE57576A0E54C453515151
%4E6AB80003D340515151C32881C9ADF2D4515151515151C20EE0C1424CA02BA02BA0C1BFA1E0
%4E63C80003D360E0E4C2BFF0C51DD0450EE3E2C6BFE4E2E5DFC01CE1C11CE9C04240A0E3D0BFEC
%4E61080003D380E0E0E0E0C9464FD1B5A0D22CC635C10EC8A1BCC0B8C4B3A95C0651CD54D871C3
%4E6CF80003D3A0554942A2B4ADB9AAC4356E4B05CD462A44BEC372525252525252C14F2A1E006564
%4E68F80003D3C07A0000000081244668 5A585D358043E0C2A140E4E228C335C2A1E0C019E0C3A1
%4E6E780003D3E0C0A1C01F2AA0C2A3C31BE1C2A1C0A260C0A2E42C20A0C2B2E0EBE2C0A2EAE0B2
%4E6E1B0003D400A0C0A2E0C0A2E5C0A1C0A128A1F2C0B32543E6E0E0E0E2E4C22AE4C0A2CCB3C0
%4E6E7B0003D420B2C2A1C9B2E0E4C0B2E668A1C50566A0C120A0E0E0C1B3E7E4C2B2C825E4C0A2
%4E60A80003D440CEB2E028A0C0A3C5B2E0E0E0E0C0B2E0E454C3A1CEB2C4A1E9C0A2C1A1E2E4C7
%4E60B80003D460BFA0E0E2C8A2E2E02180B9E7C4B2C0A1B2C4B3E268A1C0A1B3C51BA0E4E4B4E8
%4E6CB80003D4B0E0E0C1A2C2A5B342C1B2E2C2A3E04153E128E2E57141A0C2A1B3A0C0B2A1E2E3
%4E61E80003D4A0E0B4C3A2EDC1B2A0C41E2AA0C0B2E3C4A8E7E0C2A147E5E1EAC3B3C0B2A5CBA1
%4E6E880003D4C0E0C11C72EBC0B2C0A128E7C1B2A2E5C0B2E0E4B4A0C0A1C3B2C7B351E303A273
%4E6D680003D4E0A0E1E2E2B2C4A2C004C4A22AC1B5E1E0E4E0B341A0E0C00403BE35A028E1E21D
%4E69F80003D500C2B2E0E5E2C00406006 5647A0000000000526F5EAA04281E80DC1EDF456FC02A
%4E64180003D5201ECA6FC26FD71ED81EC46FC8691E4ECF038DD235C11DC319E1F3E835D4A1E5D4
%4E6DA80003D54019C10385A0C01BD635C235C91AC41AD772C2BFC272CA05DB5335C23553D51DE1
%4E6EC80003D5600384C119CB1AC7A1C4A1C71AC572C435A0E8C05AC372ECC11BC41CC035A1D05C
%4E63A80003D580038AA14F4EDFC928D828C41A28D62B1ADA28DD281ACA1A6FDFC628C0BE06DC1E
%4E67380003D5A00065647A0000000000083A30B5B5AA828801B6060C02BCA2B6160606 0C0701BDF
%4E64780003D5C0DE1BDFCD2B6FDFDFC5A2D5752AC51DC01DC87BA06364DFD32C66678061B0C7B5
%4E6DA80003D5E0A3C806D6A203A0C1B5A2C84256D3BF42CB0553CA4256C235D042EA03A0CE42D0
%4E60580003D6001ACA4256C1B6C2B6CD42C22AC519E0C019C42AC742E9E2D71AC1A1C0A151DFDF
%4E69980003D620D51A5253C643DB43DB43DB43DB42BE7D2ACB41280065647A000000000064F003
%4E6F480003D6405E045BC11ACC2869C12A2CC11A5176C32865C52A35C2AFADD62880C42BA6C04F
%4E6D880003D66042C1A373C31AC7286ACA4DC9A562C03580616 3C2A276C735806AD23580CFA563
%4E6E380003D680C235B0CBA32872C6476166CB1AC22CC609CCA5C109C635C009C22BA376C409C7
%4E60480003D6A0530964C3BFCE05E209CAA5CC04C7A31BC55C61E761C61AC243A0C3574A5B7DC1
%4E6DBB0003D6C05D2B61C12864C15FA2C542C24F40C7288265D01AC1542B51C2B4AFA145C042DD
%4E60EB0003D6E01BC21AD11AC54454A2C2AFA31E7261DFD72BC02A63B3AFA3DFC1BE06C12A62D3
%4E6C680003D7001AC10065647A0000000000004066A85E6B9D35802ACE2A1ECC771A2AD7AFA9C57F
%4E60BB0003D720C619CD441BDAAEC7751AC042441AC11BDA35A0B268D2A1CB76B4CB4FC82A1AC3
%4E6FBB0003D7402B7FCCB3A1C673712BA9C4A22CC01AC5BBA4C306C147A7CB42B2A2C3042B43BF
%4E6CEB0003D760CB05E1C4401BE2C8A5C306C043B2A7C7702CA4C0B2A3C0041CC1411ECE1AC041
%4E6E7B0003D78004C0A3D5B7A362A1C32CD72AC0A2C0A1B4C34FDF61DFDF6B61612A606161C040
%4E6DCB0003D7A01E61C02A1E61C2AFAF2BC249472B54C12C5052CC2CC4492C52515152 53C4BE47
%4E6A8B0003D7C04B462CC12B0065647A0000000000429D0B5A686A2BB04E2A4ADFDFC11F646271
%4E61A80003D7E06162626252DF5BDFDF5F72FEE0E0E0E0E0E0E0E01DA0E0E0E0E0E0E052C61CD21D
%4E61EB0003D800C2A1E0E0E0E0E0E0E0E0E0E0E0E0E0C31DDFC0AFABCC11D2BFCA11CF05C006CB
%4E619B0003D82011D0BFC3AFABC11DDEA1E0E0E01CA0E0E0E0E0E0E0E0E0E0E053C52EF9E0E0E0E0
%4E61EB0003D840E0E0E0E0E0E01DA0E0E0E0DE2ADFDF545FDFDF5962626262716061 62C21FDDBCC0
%4E6A0B0003D860BE4F4BC20065647A1535000280330059 66A168A11980CE2B4CA0198 04981AC42
%4E6AAB0003D8B0A01928E41983A0604EA01980E41940A0654BA0E619A06AC4505019A070E4065F
%4E6708 0003D8A0E52CE566EFE661D328A0C6AF77A0FFFFC818D42AA0DE2AAFC305DCBFD618DFD3
%4E62EB0003D8C02AAFCD2AA0FDC818F3DC28A0DC28A0C6AFE62CE561CC515019A070E4664CA0E6
%4E6A7B0003D8E0065F42A0E619A06A46A01928E41940A06549A01980E41983A0604CA019804981
%4E6CFB0003D900ACC0BEA01980CD2BCC0065647A0000000000800E5C5E1A1DD91CDE1CC5198F47
%4E69880003D920DE1CDE1CCB2BC52B4DD6ABDFC328C328DFDFDFC22BDFCD75C805CEACD91EC3BF
%4E67680003D940C92BC35F69D4BF68DE1EC206C128C328D21EDE1ED7ACC22BC52BDFDFDFDFCC74
%4E6FD80003D960D7ABDB1CC5198F47D5BC47C4BECE5E48C40065647A0928000080132F4B685E61
%4E6D480003D9801480CD1B2C2855432ACF1B2A283A7055408 1C2AFA0C2A50B81C70EB11E0E85B3
%4E6C0B0003D9A0C31A43815054 0E81C00E86A04781C5A9C327A462B173C31BC13970E06B81CB39
%4E6D980003D9C0C206A02AC11A4681C8AD18714181C1B7D92B81D11E746380C027CAA7CB3980A3
%4E6D980003D9E0C327D83B81C5A41B63CD2A1EC404C135A53BC6BFC5A23B14C104C005C004C114
```

%4E6F880003DA003BA3CC3BA2B5A135C104542A6DC31BA4C53B81C0BFD627C4A2398175C3A7B5C9
%4E60580003DA20276081C1BF55CBBF6581DC0B8170C118BEACBE4881C51AC32AA006C2396A81EC
%4E6D280003DA4070C03918736481C1B4A427C4A7B44581E70EB61E574180BFC31AC40E811E0E81
%4E6CD80003DA60C3274680A671AFB7428051682C1BCDBE2A0B54C3B33A282A1BCC1400636C6503
%4E68480003DA802400008CB44A0378687BC80E801117801C4178011 0E80C705C70E80111417C417
%4E6AD80003DAA014110E807CC20E801117801 71C11780110E8072C3AF38AE1A73C92C79D2381438
%4E6F780003DAC0D519C62AC619C6A538A83BA83BA46C7161F762E27AC51AE225A0E0E0E0253BC2
%4E6CB80003DAE01AC5AAE2C01FE0C2A93B39C1181B181B18C01C386060E0E0601CC01B1B181B18
%4E6A880003DB00C13980C245E150E050E0C245CAB360E0E0606060C0B3E7C243C019A0C119A0C0
%4E69480003DB2019E0C01CE019C143C11FA051C035E16060E060E060E0C13550E11AC24260C11C
%4E6A380003DB40A050E050E0C01C6044C61CE260E060606060E0C21CC5A1432A19A0C01FE0C01F
%4E69E80003DB60E0C01FE0192A43A1E0C02A52E13880E0E060E0E038A051C22AC442608022E050
%4E68780003DB80E050E0C022388044C52B18E23880606060E06080A0C2182BC6425019A0C025E0
%4E6A380003DBA0C025E0C025E0192844C127C31B6219A0E019A0E019A0E019A0C218E4C10681A1
%4E6C980003DBC0C02A605060C02C6050C0A10682C0A135C0BFA2BBAFA0BBA2BFC035B2E222A035
%4E6B180003DBE0C220C33A391B803920C22CA022A0E5E03BE760B0393B64A0E0E3E06639388035
%4E6BC80003DC00A0C535E2E0C21AC21DC4391B80393AC71DC31AC000636C65060D000004000058
%4E69D80003DC206839B52880C41081D674108167CA05C1AFA80380A4CB118214C014CB118062C0
%4E624B0003DC402AC71182D035A10380AFAC2EC22E69C02ACB7FCD5139C02ED518DFC72EDF4A4E
%4E61B80003DC6046D228C47F43D528D3BFDFD3284C444448DFDF61D3BF6F426142E241FB46D604
%4E6AA80003DC80CC2CC07E0449C3AFAC038C013C923C624C020C310813A80C01351C7512351C1
%4E6CB80003DCA03B81C1512051C41081A20380ABB3AE28CE26CC1DBE2ACD512651CB060065647A
%4E69280003DCC00E2302018B3419785A5E5D194028A01AC128A0C23AA028523B06A01A60A028C0
%4E6C280003DCE006A0E1E040E038A038A0E0E42AA1412AA042A051E17081E0E0E2E0E42AE4E2E0
%4E6C880003DD00E26040E04242E050E02CE0E070E040E4E428A0E2E01BE2E4E4E050E2C11CE1E3
%4E6B380003DD2040E2E0E2E2E2E0C128A040E1E240E24044E042E050C0A171E1E46180E272E0E5
%4E6D680003DD4071A0E0C01940E0E440E2E042E140E2E0C01CE0E2C01CE0E050E0E0E3E4E4E0E4
%4E6BC80003DD602BE35041E06138E0C328A0E4E0E240E161A0E0E2E2E0E2C23940C2A1E463A040
%4E6CA80003DD8042E01AE3E528E1E0E4C105E106E3E0C01BE0E14060E01A80E040E2E0C11BA0E2
%4E6D780003DDA0E060E144E0E240E2E0E443E061E1E4C31CA06141E0E1E2E2E0C01CE0E042E0E2
%4E6CB80003DDC042A062E0E042E0E2E042E0E5E4E462E062E062E0E1E24070E040E2E0E2E0E243
%4E6D380003DDE0E0E2E060E040E2E042E061E2E4E4C21BE061E128E4E070402BA0E240E2E0E2E0
%4E6BF80003DE00E3E2E042E0E2E0E22BA0C128A04162E0E4E406C01BE161C1A1E428A0E24050E0
%4E6AA80003DE2006A0E2406438C0A13861A01AA0E2E060E0C039E2E0E0C028A03A38C328A02B1A
%4E6AB0003DE4080C139E42861E02C38C000636C65173B0C1F8010150BA8395D2E80C228A071C1
%4E6B380003DE604228802B4271E0632CE2C742C341E3E164A0C7423A8142C6A2C12BC21BA0C441
%4E6F080003DE8053C341CBA1E1C219C14138C25441E31EC235C16F38E6C1A1DFC66805DC53C519
%4E60080003DEA07CC419C33BC253CB40D1382ECA40CF681A80C147C752C519C44A1AC11CC338CB
%4E6D280003DEC0453984388039 84C2533980383982388039 82BF2BC23AD53AC12881C23AD53AC1
%4E6CA80003DEE02BC0398338B0398338398438398338803982441AD41B8048D445C81CD242CE62
%4E60D80003DF001DC94071C2651DC9611DC240AFADC2631AC1613BC019CC6FC73BC51ACE18C4AB
%4E60280003DF20C4A53BA3C63B18842BCE18C03BC5A7B5D63BC9BE06B306C11AC162B761B42B1A
%4E66F80003DF40B2C928000000000000000000000000000000000000000000000000000000000000
%4E64580003DF600000000000000000000000000000000000000000000000000000000000000000
%4E64780003DF800000000000000000000000000000000000000000000000000000000000000000
%4E64980003DFA000000000000000000000000000000000000000000000000000000000000000
%4E64B80003DFC000000000000000000000000000000000000000000000000000000000000000
%4E64D80003DFE000000000000000000000000000000000000000000000000000000000000000
%4E69680003E000636C65173B0C1F8042F26859A09A2A8043C01BC406404240A0712842C01B6FC3
%4E6EE80003E020A1C31BC2A2C2B2E9B2C7B2A042DF47C01BEAC71BC3A4B3E5C473A0C771194065
%4E60A80003E040C91BC9B2C42AC02C49C22AA2C8B3A1B8A2B3C2B4A0E1B3A36EE9741A80C12CCE
%4E6DD80003E060B2CDB6A1CD77286D38A038C3A5C1A22846C338C2384280C11AA0E106AAC238E2
%4E6CC80003E0B06040B0C7BFC0511FC11F61E1C005C03842B07DB2C538C23BC2AAC1B3CA38A038
%4E60580003E0A019C21CE028C01CC21CD4B8C5B2CCB964F2C01FC6A542CBA32BC6501DA5E342C5
%4E6F680003E0C0A4B2C71DC21C28C01CC2A1C25028C25AB3A2B2CDB2E1C41DC41DC552A2C72BE2
%4E62280003E0E0B448C55F28E1C2A228DBB4E11DA3E1B9EDCB5FC11DC2A1C58E48B250B3C006BA
%4E6AB80003E10006C1B228C01DA01DC32A0065647A0E0702010811EA5D5A286AC12CA0F741E4C9
%4E63F80003E12005E8E7F7E7F344E1F7E7F3E7F7E7F3E7C535F040E5F3C728D728E3E0E0E0E0E0
%4E6FE80003E140E0E0E0E0E0E0E0E0FFE0E0E0E0E0E0E0E0E0E0E0E0E0E0E0E0E0DF6170A00B85
%4E61880003E1601A0B842A0B85A060C1039EDFDFDFDFDF1A6363C128C11BC12BC11B63DFDFC328

```
%4E6D280003E18040C02841C12841C128C11EC02841C12840DFC728C528C528C728C70ECC0EC70E
%4E69B80003E1A0C71BCC18C71873C1530E5374C4530E5371C253065300C00636C65173B0C1F0071
%4E69780003E1C0A3B851045920806 1A0D83562A0D21AC41B62A0C142A0C405E4C11A66A0C142A0
%4E68FB0003E1E04A38A0C11AC0530380E1C142A0411976C138A0C9434119C1B5C2B571C1400381
%4E6AC80003E20035C02879E14238A071C21881E3E371E14438A07168A0E74638A06BA0E54838A0
%4E6B580003E220C2282AC1551B62A0D4A2C00381E2C1B6C735C7B635C055E5C238A53BA9410381
%4E6BF80003E240C120A0E2E311C21DC11CC328C451E1E211A0E311CE28A0C0BFE21160A0E3C8B3
%4E6AA80003E26043A043A0E4C7B4E43B13E045A0C020E0E228E6E238A047A02842A01338B5C538
%4E69180003E280A0E24235C028E3E313A0E6400A82C00381A1E4C44638A0C00A81C035C01B0A60
%4E69580003E2A0A0E4C021C12AC51DA0400A82C0510A2861A0E4C41DC438A0C00A8153C0038261
%4E6DD80003E2C0A0E42AEA038267A0E4C3B5C438A0C820E2E312B5A0C42AE3E4E4E312C02838A0
%4E6DE80003E2E041A3E114E8E3E1401AA0C31DE3C1A10B81E0E3C02AA01AE2E8E1C345A1C438A5
%4E68280003E30042A00BC11BC0BE28CD3981062A80A03AC028380BC22C00636C650A2102010833
%4E6D080003E320FB0D785AA82880CA06C078A01AA019382A1AC61DF160191A81F5E26019A0C31D
%4E6E380003E340C0B3EE1AE36019C91DC343E11AE560C8B3C44250A0E0E61AC2B4CA42B3A0E019
%4E6B380003E360386662A03864A2C270A060E074731BA6C528A01AA06019A0C67A3BE560E0E0C5
%4E6AD80003E380ADE360E06019A0C42A1AC5781AA060193860E0C335C31BC53B55A060E06019A0
%4E6C980003E3A0C2AD553850E060E07018CA1857A0E050E019A0BF35C41BC43BBFC005C13B52A0
%4E6D680003E3C060E0E0C1AD5BA0E0E0C0A12AC67C1AA060E0E051C318C53B57A0193850E019AF
%4E6BC80003E3E0C32A50A060E0E0E02881D11AA060E060E0CE3BC3BC1AA06050601938C7A53BA2
%4E69D80003E400C228A06019A060E0C51CC173712CE56060E07F038043A1E06019A0C4741DC21D
%4E6DD80003E420C0B2C24250A01AA0E0E5CE43E11AA0651AF5E560C3B6C2B4C21DC4B5E3E3601A
%4E69980003E440CB03816B601AA0BEC828B2C02CBE7828A01A381A382A00636C655F1101000002
%4E6E180003E460FF685B619E43D4397028C226C2A2C0A2C0A1C1A2C0A1C2397028C72AE0E2E2E2
%4E6BA80003E4802AC135C726C2A2C220E02EA050C2A42162EEE251802C51C1B2C42AC42080E2C9
%4E6AC80003E4A0B3C60381C020E0C0A1C12A042C6CECC104C1B2E35162C5B4C120C013C1A450B3
%4E6AE80003E4C054C1B345E0C206C02A56C22AB348C038D61B408040C138C2B4C5A3C1B3516250
%4E6D680003E4E0C326C03881C0A5E452C1B34AC32635E2C32AB3C82643D33560C1BFA9E4275462
%4E6EB80003E500C1B3C535C275A055C1B3C535C77AB3E1C672A3C4B6C3B6E46150CBB3C23BC571
%4E6A880003E520381BC1B366CB3841C2713803803 8CA73388142C0B3C2113B1838C379B2C413C5
%4E6BA80003E5400381A0C32AEBC613C23BC03A21E05162C2B3C2A5B7A1B2C111B3A2C5A2C2A2C0
%4E6B880003E5607028C404CB721B47C235C004C71180A0C3BBC571A9C111A3C5A85151C13BE2C3
%4E67D80003E5800561D3B4E1C4BE1B2A1BA06380A04AC104C035C200636C65000D010300544068
%4E68780003E5A05BA1540680C02A43444344192A7940704271407141 72C6A939AFA02882D32840
%4E6C880003E5C0C1212C44C15753512841C15528C0AFA1CD3AC027A048CA19D2287CC727C127A0
%4E6DF80003E5E0C11E80A04743C7A3C0A3E443C02AC4B4DA14C3A1DD1E80D127C319C02AC13B44
%4E6F380003E60080A424C0B343E0E3B8A0BCA23BE841C3192861C0BFC43BC805C1A663CA1EB7E5
%4E69880003E620414A80A04380A0C2A45028C3521B6365E25428C352A0286942E6E228816449C4
%4E62C80003E6402AC3BFC2BF6BB3A8B2D428DABB42CB2EE9C3A6C5A3B3468 01EC81EA0E527C027
%4E6F280003E66040C22A28D428C42AC7BA4F45C055ABB7AAB71E64E01B6128E71B602A1B42C1BE
%4E68680003E68041454847C10065647A10380102802 0AE0D689C4E06807080CA42641BC40673C1
%4E6B580003E6A01BC12AE342C542C51E70C1A561A152A51D427080B20E64C6A1C2427682C65528
%4E6D880003E6C0C242C6A3D143C11E62D41C42C0A2CCB2C6B3C54563451C4260C845DB28C343C2
%4E6D380003E6E0A4C4A428C71C43CA42C640E4CE42C6401D63C8A15242A053B8C50C82C0500C83
%4E6DC80003E700A0C1B6C21AA055B4C1BF0C82B6C10C83A0C42CA02AA0C0426EE7E242C01D61D7
%4E6E480003E72042A5D64263C1A4C75742C04165C7A4C31DC441DAA41DCAB564C25641DD41D6B6
%4E6BB80003E74068C7A3C642C6A3D142C12A718228D1B2C041A40E821BC205CF417482D4417482
%4E66B80003E760C0BE6BB52A62A051A028C11EA0C00600636C65142101028042 4D035104390680
%4E6BE80003E7B01AC106C035C1212AC035C628C02AC12135C01BC006C22ACC05C43A6DC23AB1CF
%4E6C180003E7A02AC22863C335CA35C128C13AC23AC22011C2A1B4A8B4CC753AB2C020C00BC028
%4E6CE80003E7C085C00BC728C13A8028C60BC80BD40BC80BC63A8060201180 73C178C20BC80BC3
%4E62E80003E7E01A65C80BC80BC479CE0BC80BC17AC028CF0BC80BC935C90BC80BD40BC80BCB09
%4E6D780003E800B1C51BC81BC51AC1BFC10981C020C3A25BA25BA3C440C4091AC6285CC035A05C
%4E6D780003E820C1355C28C528C4098058C4BD35A2C044C0BDC435C409C028C23BC028A0EB28C0
%4E6D180003E84057C809C35A47358046C01AC43BC009EBE10A852B5A6C84A0C14B28C43BC12047
%4E69780003E860E1350A84CB564204403B1183A0C14A58C5356147E128C72A69043BC120C035A0
%4E69980003E880C14B6847E10A85C01A3504C10665043B1183A0C14B61816347E1C628C21A6081
%4E67A80003E8A06380E5C14BC0BE21118 0C32011C428A02880A00A85C03506040600636C65142A
%4E67680003E8C0010208 5219A8940693402AC21FC0422881C6412A634051C0062806C051CF5106
%4E69D80003E8E0B1C61206C552D052C20680CC05C60682C252C30681C654C354C228704D520680
```

%4E67180003E900C14341540681C20681C20680C828800580206C04453C452C14FC7068042725 1
%4E6AD80003E920068 1C446068 1C2720681D24551C22852C8487FC553C152C154C90684C17FC052
%4E69980003E940C51F444256C34454C353C30680C3537506510680D555C5760682CF06C106C006
%4E67C80003E960C006C5287852C00682C0414040285 3C30682C055C052C02852CA06C006C006C1
%4E67F80003E98052CB400680C10681C465600680C551C64154C1062B06C64306D20683C5288006
%4E68480003E9A081C821C22806C223C723404452C152C4064653C253C552C14A0681C0404C0682
%4E6A180003E9C0C714286206C652C2634651C754C3610681C10681C255C051C452DFC00681C253
%4E67080003E9E0C00681C60681C653CB2880062A5128215 1602A5540512880 52C02CC051212806
%4E69FB0003EA0028062A2806C00065647A150001028020668CE119BC42AF527C470A0E8E8E7E0
%4E69AB0003EA2021A00EB2EB1181A01EC70B80A0E10E80A0C021A421E3E0E2C30BA043C11BA011
%4E6DFB0003EA4083A0E2C12EA2C527C0A1181BA0E0E6E0118260E7C1A1E02AC62AA0C4B20EE7C5
%4E6268 0003EA60A2C2A2E4E4E5F61EE4E0414343C6A1C3B5E07FC1B2E7E0E1F1EBC3B2CCD2E20E
%4E6D380003EA80C60BA0F50EC50B80A043C30543C52CA0C2BFC10B28D3532A60E5C154D12760E6
%4E6F480003EAA0E1F1E971B2CCB2E0C106C218E42AA0414343C21EA7E0E2F0C306E6C4A2C2A2E4
%4E6D380003EAC0E9C3A1E8E4EC2A1BA0E61BA011CD5151A0C218C011A01182E2515152C8B227C8
%4E6F4B0003EAE01EE0C370A041B2E7E3272CB2C32AB2E0C2A21CC670A3C0A1C0A4D70E83CE0EB1
%4E6B580003EB00E0F1E60E80BEDC0E8000636C65152B01020060B078A139BA1881C52AC104C463
%4E6828 0003EB202BC03951C7110411C81180C111C22AC128C0398138398138A2383981383981 3B
%4E6948 0003EB4039813 8A0C4394065727272721E44C2A138A2383981383981 3B3981383981 7571
%4E6A780003EB60A01EC2742BC2732138753AB2404139813 8A238398138A238C75240C363781EC3
%4E6A780003EB80B543C452C0A1383981383981383981C252C9523A38E01B7821383AB240753A52
%4E6B180003EBA04042C0398138398138A142C2526111523A38C12B4327C43A21A0C52A447352C1
%4E6B280003EBC072398138 41C052C25278B2403A52C17838C05240765235383581383552 35C1A1
%4E6B880003EBE0C052C0517138C5BFC0524046C053C005383AA003A0C051C2514573524439B0A0
%4E65D80003EC00403AA003A0C103A0C0B5C062715240C052C11B46E003B240C411C1524042C052
%4E69D80003EC2038A2383951427139C4115240E41EC71EE50344C452C0A1383981 38A238D2C252
%4E68B80003EC404078524027CB275240C13A54C43A5240C0398138398138398138398138C17262
%4E6B980003EC605240E01BC32BCA1BC15245C2A1383981383981 38A2383981 38B240C827C97827
%4E6B280003EC80C852383981383981383981383981383981383951C6613A80CA713A80C31BA1C2
%4E68980003ECA05339A23981A43986A5B6686D63A0210380BE2ACE6B0406006 36C650001000200
%4E6AF80003ECC033126861 0B9E2280C42C60E406C02A3980210E1E0E271780E7C12BA0C20E71A0
%4E6AE80003ECE0C211392839283828 39C10BE2E128A0E30EE2418039283928392839511B42C11B
%4E6E580003ED00E4E5C23AC53918C2A1520BE32CC6A5C43953C11B43E21ACA1BA0C4392AA2C0A4
%4E6FD80003ED20E11A41C551E1E4C574A8CFB54C6648D3B2E9F4C43BE27128D021A0C3A3C0A1B6
%4E6EC80003ED40A52844E5C33BD1B6A2EB21E460B2C713A0C6BFC2A20381A0C0A1EAC605E4E226
%4E6FE80003ED6044C137E3ECC117A026A7E442E8C117A026E6E441CC0EA0E7E440E5E5E428E2C0
%4E61280003ED801BE228E6C01AE1E435A0E3E4C61AA3E4C02CE0E3EBE8E3E360C335E228C4A374
%4E60580003EDA0A0EEC62BF7D2B2C5BCA011C2A3CC2BA01066A011CEA4C918A0D728BE35C235A0
%4E6A780003EDC0C8B621C027492B00636C65173B0C1F007201685991612880 4F454306D61BE528
%4E6E580003EDE0D128C335E5C5A90381A5B3E34AA1E5C20B1B38C31ECC11A0E328C20BB0A118A1
%4E6C980003EE000DC327B07611A0C217A0E135A0C03BA01ECE542717E2E11E0DEE42C017A0E41E
%4E6D980003EE200D814BC3A1B3A0C51E0D80CA0380A2E12AC6A10D804D35C3A2E3513B4D81E854
%4E6BE80003EE401181 7C55A055118 1C72AC917A017C62B81C1BF7080C1A1E824A0D11DEB17A017
%4E62A80003EE60D5BE0380C02AA0FDD62CC5B5CDBFC8A162A0DC19A01943C4BCD019A019E4D2BF
%4E6F780003EE802EE119E6D0A4E9C51B2BCA356AA0C3B2A221C7056CA044D52861A0C4B7A1C3B4
%4E6AB80003EEA0C3B46CA0CA04C3046DA0C6BEC104C30443B52C4362A02A430072657A0B140C00
%4E6D380003EEC08243FD7B4E39041EB061C8133513CA06A11EA260C928CBA1C206A10EC7523981
%4E62D80003EEE052C8A1C5A1E83AA0C8A1C7A1E738A0C7A1C9A1D0A1CBA146C6A1CDAFA0D11CC8
%4E6CF80003EF001CD3B2A043E3B2D21CA1C6A11CCA3983C4A10383A1CC20C111C935CC3982C211
%4E6B080003EF2052D3A2C3352EC03A3B4041C3054341C1383AC12D18BFC211D4A2C611C674C135
%4E6E280003EF40C174C8543981C020E90383A1CC398253C4A1C5A11CD21CA142E3D3A11EC71EF3
%4E62D80003EF60B2A9B2BEA0EEBF45C6A1CCA1C63AC7A1CAA1D1A16581A1E738A0C8A1C6A12AD3
%4E6C280003EF802AA1C31EA1C83951C05139C9A1C2A1CA1035106AA106A1CA1409B11469C0A1BE
%4E68F80003EFA006C953142A142A145368C01EA000636C65090C0C008000004D5A3978E3E128C0
%4E6A780003EFC03A0435C0183B18E92B28C006C105707114C02AC21882E8C151397371C12AC218
%4E6028 0003EFE082C8043A80C016A4C1A3B2C053398153C8A103A2CD3B46EDE0E0EAE0E0DFEA60
%4E65780003F000E0EA60E0DFEAE0E0EAE0E04DC3A2DFFBE2DCB8D014AC20AE14BFC9B2C6B2F8E2
%4E63080003F020D42BDFC5A2CA35D80D80EDE0E0EAE0E0DF4880A060E0EA60E048DFE0E0E0EAE0
%4E6E780003F040E0DFD72DCC3980033980F503A228C03A8004D5043AC016CEBEEBC139BE06C018
%4E69080003F0603551C814EB2851060065647A0E23020188341 9B85AC65E1BC0382BA01AC12850

```
%4E69880003F08060C12872411A60A028C02C50E0E0C040A039C0A1C039E42AC3383AA0E2411DC0
%4E6B980003F0A02AA0C01D81E0C0B2E2E0E4E5E2E0E260C04042A0C240A070E0E11DA0C01DE006
%4E6C880003F0C0A0E4E428A0E2E01BE2E4E42AA070E206C01CE162A0C042A0E0E2E2C240A0C128
%4E6C080003F0E0A0C04142A0C042A0E0E4E0E2E070C0A1C11DE1E41A6161A0C21DE0E5C11DA0E0
%4E6A680003F100C019C040A0E4C042A0E0C241A0C042A0E0C01CE0E2C01CE0E070C040A0E3E4C4
%4E6C580003F12039C039E42BE370C140A06140A0C32839E4E0E2E0E161A0E0E2E2E0E2C239E0C2
%4E69A80003F140A1E463A0C04240A01AE3E528E1E0E4C105E106E3C0401BC041A0C0401AE01A80
%4E6B280003F160E0C042A0E0C11BA0E2E060E1C440A0E2C042A0E0E4C340A061E1E4C31CA061E1
%4E6CF80003F180E0E1E2E2E0C01CE0E0C240A0E2C238A062E0E0C240A0E2E0C240A0C42BA0E4E4
%4E6C680003F1A062E062E062E0E1E2E0C01DE0C042A0E0E2E0E2C339E0E2C0401AE0C042A0E0C2
%4E6C980003F1C040A061E2E4E4C21BE061E106E4C0401DC03828A0E2C042A0E0E2E0E3E2E0E21A
%4E6B380003F1E0A0E2E0C240A0C128A0C028A062E0E4E406C01BE161C1A1E428A0C240401EE0E0
%4E67080003F200E228441A4040411AA01AA0E2E060C04042A0C040A0E13AA0C306A02B1A80E106
%4E69080003F22070E1607150A02C00636C650A3009170833DB0EAB3964CA182B2D2E2B1B0438C0
%4E6E880003F2403AC0357A74C42C2AC004387373CD03853BCCA5C43887C1A9E8B4398654C135CC
%4E60280003F2603BC33BDB0380B2ABB6C9A4B4C104CF1EA5C704DEAFA1CD606067606FC060611E
%4E6B380003F280C221C0606066A1C560606760218C4A1C82818631BC260606E606067602818C1
%4E6B080003F2A01BCC60612772C060606505C7606067606FC0281867606066A6B9A538AAC2B6A1
%4E64E80003F2C0DFDFDBBDC5AFA6C121A5C20C816FCB0C816EB2C8AFA371ABC10DB26FCA0DB26B
%4E66D80003F2E0B2CBAFA0C127ABC044663506D0411841670 6B2CE0065647A0000000000200009
%4E66D80003F30003686BDF7556C52CC535DFDFCDAFA062A0C505DFD9A8B37256DFDFDBA6B6DFDF
%4E65B80003F320D0A5B3DFCCBFDA42DD19DFD3A5CCBCC545D945CA0BCCB844B5D944DA44D406C4
%4E6A880003F34044DA44DA44DA45D945D945CDBECA44B3CA0CC10065647A0000000000010004586
%4E6FC80003F360494ADFD619C01AC01BC12BD70970C00BC02ADF2BD71CC01DC01EC02C2DD70CC0
%4E6CF80003F3800DC00EC02FC2AFA4C730C1AFA4C01FC020C021C031D80FC010C011C132DD33D8
%4E6D380003F3A022C023C024C134D712C013C014C035DF2ED725C026C027C4A8BEDEA8BEC015C0
%4E6B480003F3C016C017C3BFDFDFD718DFD3056FDFDFDFDFDFDFDFDFDFDFBEDE00636C65173B0C
%4E6CF80003F3E01F880105A8464500060C5450660CC2881CC2881ECB2A6C1A5B2A7C1A3DC4548
%4E60D80003F4004749AEC1ACC94D4E06CBA7C1AA464A28A04642A9C1A6C9B3D4A24E4641A1C5AA
%4E64580003F420C1A8CF4905C74FCEAFA2C7A4C649474FC3ABC3A9CA424F4FCBAACB40A3C34745
%4E60A80003F440A7C24DA0DFC02881C8AAC2A6B5A72B60C84445484FCEA3C1ABC1A3C1A5482881
%4E65480003F460C72881C54FD006C34206B306C34206B306C14206B30065647A0000000010105
%4E6E680003F4806846450043404446 49DF4EC1A9D928444B41DFC6A44CEC41C2B4CEB74343A043
%4E61280003F4A0464DC0A2DF284468B8A5C4A3B5F228D02845C9BA43CEA5C7A6B5444140F2C4BF
%4E64080003F4C0C3BF465148CCA5BEABC6BF4D46C3BFE2FAE228AFA3C1B3424348476649 46D3AF
%4E64B80003F4E0A4DD28476341CDA128C7AA28A7DF4B4C45C8B7C1AFA44E4DB7C1BBC1BEE8D328
%4E63280003F5000065647A040D0000880105A8C64500066040420 6A0400660440 6C22860C045A0
%4E6C980003F520E206C0A5C1A5E0C0A2C0B2C206C24FC44042A0C0B2C0A5C028A4B228A5E2C24B
%4E6B880003F5404942A0C2A2C4A5C1A443B206C441A24749A12BB6C44442A6C2B2E0C342A1C2A4
%4E6A980003F560C341A0C0B3C328A3D540A2C5B3E04228A128A3C2A3C3A228A0D24360A0C041A2
%4E6B780003F58042B3CD28A0E4E4C24128A341B4C2A14260A3C04FC140A028B246A0C0B4C2B451
%4E6C380003F5A0CE28A3C745B4C6A3C5A328A3C2B2C4B5C24261E046434128B2C040B3E106A040
%4E6C680003F5C0A028A1C0A2C0B5C5A328A2E3C945B2CAB2C043A3C1A2C244A228A1C042B240A0
%4E6B180003F5E04540B3C0A446A0C206A0C3A3E0C7A1C0A2C0A1C0B2C328A0C6A328A0C1424440
%4E6B980003F600A0C0A2C0A228A0C628B3C0A2C128A028A2C52BB328A028A140A1E0C5B3E0C7A1
%4E6AA80003F620E6E8C528A343A0E006E24160C0412860E141B2A0C0A3C0A2C1A1C0A2B2A0C0A4
%4E63880003F640E2430660C32860C22860C32806B328600065647A0000000080010568464500 28
%4E6D380003F660805D4D40DEA2C1A428CAA247A0446C284043EBCEB2A60642A0D728A746414348
%4E63F80003F68043CEB5A6DD28E54F4DCFA6DFE5C7BAE928A04343D228A028A4B649424FC1BFE1
%4E62980003F6A0C2B9A4BBC4BBA34A454B4CFAC2A928BEA34BC1BA284C6DD52B40C4AA28A44C40
%4E63A80003F6C0DFD0286AC3AFB6C1B7D1284BCAB2440628D62BD428C8AFA6BC2880BD4ED1BE28
%4E66180003F6E0DC280065647A0000000081010 5A886B5002880A06328A344662 8A04062A0C628
%4E6CD80003F700A0E2C028A0C228A1E9C042A0C428A0F3E3E747A0E6E040A0C028A0E6C2A1C244
%4E6D880003F720A0E3E2C64228A0E2E128A1C128A0C6A1E2E242A0E242A06528A047A0E7E4E4E9
%4E6C480003F740EA28A0C3A1C828A0C128A0C3A1C128A0E3C6B240A1E2C044A0E0C442A141A0E4
%4E6CB80003F76060A0E643A0E4C228A0C228A0E442A1E940A1E3E5C228A042A242A141A0C4BFE8
%4E6D180003F780C428A064A0E14842A0C6A1E341A0C540B2E4C644A0C442A0E248A1C1A1E1ECE2
%4E6DE80003F7A0E1C828A0C2B2E5E442A0E3E2E2C242A0E0E3C228A045A0E142A0E528A0E1E1C1
%4E6C880003F7C0A1E141A028A0C06628A0C228A0E04228A040A0E5C5A1E3E8E1E4C3B242A0E0E3
%4E6D180003F7E0E4E1C444A0C128A0E2E2C1A1E4E1E8414228 06A0C028A0E041A0E9E1E241A0C4
```

```
%4E6AF80003F800A1EC06A2E843BE52A040A0EAE5612800636065173B0C1F880105AB4645000680
%4E66D80003FB20C04006A04006A04006C02881C04006C04006A02881C04CA062E2F4B241B2C2B2
%4E6D080003FB4049B3C2B3C2B3C14F60C2414244B3E1B3C4B4C2B4A0E2B4C2B3A0C1B3C5454243
%4E6E680003FB60444546B5C6B5D0B3C8B4C4B3C6B3C2B4C528B4C44145B4EBEAC541A041444241
%4E6E780003F880B3C2B44406C242A0C1B441B4E1CBB4A0C1B4C2B54828B4C2B3C2B4C24CB4C842
%4E6FA80003FBA04FE9C1B2C6B4C2B4C2B552C2B541B34406CB4FC0B2A0C2432BA0C3B3CAB3C328
%4E6FA80003FBC0B7E1C44841B3CAB506C1B4C2B5E7E6C5424543B6424228B4C146A0C3B4E9B4E5
%4E60880003FBE0C3B4C128B4C528B4EBB328B3C24EB5C4B4D840B4D143B5C14647B4C128B5E1B5
%4E6CC80003F900E5B4E1C1B3A0C1B4C1414542424806B2CAB4A0C643B3E3C3B4C2B4C341B4E0
%4E67A80003F920C0B4C8B428A006B24006B24006B24006B261A0C2B406B228A006B2410065647A
%4E63A80003F940000000000810105E8864500EFCD622840404040A006A00640A0ED2840404040
%4E6D780003F96040404040C2A5D428A0C628C5A7B2E6C728DBA3B3D143C328D828A0C36628F028
%4E6FE80003F980C2B3A4C2A1C328C228C628A0C628CCB2A1E528C628DBA3B3F428C328C428D228
%4E61080003F9A0A0C32856C628C4BAE228C2B3A4C1BFD128A0C628D66628F6C3A3B3CCA1C5B228
%4E6F180003F9C0C328C064A2C228C228C628A0C328C62BC7B2E728C2B3A4D428A0C628F528C628
%4E6DF80003F9E0D028C9A3B3C4ABB7A3C428C428D3A1C228D928E0C0B3A4C4284040A0E2284040
%4E6A980003FA0041E0C16128E52840A061404040A00640E1C328DAA4B3C1BEC7B2C8B3CA060065
%4E66880003FA20647A0000000080010568464500494440445C1A42847A3E3E0E0E041E1C7A328
%4E69980003FA404544E22BE04BA3E4E0E043A006A0C6A3286541616 3A0404740E528A0E0E04443
%4E61180003FA60C2A2B6A248C2B4A4B6E0B7EFE041D628A0C5A7C9A2C1B8A52840D028DEA2D428
%4E6B380003FA80404 4D5B3A0B3A0B3C2B4A24A804040D3284040BFA1B3C0B3A058C3A3C1A52840
%4E6CF80003FAA04081D2284040CAA2D3B3C0B3C1B642C7A3C1B6C0B6C0B6CBA2454040D128D228
%4E6CA80003FAC040A6C1A2C4B3C0B3C0B3C1A644434DC5A328C3B6A2C1B3C7A3284041064B4560
%4E6E780003FAE028C6A1B2C2B4A0C2A64F424540CBB3C1A328C6A6C7B44044494049C4A2C0B6C2
%4E6A580003FB00B4C1A6C3B6E2C2BE4006A040C0B3404 3B52842B640C0B528A006B2280065647A
%4E66880003FB2000000000B1010568864500068041E042C4642840 43C069A04F4DA028EDB2C3A1
%4E6D880003FB40E8424FC1B3DB284440C4B5D0A6B3A1CBB6424240 4BC6B542C1A2E1D228464 2C0
%4E60480003FB606228C8A6CAA7E528C7A343D828D528A0284540C4A244C2A6C2A2B8A046D9BF4D
%4E6F680003FBB056C6A12846C4A549A1C4A247A0C4A4C2642840D128CEBB47D8A6B24B4048F2B9
%4E6E380003FBA0A0C1B9C2A5DFCCA12849474080408141A5C1A7C1A3B2A1B4A243D428C26D28D1
%4E6A080003FBC028E2C1A7CFB9A042D4B2C7BE63A02846B2284446 0065647A0000000800105A8
%4E6D980003FBE0864500288 2CE480682C228A628A628A428A3C66B426747A228A728B2A128A4FE
%4E6D980003FC00C6B5C2A528B228A7414642A0C54FC741A128A628A2C0B2C3B7CA4A414345B8C2
%4E6DF80003FC20B2C1A328A4CE42414641B3C2B4F3C5424064B5D7A24246B4CCB4C3B4C461B6C2
%4E61080003FC404BB5C24340BF41A0C14705C342A0C96FE3C246B6C6B4C4B4C44A4FC4B6CCB8E5
%4E6D980003FC60C5B7C246B6C44146414A42B5C2B6A328A3B5C7B6C7414A41B4C34166B2A128A4
%4E6DA80003FC8028A3B2C046A2C0B5F2C640B3C040B2A028A428A628A1C840A0CD6FA628A428B2
%4E6BD80003FCA0A54E6FC065B2A328B2A428A428A4B9A028B628DE664FC042060065647A000000
%4E67C80003FCC0008001056B46450028 8060A0D72860A143A042A0C5A128AB41A0C1A128E2284A
%4E6F280003FCE06142DAA1D4B348E528E3CBB4C2B4E0E741A04B42E0C0B6E545A0C5B6A0474143
%4E6E780003FD004CC5A3C1A1E2D2B2404041E028C2A1CDB74EA041C4B544E028EFC8B528A3B261
%4E6DE80003FD2044A0E448C6B3A041A0CFB5A328A241BFC6A1285449A2EAC7A128404363E128E3
%4E6E580003FD4047C3B3E7C1A1CBB5446542E3D0B5C284A128A044A0CBB442424AA028C6B5C2B2
%4E6C080003FD60A1C0B4A0C5A1284C47D3B345A3B2E2D1284041A043A0E3C5B2A0B3A0B228A2
%4E6EF80003FD802846A0E545EF2844C7A728ECD228E245C6B4C2A6C0BE06A02841A0CBB3414260
%4E66980003FDA0B50600A0000000000000000000000000000000000000000000000000000000
%4E64B80003FDC0000000000000000000000000000000000000000000000000000000000000
%4E64D80003FDE0000000000000000000000000000000000000000000000000000000000000
%4E64080003FE00000000000000000000000000000000000000000000000000000000000000
%4E64280003FE20000000000000000000000000000000000000000000000000000000000000
%4E64480003FE40000000000000000000000000000000000000000000000000000000000000
%4E64680003FE60000000000000000000000000000000000000000000000000000000000000
%4E64880003FE80000000000000000000000000000000000000000000000000000000000000
%4E64A80003FEA0000000000000000000000000000000000000000000000000000000000000
%4E64C80003FEC0000000000000000000000000000000000000000000000000000000000000
%4E64E80003FEE0000000000000000000000000000000000000000000000000000000000000
%4E641B0003FF00000000000000000000000000000000000000000000000000000000000000
%4E643B0003FF20000000000000000000000000000000000000000000000000000000000000
%4E645B0003FF40000000000000000000000000000000000000000000000000000000000000
%4E647B0003FF60000000000000000000000000000000000000000000000000000000000000
```

```
%4E64980003FF800000000000000000000000000000000000000000000000000000000000000000
%4E64B80003FFA000000000000000000000000000000000000000000000000000000000000000000
%4E68C80003FFC000000000000000000000000000000000000000000000000000000000094AA555555
%4E60880003FFE0F5FF55555595FFABAAAAAAFEBFAAAAAA0A000000000000000000F0FFFF3F009351
%0781010
```

```
%4A65B4000000904F00000005E2000003000000030000000300000003000000030000000300
%4A6324002000000300000003000000030000000300000003000000030000000300000000300
%4A6344004000000300000003000000030000000300000003000000030000000300000000300
%4A66E4006000003000000031400000326000003380000034A000003000000036C00000300
%4A6384008000000300000003000000030000000300000003000000030000000300000000300
%4A63A400A000000300000003000000030000000300000003000000030000000300000000300
%4A63C400C000000300000003000000030000000300000003000000030000000300000000300
%4A63E400E000000300000003000000030000000300000003000000030000000300000000300
%4A68F401004EF9000031624EF900002ABE4EF900002A5E4EF9000029184EF9000030F44EF9
%4A6334012000031564EF9000031224EF900031684EF90000316C4EF9000031304EF90000
%4A67E4014035B24EF900002E364EF900002B3C4EF9000035224EF90000359A4EF9000041FA
%4A684401604EF9000037404EF9000037C24EF9000035C44EF9000041844EF9000042C84EF9
%4A66A401B00000427A4EF9000048024EF90000432E4EF9000044EB4EF9000047AB4EF90000
%4A689401A040384EF9000038604EF900003BC04EF9000039B04EF900003A7E4EF900003BEB
%4A65A401C04EF900003CF64EF900003F684EF90000401A4EF900005454009040060090400B
%4A6C2401E000904F8A00904004009040 0C0080300E00803170009040 0A0000000000000000
%4A66F402004EF9000031D24EF9000033464EF9000032BC4EF9000032A04EF9000030444EF9
%4A6CD4022000035864EF900002CE4FFFFFFFFFFFF4EF9000038044EF9000037064EF90000
%4A6874024041C84EF9000041CC4EF9000058C64EF9000048224EF9000042F84EF900002F04
%4A66E402604EF900002EB44EF900002EEA4EF90000332A4EF9000032DA4EF9000033100000
%4A622402800000000000000000000000000000000000000000000000000000000000000000
%4A624402A000000000000000000000000000000000000000000000000000000000000000000
%4A626402C000000000000000000000000000000000000000000000000000000000000000000
%4A628402E000000000000000000000000000000000000000000000000000000000000000000
%4A66B403000C794EF900040024660842404EF9000400244E730C794EF90004000C66064EF9
%4A64E403200004000C4E730C794EF9000400186606 4EF9000400184E730C794EF900040012
%4A6734034066064EF9000400124E734A7900904F0C66000B0C0C794EF9000400066606 4EF9
%4A615403600004000633C0008031404E730839000300803009671 80C794EF90004001E6606
%4A645403804EF90004001E4A790080300E4E7333F90080300E0090400E427900904010 4E73
%4A665403A043F90090400045F900904FFE49F9000003B6600006B64A44675449F9000003C4
%4A6E5403C06000089033C0008031000839000600803009 66F033C0008031000839000600 80
%4A602403E0300967F033C0008031000839000600803009 66F00839000000803001 66A233C0
%4A60B404000080310008390000008030016 7F043F90091000045F9009107FE49F900000424
%4A60E4042060000648 4A446700005E33FC0000009100003 83C00004EB900000C9833C00080
%4A6EF404403100083900060080300966F033C0008031000839000600803009 67F033C00080
%4A6DE404603100083900060080300966F00839000000803001 669833C0008031000839000 0
%4A62D404800080300167F033FC0000009100004 3F90090000045F900901FFE49F9000004A4
%4A61B404A0600005C84A4467543 83C00014EB900000C9833C0008031000839000600803009
%4A6F7404C066F033C0008031000839000600803009 67F033C0008031000839000600803009
%4A606404E066F00839000000803001669A33C0008031000839000000803001 67F043F90090
%4A6344050050004 5F900905FFE49F9000005126000055A4A4467000056383C00024EB90000
%4A6EF405200C9833C0008031000839000600803009 66F033C0008031000839000600803009
%4A6F44054067F033C0008031000839000600803009 66F00839000000803001 66A033C00080
%4A62040560310008390000008030016 7F043F90090200045F900903FFE49F9000005826000
%4A61F4058004EA4A4467000186383C00034EB900000C9833C0008031000839000600803009
%4A6F6405A066F033C0008031000839000600803009 67F033C0008031000839000600803009
%4A6FE405C066F00839000000803001 66A033C0008031000839000000803001 67F04EF90000
%4A614405E0070C46FC270033FC0001008031 2033FC0000008031 20303C0FA033C000803100
%4A6304060051C8FFF833FC0001008031 2008390003008030096600000 84EF9000003A041F9
%4A63F4062000910000 43F9009107FE303CF00054403 0C0B3C866FB33C0008031 0043F90090
%4A6504064040004 5F900904FFE49F9000006526000 03DC4A44670A49F9000006606000 05F4
%4A63B4066033C0008031 0043F90091000045F9009107FE49F90000067C600003B24A44670A
%4A6454068038 3C00004EB900000C9833C0008031 0043F90090000045F900901FFE49F90000
%4A62D406A006A6600003884A44670A383C00014EB900000C9833C0008031 0043F900905000
%4A667406C045F900905FFE49F9000006D06000035E4A4467000 0C383C00024EB900000C98
%4A644406E033C0008031 0043F90090200045F900903FFE49F9000006FC600003324A446700
%4A6334070000C383C00034EB900000C987A0042790090400041F9009100004 3F9009107FE
%4A6484072042583 3C0008031 00B3C866F433FC0000009100033FCF00F0091000233FCF00F
%4A6F8407400091000433FCF00F0091000633FC0000009105003 3C0008031 0033FC00010080
%4A6514076031204FF900904F004EB90000352241F80000343C7FFF4240323C0001D01833C0
```

```
%4A64E4078000803100D21851CAFFF40C0000FF66060C0100FF675861000528083900030030
%4A6F6407A03009664A33C0008031000839000600803009 66F033C0008031000839000600 80
%4A601407C0300967F033C0008031000839000600803009 66F008390000008030016690 33C0
%4A6E5407E0008031000839000000803001 67F033FC00010080312033C00080310033FC0001
%4A607408000090401 40C794EF900040000667C0CB900040000000400026D700CB900080000
%4A60F4082000040002 6C44279009040144DF900040080424320 5E201E670000B22240281E
%4A63E408405384 4A9E6608610004DE600000A02008EC88EC88320052413 3C0008031002404
%4A65240860524 3D018D21833C00080310051CAFFF40C0000FF67046100050 20C0100FF6704
%4A67F408B0610004F8B3C86EC660AA4878800048790000666E4EB900002E36504F3A3C0001
%4A6F9408A033C0008031000839000600803009 66F033C0008031000839000600 803009 67F0
%4A6E8408C033C0008031000839000600803009 66F008390000008030016 6B033C000803100
%4A61340 8E008390000008030016 7F0605A4A4567560839000300803009664C33C000803100
%4A6F0409000839000600803009 66F033C0008031000839000600803009 67F033C000803100
%4A6FC409200839000600803009 66F008390000008030016600FEBA33C0008031000839000
%4A6F3409400080300167F033C0008031003 3C0008031006100184C4A8066540839000300 30
%4A6F4409603009664A33C0008031000839000600803009 66F033C0008031000839000600 80
%4A60E4098030096 7F033C0008031000839000600803009 66F008390000008030016 6AE33C0
%4A615409A0008031000839000000803001 67F04FF900904F00203C000003FE41F900904000
%4A642409C033C0008031004 29851C8FFFC33C0008031004EB9000044E8083900030080 3009
%4A61A409E0671A4A45661046FC270033C0008031004EF9000400000C450001661602450001
%4A62740A0033C500904014 33C0008031004EF900000E14303C00010C794EF900040024660 6
%4A60740A2033C0008031004EF900040024428642804284 33C0008031004DF900000A426000
%4A6FD40A4000A233C0008031004DF900000A52600000A433C0008031004DF900000A626000
%4A64740A60009833C0008031004ED4428642804284 4DF900000A7A6000006A4DF900000A84
%4A63540A80600000724DF900000A8E6000006C4DF900000A98600000A24DF900000AA26000
%4A65D40AA0009C4DF900000AAC600000D24DF900000AB6600001167 0FF4DF900000AC26000
%4A64E40AC000224DF900000ACC600000B64DF900000AD6600000FA4DF900000AE060000 13A
%4A6CD40AE04ED4204A91C92208E289204930C051C9FFFC4ED6428560027AFF52863E3C8000
%4A69A40B0041E9FFFE5488340730053210B04167047 8014ED4B5403080E24A64EEB1CA33C0
%4A68940B200080310065DE54883220B04167047 8014ED4B1C962F24ED6428560027AFF5286
%4A62340B407E0141EA000255883407300533C0008031003210B04167047 8014ED4B5403080
%4A6A340B60E34A64E8B1C962DE60025488321 0B04167047 8014ED4B1CA65F04ED642856002
%4A69640B807AFF52863E3C800041E9FFFE5488340730053210B04167047 8014ED4B5403080
%4A64840BA03085E24A64EAB1CA33C0008031 0065DC3005548833C0008031003220B0416704
%4A69640BC078014ED4B1C962EC4ED6428560027AFF52867E0141EA000233C0008031005588
%4A66340BE034073005321 0B04167047 8014ED4B5403080 3085E34A64EAB1C962DC30056002
%4A65C40C0054883 3C0008031003210B04167047 8014ED4B1CA65EA4ED6528620497000 33C0
%4A62740C20008031000A70FFFF000032300000670478014ED40070FFFF000032300000C41
%4A69B40C40FFFF670670FF78014ED45448B1CA63CE4ED633FC0000008031203 3C000803100
%4A6F440C6043F900000C8645F900906D0070001019670000120C000020660242400040 8000
%4A69C40C8034C066E84ED4576F726B696E672052414D206572726F72002F012F002F082F04
%4A63C40CA033C00080310033FC0000008031204EB9000035224EB900002828DEFC00104E75
%4A63840CC033FC0000008031201400160148788000487900006 6244EB900002E36508F2F3C
%4A6D440CE0FFFFFFFF2F032F024EB9000028CADEFC000C0C0200FF671248788000487900 00
%4A66C40D00663C4EB900002E36508F0C0300FF671248788000487900006 6464EB900002E36
%4A6AF40D20508F7A024E7548E7FFFE2A4F2449224849F900000D3A6000FCF44A4467000034
%4A67840D402E4D4CDF7FFF2F012F002F084878000433C00080310033FC0000008031204EB9
%4A68C40D6000002828DEFC001033C0008031007A014E752E4D4CDF7FFF4E7533FC00000030
%4A6AD40D80312048E7F8C2240026015588 2A08780FE8AD5585E38D0CAE00008000FFF86602
%4A68440DA055852F052F032F024EB9000028CADEFC000C4DF900000F1C4878800030365000
%4A67440DC048C02F004EB900002E36508F0C0200FF671A4DF900000F3C4878800030365000
%4A67940DE048C02F004EB900002E36508F0C0300FF671A4DF900000F5C4878800030365000
%4A68740E0048C02F004EB900002E36508F4CDF431F7A024E7533FC000100904F0C42790090
%4A61340E204006427900904008427900904 00A4279009040044279009040004EB90000355C
%4A69940E4046FC20004 8C52F054EB90000129A46FC2700427900904F0C4EF900000 8EC48E7
%4A61940E60C0C033C0008031403 3C0008031003039009040 06EF4880790090400A33C00090
%4A62240E805F6E33F900904008009300000839000300803009 67124EB9000048024A406600
%4A65640EA0000846FC270060FE33FC000100904004537900904 00C4EB900002B3C4A790090
%4A62040EC0401466120C794EF900040042660 84EB900040042600620 3C0080300023C00090
%4A65B40EE04F8A4EB90000432E4CDF03034E7346FC270033C0008031000839000300803009
```

```
%4A6A340F0066F060FE302F000641F900900000223C00000FFED15851C9FFFC4E75668666A2
%4A6EF40F2066BE66DA66F66712672E674A67666782679E67BA67D667F2680E682A68466850
%4A61940F40685A6864686E6878688268B8C68966BA068AA68B468BE68C868D268DC68E668F0
%4A6D940F6068FA6904690E6918692269 2C69366940694A6954695E69686972697C551848E7
%4A62D40F803000302F000E342F0012362F00164BC0D08022003002 48C0ED80D08006800090
%4A63140FA05000D28020413202601622 6F001842423 0D952427010B0426EF67060D1C05241
%4A67A40FC0B2436FE64CDF000C4E7548E73020247C00000F7E4EB900001632207C00910000
%4A66540FE0740F3202700CE16100410FFF30C1425842584258534 24A426CE8260806830000
%4A6FF41000008020437 40F42583202700CE16100410F0030C13202700CE161004100F030C1
%4A62D410203202700CE1610041000F30C153424A426CD44879000065A44878001C48780001
%4A6464104048780044E924879000065C44878009487800014878001 44E924879000065E4
%4A6324106048780012487800 0A487800144E924879000066044878001C4878001348780014
%4A62C410804E92227C0090500672014FEF004032BCA8002609068300000080224352417 01E
%4A623410A0B04162EA227C00905048720132BCA8002609068300000080224352417 01EB041
%4A636410C062EA227C00905000720470003001D0802040D1C930BCA8005241 7025B04162EA
%4A64A410E0227C00905EB0720470003001D0802040D1C930BCA8005241 7025B04162EA4879
%4A63E411000008000487900005CCA4EB900002E36487900080004EB90000226A4FEF000C
%4A6754112042A74EB90000113E08000000588F66084EB90000219060EB4CDF040C4E7548E7
%4A68C411403B38342F001E247C00904F82287C00904F7A267C00904F8A4A7900904F0C661C
%4A630411600C794EF900040042660C207C000400424E902680600626B900005A463002480
%4A60141180D0802040D1D3361002430 0FF3002D040204A383000003202D241204A3002D040
%4A6E2411A0224C30310000C0438170100003202D241204A3002D040224C30310000804 3C170
%4A6E3411C010003002D040204C318300003002D040204A303000004 8C0320448C1B3803204
%4A648411E048C1C081320348C10281000000F00A81000000F080814CDF1C1C4E7542790091
%4A66A412000000033FC1FFF0091000233FC7FFF0091000433FCBFFF0091000642790091000B
%4A63C412204279009 1000A4E752F0A247C000016F64A79009040146630 2F39000400744879
%4A6434124000904 03E4E922F39000400784879009040584E922F39000400 7C4879009040 72
%4A676412604E924FEF0018602E48790000 5A4A4879009040 3E4E92487900005A5448790090
%4A6974128040584E92487900005A5E4879009040724E924FEF0018245F4E7548E73038247C
%4A62B412A000002E36267C0000113E287C0090400A4EB900001228427900 80312E4EB90000
%4A66E412C0169C4EB900001A344A79009040146644 4EB90000593C0C794EF900040048660A
%4A680412E0207C000400484E90600A42A74EB9000058C6588F0C794EF90004004E660A207C
%4A65341300000 4004E4E90600C487800014EB900005454588F4EB900001632 0C794EF90004
%4A6FE413200030660A207C000400304E906012227C0090000042423 2C252420C4210006DF6
%4A636413404EB900001228 4B79000080004879000 05C7E4E924879000080004879000 05C96
%4A646413604E924879000080004EB90000226A4FEF001442A74E933400080000 0588F6600
%4A6DD413B0009E08020001670A301452400240000338803002E84034003002D040207C0000
%4A6DF413A0613430300000D17900904006 3002D040207C000061543030000 0D17900904008
%4A639413C048790000800042A748780001301448C02F0048780002487800124EB900002EEA
%4A652413E0487800014E9334000 80200014FEF001C670E487810004EB900000F04588F6014
%4A63E414000802000067 0E2F3C0000F0004EB900000F04588F4EB900002190 6000FF564254
%4A652414204EB900001B200C794EF900040036660 8207C000400364E904EB9000017D40C79
%4A667414404EF90004002A660 8207C0004002A4E904EB900000FCA0C794EF90004003C6608
%4A6234146020 7C0004003C4E90227C00905000424230024 8C0D0802040D1C930BC00A05242
%4A6FA414800C4208006DEA42403600D040207C000061743 3F000000091000248790000 8000
%4A633414A03003E540207C000061142F3000004E92508F42A74E9334000800000 0588F6658
%4A609414C008020001674A3003E540207C000061142F3000004EB9000030F452437005B043
%4A6F3414E0588F660242433003D040207C000061743 3F000000091000248790000 80003003
%4A64141500E540207C000061142F3000004E92508F4EB900002190609A4EB900001632 33FC
%4A6C541520FFFF0091051E33FCFCCC0091000842790091000A33FCF888009 1000C33FCFFFF
%4A6F741540009 1000E227C00900000424232F900040062524 20C4210006DF2487900008000
%4A6414156048 7900005CDE4E924879000080004EB90000226A2F3C000088004240360 0E540
%4A6384158020 7C000061282F3000004E924FEF001442A74E9334000800000 0588F6600008A
%4A60B415A008020001674A3003E540207C000061282F3000004EB9000030F452437003B043
%4A61A415C0588F660242433003D040207C000061 7E33F000000091051E2F3C000088003003
%4A615415E0E540207C000061282F3000004E92508F3002E84034003002D040207C00006134
%4A6F0416003030000D17900904006 3002D040207C000061543030000 0D17900904008 4EB9
%4A6424162000002 1906000FF6A4EB90000229C6000FC922F02207C00905000C5880C820090
%4A68D416405FFEC5886204425860F0207C00900000C5880C8200901FFEC5886218 4A790090
%4A6FC416604014660A303900040060 48C060027000 30C060DC207C00903000425 0207C0090
```

```
%4A62E41680200042502070090380042504279009105004EB9000011FC241F4E752F02227C
%4A600416A00091020020 7C000061844241 32D852410C4101006DF6227C0091040042413410
%4A632416C002420FFF3010E2400240F00084403 2C2548852410C4101006DE4227C00910500
%4A663416E0424132D852410C4101006DF64EB9000011FC241F4E75226F0004206F000812D8
%4A6424170066FC4E754EB900002190427900803 12E4EB900002190303900803 00E42790090
%4A62E41720400E42790080317033FC00010080312E4E7548E73000206F000C302F0012242F
%4A65541740001476006008320052403 0C15283B6826DF44CDF000C4E7548E73800282F0010
%4A65F41760362F0016342F001A4A426F2C42A7300348C02F002F044EB9000032BC7026B043
%4A69E417B04FEF000C6E0A702DB0436D0454846002588452435342 60D04CDF001C4E7548E7
%4A64D417A03800282F0010362F0016242F00184A826F1C42A7300348C02F002F044EB90000
%4A6B9417C032A0588452435382 4FEF000C60E04CDF001C4E752F0A247C0000173270004EB9
%4A65F417E000001632487804004879000 05CA64EB900002E36487804004879000 05CAE4EB9
%4A62541B0000002E36487900008000487900005CB64EB900002E36487900008000 4EB90000
%4A63E41B20226A33FCA78B00910500700048780020 42A7D0800680009051 0A2F004E927040
%4A62441840487800204878008 0D0800680009051 0A2F004E92203C000000C0487800204878
%4A60441860002 0D0800680009051 0A2F004E92203C0000010048780020487800 40D0800630
%4A61141880009051 0A2F004E92203C0000014048780020487800 60D0800680009051 0A2F00
%4A623418A04E92203C000001C0487800204878 00A0D0800680009051 0A2F004E92203C0000
%4A61141 8C00200487800204878 00C0D0800680009051 0A2F004E92203C000002404878 0020
%4A637418E0487800E0D0800680009051 0A2F004E92203C000002C0487800104878000AD080
%4A613419000680009051 0A2F004EB900001758203C000003404878001148780 01AD0800630
%4A61641920009051 0A2F004EB900001758203C000004004878000A42A7D0800680009051 0A
%4A623419402F004EB900001758203C000004164878000748780173D0800680009051 0A2F00
%4A62E419604E92203C000004564878000648780 17AD0800680009051 0A2F004E92203C0000
%4A62F4198004C0487800104878000AD0800680009051 0A54802F004EB900000179E203C0000
%4A62C419A0054048780011487800 1AD0800680009051 0A54802F004EB900000179E203C00000
%4A631419C006004B78000A42A7D0800680009051 0A54802F004EB900000179E203C00000616
%4A648419E0487800074878 01F3D0800680009051 0A2F004E92203C000006564878000648 78
%4A66641A0001FAD0800680009051 0A2F004E924FEF00F442A74EB900001 13E08000000588F
%4A65841A2060B4EB900002190 60E8427900B00400245F4E7548E73E004EB900001632 4246
%4A60741A4078304A7900904014661 04A3900040072670800460080004400 8042A748790000
%4A6A441A605C664EB900002E3642A74EB900002 26A42A7487900005BEE4EB900002E364FEF
%4A62441A80001442A74EB900001 13E08000000588F66000088424574073005 48C0D0802040
%4A66541AA0D1F900904F8A301048C076011202E3A3C083672842A7300648C02F0030054 8C0
%4A64541AC0720AD0812F00721230024 8C092802F014EB9000030444FEF0010602642A73004
%4A66341AE048C02F00300548C0720AD0812F00721230024 8C092802F014EB9000030444FEF
%4A67641B00001053424A426C9052457004B0456E864EB900002190 6000FF6A4CDF007C4E75
%4A66B41B2048E73F3C247C0090408C267C00005A36287C00005A324EB900001632 42A74879
%4A64F41B4000005CFA4EB900002E3642A74EB900002 26A4242360233C20090408E34BC0001
%4A62D41B60424233C20090400833C20090400642434FEF000C300348C0D0802040D1D43003
%4A64041B8048C0D0802200D29342422A413A8230034 8C0D0802240D3F900005A3A32023281
%4A62B41BA0300348C0D0802240D3F900005A3E3001328030805243 0C4304006DB842433003
%4A65141BC048C0D0802040D1F900005A4242505243722 0B2436EE82E3900005A3E06870000
%4A65841BE007FE204720390000 5A42722AD0813 23C03FF2A403A8130814243300348C0D080
%4A6FF41C002E0006870091020020473003D040227C0000599A30B1000042423002 48C0D080
%4A61141C202040300348C0E980D0802200068100910200D1C13003D040227C0000599A3231
%4A65841C40000002410FFF3802700CE164D2443081524272 10B2426EC2524372 10B2436E9A
%4A62741C60424330034 8C0D0802040D1D4300352403080300348C0D0802040D1F900005A3A
%4A61241C803003D040227C000059BA30B1000030034 8C0D0802040D1D33003D040227C0000
%4A63041CA059CA30B1000030034 8C0D0802040D1F900005A3E3003524030805243720 8B243
%4A68441CC06EA0207900005A3E700ED1C030BC000742A7487900005D7C4EB900002E36508F
%4A61F41CE042A74EB900001 13E2200300136000800000588F66000494487800014EB90000
%4A61941D00113E3B00487B00024EB900001 13E3A00487800034EB900001 13E3C0008040000
%4A64641D204FEF000C67064A526F02535208040001670000A40C5203FE6C00009C34123212
%4A65741D4048C1D2812001D0B900005A3EC18DB455C18D660000805252301248C0D0802040
%4A62D41D60D1D4301252403080301248C0D0802040D1F900005A3A301248C05380D0802240
%4A62C41D80D3F900005A3A3011064006003080301248C0D0802040D1D3301248C05380D030
%4A62341DA02240D3D3301104400600308030124 8C0D0802040D1F900005A3E301248C05380
%4A62641DC0D0802200D2B900005A3E30122A413A8030806002525 2E8433003D040227C0000
%4A60241DE061343431 0000D5790090400 63003D040227C000061543431 0000D5790090400 8
```

```
%4A62141E0008050007670E30124BC0D0802040D1D3065000800805000670E30124BC0D080
%4A60C41E202040D1D3045000800805000567123012 48C0D0802040D1F900005A3A04500080
%4A61E41E4008050004671230124BC0D0802040D1F900005A3A0650008032043404464 2C479
%4A62341E600090408E380233C10090408E30124BC0D0802040D1D3321008040007671C3012
%4A62B41E8048C0D0802040D1D3300152400240000734010242FFF8D042308008040006671C
%4A61941EA030124BC0D0802040D1D3300153400240000734010242FFF8D042308008040005
%4A62E41EC0671C30124BC0D0802040D1D3300151400240003834010242FFC7D04230800804
%4A62141EE00004671A30124BC0D0802040D1D3300150400240003802 41FFC7D04130803012
%4A61F41F0048C0D0802040D1F900005A3A321008050001672030124BC0D0802040D1F90000
%4A62141F205A3A300152400240000F34010242FFF0D042308008050000671E30124BC0D080
%4A62641F402040D1F900005A3A300153400240000F0241FFF0D041308032124BC1D2812001
%4A61B41F60D09372002A403215703FC2803001227C000059DA7200123100000806000 7671E
%4A64E41F80301248C0D0802040D1D430124BC0D0802240D3D43011D04102407FFF30800806
%4A65541FA00006671E30124BC0D0802040D1D430124BC0D0802240D3D430119041024 07FFF
%4A62E41FC0308008060001671E30124BC0D0802040D1D430124BC0D0802240D3D430115240
%4A65941FE002407FFF308008060000671E30124BC0D0802040D1D430124BC0D0802240D3D4
%4A62342000301153400240 7FFF308022790090 4F8A3611EB4302430040301248C0D0802040
%4A64542020D1D330030A400040321248C1D2812241D3D332110241FFBFD041308042A742A7
%4A64A4204048780003301248C02F0048780016487800164EB900002EEA42A742A748780004
%4A63F42060321248C1D2812001D09472002A4032152F014378001748780016 4EB900002EEA
%4A6424208042A742A748780033012 48C0D0802200D2B900005A3A70002A413015EE882F00
%4A656420A048780018487800164EB900002EEA42A742A748780003301248C0D0802200D293
%4A663420C070002A413015EE882F0048780019487800164EB900002EEA42A742A748780001
%4A641420E0301248C0D0802200D29370002A4130157238C081E68052802F004878001A4878
%4A6584210000164EB900002EEA42A748790000 5A1A4878001A487800174EB900002F0442A7
%4A6234212042A748780001301248C0D0802200D29370002A4130157207C08152802F004878
%4A6404214000 1A487800184EB900002EEA42A742A748780001301248C0D0802200D2B90000
%4A65942160 5A3A70002A413015720FC0812F004878001B487800164EB900002EEA4EB90000
%4A6AB4218021904FEF00B86000FB584CDF3CFC4E754279009040044A790090400467F84E75
%4A638421A048E730004A790090401466160C794EF900040054660C207C000400544E902200
%4A6E3421C06006223C000100002001E0801400020200FF1601020300FF20017210E2A07201
%4A61F421E0C0B122006600007C4879000080004879000067124EB900002E36100248048C0
%4A638422000C80000000FF508F671448790000800048790000 68784EB900002E36508F1003
%4A6404222048804 8C00C80000000FE671448790000800048790000 69184EB900002E36508F
%4A6544224048780 00A1003488048C02F00120248814 8C12F014EB900002 8CA70004FEF000C
%4A62E422606002 70014CDF000C4E75302F00064A790090401466104A39000400726708223C
%4A6774228000005B8E6006223C00005B5848C02F002F014EB900002E36508F4E7548E73E38
%4A631422A0247C00002E36287C0090400C267C000030F44EB900001632487900008000 4879
%4A65E422C000005D984E924879000080004EB90000226A42A7487900005DC44E924EB90000
%4A645422E01704424338BC00F04FEF00143039009040 0E48C00280000000FF0C80000000FF
%4A61D423006700006030390090400E48C00280000000FF7210B280674A4EB90000219042A7
%4A64E423204EB90000113E240008020000588F660004664A5466B64A43661A4878000F4879
%4A6464234000008000487900005DE24EB9000031624FEF000C4EB900001704524338BC00F0
%4A65E42360608A487900005DC44E933039009040 0E48C00280000000FF7210B280588F662C
%4A6444238042A72F3900005F0C4E92508F42A74EB90000113E240030023800080000005 88F
%4A661423A0660003F44EB90000219060E0487900005DE24E93487800074EB9000027AC3C00
%4A69A423C042A7487900005F544E924A464FEF0010660E42A7487900005F744E92508F604C
%4A67B423E042A742A748780002320648C12F014878001048780 01B4EB900002EEA42444FEF
%4A62C424000018700112 04E3A0340648C2C082671442A73004E540207C00005EFC2F300000
%4A679424204E92508F52447008B0446ED6487800064EB9000027AC33C00090401270FFB079
%4A6194244009040125 88F66064279009040 1242A74878000148780003323900904012 48C1
%4A671424602F014878000F4878001A4EB900002EB442A7487900005F3B4E924878001442A7
%4A6594248048790000604 04EB90000316233FC00040080317038BC01E04FEF002C4A546F26
%4A641424A04EB90000219042A74EB90000113E240008020000588F67E44879000060404E93
%4A66A424C0588F600002D24879000060404E934EB9000027F44AB0588F660002BC48780014
%4A663424E042A748790000605A4EB90000316233FC00050080317038BC00784FEF000C4A54
%4A642425006F264EB90000219042A74EB90000113E240008020000588F67E448790000605A
%4A674425204E93588F600002704879000605A4E934EB9000027F44AB0588F6600025A4A39
%4A61842540000400736762487800144 2A74879000060744EB90000316233FC000800803170
%4A6584256038BC00B44FEF000C4A546F264EB90000219042A74EB90000113E240008020000
```

```
%4A67442580588F67E44879000060744E93588F60000206487900060744E934EB9000027F4
%4A699425A04A80588F660001F042A7487900005FFA4E927A0F7604508F42A74EB90000113E
%4A6FD425C0240030023800080000588F660001C830044BC00280000000F0670253454A45
%4A636425E0660000667A0F30044BC07230C08167064EB9000027F40804000767225243700 3
%4A63042600B0436604760460407006B0436604760860 36B67900904012 6D2E7601602A0804
%4A60942620000667245343700 1B0436F0A3639009040125343601270 03B0436604760260 08
%4A66942640700 7B0436602760548780003 4EB9000027AC3C0070FFB046588F6602424642A7
%4A66B4266042A74878000132064 8C17403C2822F014878000E4878001C4EB900002EEA42A7
%4A66F4268042A74878000132064 8C1E4817403C2822F014878000E4878001A4EB900002EEA
%4A662426A042A742A74878000132064 8C1E8817403C2822F014878000E487800184EB90000
%4A68E426C02EEA42A742A74878000132064 8C1EC817403C2822F014878000E487800164EB9
%4A645426E000002EEA42A74878000148780003320348C12F014878001248780 00C4EB90000
%4A651427002EB47001B0434FEF0078661042A74879000060 0C4E92508F60000066700 2B043
%4A65342720660E42A74879000060264E92508F60507004B043660E42A74879000060404E92
%4A66D42740508F603C7005B043660E42A74879000060605A4E92508F60287008B04366164A39
%4A66742760000400 73670E42A74879000060744E92508F600C42A74879000060 8E4E92508F
%4A63E4278008040001670633C3008031704EB9000021906000FE24487900005DE24E934279
%4A65E427A00080317058BF4CDF1C7C4E75302F0006207C0090401033C00080317033FC001E
%4A614427C00090400C30BC00B0082B0007000167084A790090400C66F00828000700016704
%4A647427E070FF600E30390090400F48C00280000000FF4E754279008031703 3FC00040090
%4A65442800400C4A790090400C6F1A4EB90000219042A74EB90000113E08000000588F67E2
%4A610428207001600270004E7548E73000202F000C262F0010342F00164879000008000E540
%4A62442840207C00005A1C2F3000004EB900002E364879000080004879000005B224EB90000
%4A6644286 02E364879000800042A7487800062F034878001648780 01B4EB900002EEA4879
%4A6474288000008000 42A74878000430024 8C02F00487800174878 00094EB900002EEA4879
%4A644428A00000800042A74878000430 2F00664 8C02F00487800174878 00144EB900002EEA
%4A665428C04FEF00584CDF000C4E7548E73000142F000F162F0013102F0017E20010006C02
%4A62A428E05300487900008000 42A74878000472001202E18974001403D2822F014880 48C0
%4A68E4290058802F00487800 1A4EB900002EEA4FEF00184CDF000C4E75206F0008122F000F
%4A659429200C01006467540C010073673E48E73C007604780F7A070C01005867 1C7A270C01
%4A62A429400078671 40C01006867 0E760378070C01006F67047601780 1222F00147000302F
%4A611429600026206F00186000116722B202F00046A044480722D10C16004202F0004326F
%4A64F429800016322F00120A0100016710E249640C3209E449D249E449D0C172012F082F01
%4A634429A02F092F082F00610001164FEF0010225F206F0008322F00120A0100016 73C5501
%4A640429C0676265385741670A302F0016D040323B007BD24110190C00002067F610C0D241
%4A675429E0640410FC002C10D966F4112120099088722060021 0C151C8FFFC4E75302F0016
%4A60142A00D040323B00424841122F000F0401006467061210 10BC00204841600 8D2416402
%4A61D42A2010C010C010190C00002067F048414A01670210C1484110C0600610FC002C10D9
%4A6F342A40D24165F666F84E75000000000000800040002000900048002400920049002 22F
%4A66042A60000470004A6F0012670270FF302F000E206F000848E73C007604780F7A07D0C0
%4A65C42A80534042103 27C00302401E6A94A806B0C08C1001F60062401671AE6A9C4440C42
%4A6BB42AA0000A6D02D445D449110251C8FFEA4CDF003C4E757220110151C8FFFC60F02F02
%4A62E42AC0302F0012206F000C2248D0C0421053407400 4A6F0016660408C2001F222F0008
%4A67242AE00C810001869F6F0EE28982FCC350340142414841D3810C4000046F0A70046006
%4A65642B00424148416726 82FC000A4841060100301101 51C8FFECB1C9671E22026B027400
%4A68642B204841302F00125D406AD6600C4A8266DC72201101B3C866FA241F4E7548E73020
%4A61D42B4045F900904F007403526A0004322A00026700008C41EA0008301052 50B06A000A
%4A6F342B606600017C4250526A0006610002720C32000720186660320 2E541207210347000
%4A63542B80102800019 06A00064A6A000E67060C40002960040C40001D6E3C671C76001628
%4A62242BA00006D65255436C0A4232201842721034600620680008 60C6258810347600 1628
%4A62D42BC00006D65255436C0442322018E2413232101061 00026A51CAFF96600001024A32
%4A6F942BE0201867 0000F63002D0403232001C52720024B2720024660000E2427200247200
%4A61D42C0012322018 0C0100066E0000D0D241323B10044EFB1002000C001C004E006C00AE
%4A60142C2000BA42322018D0402072003442B2003460104A32202C67124232202CD0402072
%4A6D442C4000346100044860000092 15BC0001202C72003232001 0D0402072003461000 1E0
%4A6B942C6060000078720012322030523220302241323200 10D0402072003430096100 0340
%4A6E442C80601872001232203022415232203 0D0402072003430096100 03884A00663C3002
%4A60542CA0E5402072003472001228000 6D25253416E06423220186022 25A8000800344232
%4A62A42CC020306016D0402072003461000 04C600AD0402072003461000 0A051CAFF024CDF
%4A65642CE0040C4E754A7900904F0E670E7229922F000B7000102F0007600C7000102F000B
```

```
%4A62D42D007200122F0007ED40D041D0400680009050004E75206F000443F9009050004A79
%4A68242D2000904F0E671E702990280001D040D2C03F117280701C32A9008093C151C8FFF8
%4A65142D40329F601870001028000 1EF40D2C03211702832E9000251C8FFFA328172001228
%4A64842D600006D27900904F0053416F06206800086 0A64E75206F000443F9009050004A79
%4A67042D8000904F0E672270299028000 1D04006400E80D2C03F117280701C32A9FFB0D3C1
%4A65342DA051C8FFF8329F601E700010280001EF4006400052D2C03211702833610002 51C8
%4A67242DC0FFFA5549328172001228 0006D27900904F0053416F06206800086 09C4E752F02
%4A68742DE043F9009050004A7900904F0E672443E9005441E9FFFE243C000000D2721D7028
%4A6B142E00332051C8FFFC4250D1C2D3C251C9FFF0602041E90080742C721C702932D851CB
%4A6F042E20FFFCD1C2D3C251C9FFF27029425951C8FFFC241F4E75322F000A206F00044 8E7
%4A64842E4020202448 34014A7900904F0E671E7000101A327C00807229921A4881D2790090
%4A63642E604F066B220C41002A6C1C60207200121A327C00027000101A907900904F066B06
%4A63F42E800C40001E6D0658 8A7000600EED40D041D0403202205A610000A472001212D279
%4A69142EA000904F0053416F06246A000260984CDF04044E754E56FFF02F2E00182F2E0014
%4A6E842EC0486EFFF02F2E00106100FBF44267486EFFF03F2E000E1EAE000B2F2E001C486F
%4A6B942EE000046100FF524E5E4E754E56FFF02F2E00182F2E0014486EFFF02F2E00106100
%4A65142F00FB5E60C84A7900904F0E67127229922F000B7000102F0007327C008060107000
%4A63042F20102F000B7200122F0007327C0002ED40D041D040322F0012206F000C2F022F08
%4A65042F40240943F900905000D2C0300102410003024 0FFFC4A7900904F0E671E6006D002
%4A66342F603280D3C2101B670A0C00002066F0420060EE2008909F241F4E754A4167160C41
%4A63842F8000016606323C0040600A323CFFC06004420032C0101867DA0C00002067F24A41
%4A64942FA067F00C00004165EA0C00005A62E4D00160E0322F000A206F0004302F000E2268
%4A61C42FC00002D2C0594FD01848C02F0010102F4000041011673E0C0000206604700060 30
%4A61D42FE04A7900904F0E67060040008060220C010001651C0C40004165160C40005A6210
%4A61643000 0C010001620606400040600406 40FFC0613C7003508F4E75206F0004302F000A
%4A60243020226800024A3100006716D01832407000 10102F002F0970006114508F70044E75
%4A6484304070004E757000302F000E322F00120241FFFC80414A7900904F0E67127200122F
%4A642430600007ED4106410029922F000B600C7200122F000BED41D22F0007D24143F90090
%4A60543080500033801000 4E75206F000448E7003043F900905000246B000270004A790090
%4A643430A04F0E673A1010ED4006400029902800013 67C0080D040D2C060044251D3CB101A
%4A654430C066FB700010280006D07900904F0053406F06206800086 0B84CDF0C004E751028
%4A66F430E00001ED40D010D040D2C060024259101A66FA60CE2F0A45F900904F0043EA0044
%4A67543100206F00087003B1E157C8FFFC660C4A32001867F2423200 1842916100FF70245F
%4A638431204E757006322F000E6A484441700560427007322F000E33C100904F0A42790090
%4A652431404F062F2F00082F2F0008 6126504F33C000904F024E757004322F000A426F000A
%4A624431606010700260084E757001600270 03322F000E48E7202045F900904F00740343F2
%4A64E431B020194A2157CAFFFC664015BC0001202C42322030D4423581201C42722024322F
%4A6FC431A000123581201 0D442206F000C2588203424493400 0C020003670A0C0200046704
%4A668431C06100FC7C148270016002700 04CDF04044E7548E72038246F001449FA02C67400
%4A655431E0700072294A7900904F0E6712101A921A207CFFFE00B0006F01B0001A6010121A
%4A6FC43200101A207C00800002006F0100001AED40D041D0400680009050002240265A322F
%4A60D43220001A7000101B670A103400006120D44060EC72001212D27900904F0053416F06
%4A6534324024 6A000260982002 4CDF1C044E7548E72020240848 4245FA017A0C400032660A
%4A6504326 04A016A0252400241FE7FE540D4C070FF3001801A32803001801A33802000D2C8
%4A62E432804A5267127000300 1801A32803001801A33802000D2C84B4054404CDF04044E75
%4A65A432A0226F0004322F000E0241FFFC302F000A207CFFFE00800041018 06092226F0004
%4A66C432C0322F000E0241FFFC302F000A207C00800002004101006000FF764E56FFF02F2E
%4A6C2432E000182F2E0014486EFFF02F2E00106100F7CE4267486EFFF03F2E000E1EAE000B
%4A6D1433002F2E001C486F00046100FEC84E5E4E754E56FFF02F2E00162F2E0014486EFFF0
%4A637433202F2E00106100F73860CB1F6F0007000A322F0012426F00102F01486F000E6100
%4A68843340FE9250BF4E7548E72038246F001449FA0152700072294A7900904F0E670C101A
%4A63943360921A207CFFFE00B0600A121A101A207C00B00002ED40D041D0400680009050 00
%4A6FA43380224 0265A2408484272007000101B6726103400004251427120 00D2C852810C00
%4A63F433A000276D060C00002E6FE0425142712000D2CB528160D474001412D47900904F00
%4A63B433C053426F06246A000260882001 4CDF1C044E75000201030406050708 0A090B0C0E
%4A647433E00D0F101211131416151718 1A191B1C1E1D1F202221232426252728 2A292B2C2D
%4A6454340021 2E00022F303132010 32C2D33342C2D333500022F362C2D373839063A3B3C3E
%4A642434203D3F2C2D404131324243444645474 84A494B000201032C2D214C0002014D2C2D
%4A68A434402141 4E504F515206530731555456575 9585A5B5D5C5E5F6160625F6463651C67
%4A69F434606668696B6A6C3C3C3C3C6E3C6E3C6D6E00006F700000717200006D6D00003C6D
```

```
%4A6FB4348000003C6E00003C3C00006E3C000000000000000000000000001C1EDBDD1C5D
%4A64C434A01D5B000000000000000032000000000000000000000000000000000000000
%4A6BC434C000002528262900000002E000000002C002B000001020304050607080 92A270000
%4A614434E00024000A0B0C0D0E0F101112131415161718191A1B1C1D1E1F20212223000000
%4A61043500002D000A0B0C0D0E0F101112131415161718191A1B1C1D1E1F20212223000000
%4A619435200000700 04A390004007267 0C0C794EF900040000660270013 3C000904F0E611C
%4A6BB4354041F90090500043F8002C721D701442985 1C8FFFCD1C951C9FFF44E7541F90090
%4A603435604F184268FFE84268FFEE4268FFEA4268FFF04268FFF243E8001C720342184299
%4A6894358051C9FFFA4E7541F900905000202F0004D1C0D1C030AF000A4E75302F000641F9
%4A684435A000904F0460063210B25067FC51C8FFFB4E75206F000410EF000B10EF000F4228
%4A6B9435C000044E754E56FFFE48E73F38142E000B162E000F227C00904FF0247900904FFC
%4A650435E0207900904FFC7214D1C12648204A720AD1C11810200A720BD08128401014 4600
%4A63E43600B800670242040C0400E0651A7C03300648C0207C00904FEC423008005 3464A46
%4A6FE436206D0000DC60E87C037A001A020045000470001 0039A4002450003 1002E4081400
%4A6774364010 03E408160070 01B0456402424570001004721CC081E4803D40FFFE526EFFFE
%4A68743660CAEEFFFE4A456716300648C02040D1CB5210660A300648C02040D1CA52103206
%4A62E4368048C1207C00904FEC1005D1301800320648C120491005D1301800 1004EA087200
%4A67D436A012003A013001207C000069867E003D47FFFE1D700000FFFF673C320648C12049
%4A676436C070001030 1800B06EFFFE652A320648C12049102EFFFF913018007003B0456604
%4A674436E0700260027001320648C1207C00904FF4D1301800 60C453464A466C00FF2C4CDF
%4A65E437001CFC4E5E4E752F02223900904FFC2041700AD1C014102041700BD1C010104600
%4A6034372 0B4006702420 20C0200E065047000600C720012027003C28052812001241F4E75
%4A62D437402F02242F00084EB900003706320066067018600000 6A2002207C00904FF4D1C0
%4A6354376022482002207C00904FECD1C0340170001010 80C1484002800000FFFF94407000
%4A6E2437801011B0426508100291111002D1107000101 1B041650A100191111001D11060EE
%4A602437A00C100019630410BC00197400141070003002C1FC000CB1C1340070003002241F
%4A63E437C04E7548E73020242F00104EB900003706360066047001602620022 07C00904FEC
%4A661437E0D1C024482F024EB900003740720CB280588F6E0810039112700160027 0004CDF
%4A6304380004 0C4E7548E73000242F000C262F00104EB900003706 4A8066047001603C2003
%4A63F43820207C00904FF4D1C022482003207C00904FECD1C0700010117200121 0D081B082
%4A63C438406404700060144A826F0A4A116306538253116 0F2100291107001 4CDF000C4E75
%4A6564386048E73E00242F0018222F001C2C3900904FFC0686000000E62A0618390004006F
%4A6464388048844 8C47007C88076007013B08155C3440366000008 2004B082620C4A836704
%4A685438A070FF600270FE6012E5822002E582D480D4812042D1C5700010104CDF007C4E75
%4A68C438C048E73E20242F001C2C3900904FFC203900904FFC7214D0B12240700DB082660E
%4A641438E01039000 4006F488048C0600000BE700DB0B2640670FF600000B22002D080207C
%4A6FC439000000698E72001230000002A0102810000 00E09A812002D0805280207C0000698E
%4A6EF439207800183000002005D0867600244016120801000767162205528 12041D1C67000
%4A6164394010102203E189D0812600603A0801000667182205528 12041D1C670001010E008
%4A6284396022 03E989D0812600601C0801000567162205528 12041D1C670001010720FC681
%4A64843980E18BD08326007040B0846F102044D1C970001010 2203E189D0812600700BB082
%4A66E439A066062003E088260020034CDF047C4E7548E73830362F001A342F001E247C0070
%4A62E439C04F447009B0426406700060000 0AC720032020 2FC00052041300348C0C0FC0032
%4A654439E022402239009 04FFC701ED280D3C1D1C928082204548170002641101320445288
%4A62343A0072001210E189204476001610 7410E5AB2403D282D08124802044588874001410
%4A62C43A202244568970001011E148D4407602700030028 0FC002B484002800000FFFF3200
%4A6D943A406604722060107 01AB0416406064100156004064100403 00341EA000411810000
%4A68643A607000300280FC002802800000FFFF340053434A436CB8200A4CDF0C1C4E754E56
%4A67C43A80FFFA48E73F3C362E000A342E000E246E00107009B0426C0670FF600001443003
%4A6A843AA048C0C0FC00322240223900904FFC701ED280D3C1284922522649CF890C8700FF
%4A6E143AC0FFFFCF896306267C01FFFFFF7A02320541EEFFFA2E0B1007020000FF11801000
%4A64A43AE02E0BE08F264753454A456CE24246424530054 1EA000418300000 0C0400616504
%4A6DF43B00040400200C040041650C0C04005A6206040400 40600E0C0400206604420460 04
%4A60043B200404001 50C0400276302420432 06C3FC00287000100 4D2403C015245700 3B045
%4A6BA43B406EAE3006E040020000FF1D40FFFD1006020000FF1D40FFFE3C02CDFC00057A2C
%4A66E43B606018300548C05A802240D3CC300548C02200D28C2A4112955345BA466CE44245
%4A67843B8030054 8C0320648C1D0812240D3CC300541EEFFFA12B000005245700 5B0456EC0
%4A66B43BA07004B0426F1430034 8C0E38058802F004EB9000047A8588FCF8B4A87CF8B670470FE60027000
%4A6B343BC0300348C0E38058802F004EB9000047A8588F7002B0426F12
%4A6CE43BE04CDF3CFC4E5E4E7548E73838242F001C247C00904F4C267C00904F4B2B122039
```

```
%4A61543C0000904FF824809084280076004 9EA00047200121360140801000067062004D194
%4A64B43C205283588C2001E28822004A8166E820035A80E540204A2204D3B000004A136728
%4A67743C404A826624487800094EB9000038C05280588F2F00487800094EB900003D18257C
%4A61543C600000384000285 08F2004D1AA0028222A00280CB100003840650000 6E42AA0028
%4A62643C8049EA001076006046588C224C221120010C8100000E10633480FC0E1038002003
%4A65B43CA058802F004EB9000038C072003204D081588F2F00200358802F004EB900003D18
%4A66B43CC070003004C0FC0E109194508F5283700 5B08362B442A74EB9000047A848780001
%4A68743CE04EB9000047A8508F168241EA000420084CDF1C1C4E752F02242F0008222F000C
%4A6A743D00700BB08263027200 2F012F024EB900003D18508F241F4E754E56FFFB48E73F38
%4A67F43D20262E0008242E000C247C000047A8227C00904FFC265120517214D1C12D48FFFB
%4A63F43D402E110687000000E62A07700BB08366162E02468702870000 00FF20472002E188
%4A61D43D602E088E8024071D790004006FFFFF3E2EFFFE48873D47FFFE026E0007FFFE700D
%4A66343D80B083640670FF600001D8700DB083664E4246603442443004 48C032064 8C1D081
%4A67043DA02040D1C542105244700AB0446EE8340648C285FC000A48C22202700CD2802F01
%4A6A243DC04E92588F0646000A300648C0322EFFFE48C1C3FC0014B0816C0001B660B62A02
%4A67B43DE02F034EB9000038C028402043D1CB3008207C0000698E7C001C3000003D46FFFC
%4A6B643E000246001F3E2EFFFC9E463D47FFFC2043D1C852883008207C0000698E78001830
%4A67443E2000007040B044588F6F26300448C02040D1EEFFF81002020000FF10802E05E08F
%4A69643E402A072E0CE08F2847487800024E92588FBA8C6700010C7009B083663C204B7213
%4A65743E60D1C1780018105244300448C072221439000 4006D488248C29282B0816D0A382E
%4A6AF43E80FFFEE3440644000C204B7213D1C1108448780 0024E92588F082E0007FFFD6724
%4A63B43EA030064 8C02040D1CB2205E0891081300648C052802040D1CB1005020000FF1080
%4A66F43EC06000008C082E0006FFFD6732300648C02040D1CB2205E8891081300648C05280
%4A64043EE02040D1CB2005E988320648C152812241D3CB1211020100 0FB0011080605008 2E
%4A65F43F000005FFFD6738300648C02040D1CB200502800000 0F00E088320648C12241D3CB
%4A60843F201211020100F0800110803006 48C052802040D1CB1005020000FF108060104A6E
%4A67C43F40FFFC660A300648C02040D1CB10857009B0466D0470006002700 12F004E92588F
%4A6D843F604CDF1CFC4E5E4E754E56FFFC48E73C00302E000A262E000C48C0CFC00322400
%4A66F43FB0203900904FFC721ED081D4802A027802320441EEFFFC1003020000FF11801000
%4A65B43FA02403E08A260253444A446CE44A83670670FF6000005E4244424230024 8C03204
%4A64643FC048C1D081D0852240101132024 1EEFFFCB0301000620000323002 48C0320448C1
%4A66243FE0D081D0852240101132024 1EEFFFCB0301000640C30044 8C081FC000548C06012
%4A6714400052427003B0426EB25A447032B0446EA8700A4CDF003C4E5E4E75222F00047001
%4A67F44020E3A07200123900904F4B80812F004EB900003BE8588F4E7548E73E00342F001A
%4A61B44040362F001E4200203900904FFC0680000000E62C001839000 4006F488402440007
%4A61F4406070011202E3A0468072001239009 04F4BC0812F004EB900003BE8220070003002
%4A64B44080E580D08122402A11E48D70003002E580D08122404291 0C430080588F6304363C
%4A616440A0008012390004006F488148C1E6817003C2803001207C000069A8123000004881
%4A63C440C0C2FC000FC2C3200580C112390004006F4881EA4102410007B04164047600600A
%4A6FE440E0760036007000300196803003721 3B2406402701336 02C6FC0014D64070003003
%4A64E44100D086C1895211C189672A70003002E388720CD0812F004EB9000047A870003002
%4A66044120E388720CD08152802F004EB9000047A8508F604A3404C5FC001460123002 48C0
%4A62044140D08622401211E2092240128153424A426CEA70003003D086224012BC00804242
%4A6654416060147000300272 0CD0812F004EB9000047A858BF52423004E348B04262E44CDF
%4A66344180007C4E7543F900904F8E302F000E4840206F0008302F000640C146FC25000839
%4A6F0441A000050080300966 1A4AA900066614330008031704840134000052348000 67001
%4A602441C060027000046C14E757000600270012040302F000640C146FC250008390005008 0
%4A658441E03009660C33C00080317046C17001600846C12008530066D64E7543F900904F8E
%4A61D4420010290002 6A20720012290001B21167182F0112112F014EB9000035C4508F43F9
%4A6564422000904F8E60026716B3E900066710137C00FF000242390090 4FEB135100014EB9
%4A62B4424000004 32E43F900904F8E203C000100032 0494EB9000041984A80661252390090
%4A65E442604FEB660000145339009 04FEB600A10290002660452290002 4E7548E780C043F9
%4A6FB4428000904F8E2069000620086600002010290004488041F1000A522900040C00000F
%4A6E2442A06500001A4229000460000012 52A900065329000566000006 42A9000610B90080
%4A638442C0300F4CDF03014E7341F900904F8E10280003B028000467000 01C522800030C00
%4A65F442E0000F650000064228000348804 8C01030000A4E7570FF4E7543F900904F8E302F
%4A6FA4430000060880000033C00080312E3239008030 0E33EF000A008031700 8C0000042A9
%4A6644432000024 2A9000633C00080312E4E752F0A45F900904FA852B900904FF8206A002A
%4A64E4434022086754302A002802400FFE43F900802001D2C0B3085289671E532A00176508
%4A63C4436053885589600000CC523900904FC06410533900904FC06008532A0016660000B4
```

```
%4A605443800C40003C641272020C40001E6502720341EA0019600000809 1C87200122A0004
%4A604443A0B22A0005670000A420321006580102010 00C15410004E19B1200E089204048E7
%4A638443C07E0074007600780 07A007C0043FA00F0321910181580101 9E2096402B102E209
%4A651443E06402B103E2096402B104E2096402B105B10612196ADCBB0615450021B9061544
%4A64444400001D41EA001CB7061103B5061102460611064CDF007E2001E9409041D04043F9
%4A60944420008020 01D2C0157C000F0016157C000400171210B211677A40C0007C070033C0
%4A67244440008031501281 46C06068222A00006762701FE3B155C8FFFC7201E1A14681C3AA
%4A62C4446000002200 0C0000026D266E0C227900904FFC1229001360180C00000C6E0E3F01
%4A692444B070EEE249D141E541D041321F0640000BC0FC000AD0B900904FFCE09980817200
%4A6FA444A0122A0005258010065801020 1000C1541000535490028254 8002A245F4E750003
%4A6A3444C0050607090A0B0C0D0EFF224A4CDF0C3C4A3900904FFA6600000C4A3900904FC0
%4A655444E06A00004E70FF4E7541F900040000301 00C404EF966182028000 2E28865100CB0
%4A6064450000008000650 80C8000048000650470014E757007C0390004006FC0FC00140640
%4A6844452000E6205F9FC023CF00904FFC224F2F0848E73C30244947F900802001740076 00
%4A6174454061000132670000502A006B000018200 3C0FC000A41F200F643EA0014700912D8
%4A66E4456051C8FFFC5282538361000 10A6A00001E4A856B0001D22003C0FC000A43F200F6
%4A6524458041EA0014700912D851C8FFFC5782200261000 21A52820C42000265A47602142A
%4A6FA445A0001370229039000 4006DB4006502740070 07C0390004006FD0000600000CB400
%4A607445C0640A1540001361000 1BC6010610000A6670A6BF2200253806100 01D2102A000A
%4A677445E04680B02A000B670A422A000A157C00FF000B303C00C74232001E51C8FFFA7404
%4A6034460076037A00610000 6E670A8A8030025340610001 9A0802000066025643 0C42000C
%4A63B4462065E24A856A000006610001467807CB390004006F6724D88453846100003 86700
%4A6044464000166A00000A6100017060000 00E2002538061000 15851CCFFE2610001A66700
%4A63544660000C7001610001466000017A4CDF0C3C70004E75700AC0C343F200002002E740
%4A6394468090 42D04041F3000048E73E481C1046061A200010BB06182800 08B90616280004
%4A647446A0B70614280002B50649FAFE14321CD241103010001 2C0E4096402B102E2096402
%4A62F446C0B103E2096402B104E2096402B105B10612 1C6ADA7200100680028003B0048005
%4A690446E06748720149FA00507000E20EE350E20DE350E20CE350E20BE350E20AE3506722
%4A6FB44700526A000E6404536A000E0800000466080081800000000600A103400F06B048331
%4A69B4472000F6D20164C2123C00014CDF127C52825283200 14E75FFFFFF00FF010203FF04
%4A62C4474005060708 09FF3579000400700 00C357C00FF000A7007C0390004006FD0000600
%4A63144760000C1540001361 0B614E61186000007 6303C00C74232001E51C8FFFA223C0000
%4A669447800FF0602C7009423200005 1C8FFFA7002423200105 1C8FFFA7009423200145 1C8
%4A670447A0FFFA123C00076008202F00047201E1A183B900904FA84E757007C0390004006F
%4A67B447C066024E75D0407201E1A1534143EA00E6C0FC000A5340423100005 1C8FFFA700C
%4A654447E0E1A160CC4EB90000432E203C00001A0A538066FC33C0008031006 10666E66000
%4A63444800FCCA43F900904FA8202900007200122900059229000480818 0A9002A67027001
%4A66C448204E7548E7303045F900904FA847F900802001742 1946F001A6554202F001C6618
%4A64B448406 1C0664A226F00146100FE32673C5BC0530048804 8C06038202F0014E1801002
%4A61344860E098720040C2007C0700122A000543F2100658010201000CB22A0004460446C2
%4A63744880600C228015410005 46C2700160027000 4CDF0C0C4E752F02302F000A60122439
%4A6D3448A000904FF8223900904FF8B28267F653404A406EEA241F4E754E56FFF82F02122E
%4A688448C0000B102E000F242E0010227C00904F781D41FFF81D40FFF913C000904F794211
%4A68444 8E06002521110114880 4BC02040D1C24A1066F01001D1112D42FFFA422EFFFE42A7
%4A6A34490486EFFF84EB900002E36508F241F4E5E4E75202F00042F00103900904F794880
%4A67B4492048C02F00103900904F7848804 8C02F004EB9000048B84FEF000C4E75202F0004
%4A664449402F00103900904F7948804 8C02F00103900904F7848804 8C02F004EB900004966
%4A6BC449604FEF000C4E754E56FFF648E73000142E000B162E000F202E001042A748780008
%4A6C344980486EFFF62F004EB900002ABE41EEFFF64FEF00106002528 80C10003067F84A10
%4A670449A0660253882F0B100348804 8C02F00100248804 8C02F004EB9000048B84FEF000C
%4A647449C04CDF000C4E5E4E752F02206F0008720012107000101822485288740014118082
%4A660449E08280200124 1F4E7548E73020246F0010362F001660302F0A4EB9000049C84A80
%4A62D44A00588F670000267402101A1200EB080201000F9001E1A2300260064A1A66FC5340
%4A69C44A204A406CF653434A4366CC2F0A4EB9000049C84A80588F660470006002200A4CDF
%4A67744A40040C4E754E56FFF448E73C20246E0008342E000E362E00127000101 2EB487800
%4A6FB44A601812024400 0F72029004E1A13A0132021004E06934013205 5341C44132031004
%4A66644AB0E06936013205 5341C6412F0A4EB9000049C84A80588F660670006000000C24A39
%4A6BE44AA000040072670470016002 70041D40FFF41D6E0017FFF5528A2D4AFFF6422EFFFA
%4A66244AC0082E0000001B670E486EFFF44EB9000030F4588F601A7000302E001A02800000
%4A6B344AE0FC002F00486EFFF44EB900002E36508F424060064A1A66FC5240B04263F6522E
```

```
%4A6BC44B00FFF4102E001752001D40FFF52D4AFFF6422EFFFAB4436606006E0400001A082E
%4A65C44B200000001B670E486EFFF44EB9000030F4588F601A7000302E001A02800000FC00
%4A6B044B402F00486EFFF44EB900002E36508F300260064A1A66FC5240B04565F6200A4CDF
%4A66544B60043C4E5E4E7548E73E00242F0018382F001E362F00227000302F00262F002F02
%4A66A44B804EB9000049E824002F024EB9000049C84A804FEF000C670000484A3900040072
%4A60244BA0670470186002701 23C007A03602E7000302F002A2F00700030052F0070003003
%4A65844BC02F00700030042F002F024EB900004A4424004FEF001467000085645BA4663CE
%4A66144BE04CDF007C4E752F024A39000400726704700460027008240048790000 69AC4878
%4A63D44C00001B200256802F004EB900004BB82F39000400744EB9000049124879000069B4
%4A67844C204878001C200258802F004EB900004BB84FEF001C241F4E7548E72020227C0091
%4A61A44C400000247C00006BBA2409068200000500204242504241 32DA5241700 8B0416EF6
%4A6B544C604CDF04044E754E56FFFE48E73F38242E000B247C000048B81A390004006F4885
%4A60644CB0024500074A4567000310424738476000003024EB9000035224A39000400726704
%4A65744CA07004600270 0A4879000069C6487800012F004E92300C48C02F004EB900004 93C
%4A65244CC0426EFFFE12390004006F488148C10281000000E0EA8136015243380312390004
%4A65B44CE0006F488148C17018C280E6813001207C00006B9A103000004880C9C053447E04
%4A6BD44D00364742464FEF0010720AB26EFFFE6F047003600E7264B26EFFFE6F0470026002
%4A66644D2070013600302EFFFE48C02F00300648C056802F00300348C02F004EB900004966
%4A67244D404879000069DC300648C056802F00487800044E927213B2464FEF0018671E3004
%4A65F44D6048C02F00300648C056802F00487800054EB9000049664FEF000C601448790000
%4A6DB44D8069DE4878001648780044E924FEF000C3D44FFFE526EFFFE12390004006F4881
%4A63E44DA048C17018C280E6813001207C00006B9A103000004880D840300648C02F00300C
%4A67244DC048C02F004EB900003B60360048C0508F2F00300648C056802F00487800094EB9
%4A67644DE000004966B64B4FEF000C6F02364352467214B2466E00FF124A39000400726704
%4A67244E00702460027 03C3D40FFFE380BE24442463006 48C02F00300C48C02F004EB90000
%4A69644E2038603600C7EEFFFED644300348C02E0B81C748C036000B030000508F67344A39
%4A62744E400004007267082 03C000000DD6002705D42A72F00300648C056802F00300343C0
%4A64F44E60E280720CD0812F004EB9000030444FEF00103003E2403600602442A7487B0080
%4A65644E80300648C056802F00300348C0720BD0812F004EB9000030444FEF00105343 4A43
%4A65844EA06ED852467214B2466E00FF664A39000400726704700060027004380032 0C48C1
%4A66344EC0300548C05380B28066444A826738487900006 9E4487800183004 48C056802F00
%4A66A44EE04E922F39000400784EB900004912487900006 9EC4878001930044 8C058802F00
%4A67844F004E924FEF001C4EB900004BE66038487900006A064878001830044 8C056802F00
%4A65044F204E922F39000400744EB900004912487900006A0E4878001930044 8C058802F00
%4A66F44F404E924FEF001C42A74EB90000113E36000800000588F6638320C48C130054 8C0
%4A67444F605380B280661C08030001 67164A82671242A74878000D4EB900003CF6534C508F
%4A6FA44F80600E487800014EB900004896588F60B6524CB8C56D00FCFC4CDF1CFC4E5E4E75
%4A65944FA048E73E00342F001A78002A0476033003 48C02F004EB9000038C02200D8813C03
%4A69244FC0588F601630034 8C05A802F004EB9000038C02200DA81588F53464A466CE65343
%4A68F44FE04A436CCA487900006A1E4878001130024 8C056802F004EB9000048B82F044EB9
%4A66645000000493C4A844FEF001067000086 0C840000FFFF6200000A0C850000FFFF6330
%4A66B450200C840001FFFE6200000A0C850001FFFE630E2004E28828002005E2882A0060E0
%4A62445040200452 80E28828002005528 0E2882A0076003605C6FC003C200380C472003200
%4A64245060260148790000 6A2E4878001230024 8C052802F004EB9000048B82F034EB90000
%4A68B45080493C487900006A404EB9000049124FEF00144CDF007C4E754BE73C20242F0018
%4A621450A07601247C00004BB842A74EB90000113E3A0008000000588F6600016A08050001
%4A69E450C0671C4A826718760042A72F034EB900003CF6508F5283700BB0836EEC76014AB3
%4A602450E0670001324EB9000035224A39000400726704700060027004280048790000 6A46
%4A6334510048780001220 45EB12F014E9276004FEF000C3003E540207C00006A522F300000
%4A62A4512022035A812F01200456802F004E922F034EB9000038C022003A0170003001588F
%4A652451402F0020035A802F0022047011D2802F014EB900004966700AB0834FEF0018661C
%4A65E45160704BB0456416487800 1442A7487900006B1B4EB9000031624FEF000C5283700B
%4A66945180B0836E8E4A826734487900006B324878001822045C812F014E922F3900040078
%4A65E451A04EB9000049124879000 06B3A4878001922045E812F014E924FEF001C10390004
%4A67C451C0006F488048C07207C0816736487900006B4E4878001B22045E812F014E922F39
%4A653451E0000400744EB9000049124879000 06B564878001C220450812F014E924FEF001C
%4A67E4520060064EB900004BE62F044EB900004FA07600588F487800014EB900004896588F
%4A68A452206000FE864CDF043C4E7548E73800740F4878000C4EB900038C03B004EB90000
%4A64C4524035224A39000400725 88F6708203C00006CE06006203C00006C5A42A72F004EB9
%4A63C4526000002E364A39000400725 08F6708203C00006CFE6006203C00006C7842A72F00
```

```
%4A65A452804EB900002E362F39000400784878001542A74EB9000048B82F39000400744878
%4A65F452A0001842A74EB9000048B830024BC02F0030044BC02F004EB9000053924FEF0028
%4A620452C042A74EB90000113E36000800000588F660000AB0B030007670C72011002E1A1
%4A6FE452E03001B8406010080300006670A70011202E3A04640C84008030005670452426008
%4A6E5453000803000467025342024200 0F32034BC10281000000F06714300248C02F003004
%4A6504532048C02F004EB900005392508F08030001672270 0F340048C02F004878000C4EB9
%4A65D4534000003BC0380048C058BF2F004EB900005392508F320348C17030C280670C4878
%4A67645360000A4EB900004896588F48780001 4EB900004896588F6000FF48300448C02F00
%4A6B2453B04878000C4EB900003CF6508F4CDF001C4E7548E73F38362F002A342F002E347C
%4A632453A080007A054247364778 0F7207B24466204A390004007267047 0F5600270053A00
%4A6FC453C04A39000400726704700460027000364070003 00A320348C1C081670470076002
%4A63B453E07008384072 0F300448C09280E3B13C01DC45B84266082 03C000000A060027020
%4A6514540042A72F00300B4BC0320C48C1D0B12F00300648C02F004EB90000304442A742A7
%4A6514542070 0F320C4BC19081320B48C1D0B12F00300648C02F004EB900003044300AE248
%4A6B04544034404FEF002053444A446C00FF5E4CDF1CFC4E752F02242F00084EB900004C3B
%4A6CB454602F024EB9000050982F024EB900004C66508F241F4E754E56FFDE48E73F3C262E
%4A61B4548000083A2E000E382E0012247C000048B826434A39000400726704700760027005
%4A66A454A03D40FFF2302EFFF2C1FC000334005C422F39000400785242700030022F0042A7
%4A62D454C04E922F3900006BC65242700030022F00487800014E922F39000400745242 7000
%4A662454E030022F0042A74E922F3900006BA05242700030022F00487800014E923D45FFF8
%4A6D745500426EFFFA4FEF00306004526EFFFA7000302EFFFA2F002F034EB9000049EB4A80
%4A68C45520508F66E63D6EFFFAFFF4536EFFF4426EFFF63D6EFFF6FFFA42A7322EFFF648C1
%4A650455402F01720032042F017000302EFFF82F002F034EB900004B66487900008000 4878
%4A66645560000370003 0042F007200322EFFF82F012F034EB900004A44342EFFF248C27000
%4A6E145580302EFFF4322EFFF648C19081B4804FEF002864 1E48790000 6B66322EFFF248C1
%4A6DF455A0C3FC00035A812F014878000 84E924FEF000C7E193D47FFFC7E14384742A74EB9
%4A644455C00000113E240030023D40FFFE0800000588F660002E44878000 14EB900004896
%4A6B9455E07000302EFFFE7230C081588F6702534C7000302EFFFE0280000000C06704536E
%4A6B345600FFFCCF8C4A47CF8C670E4A6EFFFC6708082E0001FFFF67A43D6EFFF8FFEE4A6E
%4A69345620FFFC6706026EFF3FFFFECF8C4A47CF8C6706026EFFCFFFFE7E193D47FFFC7E14
%4A619456403847082E0001FFFF67083D45FFFB426EFFFA082E0006FFFF6716526EFFFA302E
%4A62F45660FFFA3E2EFFF4BE406406536EFFFA6012062E0007FFFF670A4A6EFFFA6304536E
%4A691456 80FFFA7000302EFFFE0280000000C2670000FE48780001322EFFF648C12F017200
%4A6D3456A032042F017000302EFFEE2F002F034EB900004B66302EFFFAB06EFFF64FEF0014
%4A611456C064083D6EFFFAFFF6602A7000302EFFFA322EFFF248C17400342EFFF6D282B081
%4A64A456E063123D6EFFFAFFF63E2EFFF69E6EFFF23D47FFF642A77200322EFFF62F017200
%4A6904570032042F017000302EFFF82F002F034EB900004B667000302EFFFA2F002F034EB9
%4A6794572000 0049E826404A6EFFF64FEF001C6F08203C00006B726006203900006D2A2F00
%4A6AA4574048780002487800084E92342EFFF248C27000302EFFF47200322EFFF69081B480
%4A683457604FEF000C6408203C00006B7E6006203900006D2A2F00322EFFF248C1C3FC0003
%4A658457805A812F0148780008 4E924FEF000C7C001C130246000F70011213E80952019206
%4A691457A0E3A03D40FFF07000302EFFF053801206E3A032407000302EFFFE7230C0816700
%4A6B4457C0009E082E0005FFFF673274003409700 0302EFFF8C48066122A402E09302EFFF8
%4A6DE457E080473D40FFF8C18D604A70011206E3A03E2EFFF89E403D47FFF86038082E0004
%4A6E445800FFFF673070011206E3A03E2EFFF8DE403D47FFF8740034097000302EFFF8C480
%4A6AB4582066123 02EFFF01206E3683E2EFFF89E403D47FFF8240B5282204274003409700 0
%4A6A245B40302EFFF8C4801006E0AA524260064A1866FC53424A4262F64A106700FF58302E
%4A65645860FFFA906EFFF6524034 00C4FC000348780001700030022F00720032042F017000
%4A64845880302EFFEE2F002F0B4EB900004A4448790000800070003 0022F00720032042F01
%4A6C4458A07000302EFFF82F002F0B4EB900004A444FEF00286000FD067000302EFFF84CDF
%4A67F458C03CFC4E5E4E752F02242F00084EB9000035224EB900004C3B4A39000400726708
%4A686458E0203C00006CFE6006203C00006C7842A72F004EB900002E364A82508F66084EB9
%4A63445900000052 2A6024303900040070 48C02F004878000C4EB9000038C0588F2F002F02
%4A698459204EB9000054764FEF000C2F004878000C4EB900003CF6508F241F4E754EB90000
%4A6384594035224EB900004C384A39000400726708203C00006D146006203C00006C8E42A7
%4A68D459602F004EB900002E3642A74878000B4EB9000038C0588F2F00487900006D3A4EB9
%4A68C459B0000054764FEF000C2F004878000B4EB900003CF64FEF00104E750000FF00F0F0
%4A66F459A0F00FFFFFFFF0FF0FF0FFFF48FFB4F8F4F84FF4F8F48FFFB0F08F080010001C00
%4A65C459C02C00400058007400940 0E000DC09D812D41BD024CC2DC836C43F010203040506
%4A62D459E00708020406080A0C0E100306090C0F121518040 80C1014181C20050A0F14191E
```

```
%4A61C45A00232B060C121B1E242A30070E151C232A313808101B202830384078000005A68
%4A62545A2000005A8A00005AAC00005ACE00005AF0FFFF009020000090300000902800007 0
%4A62045A40380000905F800080300042555454 4F4E203000004255545 44F4E203100004A4F
%4A60845A605953544943 4B0000021600005A700000434F4C4F5220202020202052414D2065
%4A62645A8072726F722061743A200002160000 5A920000504C41594649454C44202052414D
%4A6F645AA0206572726F722061743A200002160000 5AB40000414C504841202020202052
%4A65C45AC0414D206572726F722061743A200002160000 5AD600004D4F54494F4E204F424A
%4A61545AE02052414D206572726F722061743A200002160000 5AF8000047414D4520202020
%4A60E45B002020205241 4D206572726F722061743A20000E1700005B1A000052656164 3A20
%4A60A45B2000000217000 05B2E020000005B1257726F74653A2000021D00005B3E0000666F
%4A61745B4072206E65787420746573740009 1C0090403E020000005B36021C00005B640200
%4A62E45B6000005B4C205072657373200002290000 5B740000666F72206E65787420746573
%4A60A45B80740009280090403E020000005B6C022800005B9A020000005B822050726573 73
%4A61A45BA02000020D00005BAA0000494E505554203300020C00005BBE020000005BA2494E
%4A60B45BC050555420320002 0B00005BD2020000005BB2494E505554203100020A00005BE6
%4A62945BE0020000005BC6494E505554203000 0B0900005BFA020000005BDA373635343332
%4A69045C00313000007F5F5F5F5F5F5F5F5F5F5F5F00DE00040500005C1A0000746F20736565
%4A61345C2020302061707065617200040400005C36020000005C12616E64206D6F7665206A
%4A63D45C406F79737469636B730000040300005C56020000005C2A5072657373207377 6774
%4A61A45C606368657300000801000005C72020000005C4A537769746368205465737400 0801
%4A62D45C8000005CB60000506C617966696566642054657374000 0B0200005C9E00004261
%4A6EC45CA06E6B203D200007000000 5C0400000701000005C100000080100005CBE00004 16C
%4A62545CC0706861205465737400000801000005CD20000436F6C6F722054657374000008 01
%4A63D45CE000005CE6000020436F6E7665726765 6E636520546573742000000C0100005D02
%4A65C45D0000004D6F746F6E204F626A65637420546573740000 0F1600005D1E00004F62
%4A61945D206A6563743A000E1700005D32020000005D1650696374757265 3A00000B180000
%4A65E45D405D4802000000 5D26486F72697A6F6E74616C3A000D1900005D60020000005D3C
%4A63545D605665727469636 16C3A00111A00005D76020000005D5453697A653A00081B0000
%4A64445D805D88020000005D6A436F6C6F722050616C657474653A00000A0100005DA00000
%4A64945DA0536F756E642054657374000020400005DB4000057616974203320536 5636F6E
%4A64845DC0647300000203000 05DD0020000005DAC54657374696E6720536F756E64204350
%4A66B45DE055000203000 05DEA0000536F756E642050726F636573736F72204E6F74205265
%4A63F45E0073706F6E64696E670000020500005E12000053706565636820436869702054 69
%4A63B45E206D65204F757400000206000 05E3000004D757369632043686970205469 6D6520
%4A64F45E404F757400020700005E4C0000536F756E642043505520496E746572275707420
%4A63545E604572726F72000209000 05E6E0000536F756E642043505520524 14D2032204572
%4A64145E80726F72000208000 05EBC0000536F756E642043505520524 14D2031204572726F
%4A64245EA072000200000 5EAA0000536F756E642043505520524F4D2033204572726F7200
%4A64545EC0020B00005EC80000536F756E642043505520524F4D2032204572726F7200020A
%4A64A45EE000005EE60000536F756E642043505520524F4D2031204572726F720000005E0A
%4A61E45F0000005E2800005E4400005E6600005E8400005EA200005EC000005EDE020E0000
%4A64B45F205F2400004375727265 6E7420436F696E2056616C75653A00020F00005F400000
%4A62145F404E756D626572206F6620536F756E647320203A00021000005F60000000000000
%4A65045F60536F756E642043505520537461747573202 03A00191000005F7C0000476F6F64
%4A61145F800000021200005FBE020000005F1C536F756E642023203A00021700005FA40200
%4A64445FA000005F82746F206865617220736F756E640009160090405802000000 5F980216
%4A64145FC000005FCA020000005FB2205072657373200002 1A00005FDE020000005FBE746F
%4A63145FE02073656C65637420736F756E640007190090407202000000 5FD2021900006006
%4A6FC46000020000005FEE4D6F76650000101200006014000053696C656E742020202020
%4A6AC46020202020202020001012000060 2E00004E6F697379202020202020202020202000
%4A6E546040101200006048000 04D757369632043686970205465737420200010120000 6062
%4A60846060000045666665637473204368697020546573740010120000607C000053706565
%4A6C4460806368204368697020546573742000101200006096000020202020202020202020
%4A6BE460A02020202020202000101D000060B0000020576B697465202000000101D000060C2
%4A6C9460C000002020526564202020000001 01D000060D4000020477265656E20200000101D
%4A6E0460E0000060E600002020426C756520200000101D000060F8000020204772657920 20
%4A6F4461000000101D0000610A00002056696F6C6574200000000060BA000060CC000060DE
%4A605461200000060A8000060F0000060A8000061020000060CC000000000000000FFFFFFFF
%4A61C46140FFFFFFFF0001000100010001000100010001000100010000FFFF000100000000FFFF
%4A67F46160000100000000FFFF000100000000FFFF00010000FC00F0C0F00CFCCC4CCCFCCC
```

```
%4A659461B0FC0CF0C00000F0000000F00F0000F0F00000F0FF0000FF000000FF0F0000FFF0
%4A62D461A00000FFFF0000FF800000F0080000F0800000F0880000F8000000F8080000F880
%4A64E461C00000F8880000FF000000FF020000FF040000FF060000FF080000FF0A0000FF0C
%4A6FA461E00000FF0E0000F0200000F0220000F0240000F0260000F0280000F02A0000F02C
%4A6EE462000000F02E0000F0400000F0420000F0440000F0460000F0480000F04A0000F04C
%4A600462200000F04E0000F0600000F0620000F0640000F0660000F0680000F06A0000F06C
%4A612462400000F06E0000F0800000F0820000F0840000F0860000F0880000F08A0000F08C
%4A624462600000F08E0000F0A00000F0A20000F0A40000F0A60000F0A80000F0AA0000F0AC
%4A636462800000F0AE0000F0C00000F0C20000F0C40000F0C60000F0C80000F0CA0000F0CC
%4A602462A00000F0CE0000F4000000F4020000F4040000F4060000F4080000F40A0000F40C
%4A60A462C00000F40E0000F4200000F4220000F4240000F4260000F4280000F42A0000F42C
%4A61C462E00000F42E0000F4400000F4420000F4440000F4460000F4480000F44A0000F44C
%4A61F463000000F44E0000F4600000F4620000F4640000F4660000F4680000F46A0000F46C
%4A631463200000F46E0000F4800000F4820000F4840000F4860000F4880000F48A0000F48C
%4A643463400000F48E0000F4A00000F4A20000F4A40000F4A60000F4A80000F4AA0000F4AC
%4A655463600000F4AE0000F4C00000F4C20000F4C40000F4C60000F4C80000F4CA0000F4CC
%4A667463800000F4CE0000F4E00000F4E20000F4E40000F4E60000F4E80000F4EA0000F4EC
%4A625463A00000F4EE0000F8000000F8020000F8040000F8060000F8080000F80A0000F80C
%4A62B463C00000F80E0000F8200000F8220000F8240000F8260000F8280000F82A0000F82C
%4A63D463E00000F82E0000F8400000F8420000F8440000F8460000F8480000F84A0000F84C
%4A640464000000F84E0000F8600000F8620000F8640000F8660000F8680000F86A0000F86C
%4A652464200000F86E0000F8800000F8820000F8840000F8860000F8880000F88A0000F88C
%4A664464400000F88E0000F8A00000F8A20000F8A40000F8A60000F8A80000F8AA0000F8AC
%4A676464600000F8AE0000F8C00000F8C20000F8C40000F8C60000F8C80000F8CA0000F8CC
%4A688464800000F8CE0000F8E00000F8E20000F8E40000F8E60000F8E80000F8EA0000F8EC
%4A669464A00000F8EE0000FF200000FF220000FF240000FF260000FF280000FF2A0000FF2C
%4A674464C00000FF2E0000FF400000FF420000FF440000FF460000FF480000FF4A0000FF4C
%4A686464E00000FF4E0000FF600000FF620000FF640000FF660000FF680000FF6A0000FF6C
%4A689465000000FF6E0000FF800000FF820000FF840000FF860000FF880000FF8A0000FF8C
%4A69B465200000FF8E0000FFA00000FFA20000FFA40000FFA60000FFA80000FFAA0000FFAC
%4A6AD465400000FFAE0000FFC00000FFC20000FFC40000FFC60000FFC80000FFCA0000FFCC
%4A6BF465600000FFCE0000FFE00000FFE20000FFE40000FFE60000FFE80000FFEA0000FFEC
%4A63A465800000FFEEF000F00FFF0F0F0FFFF00FF0FFFF0FFFFFFB0F008F080F088F800FB08
%4A641465A0F880F8888008408808008C00900094009800 9C00A000A400A800AC00B000B400
%4A6EB465C0B800BC00C0A0C4A0CBA0CCA0D0A0D4A0DBA0DCA0E0A0E4A0E8A0ECA0F0A0F4A0
%4A699465E0F8A0FCA0C020C420CB20CC20D020D420DB20DC20E020E420E820EC20F020F420
%4A6D046600F820FC20C080C480CB80CC80D080D480DB80DC80E080E480E830EC80F080F480
%4A63246620F880FC80010200006620000 4D61696E20524F4D206572726F72000015020000
%4A6F146640664400005500170200006 64E00004C00010300006658000047616D6520626F61
%4A616466607264205241 4D206572726F72000010400006676000 04E4F2047414D45205052
%4A61C466804F4752414D000104000066 8E0000524F4D206174203130303030206572726F72
%4A6F1466A000000105000066AA0000524F4D206174203138303030206572726F7200000106
%4A601466C0000066C60000524F4D206174203230303030206572726F7200000107000066E2
%4A615466E00000524F4D206174203238303030206572726F7200000108000066FE0000524F
%4A6FC467004D206174203330303030206572726F7200000109000671A0000524F4D206174
%4A6EF467202033383030302065726 72726F720000010A000067360000524F4D206174203430 30
%4A6F546740303020657272 6F720000010B000067520000524F4D206174203438303030 2065
%4A61B4676072726F720000010C0000676E0000524F4D206174203530303030206572726F72
%4A603467800000010D0000678A0000524F4D206174203538303030206572726F720000010E
%4A60A467A0000067A60000524F4D206174203630303030206572726F720000010F000067C2
%4A610467C00000524F4D206174203638303030206572726F7200000110000067DE0000524F
%4A615467E04D206174203730303030206572726F7200000111000067FA0000524F4D206174
%4A6EE468002037383030302065726 72726F720000011200006816 0000524F4D206174203830 30
%4A6F046820303020657272 6F720000011300006832 0000524F4D206174203838303030 2065
%4A6E0468 4072726F720000150400006 84E000055001505000068580000550015060000 6862
%4A6C546860000055001507000068 6C000055001508000068760000550015090000 68800000
%4A6E946880550015 0A0000688A000055001 50B000068940000550015 0C0000689E00005500
%4A6F1468A0150D000068A8000055001 50E00006 8B200005500150F000068BC000055001510
%4A6CB468C0000068C6000055001511000068D000005500151200006 8DA0000550015130000
%4A605468E068E4000055001704000068EE00004C00170500006 8F800004C00170600006902
```

```
%4A6C94690000004C001707000069 0C00004C001708000069160000 4C001709000069200000
%4A6F3469204C00170A0000692A00004C00170B0000693400004C00170C0000693E00004C00
%4A6F746940170D0000694B00004C00170E0000695200004C00170F0000695C00004C001710
%4A6CF469600000696600004C001711000069700000 4C001712000069 7A00004C001730000
%4A6BF469B069B400000 4C000002040405030000000001010202030344042505470628075008
%4A65E469A031098E408A408C400A0F141E50726573732000002066 6F72206E657874207363
%4A666469C07265656E00004B6973746F6772616D20666F7220506C6179657220002D002620
%4A650469E055500000507265737320000020746F20636C6561722616C6C206B6973746F67
%4A65046A0072616D7300005072657373200000666F72206E657874206C6576656C0000546F
%4A66246A2074616C20436F696E73203A200000417667205469 6D652F436F696E203A200000
%4A62346A402073656300005374617469737469637300000006A7E00006A8C00006A9A0000
%4A65746A606AA800006AB600006AC400006AD200006AE000006AEE00006AFC00006B0A506C
%4A66B46A807972203020436F696E733A00506C7972203120436F696E733A00506C79722032
%4A68546AA020436F696E733A00506C7972203320436F696E733A003020506C7972204D696E
%4A65846AC073203A003120506C7972204D696E73203A003220506C7972204D696E73203A00
%4A67546AE03320506C7972204D696E73203A003420506C7972204D696E73203A00546F7461
%4A64946B006C2047616D6573203A004572726F7220436F756E74203A001B0F00006B240000
%4A61746B200000000045455052 4F4D204552524F52000050726573732000007 46F20636C65
%4A65B46B406172207374617469737469637300507265737320000066 6F7220686973746F67
%4A65F46B6072616D7300001E1F204D4F5245201E1F00001C1D204D4F5245201C1D00001E1F
%4A6C546B80204D4F5245201E1F00008F00FF0060FFF0FF8F008FFF60F0F0F00A0F141E0119
%4A66446BA000006BA60000746F2073617665207468697320736574696E6720616E642065
%4A67046BC078697400011600006BD00200000006B9E726573746F726573206F726967696E61
%4A63F46BE06C2073657474696E670001080000 6BF6020000006BC44F464600010700006C06
%4A6F246C00020000006BEA4F4E0000050600006C16020000006BFA3520342033203220312 0
%4A6B746C203020392038000505000006C32020000006C0A3120312031203120312031001506
%4A6D946C4000006C4A020000006C2637203620352034203320322031203000 0D0200006C66
%4A64046C60020000006C3E2B537769746368207665727369 6F6E2900000F0100006CB00000
%4A68646CB047616D65204F7074696F6E7300000F0100006C960000436F696E204F7074696F
%4A6DC46CA06E73000050A00006CB0020000006C2637203620352034203320322031203000
%4A63246CC0010C00006CCC020000006CA44F464600010B00006CDC020000006CC04F4E0000
%4A65B46CE0080200006CEC020000006CD02853776974636820766572736 96F6E2900000A01
%4A64746D0000006D0600047616D65204F7074696F6E7300000A0100006D1C0000436F696E
%4A61C46D20204F7074696F6E73000000006D2E2020202020202020202000000424D756C7469
%4A61646D40706C6965723A003100320033003400350036003700380075426F6E7573204164
%4A64346D606465723A004E6F6E650032206769766573203100342067697665732031003420
%4A63046D80676976657320320035206769766573203100332067697665732031000046 7265
%4A67046DA06520506C6179000000000000000000000000000000000000000000000000000000
%4A63746DC000000000000000000000000000000000000000000000000000000000000000000
%4A63946DE000000000000000000000000000000000000000000000000000000000000000000
%4A62C46E000000000000000000000000000000000000000000000000000000000000000000
%4A62E46E200000000000000000000000000000000000000000000000000000000000000000
%4A63046E400000000000000000000000000000000000000000000000000000000000000000
%4A63246E600000000000000000000000000000000000000000000000000000000000000000
%4A63446E800000000000000000000000000000000000000000000000000000000000000000
%4A63646EA00000000000000000000000000000000000000000000000000000000000000000
%4A63846EC00000000000000000000000000000000000000000000000000000000000000000
%4A63A46EE00000000000000000000000000000000000000000000000000000000000000000
%4A62D46F000000000000000000000000000000000000000000000000000000000000000000
%4A62F46F200000000000000000000000000000000000000000000000000000000000000000
%4A63146F400000000000000000000000000000000000000000000000000000000000000000
%4A63346F600000000000000000000000000000000000000000000000000000000000000000
%4A63546F800000000000000000000000000000000000000000000000000000000000000000
%4A63746FA00000000000000000000000000000000000000000000000000000000000000000
%4A63946FC00000000000000000000000000000000000000000000000000000000000000000
%4A63B46FE00000000000000000000000000000000000000000000000000000000000000000
%4A61F470000000000000000000000000000000000000000000000000000000000000000000
%4A621470200000000000000000000000000000000000000000000000000000000000000000
%4A623470400000000000000000000000000000000000000000000000000000000000000000
%4A625470600000000000000000000000000000000000000000000000000000000000000000
```

```
%4A627470800000000000000000000000000000000000000000000000000000000000000000
%4A629470A000000000000000000000000000000000000000000000000000000000000000
%4A62B470C000000000000000000000000000000000000000000000000000000000000000
%4A62D470E000000000000000000000000000000000000000000000000000000000000000
%4A620471000000000000000000000000000000000000000000000000000000000000000
%4A622471200000000000000000000000000000000000000000000000000000000000000
%4A624471400000000000000000000000000000000000000000000000000000000000000
%4A626471600000000000000000000000000000000000000000000000000000000000000
%4A628471800000000000000000000000000000000000000000000000000000000000000
%4A62A471A000000000000000000000000000000000000000000000000000000000000000
%4A62C471C000000000000000000000000000000000000000000000000000000000000000
%4A62E471E000000000000000000000000000000000000000000000000000000000000000
%4A621472000000000000000000000000000000000000000000000000000000000000000
%4A623472200000000000000000000000000000000000000000000000000000000000000
%4A625472400000000000000000000000000000000000000000000000000000000000000
%4A627472600000000000000000000000000000000000000000000000000000000000000
%4A629472800000000000000000000000000000000000000000000000000000000000000
%4A62B472A000000000000000000000000000000000000000000000000000000000000000
%4A62D472C000000000000000000000000000000000000000000000000000000000000000
%4A62F472E000000000000000000000000000000000000000000000000000000000000000
%4A622473000000000000000000000000000000000000000000000000000000000000000
%4A624473200000000000000000000000000000000000000000000000000000000000000
%4A626473400000000000000000000000000000000000000000000000000000000000000
%4A628473600000000000000000000000000000000000000000000000000000000000000
%4A62A473800000000000000000000000000000000000000000000000000000000000000
%4A62C473A000000000000000000000000000000000000000000000000000000000000000
%4A62E473C000000000000000000000000000000000000000000000000000000000000000
%4A630473E000000000000000000000000000000000000000000000000000000000000000
%4A623474000000000000000000000000000000000000000000000000000000000000000
%4A625474200000000000000000000000000000000000000000000000000000000000000
%4A627474400000000000000000000000000000000000000000000000000000000000000
%4A629474600000000000000000000000000000000000000000000000000000000000000
%4A62B474800000000000000000000000000000000000000000000000000000000000000
%4A62D474A000000000000000000000000000000000000000000000000000000000000000
%4A62F474C000000000000000000000000000000000000000000000000000000000000000
%4A631474E000000000000000000000000000000000000000000000000000000000000000
%4A624475000000000000000000000000000000000000000000000000000000000000000
%4A626475200000000000000000000000000000000000000000000000000000000000000
%4A628475400000000000000000000000000000000000000000000000000000000000000
%4A62A475600000000000000000000000000000000000000000000000000000000000000
%4A62C475800000000000000000000000000000000000000000000000000000000000000
%4A62E475A000000000000000000000000000000000000000000000000000000000000000
%4A630475C000000000000000000000000000000000000000000000000000000000000000
%4A632475E000000000000000000000000000000000000000000000000000000000000000
%4A625476000000000000000000000000000000000000000000000000000000000000000
%4A627476200000000000000000000000000000000000000000000000000000000000000
%4A629476400000000000000000000000000000000000000000000000000000000000000
%4A62B476600000000000000000000000000000000000000000000000000000000000000
%4A62D476800000000000000000000000000000000000000000000000000000000000000
%4A62F476A000000000000000000000000000000000000000000000000000000000000000
%4A631476C000000000000000000000000000000000000000000000000000000000000000
%4A633476E000000000000000000000000000000000000000000000000000000000000000
%4A626477000000000000000000000000000000000000000000000000000000000000000
%4A62B477200000000000000000000000000000000000000000000000000000000000000
%4A62A477400000000000000000000000000000000000000000000000000000000000000
%4A62C477600000000000000000000000000000000000000000000000000000000000000
%4A62E477800000000000000000000000000000000000000000000000000000000000000
%4A630477A000000000000000000000000000000000000000000000000000000000000000
%4A632477C000000000000000000000000000000000000000000000000000000000000000
%4A634477E000000000000000000000000000000000000000000000000000000000000000
```

```
%4A627478000000000000000000000000000000000000000000000000000000000000000000
%4A629478200000000000000000000000000000000000000000000000000000000000000000
%4A62B478400000000000000000000000000000000000000000000000000000000000000000
%4A62D478600000000000000000000000000000000000000000000000000000000000000000
%4A62F478800000000000000000000000000000000000000000000000000000000000000000
%4A631478A00000000000000000000000000000000000000000000000000000000000000000
%4A633478C00000000000000000000000000000000000000000000000000000000000000000
%4A635478E00000000000000000000000000000000000000000000000000000000000000000
%4A628479000000000000000000000000000000000000000000000000000000000000000000
%4A62A479200000000000000000000000000000000000000000000000000000000000000000
%4A62C479400000000000000000000000000000000000000000000000000000000000000000
%4A62E479600000000000000000000000000000000000000000000000000000000000000000
%4A630479800000000000000000000000000000000000000000000000000000000000000000
%4A632479A00000000000000000000000000000000000000000000000000000000000000000
%4A634479C00000000000000000000000000000000000000000000000000000000000000000
%4A636479E00000000000000000000000000000000000000000000000000000000000000000
%4A62947A000000000000000000000000000000000000000000000000000000000000000000
%4A62B47A200000000000000000000000000000000000000000000000000000000000000000
%4A62D47A400000000000000000000000000000000000000000000000000000000000000000
%4A62F47A600000000000000000000000000000000000000000000000000000000000000000
%4A63147A800000000000000000000000000000000000000000000000000000000000000000
%4A63347AA00000000000000000000000000000000000000000000000000000000000000000
%4A63547AC00000000000000000000000000000000000000000000000000000000000000000
%4A63747AE00000000000000000000000000000000000000000000000000000000000000000
%4A62A47B000000000000000000000000000000000000000000000000000000000000000000
%4A62C47B200000000000000000000000000000000000000000000000000000000000000000
%4A62E47B400000000000000000000000000000000000000000000000000000000000000000
%4A63047B600000000000000000000000000000000000000000000000000000000000000000
%4A63247B800000000000000000000000000000000000000000000000000000000000000000
%4A63447BA00000000000000000000000000000000000000000000000000000000000000000
%4A63647BC00000000000000000000000000000000000000000000000000000000000000000
%4A63847BE00000000000000000000000000000000000000000000000000000000000000000
%4A62B47C000000000000000000000000000000000000000000000000000000000000000000
%4A62D47C200000000000000000000000000000000000000000000000000000000000000000
%4A62F47C400000000000000000000000000000000000000000000000000000000000000000
%4A63147C600000000000000000000000000000000000000000000000000000000000000000
%4A63347C800000000000000000000000000000000000000000000000000000000000000000
%4A63547CA00000000000000000000000000000000000000000000000000000000000000000
%4A63747CC00000000000000000000000000000000000000000000000000000000000000000
%4A63947CE00000000000000000000000000000000000000000000000000000000000000000
%4A62C47D000000000000000000000000000000000000000000000000000000000000000000
%4A62E47D200000000000000000000000000000000000000000000000000000000000000000
%4A63047D400000000000000000000000000000000000000000000000000000000000000000
%4A63247D600000000000000000000000000000000000000000000000000000000000000000
%4A63447D800000000000000000000000000000000000000000000000000000000000000000
%4A63647DA00000000000000000000000000000000000000000000000000000000000000000
%4A63847DC00000000000000000000000000000000000000000000000000000000000000000
%4A63A47DE00000000000000000000000000000000000000000000000000000000000000000
%4A62D47E000000000000000000000000000000000000000000000000000000000000000000
%4A62F47E200000000000000000000000000000000000000000000000000000000000000000
%4A63147E400000000000000000000000000000000000000000000000000000000000000000
%4A63347E600000000000000000000000000000000000000000000000000000000000000000
%4A63547E800000000000000000000000000000000000000000000000000000000000000000
%4A63747EA00000000000000000000000000000000000000000000000000000000000000000
%4A63947EC00000000000000000000000000000000000000000000000000000000000000000
%4A63B47EE00000000000000000000000000000000000000000000000000000000000000000
%4A62E47F000000000000000000000000000000000000000000000000000000000000000000
%4A63047F200000000000000000000000000000000000000000000000000000000000000000
%4A63247F400000000000000000000000000000000000000000000000000000000000000000
%4A63447F600000000000000000000000000000000000000000000000000000000000000000
```

```
%4A63647F8000000000000000000000000000000000000000000000000000000000000000
%4A63847FA000000000000000000000000000000000000000000000000000000000000000
%4A63A47FC000000000000000000000000000000000000000000000000000000000000000
%4A63C47FE000000000000000000000000000000000000000000000000000000000000000
%4A648480003 02F000648E73F3E340045F90090200047F90090280049F9009030004BF90090
%4A60C4802038004DF9009040463F3C000130390090402 2B0790090402466000434303900 90
%4A66048040400 6D0403F00363900904AA6024300E0E64BD67900904862538341F9000086DE
%4A6FA480601039009048584880D0303000323900904040C410001670 8E341B04163023001
%4A65B480803F00D4426608343900905F80D4423C3520003F061C17024600FC0C4600A0662C
%4A6F3480A0303900904006024000036600035030322000064000009B0790000CBDE65063039
%4A6F1480C00000CBDC358020006000033204460024650003 2A0C46007862000322383320 00
%4A65F480E0300490790090 4A820C407FFF6200030E3A342000300590790090 4A840C4083FF
%4A62A4B100620002FA4BC23F06080400056 72C7006C06F0006660002E406762000200041F9
%4A6F54B1200000865E640002C041F90000869E10306003D13620006000000C2080400046700
%4A6024B14000500C46003065080C46003863 0000AC303C0006C06F0006660002A006762000
%4A60E4B16020006 40C0884000437842000603 43C170C46002465100C46002C620A41F90000
%4A6024B180D2686000026641F90000D1E86000025C3002004000023 22F0006B3400240001E
%4A6384B1A066504A7900904862674 80C57003C630000284A7900904B5066000240 2F2F0002
%4A6874B1C0E44E5F462F06E24A2F024EB9000470CE4FEF000C6000022461000528 08C2001E
%4A6134B1E0383320003A342000080400046 70C6000FF7E0C57003C6200020 23C3620000246
%4A63A482001C003E3C0080363C07C0064604000246 1C000C460C006420DA4761000D1C6B18
%4A6FA482209A47DC46044604003033 10000240000F0C40000C6C00010404461 0000C460C00
%4A62E482406420 9A4761000DC06B18DA47DC46044604003033 10000240000F0C40000C6C00
%4A64F4826000DA0446080002461C000C460C0064209 8476 1000E5E6B18D847DC4604460400
%4A6054828030331000024000 0F0C40000C6C0000AC0646 1000024 61C000C460C006420DB47
%4A62D482A061000EF06B189847DC4604460400303 3100002400 00F0C40000C6C00007E0646
%4A60D482C0040002461C000276E3FF2000BD762000088400050 8B3000520010802001F6700
%4A6384 82E000863205064104000241F8000A41F8003004064 00600EA48D240EC49D241B441
%4A60A4830067000084303210006622B47900904A80660633C100904A8037842000398 52000
%4A6EA483206100091434013833200060623033100002400 00F0C40000C6D2C30023601E248
%4A65648340E2492F002F014EB900047356508F4A722000670000EA610006BA3C1741F90000
%4A6294836086 5E600000823C170802001E667241F90000869E1030600067000080 6A1C0804
%4A6314838000046776604837842000398520003C1741F90000869E10306001C02F0007665A
%4A6CD483A0067620002000643210306002080000006724080400046 61608F3000420010636
%4A6FB483C00060200035B90000CBE0200060 2C08B30004200160 0AD1362000080400046 61A
%4A617483E041F90000861E2070600010362000024000FCE24835B000002000548F341F0242
%4A66A4840003FF66063439009 05F80D442B47900904A806600FC7A4A6F0004664A30352000
%4A6814842002400 3FF66063039009 05F80D4033C000904A803F7CFFFF00046000FC52B479
%4A6424844000904A8066B4303620000240 03FF66063039009 0493AD0403 3C000904A803F7C
%4A6904846000000008 60945C8F4CDF7CFC4E75D4426608343900905F80D4423C3520003F06
%4A63B484800246FC000C4624006500012 60C469FFF6200011E383320003004907900904A82
%4A64D484A00C407FFF6200010A3A342000300590790090 4A840C4083FF620000F630390090
%4A600484C0402632000241000341F900904AF8D2410830000210016702 50400C4660006616
%4A667484E048A7C0002F024EB9000472343E00588F4C9F0003601641F900904B083E301000
%4A68648500DE4741F90000860C3E307000D24141F9009048EE48C7DFB010003206EC498240
%4A6364852041F90004098A10301000675A027503FF200032007E0AEF68817520000C410019
%4A64E485406D2C41F90000C534D2413030100035 8020000C4654006558 0C465FFF62520884
%4A61E4856000043784200002761FFF2000604241F90000C6607000103010000244FFF08B40
%4A63A4858037842000602AB47900904A80661E3036200002 4003FF66063039009 0493AD040
%4A6434850A033C000904A803F7C000000026 10006C2341F024203FF66063439009 05F80D442
%4A658485C0B47900904AB06600FEB24A576620303520000 24003FF66063039009 05F80D040
%4A691485E033C000904A803EBCFFFF6000FE8E548F3239009040260241000341F9009049D0
%4A6EE486000030000110004CDF7CFC4E750000000A0014001E00280032003C004600500000
%4A69748620CBE80000CBE80000CBE80000CCE80000CCE80000CCE80000CDE80000CDE80000
%4A69F48640CDE80000CEE80000CEE80000CEE80000CFE80000CFE80000CFE80000D0E80000
%4A66348660CC680000CC680000CC680000CD680000CD680000CD680000CE680000CE680000
%4A65248680CE680000CF680000CF680000CF680000D0680000D0680000D0680000D1680E06
%4A6B4486A080000E0680000E06800000064040000640400006404000060040000600400006
%4A62F486C0004000022000000220000002 2000FF06FF00FF06FF00FF06FF00000640E0040B
%4A632486E00F12060D1114080F13160A1115180C13171A0E15191C10171B1E12191D200600
```

```
%4A69A48700030041F90090486443F900904AFB183320001A3420004E56FFF470FF3D40FFFE
%4A635487203D40FFF476063F023C303000674CDC46083100003001664272001234600092 05
%4A66648740488 13E016A0244477000103360009004488 03C006A0244463406D447B46EFFFE
%4A65F4876064183D42FFFE3D46FFFC3D47FFFA3D40FFF83D41FFF63D43FFF455B36AAA341F
%4A69448780302E0008E248760141F900008A64323000003C2EFFFC3E2EFFFAB24663027600
%4A693487A0B24763027602 4A6EFFF86A0851434443024300074A6EFFF66A0A0443000C4443
%4A6E1487C00243000 70C40001265000110 0C40001662000 1080C46001464100C470014640A
%4A617487E0588302430007600001B00C46002C640001A80C47002C640001A0610001EA6700
%4A6544880001983 83C001261000 1A2660001 8C41F900904AE6322EFFF46B00017E3C301000
%4A63E488200831 00061B016702 5041E64E0246001E41F90000BFF03C306000DC4641F90000
%4A65948840C0883E301000320741F90000C09BC3F0600041F90000C0AACFF060003C01322E
%4A6B048860FFF8 5441D241D241DC41322EFFF6D241D241DE413004E2482F002F033002E248
%4A664488802F004EB900046EEE4FEF000C3203D24141F90000A5A0103010004880D040D040
%4A669488A09C4041F900904A86318640EE41F90000A5B0103010004880D040D0409E4041F9
%4A64E488C000904A8E318740EE4879000000504EB900048064588F600000C00C40000C6500
%4A60A488E000B80C400010620000B0610000FA670000A8383C000A610000B26600009C3002
%4A65848900E2483200D64341F90000F998D070300041F90000F9AAD2703000E24B0240001F
%4A62148920024103E0D240D2414A7210006726303510000240FC000C40D400671 80C40E800
%4A62D4894067120C40EC00670C0C4018006706 0C40B8006644080300006714 0C4600106538
%4A62A489609C476A0244460C46000864 2C6014080300016708 0C460010651E60060C470010
%4A6B9489B06516E24C2F042F033002E2482F004EB900046EEE4FEF000C4E5E0276E3FF2000
%4A66C489A0D643D643D73620004E7541F90090487A4A7240006606 4A704000672854444A72
%4A628489C0400066064A704000671A54444A7240006606 4A704000670C54444A7240006604
%4A65C489E04A7040004E7598390090 4A820C0400066 31C0C0400796 4169A3900904A840C05
%4A64448A00000B630A0C05007F640478FF4E7578004E753033300090 4438006A0244403234
%4A61448A2030009245 3A016A0244417604 0C4004006402 76000C4104006402 76084A446A0A
%4A62148A4004430020444302430 01C4A456A0A0443003044430243001C0276E3FF2000D736
%4A67548A6020004E75000100010001000200020002000400040004000400040004000200 02
%4A63B48A800002000148E73F3E322F0032D24145F90090200047F90090280049F900903000
%4A65648AA04BF9009038004DF900904046613A35AF0036100037AF003A100039AF003E1000
%4A64248AC0027503FF1000302F0042740AE5608175100002 7603FF1000302F0046E5608176
%4A66F48AE010004CDF7CFC4E753032100067080C408000660000AB43F900905F8041F90090
%4A65648B0048923601EC4B5243D643D6430C4300806D04363C007E383130003004D0403A36
%4A67A48B200000024503FF3C01E24EB846622E4A44660E3A390090493A33C60090493A601C
%4A62948B400C4400206206BC7000006F103A0438350000024403FF3004D04060CE3B841000
%4A64848B603D8510003E046710DE4730367000024 0FC0080463D807000DA45670E30355000
%4A6564 8B800240FC0080463B8050003031300067048044660833863000 55436AEE4E7548E7
%4A65248BA03F3E342F0032322F0036D241D44245F90090200047F90090280049F900903000
%4A6D848BC04BF9009038004DF900904046 61684CDF7CFC4E7548E73F3E342F0032D44245F9
%4A66248BE00090200047F90090280049F9009030004BF9009038004DF900904046 61724CDF
%4A68348C007CFC4E7548E73F3E342F0032D44245F90090200047F90090280049F900903000
%4A67E48C204BF9009038004DF900904046610000D24CDF7CFC4E756100FEB035B220001000
%4A6E948C4037B32000100039B4200010003035 20000240FC00027503FF1000817510003036
%4A62B48C6020000240FC00027603FF1000817610003835 2000024403FF3C04DC463A362000
%4A65448C80024503FF67123E05DE4730357000024 0FC00D0443B8070004A44670E30366000
%4A68A48CA00240FC00D0453D8060003C02E24EBC790090493A660633C50090493A3606EA4B
%4A66148CC05243D643D6430C4300806D04363C007E43F900905F8030313000670 4B0466608
%4A61F48CE03384300055436AEE700035802000378020003980200 03B8020003D8020004E75
%4A64B48D003B352000024403FF3C04DC463A362000024503FF67123E05DE4730357000024 0
%4A66E48D20FC00D0443B8070004A44670E30366000024 0FC00D0453D8060003C02E24EBC79
%4A67748D400090493A660633C50090493A3606EA4B5243D643D6430C4300806D04363C007E
%4A65548D6043F900905F8030313000670 4B0466608338430005 5436AEE303CFC00C1752000
%4A69448DB0C17620004E7548E71F063E2F00260647000D603E48E71F063E2F0026603448E7
%4A67848DA01F063E2F00260647001160 2648E71F063E2F00260647001560 1848E71F063E2F
%4A67048DC00026064700196 00A48E71F063E2F002652473C2F00224BF9009038004DF90090
%4A68C48DE0404643F900905F8041F900904 8923606EA4B5243D643D6430C4300806D04363C
%4A65048E00007E383130003004D0403A360000024503FFB846622E4A44660E3A390090493A
%4A62F48E2033C70090493A601C0C4400206406BC7000006F103A0438350000024403FF3004
%4A62648E40D04060CE4A44670E323600000241FC0082473D810000300567 10D04032350000
%4A65948E600241FC0082473B810000303130006704B0446608338730005 5436AEEDE473B84
```

```
%4A69148EB070003D8570003 1B670004CDF60F84E7548E73E06342F00225242 3C02D4424BF9
%4A63E48EA0009038004DF900904046 3B352000024403FF3A362000024503FF67123205D241
%4A61A48EC0303510000240FC00D0443B801000320467 10D241303610000240FC00D0453D80
%4A66D48EE01000BC790090493A660633C50090493A41F900904892363020 00EA4B5243D643
%4A64548F00D6430C4300806D04363C007E43F900905FB0303130006704B04666083384 3000
%4A65F48F2055436AEE700031802000 3B8020003D8020004CDF607C4E750C420080640E0C45
%4A64948F40F0B06300009A72004A414E75323CFFC0D2424A72100067206B00008C30331000
%4A61C48F6090446A024440B043640E300590741000 6A024440B04365D030015540024000 3E
%4A63248F80024107C0D2404A721000671E6B643033100090446A024440B043640E30059074
%4A62C48FA01000 6A024440B043659E300158400240003E024107C0D2404A72100067206B3C
%4A62F48FC0303310009044 6A024440B0436410300590741000 6A024440B0436500FF6C08C2
%4A6044 8FE0001F72FF4E753033100004400200 6000FF703033100004400200609630331000
%4A63E490000440020060BE0C4207C0650C4A456A00009A72004A414E75323C0040D2424A72
%4A6F649020100067206B00008C303310009044 6A024440B043640E300590741000 6A024440
%4A60F49040B04365D030015540024000 3E024107C0D2404A721000671E6B643033100090 44
%4A611490606A024440B043640E300590741000 6A024440B043659E300158400240003E0241
%4A6094908007C0D2404A721000 67206B3C303310009044 6A024440B0436410300590741000
%4A649490A06A024440B0436500FF6C08C2001F72FF4E753033100004400200 6000FF703033
%4A6CA490C0100004400200609630331000044002 0060BE3202300155400240003E024107C0
%4A6FB490E0D2404A721000 67226B00008430331000 9044 6A024440B0436410300590741000
%4A62D491006A024440B0436500008 60641FFC00C4200806 5244A721000671E6B5E30331000
%4A6244912090446A024440B043640E300590741000 6A024440B04365560C4207C064280641
%4A6124914000804A721000671E6B3A303310009044 6A024440B043640E300590741000 6A02
%4A61F491604440B04365280BC2001F72FF4E753033100004400200 6000FF78303310000440
%4A6E749180020060 9C303310000440020060C04A414E753202300154400240003E024107C0
%4A6F8491A0D2404A721000 67226B00008430331000 9044 6A024440B0436410300590741000
%4A639491C06A024440B0436500008 60641FFC00C4200806 5244A721000671E6B5E30331000
%4A630491E090446A024440B043640E300590741000 6A024440B04365560C4207C064280641
%4A60F4920000804A721000671E6B3A303310009044 6A024440B043640E300590741000 6A02
%4A61C492204440B04365280BC2001F72FF4E753033100004400200 6000FF78303310000440
%4A6324924002006 09C303310000440020060C04A414E7548E73F3E302F0032D0403C2F0036
%4A66C492603E2F003A45F9009020004 7F9009028004 9F900903000537900904ADC61064CDF
%4A64A492807CFC4E753A0041F900904864343050 00D4423633200038342000 3F3C00F00807
%4A618492A00004660001 5C0839000600904856661230 03D046907900904A6C0C4070006400
%4A614492C00140D646610007126400013 20C728000100066000 0B2964606430080024 3FF7F
%4A6F5492E00C7905400090403A630001163001904202400 7C00C4000406642080700066700
%4A6024930001000B3900060090485666143004064000 8090790090 4A6E0C407400640000E2
%4A6F7493200644008061000576640004 9A61000552660004920444008060000 4BA0C4007C0
%4A6054934066000 0BE0807000767000 0B6083900060090485666143004044000 8090790090
%4A6014936 04A6E0C4074006400009804440080610005686400045061000508660004480644
%4A6244938000806000044061000 4DC667096464A7900904ADC676A303310000240000F0440
%4A64B493A0000C6B5C41F90090485AD0400830000500016 60C41F900904AF04A7000006 73C
%4A659493C048A73F000C7903C00090403A651AB8741000640A0B070006670E7E60600C0807
%4A6CB493E0000767047EA060027EE03C3C0080537900904ADC6100FEBE4C9F00FC0257FFEF
%4A60F4940008070005660001 2C0839000600904856661230039046907900904A6C0C407000
%4A61E4942064000110964661000578640001 020C728000100066000082D6460243FF7F0C79
%4A60D4944005400090403A630000EA300290810240 07C00C4007C0662C08070006670000D4
%4A6304946 00B3900060090485666 00FEB63004064000 8090790090 4A6E0C407400640000B4
%4A6414948 06000FE9E0C400040660000A8080700076700 00A0083900060090485666 00FECC
%4A637494A0300404400080907900904A6E0C4074006400008 06000FEB4610003AA6670D646
%4A64E494C04A7900904ADC676A303310000240000F0440000C6B5C41F90090485AD0400830
%4A64E494E00004000 1660C41F900904AF04A7000006 73C48A73F000C7903C00090403A651A
%4A64A49500B8741000640A0B070006670E7E50600C0807000767047E9060027ED03C3C0080
%4A6814952053790090 4ADC6100FD5C4C9F00FC0257FFDF0807000666000158083900060090
%4A6384954048566612300490469079009 04A6E0C4074006400013C98466100037E6400012E
%4A6304956 00C7280001000660000AED8460244FF7F0C7905400090403863000116300190 82
%4A6F5495800240003E0C40003E66420807000567000100083900060090485666143003 0640
%4A6FE495A00080907900904A6C0C4070006400 00E2064300806100042264000 20A61000 2A6
%4A6F7495C0660002020443008060000 1FA0C4000026600 00BE0807000467000 0B608390006
%4A609495E00090485666143003044000809079009 04A6C0C4070006400009804430080 6100
```

```
%4A613496000 3A0640001C06100025C660001B80643008060000 1B06100026867 0D8464A79
%4A62F4962000904ADC676A303310000240000F0440000C6B5C41F90090485AD04008300007
%4A65B4964000 01660C41F900904AF04A700000673C48A73F000C7903C00090403865 1AB673
%4A64A49660 1000640A08070005670E7EA0600C0807000467047E9060027EB03C3C00B05379
%4A6934968000904ADC6100FBFE4C9F00FC0257FFBF0807000766000 12E0839000600904856
%4A628496A066123004D046907900904A6E0C4074006400011 2D846610001E4640001040C72
%4A623496C0800010006600008498460440080024 4FF7F0C7905400090403863 0000E83001
%4A63A496E090820240003E0C40003E662C0807000567000 0D2083900060090485 66600FEB2
%4A62449700300306400080907900904A6C0C4070006500FE9E600000AE0C400002660000A6
%4A6304972008070004670000 9E0839000600904856 6600FEC83003044000809079009 04A6C
%4A649497400C4070006500FEB4607A6100013466709846 4A7900904ADC676A303310000240
%4A64749760000F0440000C6B5C41F90090485AD0400830000600016 60C41F900904AF04A70
%4A64E4978000006 73C48A73F000C7903C00090403865 1AB6731000640A08070005670E7E60
%4A68D497A0600C0807000467047E5060027E703C3C00805379 00904ADC6100FACA4C9F00FC
%4A65A497C00257FF7F320406410400024 1FB000A41FB00300306400600EA4BD240EC49D241
%4A635497E0B441670000744A721000663A3783200039842000 3005E2482F0041F900904864
%4A65449800300 1E24831B050002F004BF9009038004DF900904046610 0F41E4EB90004C690
%4A69E49820508F301F4E753005E2482F00E2492F014EB900049C364A40660ADEFC000A303C
%4A69C4984000F04E750C40FFFE660C4EB90004C690508F301F4E75508F3783200039842000
%4A67E49860301F4E753F013005E2482F002001E2482F004EB900049572508F321F4A804E75
%4A676498803F013005E2482F002001E2482F004EB900049572508F321F4A804E750C42007E
%4A617498A0620A7200303CF080B0444E753202044100406160 65F4300155400240003E0241
%4A65A498C007C0D240614E65E2300158400240003E024107C0D240603C0C4207BE630C4A44
%4A614498E06A06323C0000B2424E753202064100406122 65F4300155400240003E024107C0
%4A60F49900D240611065E2300158400240003E024107C0D2404A7210006738 6B3830331000
%4A60F4992090433 3C00090403C6A0244400C4007C0642033C00090403830341000904433C0
%4A6124994000904 03E6A0244403 3C00090403A0C4007C04E753033100006400280024 0F800
%4A6114996004400200904333C00090403C6A0244400C4007C064DC33C00090403830341000
%4A6264998006400100024 0F800904433C00090403E6A02444033C00090403A0C4007C04E75
%4A616499A0320230015540024 0003E024107C0D2406100FF62652070400C420080650C9240
%4A634499C06100FF52651030 3C00800C4207C06406D2406000FF404E753202300154400240
%4A64D499E0003E024107C0D2406100FF2A652070400C420080650C92406100FF1A6510303C
%4A67E49A0000800C4207C06406D2406000FF084E75FF52657365742048696768205363 6F72
%4A68D49A2065205461626C65733F004E6F0059657300EE536F756E647320696E2041747472
%4A69049A4061637420 4D6F64653F004E6F0059657300CC526573746F726520466163746F72
%4A6BF49A607920446566617 56C742053657474696E67733F004E6F0059657300754 7616D65
%4A64049A8020446966666963756C74790030202D204561736965737400310032202D204561
%4A63549AA0737900330034202D204D6F646572617465003500 36202D204861726400372 02D
%4A63B49AC0204861726465737400404865616C746820506572204 36F696E00313030003132
%4A6BA49AE0350031353000313735003230300032323500323530003330300033353000343 0
%4A6B849B0030003435300035303000353530003630300036353000373030003735300038 30
%4A6A749B2030003835300039303000393530003130303000313130300031323030003133 30
%4A6A849B4030003134303000313530300031363030003137303000313830300031393030 00
%4A62D49B6032303030009 8436F696E7320746F205374617274003100320033003400DD4175
%4A68B49B80746F6D617469632052657365742 06F66204869676820536 36F7265205461626C
%4A68F49BA065733F004E6F0059657300BB446973616 26C65205370656563683F004E6F0059
%4A64549BC0657300AA52656475636520546578743F004E6F0059657300000007B00000037
%4A6A749BE000000038000000390000003A000400020006000200060002000600004C455645
%4A69A49C004C20000000FE00FC00FD00F900FB00F300F700E700EF00CF00DF009F00BF003F
%4A6CD49C20007F007E131314141313141405051812050518120101171701011010020203 24
%4A64E49C4002022211373735353737353538382739383827393434 3A3A34343B3B20203C3D
%4A60C49C6020203E3606060404060604041616092316160923151508081515252507 07292A
%4A6B549C8007072B2E1F1F1E1E1F1F1E1E0C0C3F0F0C0C3F0F28281D1D28284040414 12C30
%4A6C449CA0414133191313141413131414050518120501181201011717010110100202 0324
%4A65649CC0020222113737353537373535383827393838273934343A3A34343B3B20203C3D
%4A62949CE020203E3606060404060604041616092316160923 0A0A42420A0A0D0D43432D32
%4A69849D004343311A1F1F1E1E1F1F1E1E0C0C3F0F0C0C3F0F2121444421212626 0B0B2F1B
%4A61A49D200B0B1C0E051400009D2C0000434C454152494E4720535441545300000B100000
%4A62F49D409D48020000009D24544F2041424F52540000040C00009D5E020000009D3C5741
%4A63849D605252494F5220425554544F4E530009080000 9D7A020000009D52505245535320
```

```
%4A63E49DB0424F5448000054524541535552452052 4F4F4D00594F552048415645202020
%4A66149DA05345434F4E445300544F20434F4C4C454354205452454153555245530000594F
%4A65849DC055204D555354204558495420544F000052454345495645204 24F4E555320504F
%4A66349DE0494E5453000000090543C009056BC0090593C00905BBC030002010A0BA8A2B4A3
%4A6DA49E00AC9CB17BA57AA03B84008800BC00900004B005A005DC0618BABBBCBDBEBFC0C1
%4A60F49E20C2C30000C4C5C6C7C8C9CACBCCCD0000CECFD0D1D2D3D4D5D6D70000A8A9AA20
%4A69849E4020A4A5A6A700ABACADAE0000AFB0B1B2B300B4B5B6B70000B8B9000020505245
%4A6E849E60535320535441525420002020414444202020434F494E2000202047414444202020
%4A65749EB0434F494E530020494E5345525420434F494E2000202047414D45204F56455220
%4A66149EA020004F4E204C4556454C3A00211B00009EB40000434F494E204D494E2E002201
%4A64049EC000009EC6000054494D453A00211900009ED40000312043 4F494E203D00001E19
%4A62749EE000009EE6000046524545205 04C4159203D001E1A00009EFA0000202020202048
%4A63149F0045414C5448001E1D00009F0E000041544152492047414D455300211C00009F26
%4A6FB49F20020000009F06403139383500 1F0200009E3000001F0100009E24020000009F2C
%4A60949F401F0000009E18020000009F342106000009E3C00002305000 09E46020000009F4C
%4A6FE49F60210B00009E3C0000230A00009E4C020000009F60211000009E3C0000230F0000
%4A62449F809E52020000009F74211500009E3C000024140000 9E58020000009F8800009F54
%4A63249FA000009F6800009F7C00009F90040900009FB400004C4556454C3A000020202020
%4A6B149FC0202020202020202020202020202020202020202020505245535320535441525420 20
%4A64349FE0202020002057495448494E2032302053454 34F4E4453200020544F20434F4E54
%4A6094A000494E55452047414D4520200020202041542054484953204C4556454C20202000
%4A60B4A0209D289D249D1C9D349D209D289D2C9D1C9D189D389D289D249D309D189D209D28
%4A6814A0409D5A9D609D3C9D689D6E9D429D4C9D529D48020002000200028002800280020 0
%4A6284A060020000000011001900110011001900110011001900 99D989D9E9D7C9DA49DAC
%4A6DC4A0B09D8C9DB29D869D9400000100000000000100000000001000000000A000A000A
%4A63B4A0A0000B000B000B0009000A0009001F003F003F007F007F00FF00FF09240924092D
%4A6CE4A0C0092D09360936093F093F094B094B095109510 95A095A0EFC0EFC0FFC10FC1C5C
%4A6F84A0E01C5C1C601C640000010001800100000FF00FEB0FF0000000180020001800000
%4A6044A100FEB0FE00FE800000020002800200000FE00FD80FE0000000200028002000000
%4A6034A120FE00FD80FE0000000100018001000000FF00FE80FF0000000180020001800000
%4A6194A140FE80FE00FE800000020002800200000FE00FD80FE0000000280038002800000
%4A66B4A160FD80FC80FD800000028003800280000 0FD80FC80FD800180010000 00FF00FE80
%4A6124A180FF0000000100020001800000FE80FE00FE800000018002800200000FE00FD80
%4A6054A1A0FE0000000200028002000000FE00FD80FE0000000200018001000000FF00FE80
%4A6164A1C0FF0000000100020001800000FE80FE00FE800000018002800200000FE00FD80
%4A6344A1E0FE0000000200038002800000FD80FC80FD800000028003800280000 0FD80FC80
%4A6794A200FD800000028000 0F0001000100000001000100010001002000200020002000 64
%4A6524A220007D009600AF00C800E100FA012C015E019001C201F402260258028A02BC02EE
%4A6554A240032003520384 03B603E8044C04B00514057805DC064006A40708076C07D01DCF
%4A6924A2601DD81DE11DEA1DF31E001E001DF31DEA1DE11DDB1DCF0000004700000046 0000
%4A6B34A280004500000044000000DA0000009800000D1000000D8000000D5000000DC0000
%4A6B94A2A0A2860000A28E0000A2920000A2960002000100010002000000 1A0000001B0000
%4A6824A2C0001C0000001D0000001E0000001F0000002000000021000000090000000A0000
%4A6744A2E0000B0000000C0000002F0000003100000033000000350000003000000032 0000
%4A69A4A300003400000036000005D0000005E0000005F0000005D0000006000000 06E0000
%4A6BE4A320006100000062000000630000006600000067000000 6B0000006D0000006C0000
%4A6854A340006100000068000000690000006400000061000000680000006900000064 0000
%4A67D4A360006100000062000000 6A0000006400000061000000620000006A000000640000
%4A6624A380A33E0000A34E0000A35E0000A36EFFFF00010000000000010001FFFFFFFF0000
%4A66A4A3A00000FFE00020FFE000200020FFE003E80FA007D0177003E81F4003E807D00002
%4A6CD4A3C000050003000700020009000200030000 1C8800001DB400001DB700001DBA0000
%4A61C4A3E01DBD00001DC000001DC300001DC600001DC900001DCC0008000700 0A00090010
%4A6974A400000E00140012001800150 01E001B00040004000500040006000500070006000 8
%4A68A4A420007000A0009000400040004000400030003000300030007000600090008000E
%4A6B44A440000C00120010001500120 01B0018000400030004000400050005000600060007
%4A66A4A460000600090008000300030003000300020002000200020000027000000280000
%4A6A44A480002900000002A0000009400000095000000960000009700000006000000C70000
%4A6E04A4A000C8000000C9000000CA000000CB000000CC000000CE000000CF000000D00000
%4A6AA4A4C0007E0000007F0000008100000083000000840000008500000086000000A80000
%4A6CC4A4E000A9000000AA0000008900000008A0000008B0000008C0000008D0000008A0000
```

```
%4A6CD4A50000BF000000900000009100000004000600080000A0000A4B60000A4960000A4BE
%4A6E34A5200000A4E6040A0A090000002B0000002C0000002D0000002E000000010000FFFF
%4A66C4A5400001000 1FFFFFFFF000000010000FFFFFFE0000000200000FFE000200020FFE0
%4A6834A560FFE0000000200000000000020004000600010003000500070000000200040006
%4A6C34A580020005000600020002000000FE00FF0005000400000000000FE00FF0000000400
%4A6484A5A0050003000200000000000000020003000100000000000000000000030002000200
%4A6BC4A5C000110012001300140015001600170018001900 1A001B001C001D001E001F0020
%4A6AA4A5E000210012002200140023001600240018002500 1A0026001C0027001E00280020
%4A6BB4A6000011001200290014001500160020018001900 1A002B001C001D001E002C0020
%4A6D04A620002D001200290014002E0016002A0018002F001A002B001C0030001E002C0020
%4A6AC4A6400011001200310032001500160033003400190 01A00350036001D001E00370038
%4A6C04A6600021001200390032002300160030A00340025001A003B00360027001E003C0038
%4A6DD4A6800011001200290030D00150016002A003E0019001A002B003F001D001E002C0040
%4A6F24A6A0002D001200290030D002E0016002A003E002F001A002B003F0030001E002C0040
%4A6654A6C001C101C201C301C401C501C501C601C601C701C801C601C601C901CA01C901CA
%4A68B4A6E001C501CB01C601CC01CD01CE01C901CA01C501C501CF01D001C901C801C901D0
%4A63B4A70001C701CA01CF01CA01D101C501C9000801C501C5000800080 1C501D2000801CA
%4A6074A72001C9000801C9000800080008000800080008000801CA000801CA01C9000801D301C6
%4A63B4A74000080008 01C601C6000801CA01C601D401D101D201D301D401D501D601D701DB
%4A66E4A76001D101C501C901D001C501D201D901CA01C901C801D301C601DA01CA01C601DB
%4A6EB4A78000080008000801D00008000801CF0008000801CB0008000801DA00080008000B
%4A69C4A7A001C901C801DC01D001C901CA01DC01CA01CD01CE01DC01CA01C501C501DD01C6
%4A65B4A7C001D101C501DC000801DA000801C601C6000801CA01DE01CA000801DF01C601C6
%4A6564A7E001C9000801C901D001C9000801E0000801C701CA01DD01DB01D101C501DC01D0
%4A6494A80001C701C801CF01D0000801C801CF01D001C7000801CF01D001C701C8000801D0
%4A61F4A82001C701C801CF0008000800080 1CF01D001C701C80008000800080 1C8000801D0
%4A61F4A84001C7000801CF0008000801C801CF000801C70008000801D001C101C201E101C4
%4A65D4A86001E201E301E401D80008000801DD01C601D101D201E501D401C501CB01DD01CC
%4A66C4A880000801CA01DD01D401C901C801E501C601C9000801E501C601C701C801DD01C6
%4A6654A8A0000801DF01DD01C601DA000801DD01C601C701CA000801CA01C9000801DC01D0
%4A64E4A8C001C501C5000801D001C901C801C9000801C501C501CF000801C901C801DC0008
%4A6B84A8E001E601E701E801E901EA01EA01EB01EC01ED01EE01EB01EC01EF01F001F101F2
%4A6A94A90001EA01F301F401F501F601F701F101F801EA01EA01F901FA01FB01EE01FC01FA
%4A60E4A92001ED01FD01FE01FF0200020101F10202020102010202020201EA0203020401FF
%4A6F54A94001EF020501F10202020502050202020202020201FD020401FF01FB020202060207
%4A6EC4A960020202020202080207020201FD0208020902 0A020B02060209020C020D020E020F
%4A6494A980020A01EA01FC01FA01EA021001F901FF01FB0211020602070212 01FD02080209
%4A6984A9A0020502050202021302050205021402020205021502020202020216021702020202
%4A6584A9C001FB01EE0218021901EF021A021B021C021D021E021F01FB01EA01EA02200207
%4A6E54A9E002000201021F0202021202020208020702020 1FD01F901FF0202022102080207
%4A61B4AA0001FB020201FC021901EF0205021F0202021201FD02200209020A01EA02180219
%4A6064AA20022201EE01F90219020201EE01F9021902220202 01F9021902230215020202 24
%4A6BD4AA40022302150214020202250225 01F9021902260227020202020205022802020224
%4A6DF4AA60022602050214020202290227021402020226020502020224 01E601E7022A01E9
%4A6104AA80022B020D022C020F0202020202200207020A022D022E022F01EA01F3023001F5
%4A6314AAA0020202310220022F01FB01EE0232020701FB0202022E020701ED01EE022001EC
%4A6F84AAC0020202210220020702120202022002 0701ED01FD020401FF01FB020202180219
%4A6DF4AAE0023302330202022401EF021501F10202020102010214020201EF0234021F0202
%4A6024AB0002350236023702380239023A023B023C023D023E023F023F02400241024202 41
%4A60A4AB20024302440245024602470248024902 4A0243024B024C024D024E024F02500251
%4A6224AB40025202530 24C02540255025602570258025902 56025A0258025B025C025D025E
%4A6164AB60025702580257025802 5A025F025A02580260026102 5A02610262025F02630264
%4A64D4AB80025A02580265026602670268023F0269026A026B026C026D026E026F01D70270
%4A6134ABA0026A02710250025102430272027302740275024F026C02760277027802450279
%4A66B4ABC00267026702 7A027B025A025F027C027D0260027E025A025F027F025F025A025F
%4A6214ABE00280024F02810251025702820283028202840285028602870 23A023A02880289
%4A6454AC00028A02560283028B028C0267028D028D025A0282028E028F02900291029202 76
%4A6414AC20029302940295024D02570258029 6025F02970298029902 9A029B0271029C0251
%4A64C4AC40029D024F024C02510267029E029F02A002A10267029F02A002A1029E02A202A3
%4A6684AC6002A1029E029F02A402670267029F02A502A602A702A802A90290024F02AA02AB
```

```
%4A6614AC8002AC0267027C02A40267029E029F02A402AD025802AE02AF02B002B402B002B1
%4A65A4ACA002B202B301E402700267026702880289 02B402B502B602B702B802B902BA02BB
%4A66A4ACC0026702BC02BD02BE02BF024F02B602C002C1025802C202C3025202C402C502C6
%4A6634ACE0026702C702C80276027F025F02C902CA02AD0253025A02820242025802 9C024D
%4A6504AD00023A027102CB02CC02C1027E02CD02580243025602 4C02CE024202CF02830258
%4A67E4AD2002D002D102D202D302D402D402D502D602D702D802D502D602D902DA02DB02DC
%4A69A4AD4002DD02DE02DF02E002E102E202DB02DC02D402D402E302E402D902E502DB02E4
%4A6B94AD6002E602DA02E302DC02E702E802DB02E902D402D402EA02E902EB02EC02EA02DC
%4A6DE4AD8002D902ED02DB02E902EE02ED02EA02E902EE02DA02EA02DC02D902ED02EF02F0
%4A6BB4ADA002EE02ED02D502D602EE02DA02F102F202F302EC02EF02F402F502F602F702F8
%4A6B84ADC002E702E802DB02E402EB02EC02E302DC02D902F902EF02F002FA02DA02F102F2
%4A6E04ADE002EE02ED02EA02E402EE02ED02E302E902EE02D802EA02E902FA02ED02EA02E9
%4A6A74AE0002D902E502FB02E402D902DA02FB02DC02E102E202FB02DC02D402D402FC02D6
%4A6B54AE2002E702E802FB02E902D702ED02D502D602EE02DA02E302DC02EE02D802D502D6
%4A6BF4AE4002D902ED02DB02E402D902ED02FB02E902D702DA02FC02F202E702E802FB02E4
%4A69B4AE6002D702D802E302E402EE02D802E302E402D702ED02E302E402D702D802EA02E4
%4A6B64AE8002D702D802E302E902EE02ED02E302E402D702D802EA02E902EE02D802EA02E4
%4A6AA4AEA002D702ED02E302E902EE02D802E302E902D702ED02EA02E402D002D102FD02D3
%4A6D94AEC002F502F602FE02F802EE02ED02FC02D602F302EC02FF02F402DD02DE02FC02E0
%4A6934AEE002EE02DA02FC02F202D902F9030002F002D902ED030002F002D702D802FC02D6
%4A6B44AF0002EE02D802FC02D602D702ED02FC02D6030102DA02EA02DC02D902ED02FB02E4
%4A6524AF2002D402D402EA02E402D902E502DB030202D4030302E3030202D902E502FB0302
%4A6EF4AF4003040305030603070308030903 0A030B030C030D030A030B030E030F03100311
%4A6D44AF6003080312030A0313031403150310031103160317031803190 30E031A03100319
%4A6E44AF8003 1B030F0318031103170310031D031E031F0320032103220323032003 00311
%4A6ED4AFA0030E0324031003250326032703200325032803 0F0320031103290 32A032B030B
%4A6124AFC0032C032A030A030B032D032E030A032F031C0323032 0330032F0331032 0333 0334
%4A6064AFE0031C0317031003190322032303180311032903 0D032B030B0335032E030A032F
%4A6CB4B000032603360320033703260327031803250326033803200325033903270320 0325
%4A6F54B020030E031A033A0319030E030F033A0311031403150 33A0311030803 09033B030B
%4A6084B040031C0317033A031D030C032A030A030B032B030F0318031103 2C030D030A030B
%4A60D4B060030E0336031003370 30E0324033A0325033C032E033B032F031C0317033A0319
%4A6054B0800339033D0318033703 26033D0318033703390336031803370339033D03200337
%4A6EC4B0A0033903380318032503260336031803370339033803200325032 6033D03200337
%4A6E94B0C0033903270318032503260338031803250339033603200337030403 05033E0307
%4A6E74B0E0033103320 33F0334032C032A033B030B0340032303410342030803 12033B0313
%4A60C4B100032D032E033B032F0343034403450346034303 2A0345034 6030C030D033B030B
%4A6084B120032C030D033B030B030C032A033B030B031B030F0320031 1030E0336033A0337
%4A6E84B1400316031703200319030E0347031003250316031703 18031D030E0348033A0325
%4A61A4B1600349034A034B034C034D034E034F035003510352034F035003530354035 50356
%4A6294B1800357035B0359035A035B035C0355035D0357035E035F036003530361035 50362
%4A6284B1A0036303540 35F0356036403650355036603670368036 9036A036B0354036 90356
%4A62C4B1C0035303 6C0355036A036D036E036F0370037103540369035603720373037 40375
%4A6564B1E0037603770378037 9037A037B034F037C037D037E037F0380038103820383038 4
%4A63A4B2000364038503550362038 6038 7035F0388037203890374037503 8A037B034F037C
%4A6894B220036D036E036F0362036D036E035F038B036D038C036F038B038D036E036F038B
%4A6404B2400353036103 8E0362035303 54038E0356035B035C038E035D034D034E038F0350
%4A6364B2600390039103 8E0366039203770378037 9036D0354035F0356037603520378 0379
%4A6444B2800353039303 55036203530 36C038E036A038A037B038F037C0364036503 8E0362
%4A6104B2A0035103520 35F0360039403520 35F0360035103 6E035F0360035103520 36F0360
%4A61A4B2C0035103520 35F0370039503 71035F0360035103520 36F0370039403520 36F0396
%4A6414B2E0035103 6E035F0370039503520 35F0370035103 6E036F0360039703 8903980399
%4A6574B3000381038203980384037603770 38F0379037D037E039A039B0357035 8038F035A
%4A6534B320037A037B038F037C0372035203 9A0375037 2036E039A0375039C0352038F0379
%4A64C4B3400395035203 8F0379039D0377038F0379039D0354036903560353039 3038E0362
%4A62D4B360034D034E036F0360035303520355036A034D034E035F0370035303 52038E0370
%4A6514B380039E039F00000000039E039F03A003A1039E039F03A203A303A403A503A603A7
%4A68F4B3A003AB03A903A903A903A903A903A903A903A903A903A903A903A903A903A903A9
%4A6984B3C003A903A903A903A903A903A903A903A903A903A903A903A903A903AA03AB03AC
%4A6054B3E003AD03AE03AF03B003B103A903A903A903B203B3000000000000000000000000
```

```
%4A6604B400000003B403B503B600000000000000000000000000000000000000000000
%4A6ED4B420000000000000000000000000003B703B803B903BA03BB03BC03BD03BE00000000
%4A6C24B440000003BF03B300000000000000000000003C003C103C203C303C40000000003C5
%4A63C4B46003C603C703C803C90000000003CA000003CB03CC03CD03CE03CF0000000003D0
%4A6E44B48003D103D203D303D400000000000003D503D603D703D803B3000000000000000
%4A6814B4A003D903DA03DB03DC03DD03DE03DF000003E003E103E203E303E403E5000003E6
%4A6934B4C003E703E803E903EA03EB03EC000003ED03EE03EF03F003F103F203F3000003F4
%4A67E4B4E003F503F603F703F803B300000000000003F903FA03FB03FC03FD03FE03FF0400
%4A6E14B50004010402040304040405040604070408040904 0A040B040C040D040E040F0410
%4A6D74B52004110412041304140415041604170418041904 1A041B041C041D03B300000000
%4A6EF4B5400000041E041F0420042104220423042404250426042704280429042A042B042C
%4A6134B560042D042E042F0430043104320433043404350436043704380439043A043B043C
%4A6254B580043D043E043F0440044104420443044404450446044704480449044A044B044C
%4A6374B5A0044D044E044F0450045104520453045404550456045704580459045A045B045C
%4A6494B5C0045D045E045F0460046104620463046404650466046704680469046A046B046C
%4A65B4B5E0046D046E046F0470047104720473047404750476047704780479047A047B047C
%4A6194B600000000000000047D047E047F048004810482048304840485048604870488048 9
%4A6704B620048A048B048C048D048D048E048F0490049104920493049404950496049704 98
%4A6094B6400499049A049B049C049D049E049F000000000000000000000000004A004A104A2
%4A6754B660000000000004A304A404A504A604A704A804A904AA04AB04AC04AD04AD04AE04AF
%4A6994B68004B004B104B204B304B404B504B604B704B804B904BA04BB04BC04BD04BE04BF
%4A6004B6A004C000000000000000000000000004C104C204C304C404C504C604C704C804C9
%4A6AF4B6C004CA04CB04CC04CD04CE04CF04D004D104D104D204D304D404D504D604D704D8
%4A6C84B6E004D904DA04DB04DC04DD04DE04DF04E004E104E204E304E404E504E604E704E8
%4A6CB4B70004E904EA04EB04EC04ED04EE04EF04F004F104F204F304F404F504F604F704F8
%4A66A4B72004D504D504F904FA04FB04FC04FD000B000B04FE04FF0500050105020503050 4
%4A6FB4B74005050506050705080509050A050B050C050D050E050F0510051105120513051 4
%4A6204B76005150516051705180519051A051B051C051C051D051E051F046C052005210522
%4A61D4B78005230524052505260527052805290 52A052B052C052D052E052F053005310532
%4A62F4B7A005330534053505360537053805390 53A053B053C053D053E053F054005410542
%4A6424B7C005430544054505460490547054805490 54A054B054C054D054E054F05500551
%4A6524B7E005520553055405550556055705580559055A055B055C055D055E055F05600561
%4A6534B800056205630564056500 0B056605670568056905 6A056B056C056D056E056F0570
%4A6664B820057105720573057405750576057705780579057A057B057C057D057E057F0580
%4A6784B840058105820583058405850586058705880589 05 8A058B058C058D058E058F0590
%4A68B4B860059105920593059405950596049005970598059905 9A059B059C059D059E059F
%4A69B4B88005A005A105A205A305A405A505A605A705A805A905AA05AB05AC05AD05AE05AF
%4A6994B8A005B005B105B205B305B4000B05B505B605B705B805B905BA05BB05BC05BD05BE
%4A6AA4B8C005BF000B05C005C105C205C305C405C505C605C705C805C905CA05CB05CC05CD
%4A6BB4B8E005CE05CF05D005D105D205D305D405D505D605D705D805D905DA05DB000B05DC
%4A6BD4B90005DD05DE05DF05E005E105E205E305E405E505E6000B05E705E805E905EA05EB
%4A6CE4B92005EC000B05ED05EE05EF05F005F105F205F305F405F505F605F705F805F905FA
%4A6494B94005FB05FC05FD05FE05FF06000601000B06020603060406050606070608 0609
%4A6144B960060A060B060C060D060E060F06100611061206130614061506160617061806 19
%4A6264B980061A061B061C061D061E061F06200621062206230624062506260627062806 29
%4A6314B9A0000B062A062B062C062D062E062F06300631063206330634063506360637063 8
%4A64D4B9C00638063906 3A063B063C063D063D063E063F06400641064206430644064506 46
%4A69E4B9E00647064B0649064A064B064C064D064E064E064E064E064E064E064E064E064E
%4A6544BA00064F06500651065206530654065506560657065806 59065A065B065C065D065E
%4A6664BA20065F06600661066206630664066506660667066806 69066A066B066C066D066E
%4A66E4BA40066F06700671067206730674067506760677067806 79067A067B067C067D0656
%4A67A4BA60067E067F06800681068206830684068506860687068806 60068906 8A068B068C
%4A69A4BA8006 8D068E068F06900691069206930694069506960697069806 99069A069B069C
%4A6AC4BAA0069D069E069F06A006A106A206A306A406A506A606A706AB06A906AA06AB06AC
%4A6BE4BAC006AD06AE06AF06B006B106B206B306B406B506B606B706B806B906BA06BB06BC
%4A6D04BAE006BD06BE06BF06C006C106C206C306C406C506C606C706C806C906CA06CB06CC
%4A6D34BB0006CD06CE06CF06D006D106D206D306D406D506D606D706D806D906DA06DB06DC
%4A6E24BB2006DD06DE06DF06E006E106E206E306E406E506E606E706E806E906E906EA06EB
%4A6F04BB4006E906EC06ED06EE06EF06F006CA06F106F206F306F406F506F606F706F806F9
%4A6704BB6006FA06FB06FC06FD06FE06FF0700070107020703070407050706070707080709
```

```
%4A6464BB80070A070B070C070D070E070F06E9071007110712071307140 6EE071507160717
%4A6384BBA0071807190 71A071B071C071D071E071F072007210722072307240725072607 27
%4A6554BBC007280729072A072B072C072D072E072F073007310732073307340 6E807350736
%4A6794BBE007370738073907 3A06E906EE073B073C073D073E073F074007410742074307 30744
%4A65C4BC0007450746074707 4B0749074A074B074C074D074E074F075007510752075307 30754
%4A6BA4BC2007550756075707 58075907 5A06E806E9075B075C075D06E906E906E906E906EE075E
%4A6764BC40075F073D076007610762076307640765076607670768076907 6A076B076C076D
%4A68B4BC60076E076F077007710772077307740775077607770778077907 7A077B077C077D
%4A6A24BC80077E077F078007B106E906E906EE07820783073D07840761078507860787
%4A6A94BCA0078807890 78A078B078C078D078E078F079007910792079307940795079607 97
%4A6C04BCC007980799079A079B079C079D079E079F07A007A107A207A307A407A507A606E9
%4A6D64BCE006EE07A707A8073D07A907AA07AB07AC07AD07AE07AF07B007B107B207B307B4
%4A6CD4BD0007B507B607B707B807B907BA07BB07BC07BD07BE07BF07C007C107C207C307C4
%4A6CB4BD2007C507C607C707C707C707C707C807C907C707CA07CB07CC07CD07CE00001F40
%4A6E04BD404841 4C0000001DB0454420000001C2044205000000001A9044554D0000001900
%4A6CA4BD60454420000000177042462000000015E0504D4300000014504420480000001 2C0
%4A6E54BD80444654000000113047445300000001F4045444C0000001DB04541520000001C20
%4A60A4BDA04B454E0000001A904D562000000019004341 4C00000017704D444E00000015E0
%4A6F14BDC0414D410000001450 5A4F4E00000012C0504354000000113052455A0000001F40
%4A6F24BDE0422046000000 1DB044414E0000001C2042414600000001A9057495A0000001900
%4A6F54BE0045444C0000001770424F4200000015E057494C00000014504D4541000000012C0
%4A6C84BE205357430000001130434144000000 1F404544200000001DB0424620000001C20
%4A6FE4BE404C56520000001A90454C4600000019005 24A4600000017704745 4C00000015E0
%4A6F44BE6053474D0000001450534D4F00000012C0414A4D0000001130434A2000060E0000
%4A6354BE80BE84000053434F52452050455220434F494E000005010000BE9C000057415252
%4A6384BEA0494F525300001C010000BEAE000056414C4B59524945530006110000BEC00000
%4A6534BEC057495A41524453001D110000BED00000454C56455300202045 6E74657220796F
%4A63B4BEE0757200002020206 96E697469616C733A20001D28041D41214224040F41220423
%4A62A4BF0041 0F0E412403412341 0E0C4422410346 0D0C4605450D4462062241094321410C
%4A6354BF2041E46403230A2341064641E4640241230B2241032346E56203C123C209A44323
%4A66F4BF404641E14261216221E1C609A624464427C40AA525464328E1C30EB52245432911
%4A62E4BF6024822204242 2A10B1244106412C10B1244106412D0FB12381082E0EB1238108
%4A69F4BF80422D0DB12381080143 0A25161F0A1F0A1F0A1F0A1F0A1F0A1F0A1F0A1F0A1F0A
%4A6514BFA000040002000200010001000100010001000100010001000100010001000100010001
%4A6BD4BFC000030002000200010001000100010001020005000600030002 00FF80FE00FF00
%4A6FF4BFE007000300018 0FF80FF00FD8001800380000800080008000800080007000100 00
%4A6584C000000800050003000400080006000200080000000000000000000000700010000
%4A6BC4C020000000050003000400000006000200000000C0BC0000C0CE0000C0D20000C0E4
%4A6934C0400003000300030003000004C0000004E0000004D0000004F008000800080010 0
%4A6344C060010001000100010001000010003000100000000000000000010000000000000000
%4A66F4C08000000000000000000060007000600080008000800080008000A0000000020002 0002
%4A6C24C0A00000FFFEFFFEFFFE000000020002 0000FFFEFFFEFFFE00000002000001F30BB3
%4A6C04C0C013F30BE313F37FD379D30B7300F301F300F301F30B7313F316E308F37FD379D3
%4A6C54C0E00BB300F31EF3207340E338E340E310B3FF0008B33CF318B3FF013CF319F12CF3
%4A6C74C10020B326F3FF0224F350F13CF308B322F308F1FF032AF312F11EF338B3FF0428B3
%4A6DB4C12060F308B3FF053CF3FE00FE0201F33CF348D310D301F21EF348D3FF0610D35AF3
%4A67E4C14010D300F32020202020202020200020202020202020202020000020202020202020
%4A6654C16020202020202020000020202020202020202020202020200020202020202020202020
%4A6674C18020202020200000202020202020202020202020202020200020202020202020202020
%4A6894C1A0202020202020200000202020202020202020202020202020202020000050C0000C168
%4A6134C1C00000050B0000C1CE02000000C1BA204F50454E20444F4F5253202000050A0000
%4A60B4C1E0C1EB02000000C1C220555345204B45595320544F200005090000C16802000000
%4A6014C200C1DC0A100000C14E00000A0F0000C21602000000C202202047484F5354532020
%4A6FB4C22000000A0E0000C22E02000000C20A202053484F4F5420202000000A0D0000C14E
%4A6E44C24002000000C22206100000C1680000060F0000C25A02000000C2462047454E4552
%4A6314C26041544F5253202000060E0000C27402000000C24E2053484F4F542047484F5354
%4A6D24C2802000060D0000C16802000000C268020C0000C1A80000020B0000C2A202000000
%4A6334C2A0C28E2054414B45204D4F5245205348 4F5453200002 0A0000C2C002000000C296
%4A60C4C2C0202020534F4D452047484F5354532020200002090000C1A802000000C2B40A10
%4A6094C2E00000C14400000A0F0000C2F202000000C2DE204752554E54532020000A0E0000
```

```
%4A60C4C300C30802000000C2E62020464947485420200000A0D0000C14402000000C2FC0A0A
%4A6F94C3200000C17600000A090000C33202000000C31E2020204A4F494E20494E20202020
%4A6FC4C34000000A080000C34E02000000C326204841564520465249454E4453200000A07
%4A6F24C3600000C17602000000C3420A0A0000C15A00000A090000C37E02000000C36A2046
%4A6284C380494E4420455849542020000000A080000C39802000000C37220594F555220474F
%4A6FC4C3A0414C3A2000000A070000C15A02000000C38C0000C1F60000C23A0000C2820000
%4A6B54C3C0C2D20000C3120000C35E0000C3A6020101010101010202020200000100000
%4A68F4C3E0000001000000080 70A0906050807030303030202020002000200020001000 10003
%4A6404C4000003000200020002000000000000200030002000000000004000300000010000
%4A68B4C420007200000009C0000006100000068000000690000006400000061000000680000
%4A6744C4400069000000660000006100000068000000630000006400000011000000120000
%4A6714C46000130000001400000000D0000000E0000000F0000001000000016000000170000
%4A69F4C4B00018000000190000003B0000003C0000003D0000003E0000009900000093 0000
%4A6A44C4A00092000000 9B000000C50000007A000000800000008200000088000000870000
%4A6BD4C4C0C4960000C4A20000C4AA0000C4B6030203021CD71CDB1CDF1CE31CE71CEB1CEF
%4A6CC4C4E01CF31CF71CFB1D001D041D081D0C1D101D141C481C481C481C481C4C1C4C1C4C
%4A68C4C5001C4C1C501C501C501C541C541C541C581C581C581C581C541C541C541C501C50
%4A6BB4C5201C501C4C1C4C1C4C1C4C1C481C481C481C481C48000080001E099D3C9D7C1E0D
%4A6514C54080018001800108000800080009E109E109E1183F183F183F1B571B571B5713A2
%4A6EF4C56013A213A21A7509AB09B409BD09C609CF09D809C609CF09D809C609CF09D809C6
%4A6464C58009CF09D8098709A20963096C88FC89FC170091FC92FC93FC94FC95FC96FC8AFC
%4A6694C5A08000800080008000800180010000000000000000000000200000000000000200
%4A6554C5C0020002000200020002000200020002000200020002000200020002000200020002000200
%4A6574C5E0020002000200020002000200020002000200020002000200020002000200020002000200
%4A6304C6000200020000000000020000000000000000000000000000000000000000000000000
%4A66D4C62000000000000000900001100000012121212121212121211111112121212121212
%4A6B24C64012121212121212121212121212121212120909120909090909090900000000000
%4A6B64C66000000000000000000000203040203040607080 90A0B090A0B0005050505050505
%4A6904C68005050505050505050101010101010101010101010101000000000000E090E12
%4A6F34C6A00E1B0E120E990EA20EAB0EA20E630E6C0E750E6C0E3F0E480E510E480DEA0DF3
%4A6044C6C00E000DF30E240E2D0E360E2D0E7E0E870E900E870EB40EBD0EC60EBD1C9F1CA3
%4A64B4C6E01CA71CAB1CAF1CB31CB71CBB1CBF1CC31CC71CCB1CCF1CD31C971C9B17FC17FC
%4A6214C70018FC18FC19FC19FC1AFC1AFC1BC31BC31C681C681C6C1C6C1C701C701CD71CDB
%4A6F14C7201CDF1CE31CE71CEB1CEF1CF31CF71CFB1D001D041D081D0C1D101D141C741C74
%4A6EB4C7401C781C781C7C1C7C1C801C801C841C841C8B1C8B1C8F1C8F1C931C930C3F1087
%4A69D4C760109010991 0A210AB10B410BD114817AB17B417BD17C617CF17D817E113A217EA
%4A6884C78017F318001809181218 1B1824154817 6C1775177E1787179017 9917A20BD80BF3
%4A6754C7A00C120C2D0C3F0B870BA20BBD11B411CF1112112D11481163117E119914121 42D
%4A6874C7C0144814 6313A213BD13D813F315D815F31612162D1648166315A215BD0C870C90
%4A6ED4C7E00C900C900C990CA20CA20CA20CAB0CB40CB40CB410870CBD0CBD0CBD0C3F0C48
%4A6CE4C8000C480C4B0C510C5A0C5A0C5A0C630C6C0C6C0C6C0C750C7E0C7E0C7E12C61348
%4A6024C8201348134812EA1351135113511 1EA131213121312121 31B131B131B12361324
%4A6404C840132413241 25A132D132D132D127E1336133613 3612A2133F133F133F1412137E
%4A65C4C860137E137E142D138713871387144813901390139014631399139913991 3A2135A
%4A6624C880135A135A13BD1363136313613DB136C136C136C13F3137513751375156C1524
%4A6654C8A01524152415751 52D152D152D157E1536153615361587153F153F153F15901548
%4A63F4C8C01548154815991551155115511 55A1512151215121563151B151B151B0D5A0D63
%4A6FD4C8E00D6C0D750D750D6C0D630D5A0D7E0D870D900D990D990D900D870D7E0DA20DAB
%4A6394C9000DB40DBD0DBD0DB40DAB0DA20DC60DCF0DD80DE10DE10DD80DCF0DC60CC60CCF
%4A6DC4C9200CD80CE10CE10CD80CC60CBD0CEA0CF30D000D090D090D000CF30CEA0D120D1B
%4A6AD4C9400D240D2D0D2D0D240D1B0D120D360D3F0D480D510D510D480D3F0D3612C612CF
%4A66A4C96012D812E112E112D812CF12C612EA12F313001309130913091300 12F312EA11EA11F3
%4A6024C980120012091209120911 F311EA1212121B1224122D122D1224121B12121236123F
%4A6364C9A01248125112511248123F1236125A1263126C12751275126C1263125A127E1287
%4A66C4C9C01290129912991290128 7127E12A212AB12B412BD12BD12B412AB12A214121 4C6
%4A6AE4C9E014C614CF14CF14C614C61412142D14D814D814E114E114D814D8142D144814EA
%4A6404CA0014EA14F314F314EA14EA144814631500150015091509150015001460 13A2147E
%4A67E4CA20147E148714 87147E147E13A213BD1490149014991499149014901 3BD13D814A2
%4A69D4CA4014A214AB14AB14A214A213D813F314B414B414BD14BD14B414B413F316B416BD
%4A6D94CA6016C616C616C616C616BD16B416CF16D816E116E116E116E116D816CF16EA16F3
```

```
%4A6654CA801712171217121712171216F316EA171B1724172D172D172D172D1724171B1736173F
%4A6734CAA01748174817481748173F1736175117 5A1763176317631763175A1751167E1687
%4A6BA4CAC01690169016901690168716 7E169916A216AB16AB16AB16AB16A216990BCF0BD8
%4A6B84CAE00BE10BD80BEA0BF30C000BF30C090C120C1B0C120C240C2D0C360C2D0B630B6C
%4A6DE4CB000B750B6C0B7E0B870B900B870B990BA20BAB0BA20BB40BBD0BC60BBD11B411BD
%4A6354CB2011C611BD11CF11D811E111D81112111B1124111B112D1136113F113611481151
%4A6314CB40115A1151116311 6C1175116C117E1187119011871199 11A211AB11A21412141B
%4A6494CB601424141B142D1436143F1436144814511 45A14511463146C1475146C13A213AB
%4A6834CB8013B413AB13BD13C613CF13C613D813E113EA13E113F31400140914001 5D815E1
%4A64E4CBA015EA15E115F31600160916001612161B1624161B162D1636163F163616481651
%4A6B34CBC0165A16511663166C1675166C15A215AB15B415AB15BD15C615CF15C60987099A
%4A67B4CBE01709096C0975097E0890086C0848082408000900 08D808B40890086C0B480824
%4A6544CC00080009000 8D808B40890086C0848082408000900 08D808B40890086C0B480824
%4A65C4CC20080009000BD808B40890086C0848082408000900 08D808B4089908750851082D
%4A6974CC400809090908E108BD08A2087E085A08360812091208EA08C608AB08870863083F
%4A6814CC60081B091B08F308CF0890086C0848082408000900 08D808B4089908750851082D
%4A69B4CC800809090908E108BD08A2087E085A08360812091208EA08C608AB08870863083F
%4A6BE4CCA0081B091B08F308CF08AB08870863083F081B091B08F308CF08A2087E085A0836
%4A6874CCC0081209120 8EA08C608990875085108 2D0809090908E108BD0890086C0B480824
%4A6874CCE0080009000 8D808B40A5A0A3F0A1B0A0009E10AB40A900A750A5A0A3F0A1B0A00
%4A6864CD0009E10AB40A900A750A5A0A3F0A1B0A0009E10AB40A900A750A630A480A240A09
%4A6BB4CD2009EA0ABD0A990A7E0A6C0A510A2D0A1209F30AC60AA20A870A6C0A510A2D0A12
%4A6BD4CD4009F30AC60AA20A870A630A480A240A0909EA0ABD0AAB0A7E0A5A0A3F0A1B0A00
%4A68D4CD6009E10AB40A900A750B240B120B000AEA0AD8085A0B480B360B240B120B000AEA
%4A6A24CD800AD8085A0B480B360B240B120B000AEA0AD8085A0B480B360A630A480A2D0A09
%4A6DD4CDA009EA0ABD0A900A7E0B1B0B090AF30AE10ACF0B510B3F0B2D0B1B0B090AF30AE1
%4A6C04CDC00ACF0B510B3F0B2D0A630A480A2D0A0909EA0ABD0A900A7E0B240B120B000AEA
%4A6C84CDE00AD8085A0B480B36197E195118F31899183F186C18C61924197519481 8EA1890
%4A6B24CE0018361863 18BD191B196C193F18E11887182D185A18B41912196C193F18E11887
%4A6A04CE20182D185A18B41912197E195118F31899183F186C18C61924198719 5A190018A2
%4A6A94CE40184818751 8CF192D199019631909 18AB185111 87E18D8193619901963190918AB
%4A6C14CE601851187E18D81936197E195118F31899183F186C18C61924197E195118F31899
%4A6E64CE80183F186C18C61924197E195118F31899183F186C18C6192419D819CF19BD19AB
%4A6144CEA0199919A219B419C619D819CF19BD19AB199919A219B419C619D819CF19BD19AB
%4A6F64CEC0199919A219B419C619D819CF19BD19AB199919A219B419C6197E195118F31899
%4A61A4CEE0183F186C1BC619241BCD1BAB1B8D1B6F1B511C2A1C0C1BEB1BCD1BAB1B8D1B6F
%4A6F14CF001B511C2A1C0C1BEB1BCD1BAB1B8D1B6F1B511C2A1C0C1BEB1BD31BB11B931B75
%4A6BD4CF201B571C301C121BF11BD31BB11B931B751B571C301C121BF11BD91BB71B991B7B
%4A6EF4CF401B5D1C361C181BF71BD91BB71B991B7B1B5D1C361C181BF71BD31BB11B931B75
%4A6A94CF601B571C301C121BF11BD31BB11B931B751B571C301C121BF11BD31BB11B931B75
%4A6F34CF801B571C301C121BF11BDF1BBD1B9F1B811B631C3C1C1E1C001BDF1BBD1B9F1B81
%4A6D34CFA01B631C3C1C1E1C001BE51BC71BA51B871B691C421C241C061BE51BC71BA51BB7
%4A6BF4CFC01B691C421C241C061BE51BC71BA51B871B691C421C241C061BD31BB11B931B75
%4A6664CFE01B571C301C121BF11412142D1448146313A213BD13D813F31412142D14481463
%4A6574D00013A213BD13D813F31412142D1448146313A213BD13D813F3141B14361451146C
%4A6584D02013AB13C613E11400142414 3F145A147513B413CF13EA1409142414 3F145A1475
%4A6484D04013B413CF13EA1409141B1436145114 6C13AB13C613E11400141214 2D14481463
%4A69C4D06013A213BD13D813F314CF14E114F31509148714991 4AB14BD14CF14E114F31509
%4A6844D0801487149914AB14BD14C614D814EA1500147E149014A214B414C614D814EA1500
%4A64D4D0A0147E149014A214B41412142D1448146313A213BD13D813F31412142D14481463
%4A6B14D0C013A213BD13D813F314C614D814EA1500147E149014A214B414C614D814EA1500
%4A6964D0E0147E149014A214B41AC61B1B1B001AE11A751A901AAB1B361AC61B1B1B001AE1
%4A6B14D1001A751A901AAB1B361AC61B1B1B001AE11A751A901AAB1B361ACF1B241B091AEA
%4A6D74D1201A7E1A991AB41B3F1AD81B2D1B121AF31A871AA21ABD1B481AD81B2D1B121AF3
%4A6D64D1401AB71AA21ABD1B481ACF1B241B091AEA1A7E1A991AB41B3F1AC61B1B1B001AE1
%4A6A24D1601A751A901AAB1B361AC61B1B1B001AE11A751A901AAB1B361AC61B1B1B001AE1
%4A6A44D1801A751A901AAB1B361AC61B1B1B001AE11A751A901AAB1B361AC61B1B1B001AE1
%4A6A64D1A01A751A901AAB1B361AC61B1B1B001AE11A751A901AAB1B361AC61B1B1B001AE1
%4A6A84D1C01A751A901AAB1B361AC61B1B1B001AE11A751A901AAB1B361AC61B1B1B001AE1
%4A6D64D1E01A751A901AAB1B3619D819CF19BD19AB199919A219B419C61A6C1A5A1A241A12
```

```
%4A6914D20019EA1A001A361A481A631A511A1B1A0919E119F31A2D1A3F1A6C1A5A1A241A12
%4A6C24D22019EA1A001A361A481A631A511A1B1A0919E119F31A2D1A3F19D819CF19BD19AB
%4A6BD4D240199919A219B419C6197E19511BF31899B3F186C18C61924197E19511BF31899
%4A6E14D260183F186C18C619241BDF1BBD1B9F1B811B631C3C1C1E1C001BE51BC71BA51B87
%4A6BF4D2801B691C421C241C061BE51BC71BA51B871B691C421C241C061BE51BC71BA51B87
%4A6A14D2A01B691C421C241C061BD31BB11B931B751B571C301C121BF11BD31BB11B931B75
%4A6A34D2C01B571C301C121BF11BD31BB11B931B751B571C301C121BF11BD31BB11B931B75
%4A6D14D2E01B571C301C121BF10E120EA20E6C0E480DF30E2D0EB70EBD0DF30F090F120F1B
%4A6CC4D3000F1B0F1B0F1B0F120F090F900F990FA20FA20FA20FA20F990F900F240F2D0F36
%4A6FE4D3200F360F360F360F2D0F240F5A0F630F6C0F6C0F6C0F6C0F630F5A0ECF0ED80EE1
%4A6F04D3400EE10EE10EE10ED80ECF0F3F0F480F510F510F510F510F480F3F0EEA0EF30F00
%4A6FA4D3600F000F000F000EF30EEA0F750F7E0F870F870F870F870F7E0F750FC60FC60FC6
%4A6D04D3800FCF0FCF0FD80FD80E12106C106C106C10751075107E107E0EA20FE10FE10FE1
%4A6C64D3A00FEA0FEA0FF30FF30E6C10361036103610 3F103F10481048 0E480FAB0FAB0FAB
%4A6524D3C00FB40FB40FBD0FBD0DF3101B101B101B101B1024102410 2D102D0E2D100010001000
%4A6FA4D3E01009100910121012 0EB7105110511051105A105A106310630EBD0000D5280000
%4A60D4D400D5460000D5720000D5A00000D5C80000D5EC0000D61C0000D648000000000000
%4A6434D420D55E0000D58E0000D5BE0000D5DA0000D6000000D6340000D65C0000D6D60000
%4A6204D440D6FC0000D71E0000D7480000D7800000D7B00000D7DA000000B0000000B60000
%4A6524D46000B203150000D46A000046494E4420544845204849444454E20504F54494F4E
%4A6174D4800000051700 00D48A00005354554E204F5448455220504C4159455253000006 16
%4A6294D4A00000D4AA02000000D482504C415945522053484F5453204E4F570000051900 00
%4A62C4D4C0D4C4000048555254204F5448455220504C415945525300000618 0000D4E40200
%4A6644D4E00000D4BC504C415945522053484F5453204E4F570000081B0000D4FE0000474F
%4A6254D500204F4646205343524545 4E00061A0000D51802000000D4F6504C415945525320
%4A6774D52043414E204E4F5700484156452046524954 4E4453204A4F494E20494E20414E59
%4A65F4D54054494D450000474554204 24F4E5553204D554C5449504C4945522042590043 4F
%4A6524D5604C4C454354494E4720545245415355524500 4D4F524520504C415945525320 41
%4A66D4D5804C4C4F5753204849474845520000424F4E5553204D554C5449504C4945520000
%4A6394D5A041444420 4D4F524520504C415945525320464F522047524541544552000046 49
%4A6654D5C05245504F5745520041444420434F494E5320414E5954494D4500464F52204558
%4A6574D5E0545241204845414C544800004D4147494320504F54494F4E5320574F524B0000
%4A6634D600444946464552454E544C5920464F522045414348205 04C415945520053484F4F
%4A64F4D62054494E47204D4147494320504F54494F4E5300004841532041204C4553534552
%4A6604D640204546464543540053544 14C4C494E472057494C4C204341555534500444F4F52
%4A6154D6605320544F204F50454E008C000000D678000000000000000047414D45204F5645
%4A63B4D68052205748454E204845414C5448203D203000840000000D6A00000D6BA0000D66A
%4A6774D6A04B4F4C4420464952452042555454 4F4E20544F2053484F4F540052454C454153
%4A6374D6C0452046495245204255545 44F4E20544F204D4F5645008000000D6E400000000
%4A64E4D6E00000D69246494E4420455849542054 4F204E455854204C4556454C0080000000
%4A6064D700D70A000000000000000047484F535453204D555354204245205348 4F54008000
%4A60B4D7200000D72C000000000000000534F4D4520464F4F442043414E20424520444553
%4A6234D74054524F594544000080000000D7560000D76C000000004649474854204 8414E44
%4A6704D76020544F204B414E4420425900552554E4E494E4720494E544F204752554E545300
%4A6254D78080000000D78E0000D7A000000000424557415245205448452044454D4F4E5300
%4A6304D7A0574849434820534 84F4F5420594F550080000000D7BE000000000000000534F
%4A6444D7C0524345524552532 04D415920424520494E5649534942 4C450000800000000D7EB
%4A6154D7E000000000000000000555345204D4147494320544F204B494C4C204445415448 00
%4A6CC4D80000904B1A00904B1E00904B1C00904B200001002000400004001000080002 0000
%4A6834D8200061000000620000006300000064000000A1000000A2000000A3000000A40000
%4A6BD4D84000A5000000A6000000A7202020202020202020202020202020202020202020
%4A6B24D8602000202020202020205741525249 4F523A202020202020202000202020202020
%4A6F84D8802056414C4B595249453A202020202020200020202020202020 2057495A415244
%4A6A84D8A03A202020202020202000202020202020202020454C463A202020202020202020
%4A6364D8C020000000D8620000D87A0000D8920000D8AA0000D8E60000D8F60000D9060000
%4A61D4D8E000000000000020464F4F443A202048454 14C5448200020494E43524541534544
%4A6AD4D900204259202000202020202020203130302020202020000000D92A0000D9380000
%4A6EC4D920000000000000000000020464F4F442F4452494E4B3A200020203130302048 45
%4A6FD4D940414C5448200000000D95A0000D9660000D972000000000000000020534F4D4520
%4A6214D960464F4F442000204445535 4524F594544200020425920534 84F54532020000000
```

```
%4A6044D980D9920000D9A6000000000000000000000000020494E5345525420434F494E5320
%4A6114D9A0464F5220000020202D4F52452048454144448202020000000D9CE0000
%4A6E24D9C0D9DE000000000000000000000000205341564520 4B4559532054 4F2000002020
%4A6ED4D9E04F50454E20444F4F5253202000000000DA020000DA1A000000000000000000
%4A6494DA00000020434F4C4C454354204D4147494320504F54494F4E202000204245464F52
%4A6074DA204520505245535349 4E47204D4147494320000000DA460000DA56000000000000
%4A60D4DA400000000000000205341564520504F54494F4E5320200020464F52204C41544552
%4A6DA4DA6020555345200000000DA7A0000DA900000000000000000000000000202053484F4F
%4A63C4DA8054494E47204120504F54494F4E202000204841532041204C455353455220454 6
%4A6DF4DAA0464543542000000000DABA0000DACA000000000000000000000000205452454153
%4A6F64DAC05552453A2020202020002020202031303020504F494E5453200020202504C4159
%4A6264DAE04552204C4F53455320202020484541 4C5448202000000000DADA0000DB0A0000
%4A60A4DB000000000000000000000000202053484F4F54204F522041564F49442047484F5354
%4A6D14DB205320202000000000DADA0000DB3A000000000000000000000000202053484F4F
%4A62F4DB4054204F5220464947485420475255 4E5453202020000000000DADA0000DB6A0000
%4A61B4DB600000000000000000000000202053484F4F54204F5220464947485420444 54D4F4E
%4A6DD4DB8053202020000000000DADA0000DB9A000000000000000000000000202053484F4F
%4A6414DBA054204F5220464947485420 4C4F4242455253202000000000DADA0000DBCA0000
%4A6114DBC000000000000000000000202053484F4F54204F5220464947485420534F52434552
%4A6E74DBE0455253200000000DADA0000DBFA000000000000000000000000205553452 04D
%4A6244DC00414749432054 4F204B494C4C204445415448202000000000DC2A0000DC400000
%4A6E84DC200000000000000000000202053484F545320444F204E4F5420485552542020 00
%4A6364DC40204F5448455220504C415945525320285945542920000000DC6A0000DC820000
%4A6014DC600000000000000000000204D4147494320504F54494F4E5320414646454354 20
%4A6424DC8000002045564552595448494E47204F4E205343524545 4E2000000000DCAE0000
%4A6124DCA0DCC600000000000000000000204B494C4C205448494545620544F20524543
%4A6064DCC04F5645522000202020202053544F4C454E204954454D202020202020200000000
%4A6EA4DCE0DCF20000DD0800000000000000000000000000202020544849454620455343415 0
%4A6234DD0045443A202020000020495445 4D204F4E204E455854204C4556454C2000000000
%4A6FF4DD20DD320000DD4400000000000000000000000000020534F4D452057414C4C53204D41
%4A6114DD40592000002020424520444553545 24F594544202000000000DD6A0000DD7C0000
%4A6BB4DD600000000000000000000202020545241505320 4D414B4520202020002057414C
%4A61E4DD804C5320444953415050454152200000000DDA20000DDB80000DDCE000000000000
%4A63A4DDA000002020545241 4E53504F5254455253204D4F5645202000205 94F5520544F20
%4A64C4DDC054484520434C4F53455354202000205452414E53504F5254455220564953494 2
%4A6F04DDE04C4520000000DDF80000DE0C000000000000000000000000202059 4F55204152
%4A64D4DE00452046554C4C204F462020002042 4F4D425320414E442F4F52204B4559532000
%4A6674DE200000D8D20000D9460000D97E0000D9BA0000D9EE0000DA320000DA660000DAA6
%4A6654DE400000DAF60000DB260000DB560000DB860000DBB60000DBE60000DC160000DC56
%4A6604DE600000DC9A0000DCDE0000DD1E0000DD560000DDBE0000DDE40000D91600000000
%4A6624DE8000000000000000000000000000000000000000000000DAA60000000000000000
%4A63D4DEA000000000000000000000000000000000000000000000000000000000000000
%4A65F4DEC000000000000000000000000000000202020202020202020202020202020202020
%4A6EF4DEE020202020202000002020202057415252494F52204E4F5720484153202020000000
%4A61D4DF002020205641 4C4B59524945204E4F5720484153202020000002020202057495A41
%4A6104DF205244204E4F5720484153202020200000202020202020454C46204E4F57204841
%4A6384DF40532020202020200000204C494D495445442049 4E5649534942494C495459200000
%4A6DD4DF6020202020204558545241204152 4D4F5220202020200000202020202045585 4
%4A6FD4DF80524120535045454420202020202000002020455854524120 4D4147494320504F
%4A6FF4DFA0574552202020000020202045585452412053484F5420504F5745522020200000
%4A6034DFC0202020455854524120534 84F5420535045454420202000002020455854524120
%4A6464DFE0464947485420504F5745522020200000000DEE80000DF000000DF180000DF30
%4A6474E0000000DF4B0000DF600000DF780000DF900000DFA80000DFC00000DFDB000000000
%4A6734E020000000B300000000000000B400000000000000B5000000C4000000C200000000
%4A64B4E0400000000000000000000000000000000000000000000000B700000000000000D2
%4A6514E06000000000000000D3000000D4000000000000000000000000000000000000022
%4A6184E0B000000023000000240000002553484F545320544F204B494C4C3A0000504F494E
%4A64C4E0A0545320464F523A0044414D4147452054 4F20504C4159455253204845414C5448
%4A6144E0C03A004C4547454E4400000000E0FE0000E1080000E11A0000E1300000E13E0000
%4A61A4E0E0E14E0000E15E0000E1740000E18A0000E1A00000E1B60000E1C4000000005452
```

```
%4A6794E10045415355524500006465737472756374696 26C6520464F4F44006E6F6E2D6465
%4A6984E12073747275637469626C6520464F4F44004D4147494320706F74696F6E7300696E
%4A6594E14063726561736573204 1524D4F5200696E63726561736573205350454544006 96E
%4A6594E16063726561736573204D4147494320504F57455200696E63726561736573205348
%4A6424E1804F5420504F5745520000696E63726561736573205348 4F54205350454544 0000
%4A6794E1A0696E63726561736573204649474854 20504F574552004B455920666F7220646F
%4A66F4E1C06F72730074656D706F726172792049 4E5649534942494C49545900000000E210
%4A6FF4E1E00000E21A0000E2200000E2260000E2340000E2400000E24C0000E25E0000E270
%4A6FD4E2000000E2820000E2940000E29B0000000005452454153555245000044524 94E4B00
%4A6584E220464F4F4400004D4147494320504F54494F4E530045585452412041524D4F5200
%4A62E4E2404558545241205350454544004558545241204D4147494320504F574552004558
%4A6314E2605452412053484F5420504F5745520000455854524120534 84F54205350454544
%4A64F4E280000045585452412046494748542050 4F574552004B455900494E564953494249
%4A6694E2A04C4954590000444553494 74E45522F50524F4752414D4D45523A000047414D45
%4A6554E2C02050524F4752414D4D45523A0000564944454F204752415048494353 3A00454E
%4A6864E2E047494E4545523A00544543484E4943494 14E3A00534F554E442044455349474E
%4A64F4E3003A00434142494E455420444553494 74E3A00535045434941 4C205448414E4B53
%4A6D84E32020544F3A0000021A0000E3120000002170000E30202000000E32602130000E2F4
%4A6F84E34002000000E32E02100000E2E802000000E33A020D0000E2DE02000000E3460206
%4A6E94E3600000E2CE02000000E35202030000E2BC02000000E35E02000000E2A602000000
%4A66A4E380E36A4544204C4F474700424F4220464C414E4147414E000053414D20434F4D53
%4A6484E3A0544F434B0000535553414E20472E204D4342524944450000414C414E204D5552
%4A64A4E3C0504859005749 4C4C204E4F424C4500004441564520504554544947524557 0000
%4A64F4E3E0504154204D4343415254485900005341 45204F482F435249532044524F424E59
%4A63A4E40000004 8414C2043414E4F4E004541524C205649434B45525300004B454E204841
%4A6154E4205441000044415645205448455552455200004D494B4520414C4241554748 0000
%4A6194E440414E44204D414E59204F5448455253000 41D0000E440000041C0000E4320200
%4A6E24E4600000E450041B0000E42402000000E458041B0000E41A02000000E46404150000
%4A6064E480E40C02000000E47004140000E40202000000E47C04110000E3EE02000000E488
%4A6024E4A0040E0000E3E002000000E494040B0000E3D002000000E4A0040A0000E3C40200
%4A6124E4C00000E4AC04090000E3B802000000E4B804080000E3A602000000E4C404070000
%4A61D4E4E0E39802000000E4D004040000E38A02000000E4DC04010000E38202000000E4E8
%4A6654E50000E0FFC80000E6A40000E6AC0000E6C60000E6E20000E6FA0000E7080000E714
%4A6394E5200000E71C0000E7280000E7440000E7600000E77E0000E79A0000000000E0FFF6
%4A62C4E5400000E7B60000E7BE0000E7D80000E7F2000000000000E80C0000E8180000E820
%4A61F4E5600000E82C0000E8480000E8640000E8800000E89C0000000000E000260000E8B8
%4A6524E5800000E8C00000E8DA0000E8F40000E90C0000E918 0000E9240000E92C0000E938
%4A6594E5A00000E9540000E9700000E98C0000E9A80000E9C400E000560000E9E00000E9E8
%4A6194E5C00000EA040000EA1E000000000000EA340000EA400000EA480000EA540000EA70
%4A6764E5E00000EA8C0000EAA80000EAC40000EAC600E000860000EAE20000EAEC0000EB06
%4A6604E6000000EB1A0000EB360000EB4E0000EB5A0000EB640000EB700000EB8C0000EBA8
%4A6144E6200000EBC40000EBE00000000000E000BB0000EBFC0000EC020000EC1A00000000
%4A60A4E6400000000000000EC2E0000EC300000EC360000EC420000EC5C0000EC7400000000
%4A62B4E6600000EC920000000000E000EA0000ECAA0000ECB00000ECCA0000ECD400000000
%4A6694E6800000ECEC0000ECEE0000ECF40000ECFC0000ED180000ED300000000000ED48
%4A6484E6A000000000047484F5354530000506C6179657273207368 6F747320687572742067
%4A6AA4E6C0686F73747300506C6179657273206361 6E6E6F74206669676874206768 6F7374
%4A6614E6E0730047686F73747320687572742070 6C6179657273206 16E6400202020646973
%4A6104E700617070656172000047454E455241544F5253000047484F5354530000203120 20
%4A6E94E72020322020203300007573696E67206D6167696320202020202031302020313020
%4A6214E740203130007368 6F6F74696E672067686F73742020203130202031302020313000
%4A6934E760666967687469 6E672067686F737420204E4F5420504F535349424C4500006B69
%4A63F4E7806C6C2067656E657261746F72202020313020203130202031300067657474696E
%4A6F04E7A0672068697420202020202031302020323020203330004752554E54530000506C
%4A67D4E7C0617965727320 73686F747320687572742067727 56E747300506C617965727320
%4A6984E7E063616E20666967687420677275 6E747300004772756E74732077696C6C206669
%4A6494E800676874207 06C6179657273004754E455241544F5253000047525 54E54530000
%4A6E94E82020312020203220202033000075 73696E67206D6167696320202020202031302 0
%4A6264E840203130202031300073686F6F74696E672067727 56E74202020203520202031 520
%4A6294E860202035006669676874696E672067727 56E74202020323520203235202032350 0
```

```
%4A63D4E8806B696C6C2067656E657261746F72202020313020203130202031300067657474
%4A6134E8A0696E67206869742020202020202035202020382020313000044454D4F4E530000
%4A6994E8C0506C61796572732073686F74732068757274206465 6D6F6E7300506C61796572
%4A6A84E8E0732063616E206669676874206465 6D6F6E73000044656D6F6E73206669676874
%4A6504E90020616E642073686F6F74000020202070 6C617965727300004745 4E455241544F
%4A60E4E920525300004445 4D4F4E5300002031202020322020203300007573696E67206D61
%4A6284E940676963202020202020313020203130202031300073686F6F74696E672064656D
%4A6524E9606F6E202020203520202035202020350066696768746 96E672064656D6F6E2020
%4A62D4E98020323520203235202032350 06B696C6C2067656E657261746F72202020313020
%4A6FE4E9A020313020203130006765747469 6E67206869742020202020202035202020382 0
%4A6034E9C020313000676574746 96E672073686F74202020202031302020313020203130 00
%4A6884E9E04C4F424245525300506C61796572732073686F74732068757274206C6F626265
%4A6744EA00727300000506C61796572732063616E206669676874206C6F626265727300 4C6F
%4A6654EA206262657273207368 6F6F7420706C61796572730047454E455241544F52530000
%4A6214EA404C4F424245525300203120202032202020330000757369 6E67206D6167696320
%4A6294EA6020202020202031302020313020203130007368 6F6F74696E67206C6F6262657220
%4A6314EA8020203520202035202020350066696768746 96E67206C6F626265722020323520
%4A62A4EAA020323520203235006B696C6C2067656E657261746F72202020313020203130 20
%4A6014EAC020313000000067657474696E672073686F74202020202020332020203320202 0
%4A6674EAE03300534F524345524552530053 6F726365726572732063616E206E6F74206265
%4A67C4EB002073686F740020202020776 8696C6520696E76697369626C6500506C61796572
%4A66E4EB20732063616E206669676874207 36F726365726572730053 6F726365726572732 0
%4A6654EB406669676874207 06C61796572730047454E455241544F52530000534F52434552
%4A6FD4EB604552530020312020203220202033000075 73696E67206D616769632020202020
%4A6124EB8020313020203130202031300073686F6F7420736F726365726572202020203520
%4A6174EBA020203520202035006669676874207 36F726365726572202020323520203235 20
%4A6254EBC0203235006B696C6C2067656E657261746F72202020313020203130202031300 0
%4A6184EBE067657474696E672068697420202020202020352020203820203130004445 4154
%4A66E4EC0048004F6E6C79206D616769632068757274732064656174680000446561746820
%4A6634EC206875727473207 06C61796572730020004445415448004F4E4C59204D41474943
%4A6594EC400000757369 6E67206D616769632020202020202020203F3F3F3F000073686F6F
%4A64D4EC6074696E672064656174682020202020202020310066696768746 96E6720646561
%4A6444EC80746820204E4F5420504F535349424C450000202020205550205 44F2E2E2E2020
%4A6364ECA020202020202032303000544849454600546869656620737465616C732066726F
%4A6604ECC06D207269636865737400202020706C61796572005 06C61796572732063616E20
%4A6404ECE066696768742074686965660020005448494546002020202020310000757369 6E
%4A6674ED0067206D616769632020202020204E4F204546464543540000736 86F74696E67
%4A6464ED202074686965662020202020203530300066696768746 96E67207468696566 2020
%4A6F04ED402020202020353030006765747469 6E67206869742020202020202020202020313000
%4A63F4ED603130302078204 34F494E53005452454153555245532078004 24F4E5553203D00
%4A6D54ED804E4F20424F4E555320212100000000 5B000000510000005200000053000000 54
%4A69D4EDA000000055000000560000005700000058000000590000005A0000005400000057
%4A6974EDC000000059000000560000005800000053000000540000005500000056000000 57
%4A6984EDE000000052000000530000005400000058000000590000005800000057000000 56
%4A6254EE000000005500000054000 0EDB80000EDCC0000EDE00000EDF4000000BF000000C0
%4A6D64EE200000005B000000BA0000005B000000C1000000BB000000BC000000BD000000BE
%4A6BC4EE400001000200002000200000002000 2000F000F007700F007700F00070700001E13
%4A6C54EE601E141E151E161E171E1B1E191E1A1E181E181E181E1B1E1C1E1D1E1E1E1F1E20
%4A6C34EE801E211E221E231E241E251E261E1E1E271E281E291E2A1E2B1E2C1E2D1E211E2E
%4A6C24EEA01E281E2F1E281E301E181E311E321E331E341E351E361E371E381E391E3A1E3B
%4A6DB4EEC01E3C1E3D1E3E1E3F1E401E411E421E431E441E451E461E471E481E491E4A1E42
%4A6ED4EEE01E4B1E4C1E4D1E4E1E4F1E501E441E451E511E521E531E541E551E3E1E561E57
%4A6F94EF001E581E591E5A1E5B1E5C1E5D1E5E1E5F1E3E1E601E611E3E1E621E631E641E42
%4A6FC4EF201E651E661E451E671E681E421E691E6A1E421E4B1E6B1E6C1E4E1E6D1E131E6E
%4A6F14EF401E451E6F1E701E711E721E731E3E1E741E751E131E761E3E1E771E781E791E3E
%4A6184EF601E7A1E3E1E7B1E7C1E3E1E7D1E7E1E7F1E801E811E821E451E831E841E851E86
%4A61F4EF801E641E421E4B1E131E871E881E891E8A1E8B1E451E8C1E8D1E8E1E8F1E551E3E
%4A6014EFA01E901E131E131E911E921E931E3E1E3E1E3E1E7A1E3E1E941E951E961E971E98
%4A6334EFC01E991E9A1E9B1E9C1E9D1E9E1E9F1EA01EA11E641EA21EA31EA41EA51EA01EA6
%4A63D4EFE01EA71EA81EA01EA91EAA1EAB1EAC1E551E3E1EAD1EAE1E131EAF1EB01EB11EB2
```

```
%4A6444F0001EB31E3E1EB41EB51EB61EB71EB81EB91EBA1EBB1EB91EBC1EBD1EBE1E131EBF
%4A6FE4F0201EBA1EC01EC11EC21EC31EC41EC21EC21EC21EC51EC61EC21EC21EC21EC31E13
%4A6154F0401E551EC71EC81EC91E131E131E131ECA1ECB1ECC1ECD1ECE1ECF1ED01E131E13
%4A6674F0601E131E131E131E131ED11E131E131E131E131E131E131E131E131E131E131E13
%4A6914F0801E131E131E131E131E131E131E131E131ED21ED31ED41ED51E131E131E131E13
%4A6914F0A01E131ED61ED71ED81E131E131E131E131E131E131E131E131E131E131E131E13
%4A6634F0C01E131E131E131E131E131E131E131E131E131E131E131E131E131E131E131E13
%4A6C54F0E01ED91EDA1EDB1EBB1E131E131E131E131E131E131E131E131E131E131E131E13
%4A6584F1001E131E131E131E131E131E131E131E131E131E131E131E131E131E131E131E13
%4A6754F1201E131E131E131E131E131E131E131E131E131EC11EBB1E131E131E131E131E13
%4A6ED4F1400000FFFFDFFFAFFF00002F007F00FF000000208F708FF08F00002FF07FF0FFF0
%4A6CA4F160000020F070F0F0F000000000F888F00F0000FFA0F08EF00C00005FFFFFFFFFFF
%4A64E4F180000000000000FF000000FC80FCA400000000F532FB63FFFF000000000000FFFF
%4A6DB4F1A000000000FFF0FF600000F050F080F0F00000F226F33DF66F00005FFFFFFFFFFF
%4A6954F1C00000663196 31C631F631F643F654F87683337223A324F334C334C445E445F445
%4A6844F1E000007222944447753F421B842F740AF708421742295 32C532F4227974E532F643
%4A68A4F2000000A520D533E633A733C833CB33D622673335228522B633F5229A55C844BA66
%4A6524F2200000427299A2B69587A493537252A0B7735310306131E1318131B343F121C252
%4A6654F24000008108F226C224933693367559C44863370000A1245226A33693689558D447
%4A6904F260000055517552766377478857995799674413551455276637774788579957996
%4A68F4F280000051557233A366747775887599769971441155525583557477758875997699
%4A69D4F2A000007515C525663677477858795797697414251555 25A636774778587959 7969
%4A6AD4F2C000002FF0AAA0EA609DA0B842F740AF709421553000006C92BB809DB0F550A643
%4A65F4F2E0000046007F004F00F421B842F740AF709421000000004C324F225E52F532F743
%4A6794F300000095203F70F630AA30C8308B33D622773300008522C744C6339D60A944BA66
%4A6D14F320000077 15C72568367B477C588F599F6959142B155725A9367A477B587D597F69
%4A6954F340000068 30B638C6348636C647B658455873364223392 49D345C349648C6488A45
%4A6774F360000026 66B66682240000C647B658C88853368AAAB866566868070000744 7333
%4A6DC4F380000035278C3BF6375C3BE8358B36F7226736AF3F9526B637B5279A55CB44BA66
%4A68A4F3A000003253 83C4A36343BBE39563B4F2B2537600004272A388B2538852D84286A6
%4A6164F3C00000614D446F605F617FB15B917DD47DF5AFF89F7FB09F00F400FD00F900FFFF
%4A6D24F3E0F410F010F110F322B5204531F531F731FC63F840FD84F335F246F158F26AF37B
%4A6E44F400F410F223A323D4349434B535E545F545E878E656F868F335F246F158F26AF37B
%4A6C74F420F410F023F023F034F034F035D045F045F067F056F076F098F046F158F26AF37B
%4A6EB4F440F410F033F033F034F044D055F045F155F177A366F588F0A9F246F158F8BDF37B
%4A6A64F460F3106300A400F5009600A500B910F811FA21B900FA43FA70F046F158F26AF37B
%4A6124F480F410F400F620F720F830F930CB32FB40FF609D50FF87FFBAF046F158F26AF37B
%4A63F4F4A0F410F403F604F705F806D906EB17EB08DF5CFD09FF5CFF9EF046F158F26AF37B
%4A6AD4F4C0F410F020F020F030C030F030C040D150E175F053F075F09AF046F158F26AF37B
%4A6E44F4E0F410F024F025B035F035F036D047C158F069F069F079F09AF046F158F26AF37B
%4A6954F50000006960B960C9429A50A953F741CC91EFA0AE94CFF4FFF80000000000000000
%4A6A34F52000005326D326943AA439C53BB54BF549F76D877FFAAFFEEF0000000000000000
%4A67D4F54000003A606A50B9229A508C41BC41F831FF83FA50AFD7EFD70000000000000000
%4A68F4F560000066 08B608A7077606790A6B1D9B0C8F5F7D0EBF5FEF5F0000000000000000
%4A66D4F580000000000303F603F8039603F803FB04FF05D877FF5AFF8FF0000000000000000
%4A62F4F5A0000000003A304C303F704F405F506F617F624F60DB40FB400000000000000000
%4A6DD4F5C000000000243500003F7E00003A1649578845D64560800000000000000000000
%4A6114F5E00000670078417B316F438F418F559F559F76AF76BF88CF99F400FD00F900FFFF
%4A60E4F6008F00CF21FF76FF98FFDDFFFF000000008F008F00CF21FF76FF98FFDD00000000
%4A6914F6208F008F008F00CF21FF76FF98000000008F008F008F008F00CF21FF7600000000
%4A64C4F6408F008F008F008F008F00CF21000000008F008F008F008F008F008F0000000000
%4A6064F660000000004FEC5F008F00CF20FF20EFFF8F00CF21FF76FF98FFDDFFFF00000000
%4A6404F68000005B30446F6930F0578F75F057CA66B9BFAF76F46ADF899F44AF66DF67FFFF
%4A6444F6A000006700504F6F407F308F418F559F699F76AF66BF88CF99617FD4CFA8BFFFFF
%4A6144F6C00000670 06F306F407F308F418F559F559F76AF76BF88CF99F400FD00F900FFFF
%4A6034F6E000006700 31306F407F308F418F559F969F76FF60FF70EF97F400FD00F900FFFF
%4A62D4F700000061 4D446F605F617FF89F7B9FB68FF5AF4F7778417F98910FFD00F900FFFF
%4A60A4F72000005B30446F6930F0578F75A2BFCA66B9BF4F775F807F980000D4CFF900FFFF
%4A62F4F740000000000988FA99FC99FFBBFA888000099997F8F711F5F936F84EF86F0F0FFBB
%4A6324F760000000007F848F85AF8340F7FF20FF82FFC0FFFF5F5081F8EF88D79FA17FA00F
```

```
%4A64F4F780000000000002FFF4EEF5EEF6FFF6FFF8FFF00008FFF6F6FAF9F5F995F656F33
%4A6AA4F7A000000000FFFF3FFF6EEF7EEF8FFF9FFFBFFF0000FFFF9F6FCF9F6F996F658F33
%4A6934F7C000000000FF005FFFBEEFAEEFCFFFDFFFFFFF0000FF00FF6FFF9F9F996F65CF33
%4A6B84F7E0000000006ABF8BBFBAAFDCBFFDDFFFFF5F776F998FAA9FBBAFCCCFDD5BBFFF00
%4A6EE4F800000000002FC55F845F966F86AFC06FB16F9A6F308F006F551F194F006F11AFFF
%4A6104F820000000003FC57F847F968F86CFC09FB19F9A9F30CF009F552F196F008F11CFFF
%4A6484F840000000004FC59F84BF96DF86FFC0FFB1FF9AFF30FF00FF553F199F00DF11FFFF
%4A6BF4FB60000000000000009F9AAF9A29096A089B0688889CCF4F335F897F83BF949F11
%4A60C4F880000000000FFFF00009F9ACF9A49099A08CB0688B8ACCF5F336F897F83BF94BF11
%4A6FF4F8A000000000FF0000009F9AEF9A6909CA08F8068888BCCF6F337F897F83BF94DF11
%4A66C4F8C0000000008F34AF54BF96DF78BFB66F99FF9ABF00FF30FFB36F459F77F6FFFFFF
%4A67C4FBE0000000006F939F84CF83FF66CFC88FBCFF9AF25FF48FF8BF700FDFFFD111FFFF
%4A6F34F900000000006F939F84DF86FF9A9FD9CFC8FFF6DFFFFFFF0000000000007F430000
%4A6694F920000000006F939F84DF86FF9A9FD9CFC8FFF6DFFFFFFF60F190F0C0F67F434A8F
%4A6E04F940BF966F450000FFFFFFFF0000FFFFFFFF0000CFC8FF9AF25FFFFFFFFFFFFFFFFF
%4A6D54F960FFFFFFFF9FD9FFF6FFFFFF44FF44FF44FF44FF44FF4460F190F00000FFFFFFFF
%4A6E44F9800000FFFFFFFF0000000600050000A0008000400040007000500000000100010001
%4A6B64F9A00000FFFFFFFFFFFF0000FFE0FFE0000000200020002000200000FFE0000000000077
%4A6AE4F9C0000000078000000790000007300000075000000740000007600700006000E000A0
%4A69E4F9E000B0009000D0005000F0000701060205030400000071000000700000000000000
%4A6314FA000000000000000000000000000000000000000000000000000000000000000000
%4A6334FA200000000000000000000000000000000000000000000000000000000000000000
%4A6354FA400000000000000000000000000000000000000000000000000000000000000000
%4A6374FA600000000000000000000000000000000000000000000000000000000000000000
%4A6394FA800000000000000000000000000000000000000000000000000000000000000000
%4A63B4FAA000000000000000000000000000000000000000000000000000000000000000
%4A63D4FAC000000000000000000000000000000000000000000000000000000000000000
%4A63F4FAE000000000000000000000000000000000000000000000000000000000000000
%4A6324FB000000000000000000000000000000000000000000000000000000000000000000
%4A6344FB200000000000000000000000000000000000000000000000000000000000000000
%4A6364FB400000000000000000000000000000000000000000000000000000000000000000
%4A6384FB600000000000000000000000000000000000000000000000000000000000000000
%4A63A4FB800000000000000000000000000000000000000000000000000000000000000000
%4A63C4FBA000000000000000000000000000000000000000000000000000000000000000
%4A63E4FBC000000000000000000000000000000000000000000000000000000000000000
%4A6404FBE000000000000000000000000000000000000000000000000000000000000000
%4A6334FC000000000000000000000000000000000000000000000000000000000000000000
%4A6354FC200000000000000000000000000000000000000000000000000000000000000000
%4A6374FC400000000000000000000000000000000000000000000000000000000000000000
%4A6394FC600000000000000000000000000000000000000000000000000000000000000000
%4A63B4FC800000000000000000000000000000000000000000000000000000000000000000
%4A63D4FCA000000000000000000000000000000000000000000000000000000000000000
%4A63F4FCC000000000000000000000000000000000000000000000000000000000000000
%4A6414FCE000000000000000000000000000000000000000000000000000000000000000
%4A6344FD000000000000000000000000000000000000000000000000000000000000000000
%4A6364FD200000000000000000000000000000000000000000000000000000000000000000
%4A63B4FD400000000000000000000000000000000000000000000000000000000000000000
%4A63A4FD600000000000000000000000000000000000000000000000000000000000000000
%4A63C4FD800000000000000000000000000000000000000000000000000000000000000000
%4A63E4FDA000000000000000000000000000000000000000000000000000000000000000
%4A6404FDC000000000000000000000000000000000000000000000000000000000000000
%4A6424FDE000000000000000000000000000000000000000000000000000000000000000
%4A6354FE000000000000000000000000000000000000000000000000000000000000000000
%4A6374FE200000000000000000000000000000000000000000000000000000000000000000
%4A6394FE400000000000000000000000000000000000000000000000000000000000000000
%4A63B4FE600000000000000000000000000000000000000000000000000000000000000000
%4A63D4FE800000000000000000000000000000000000000000000000000000000000000000
%4A63F4FEA000000000000000000000000000000000000000000000000000000000000000
%4A6414FEC000000000000000000000000000000000000000000000000000000000000000
%4A6434FEE000000000000000000000000000000000000000000000000000000000000000
```

```
%4A6364FF0000000000000000000000000000000000000000000000000000000000000000
%4A63B4FF2000000000000000000000000000000000000000000000000000000000000000
%4A63A4FF4000000000000000000000000000000000000000000000000000000000000000
%4A63C4FF6000000000000000000000000000000000000000000000000000000000000000
%4A63E4FF8000000000000000000000000000000000000000000000000000000000000000
%4A6404FFA000000000000000000000000000000000000000000000000000000000000000
%4A6424FFC000000000000000000000000000000000000000000000000000000000000000
%4A6444FFE000000000000000000000000000000000000000000000000000000000000000
%0AB1640000
```

```
%4E6698000400004EF90004014C4EF9000401564EF90004000C4EF9000400124EF9000400184EF9
%4E6B0800040020000001 7E4EF900040140000000000004EF900042566000000000000000000C
%4E6188000400400000000000000004EF900040A0A000000000004EF90004FF26F0F0F0F0F0F0
%4E6B6800040060000000100001000200030000000100 2CE08F00010004012900040113000401 0
%4E6C08000400800000400000004FFFF00008000000000010000000000000000000000000AED6BC17
%4E6038000400A0FB806A3380F0F0F0F0F0F0F0F0F0F0F0F0F0F0F0F0F0F0F0F0F0F0F0F0F0F0F0
%4E6108000400C0F0F0F0F0F0F0F0F0F0F0F0F0F0F0F0F0F0F0F0F0F0F0F0F0F0F0F0F0F0F0F0F0
%4E6C48000400E0F0F0F0F0F0F0F0F04EF9000450EA4EF9000413AA4EF9000425A04EF9000446C6
%4E6B980004010 0ED795741525249 4F52206A6F797374696 36B0057415252494F52203C46495245
%4E67FB000401203E20627574746F6E0057415252494F52203C4D414749433E20627574746F6E0C
%4E63B8000401400C40000066064EF90001000046FC23004EF900040C0A4BE7C0C033C000803 10C
%4E6438000401603 3C000803140303 90090400AEF4880790090400C33C000905F6E33F900904008
%4E6FE8000401800093000052790090400 20C79270F0090400467000C00C7900400090400 26C0C
%4E6578000401A0FFA6303900904C006600FF9C33F900904022009105 1041F90090401A43F90000C
%4E6218000401C0F940301067025D50544833F10000009103 8A33F100020091039830106702 5D5C
%4E6188000401E0544833F10012009103AC33F10014009103B033F10016009103B2301067025D5C
%4E61C8000402005 44833F10024009103CC33F10026009103D033F10028009103D4301067025D5C
%4E6208000402 2033F10036009103F633F10038009103F8303900904006024000FC0C4000806D04
%4E6103000402400A4000FCE24841F9000403C633F000000091002E303900904006320002400 0F
%4E6198000402 6062641F90091003A0241001 0660E3239009100383 0C130C13081600C43F9000C
%4E64B8000402 80F17A30D930D9309141EF000F43F900040901102900 1B0A00009FB1103039009C
%4E6328000402A048520C40FFFE670000CC303900904006024000016600006A3039009049B4024C
%4E63C8000402C0000F41F9000403A6D0403230000041F900910560224 8D0FC0010D2C14A79009C
%4E6218000402E040406B1C06511000065010006432005 0F0000051F00033FCFFFF00904040602C
%4E6FD8000403000451100004501000301002 40F00066100250 0FFF02510FFF33FC00000090404C
%4E60E8000403203039009040060240000366483039009040 42E94041F90091055043F90000F60C
%4E6598000403 40D2C0700530D951C8FFFC303900904044D1 7900904042671 40C79000500904042
%4E6308000403 6065123 3FCFFFF0090404460083 3FC000100904043039008030080800003661 4
%4E6468000403804EB9000001844A40660A2E7800002078000 44ED04EB90000015A4EB900000148
%4E6E98000403A04CDF03034E73001E001A001E001A001A000A001C000800080010001000100 01C
%4E66E8000403C000100010010F00FF00EF00DF00CF00BF00AF009F008F007F006F005F004F00C
%4E6768000403E0F002F001F000F000F100F200F300F400F500F600F700F800F900FA00FB00FC0C
%4E649800040400FD00FE00FF00322F000A7000302F000480C13F00302F000880C14840301F484C
%4E65C8000404204E753039008030003 3C00090485AE248E5F900904028E248E5F900904030303 9
%4E6488000404400080300233C00090485CE248E5F90090402AE248E5F900904032303900803004
%4E6608000404603 3C00090485EE248E5F90090402CE249E5F900904034303900803006 33C00090
%4E6858000404804860E248E5F90090402EE248E5F900904036 4E75206F0008222F000430100 1FC
%4E6648000404A0361906405D353080C1C14841323C0000E281D08148404 8C04E7541F900904846
%4E6358000404C060D6322F0006D24141F9009030000C41007E620E0C70F0801000635430 3C040C
%4E61C8000404E04E7548E7202043F90090280041F90090300045F900902000340104410040610C
%4E6FC80004050000B2653030015540024000 3E024107C0D2406100009E651C30015840024000 3E
%4E6838000405200 24107C0D2406100008A65084CDF040470FF4E753001E2484CDF04044E75322F
%4E6388000405400006D24141F9009030000C4107BE630C303010006A4E303C04004E7548E7202C
%4E60A80004056043F90090280041F90090300045F900902000340106410040613865 2C30015540
%4E6128000405800240003E024107C0D2406126651A30015840024000 3E024107C0D2406114650 9
%4E6B98000405A04CDF040470FF4E753001E2484CDF04044E754A7210006 73C6B3C303110009071
%4E6F78000405C0200033C00090403C6A0244400C4007C0642233C000904038303010009070200C
%4E6148000405E033C00090403E6A0244033C00090403A0C4007C04E753031100006400280024C
%4E6188000406 00F8000440020090712000033C00090403C6A0244400C4007C064DA33C000904 03E
%4E6E78000406 2030301000064001000240F8009070200033C00090403E6A0244033C000904 03A
%4E6498000406400C4007C04E75322F0006D24148E7202043F90090280041F90090300045F9009C
%4E6198000406 6020003401300155400240003E024107C0D2406100FF3E652A70400C420080650C
%4E68E8000406 8092406100FF2E651A303C00800C4207C06408D2406100FF1C650870FF4CDF040A
%4E6718000406A04E753001E2484CDF04044E75322F0006D24148E7202043F90090280041F9009C
%4E61D8000406C0300045F900902000340130015440024000 3E024107C0D2406100FED8652A704C
%4E6728000406E00C4200806 50C92406100FEC8651A303C00800C4207C06408D2406100FEB6650E
%4E68B8000407007 0FF4CDF04044E753001E2484CDF04044E75302F0006322F000A48E73F303400
%4E6308000407 20D040D24141F90004088A363010003A30101841F90090280043F90090300045F9
%4E63D8000407400090200047F9009048643C3010020246FF803E3110020247FF8038331000D84A
%4E6998000407 6061566A4C47F90090491E34331000D44247F9000408BAD6C2D442D442D6C2D05C
```

Appendix C - MAIN LOOP GAME PROGRAM

©1985 ATARI GAMES, CORP.

```
%4E68B8000407B061366A2C905BD053612E6A24905BD05361266A1C905B3413670ED042611A6A1
%4E6E48000407A0905BD05361126A084CDFOCFC70FF4E75E2484CDFOCFC4E750C4000406D140C4
%4E6A48000407C007FE6F200C71F3FF1002630E06400B004E750C71F3FF1002620474FF4E75064
%4E65A8000407E008004E75B04467F24A72000067EC6B46343000000242FF8094460642020033C
%4E65B8000408000090403C6A040A42FF80B44364CC33C20090403834310000242FF80944733C
%4E6408000408200090403E6A040A42FF80B44364AC33C20090403A4E75343000000642028 0024
%4E6498000408 40F8009446 33C20090403C6A040A42FF80B443648633C20090403834310000064
%4E65A8000408600100 0242F8009447 33C20090403E6A040A42FF80B4436400FF6233C20090403
%4E61B8000408 80D4790090403 8BA424E7505800400048004000480048004800480048004B0048
%4E6F48000408A004800800060007000600060006000600060006000600060006000600FFFEFFC0000
%4E6DB8000408C0FFBEFFC2FFC2FFC000020040FFFE0002FFC00040FFC200420042000200 40FFF
%4E6E98000408E0FFC00040FFFE0002004200 3E003E0040FFFEFFC00002FFFEFFC00040003EFFB
%4E6B4800040900FFBEFFC0FFFE000200404EB90004FEEA202F00083200E44141F900039FD4123
%4E62B800040920100 0E2400240000 7E021020100 03E3014381 4EB90004FED4207900038 0004EB
%4E651B000409400004FED4202F0008E540207000002 3C8009049C04E754EB90004090A3001E74
%4E6568000409604 1F90003804040EF000446FC27004EB90004FF0046EF00040A41000633C1009
%4E6BA800040980 49C44E754EB90004090A41F90003EE6A43F90003EEC8D2C140EF000446FC270
%4E67C8000409A04EB90004FF0C46EF00040A41000633C1009049C44E754EB90004090A3001E74
%4E682B000409C041F90003804040EF000446FC27004EB90004FF0046EF000433C1009049C44E7
%4E688B000409E04EB90004090A3001E74041F90003804040EF000446FC27004EB90004FF1446E
%4E62FB00040A000004 33C1009049C44E7548790009A104EB90000024853 8F4E7500000000000
%4E668B00040A2000000000000000000000000000090900000000000000000000000090900000A0
%4E63E800040A4000000000000000000000000000000000000000000000000000000000000000C0
%4E659800040A6000000000000000000000C0000000D0C000000000000000000000000000000000
%4E664800040A8000000000000000000000000000000F000000000000000000000000F000000100
%4E63B800040AA000000000000000000000000000000000000000000000000000000000000000120
%4E644800040AC000000000000000000000012000000131200000000000000000000000000000000
%4E655800040AE000000000000000000000000000000150000000000000000000000000015000000161
%4E657800040B000000000000000000000000000000000000000000000000000000000019190000191
%4E6C9800040B200000000000000000000001A1A00001A1A00191919000019190000 1B1B00191B1
%4E6DC800040B40191A1A1A00001A1A00191C0000001C1C000000000000000000001D1C00001D1
%4E640800040B60001C1C0000001C1C00001E1D001C1E1E1C1D1D1C00001D1D001C1F0000001F1
%4E6A8800040B8000000000000000000000201F00002020001F1F0000001F1F00002120001F212
%4E690800040BA01F20201F00002020001F22000002222200000000000000000000023220000232
%4E69B800040BC00022220000002222000024230022242422232322000023230022250000000252
%4E6A2800040BE000000000000000000000262500002626002525000000252500002726002527 2
%4E664800040C002526262500002626002 54E56FFFE48E70030247C009040024EB90004123447E
%4E660800040C20FFFE4A52660442536 0F8527900904006425233F9009040240090402 24EB9000
%4E6B4800040C40C0264EB9000404224EB9000400EC4A790090 4B24660000444EB9000455C44EB
%4E694800040C6000043880 4EB900045A964EB9000481964EB90004512E4EB900046E544EB9000
%4E6CD800040C80C7F44EB90004C1184EB900044B284EB90004BA564EB900044A9C4EB90004B5F
%4E6A9800040CA04EB90004635E4EB9000456B44EB90004353C4EB9000420BE4EB9000411B24EB
%4E664800040CC000040E844EB90004B11A4A52670C33FC00080090485060 00FF4A30390090485
%4E68D800040CE0E24833C0009048506000FF3848E73038247C009048D6287C00904AA6267C009
%4E683800040D004A34223900904FECB2B90090493E6700016E23F900904FEC0090493E4243300
%4E669800040D2048C02F004EB9000001664A80588F670001444A790090484E6700013A4A92661
%4E6B7800040D404AAA0004660E4AAA0008660B4AAA000C6700000C72FDB2790090485266144A7
%4E650800040D60009048526C0C4EB900041E4A42B9009048483003E540204A4AB000006700008
%4E626800040D803003D040204B527000003403E542204A70003014721FC081D080227C0000A21
%4E643800040DA072003231080 0D3B020004A3900904858 6F06533900904858300320 7C009049F
%4E6C9800040DC0423000003003207C009049D0003000020003003D040204B720032300000700
%4E64FB00040DE0301402800000300E0805280B280625A300348C02F004EB9000430AC588F604
%4E61D800040E003003E540207C009048EE42B000003003D040204B31BC000100003403E542204
%4E604800040E2072003214701FC2802001D080227C0000A21E72003231080021812000300 34BC
%4E68E800040E402F004EB9000430AC588F3003D040207C00904AA831BCFFFF00003003E540227
%4E6A3800040E6000009BDC2F3100004EB90004806458 8F6000FEAC52437204B2436600FEA24CD
%4E6B0800040E801C0C4E7548E7203B247C00904944267C00904942287C009049464EB90000017
%4E656800040EA022003401 70FFB04167000028 4A53670A0C4200FF66164253601 84A52670E300
%4E67B800040EC048C07207C0B1660442526 0064EB900040F3E4A53671053534A536600005C4EB
%4E694800040EE000040F3E60524A52670E53524A5266484EB900040F3E604053544A546C3A487
```

```
%4E655B00040F00000000074EB9000002424A8058BF671034BC001E38BC00F042790090494B601E
%4E6A1B00040F20425452790090494B0C790OB4009049486F064EB900040F3E4CDF1C044E7542A7
%4E661B00040F4042A74EB90000025433FC00B4009049424279009049444279009049484EB90004
%4E6B1B00040F6080AC508F4E754E56FFFE48E73038243C009049C6287C00904010267C00904018
%4E698B00040F804EB9000001844AB066F642A742A7224248514EB90000024E360070FEB0434FEF
%4E666B00040FA0000C66202242244914FC0007421A14FC0098421A204A548A4250204A548A30B9
%4E674B00040FC000904AA64A436C144878000142A7224248514EB90000024E4FEF000C22422449
%4E64AB00040FE0204A528A101048803B804EB90004FED47007B0546200001470003014E580204C
%4E629B00041000D1F9000380004A9066043BBC0007101A4880024000073 3C00090400E204A528A
%4E60D8000410201010488036B00C530098650000080C5300A2630436BC0098101A4880024000C
%4E67B8000410403 3C000904016204A548A33D0009049BE0C7907D0009049BE6F064279009049BE
%4E639B000410602 3FC0000BCA000904012204A548A30104BC00280000000FF323900904AA648C
%4E663B000410800281000000FFB081670000D64EB900041DF2487900008000487900009D6E4EB9
%4E664B000410A000000200363C029445EEFFFE508F4A436D604279009040024A7900904002660
%4E619B000410C0425260F430390080300048C07203C081660C700123C0009040126000008448 7
%4E62EB000410E0000080004878000148780002700030038 0FC003C02800000FFFF2F004878001E
%4E654B000411004878001 14EB9000002725343 4FEF0018609C424342A7320348C12F014EB9000C
%4E655B000411200 1C0508F5243700AB04366E842A74878000D4EB9000001C0007980000 0704AA6
%4E62CB000411407000303900904AA62F004878000C4EB9000001C0700123C0009040124FEF001C
%4E686B000411604CDF1C0C4E5E4E75227C009049C612F90090401112F90090400F12F90090401
%4E667B000411801 2F900904017204954893 0B9009049BE2049548930B900904AA64878000142A7
%4E683B000411A04879009049C64EB90000024E4FEF000C4E75227C009049C6207C00904012 4A9
%4E607B000411C0670253904A906600006A20BC00008CA070001011B0790090401066000050700C
%4E6E3B000411E010290001B0790090400E66000040700010290002B0790090401866000030700C
%4E6FD8000412001 0290003B0790090401666000020 41E900043010B079009049BE66000010303
%4E672B000412200 0904AA641E90006B05067064EB900041168 4E752F0A247C00904AA64EB90004
%4E672B000412400F3E42A742A74EB9000413AA4EB900000 23633C00090484E4878000C4EB9000C
%4E675B000412600 1A834804878000B4EB9000001A872FCC081588F2F004878000B4EB9000001C
%4E60F8000412B070003012028000010004FEF0014671E303900400700240EFFF348070003012
%4E682B000412A02F004878000C4EB9000001C0508F4EB900040F664EB90004776E4EB90000014E
%4E684B000412C042790090496A427900904B5070FD33C00090485248C02F004EB900041F82588F
%4E653B000412E0245F4E7542413001E540207C009048EE42B000003001E540207C009048D642BC
%4E6E4B000413000000 3001207C009048EA423000003001207C009048E6423000003001207C009C
%4E612B000413204936423000003001 48C0D080207C00904864427008003001 48C0D080207C009C
%4E628B000413404B00427008003001 48C0D080207C00904AF84270080030014 8C0D080207C009C
%4E619B000413604AF0427008003001D040207C00904B0831BC000100003001D040207C00904AA6
%4E692B000413803 1BCFFFF000030014 8C0D080207C009043D631BCFFFF0800524170 04B0416E0C
%4E671B000413A0FF4642790090486 24E7548E73030342F0016362F001A247C000424FE267C000C
%4E655B000413C0F1C02F3C00910000487 90000F140487800404E923002 48C0E9805080D080204I
%4E619B000413E0303008003 3C00090402433C00090402 22F3C009105003002E94048C0D080204I
%4E644B000414004870080048780010 4E922F3C009105203003E94048C0D080207C0000F3E0487C
%4E63FB000414200B0048780010 4E927010B0424FEF0024670000D02F3C009105404879 0000F66C
%4E64DB000414404 8780010 4E922F3C009105603002E94048C0D080204B4870080048780010 4E9
%4E663B000414600C79270F009040044FEF001B66142F3C009105804 87B00104EB900042550508I
%4E649B000414B060222F3C009105803003E94048C0D080207C0000F3E0487008004 87B00104E9
%4E671B000414A04FEF000C2F3C009105E02F3C009105204 87800104E92487850002F3C009105C
%4E65AB000414C02F3C009105E0487B00104EB900042518487830002F3C009105A02F3C009105C
%4E663B000414E0487B00104EB900042518 2F3C009102004879 0000F740487B01004E924FEF003E
%4E641B000415006 02E2F3C009105402 23C0000F6607020D2B02F01487B00104E922F3C009105 6C
%4E65CB000415204879 0000F6A0487B00504E924FEF001848787 0002F3C009104002F3C009105 0C
%4E67EB000415404 8780804EB900042518 4FEF00104CDF0C0C4E752F0A247C000425504 2403 3C
%4E618B000415600090402233C0009040242F3C009100004 87B00804E922F3C009102004 87B010C
%4E678B000415B04E922F3C009105004 87B00804E922F3C009104004 87B00804E924FEF0020245F
%4E646B000415A04E7548 7B00044EB9000404BA3200588F660470006016 7001B041660470406 00C
%4E63DB000415C07002B041660470016 00270024E7548E72038242F0014247C009048562 67C009C
%4E645B000415E0400028 7C009040044EB900041692204 25E8814900C54270F670000927007B05
%4E645B000416006 24A7072B053654470003014 80FC01BC484002800000FFFF32000C410149631C
%4E63DB000416204EB9000415A2580050008112600000 5E0C4100DE630A4EB9000415A28112604C
%4E625B000416407073B041644600120000C604 00C53009865 3A0C5300A2623470003014 80FC00A
%4E615B000416604840028 00000FFFF32007078B041640600120 04C60167050B041640600120 04C
```

Appendix C - MAIN LOOP GAME PROGRAM

©1985 ATARI GAMES, CORP. - Page 3 of 35

```
%4E63B80004168060 0A7028B041640400120000C4CDF1C044E7548E72020227C0003B0003039009
%4E62F8000416A049C4E2403400D040207C00009BEC3030000048C022090681000 07B20D081244
%4E60E8000416C042523002D040207C00009BF4303000048C0240906820000 7B20D0822440301
%4E6408000416E0200906800000 7B4024404252303900904 9C448C0E7B024097240D481D0822440
%4E6788000417003012 4CDF04044E7548E72030247C0090200026 7C009049AE70FF33C000904B6
%4E64D8000417203 3C000904B66427900904B687008B0790090400463448798000 34EB9000404B
%4E6558000417405640 33C00090496C588F7072B0790090400063448790000800048790000 9BF
%4E6278000417604878000448780 01F4EB9000002 5A4879000080004878000148780003700030 3
%4E6588000417800090400 42F004B78000448780025 4EB9000002604FEF00284EB9000416922F3
%4E6868000417A0009049C04EB9000425A0083900070090485 6588F670A42A74EB9000418965 88
%4E6268000417C042413001D040207C0090496E427000005 2417020B0416EEA425374203002D04
%4E6268000417E0207C0090380032300000700AE069703BB041661A7020B0536E0442780001301
%4E62B8000418005253D040207C0090496E3182000052420C4204006DC6424230024 8C05280D04
%4E6148000418202 04A427000003002 48C05A80D040204A427000003002 48C07209D081D040204
%4E6148000418404270000030024 8C0720DD081D040204A427000003002 48C07211D081D040204
%4E6178000418604270000030024 8C07215D081D040204A427000003002 48C07219D081D040204
%4E67C8000418804270000052427004B0426EBC426A003A4CDF0C044E7548E73E30342F00222 67
%4E63F8000418A0009038004 24445EB00404A42661A7620321A700AE0697006B0416602524 5243
%4E65C8000418C00C4304006C2260E876203A1A700AE06D702AB0456700000 8702BB0456602524
%4E6718000418E05243 0C4304006DE24A44670000CE4A426F06B4446F023404424545EB00404A4
%4E6578000419006646700 1B0446C4030044 8C02F004EB9000404BA3C00762 0588F6024321A700
%4E6718000419 20E0697006B0416616BC45671042A730034 8C02F004EB9000446C6508F5245524
%4E6658000419 40BA446C00007660D44A446F00006E4A426F000068700030048 0C202800000FFF
%4E6728000419602F004EB9000404BA3C004243588F321A700AE0693A01702AB0416706702BB04
%4E6908000419806 6EC5344BC43671A5243321A700AE0693A01702AB0416706702BB04566EC534
%4E6C8800041 9A060E2200A5580204B9889E2882F004EB900008BD45342588F608E4CDF0C7C4E7
%4E6BE8000419C048E73C38267C00904B7424 7C000404BA287C00904 8624A790090496A662A700
%4E67E8000419E0B0790090400462204 87800064E922400702FD480588F2F024EB900041D3433F
%4E67C8000419A000030090496A588F4A7900904B6E6F120CB900007D2900904B78670626B9009
%4E67F800041A204B784A93671E2013EC8033C0009049B02413703FC4802F024EB900041D34429
%4E62E800041A40588F600833FC006400904 9B00C7900980090400064000 10C424370003039009
%4E644800041A604AA6028000000E0EA803A00700 1B0546600005E7004B0456C1C740B300548C
%4E682800041A809480487800044E92B480588F6C045743601E5543601A740430054 8C094804 87
%4E65E800041AA000044E92B480588F6C0455436002534342443004 48C0D080207C009048644A7
%4E63F800041AC008006600000E5244700 3B0446F0460E278017002B0546616740730054 8C0948
%4E668800041AE0487800044E92B480588F6C0253431239009048584881300420 7C000086FE103
%4E64C800041B000000488092404A416F1C3001E44096403401 48C27003C480487800044E92B48
%4E651800041B20588F6F0253437003B0546604524360087004B0546602544 34A436C12340348C
%4E68E800041B4044822F024EB900041896588F60144A436F104878002A4EB900041D345343588
%4E686800041B6060EC4CDF1C3C4E7548E7380042437420300248C0723FC081660642790090400
%4E61E800041B803002D040207C0090380032300000700AE0693801703 9B041660276017039B04
%4E651800041BA067000008703AB044661042A7320248C12F014EB9000446C6508F52420C42040
%4E6C2800041BC06DAE4A43670E4879000003F4EB900048064588F4CDF001C4E7548E738203421
%4E648800041BE00016262F0018300248C0721FC081EF80D0802040300248C00280000003E0E88
%4E62A800041C00D08006800090000D1C02448200 3E580D0802040D1FC0000B38022483019064
%4E6E2800041C202000348028 0A068400000080204430190640200030804A5488301906402 00
%4E62F800041C403080280A068400000082204430110640200030804CDF041C4E7548E73020342
%4E63E800041C600012300248C0721FC081EF80D0802040300248C00280000003E0E880D080068
%4E600800041CB000900000D1C02448227C0000B3983019064020003480260A068300000080204
%4E6E7800041CA0301906402000308020 4A5488301906402000308026 0A068300000082204330 1
%4E662800041CC006402000308 04CDF040C4E7548E738003 62F0012342F001630034 8C0721FC08
%4E633800041CE0EF80D0802040300348C00280000003E0E880D080068000900000D1C02248320
%4E603800041D00700CE1613401320293512809068400000080204430029150204954883002915
%4E64B800041D202809068400000082204430029150 4CDF001C4E754BE73800342F0012487803E
%4E628800041D404EB9000404BA3600064300 20588F3003D040207C009020004A7000006 70C524
%4E63C800041D600C4304006DE8762060E442A7300248C02F0032024 8C1207C0000C6247000103
%4E621800041D801800320348C1028100000 3E00A81000003E0ED81D0812F00300248C0207C000
%4E640800041DA0C6607800183008003203 48C1700BE1A1300248C0D080207C0000C5AC3030080
%4E650800041DC048C09280D8812F04300248C0D080207C0000C534303008048C02F003003 48C
%4E67F800041DE02F004EB90000BA844FEF00184CDF001C4E7542403 3C00090400A33C00090400
```

```
%4E62C800041E002F3C00905F8048780040 4EB9000425504240 33C00090300033C00090280033C
%4E639800041E20009020002F3C00905000487807804EB9000425502F3C00900000487810004EB
%4E635800041E40000425504FEF00184E752F0A247C00904852424133C100904000700030012F0
%4E6B4800041E604EB90004095670FDB052588F660E33FC000100904B244EB90004B5FC70FDB05
%4E651800041E8066064EB9000412E44879000000434EB900048064425233FC0001009040044EB
%4E6AC800041EA00000014E4879000000024EB9000480642F3CFFFFFFFF4EB9000430AC4A79009
%4E695800041EC0484E4FEF000C67064EB900042E844EB900041708303900904966 48C02F00303
%4E6B6800041EE0009049644 8C02F004EB9000413AA427900904B1433FCFFFF00904968508F245
%4E638800041F004E7548E73C20227C00900000247C0000B3A0420012001400488220 7C0000BEF
%4E612800041F20424342444A016616101048804 8C00280000000E0EF8034001218020100 1F301
%4E631800041F40D04232802A0906850000008022455301524470 29B0446ECC2A0904850000148
%4E691800041F602245548952437 01EB0436EB64878001048780010 4EB9000413AA508F4CDF043
%4E680800041FB04E7548E72030342F0012247C00904968267C009049BC4EB90000014E4A79009
%4E67D800041FA04B24670E33FC000100904B244EB90004B5FC4879000000014EB90004806433F
%4E652800041FC0000100904004427900904000 4EB9000415544EB9000412E44EB900041DF2487
%4E657800041FE0000000434EB90004806470FEB042508F6600007A207C009049BB52503210700
%4E66F800042000B0416E2C4279009049B842A74EB9000001BA4EB900000236 33C00090484E487
%4E675800042020000C4EB9000001A833C000904AA6508F34BC04B04EB900041F024EB90004BF0
%4E610800042040700030390090 4AA602800000400067184A5366144879000000424EB90004806
%4E69D800042060 36BC0002588F60505353604C70FFB042660C34BC02584EB900047D38603A70F
%4E6DC800042080B042660C34BC0E104EB90004246A602870FCB042662234BC02582F3CFFFFFFF
%4E6A4800042 0A04EB9000430AC303900904B5448C02F004EB90004B654508F4CDF0C044E7548E
%4E6558000420C0303024 7C00904852207C00904968267C009048544A526E00038A4A52662A740
%4E6268000420E0143900904939720012390090493B700010390090493776001639009049368 08
%4E642800042100828084816600035C4A506D00035653504A526700021270FFB052670 80C50021
%4E64F800042120 6D00002070FEB052660 80C5004746D00001270FDB052660000780C500DD46C0
%4E627800042140007 04A790090484E6700006670003039009048 5A7203C0817203B2806600003
%4E620800042160700030390090 4B5C7203C0817203B2806600002870003039009048 5E7203C08
%4E621800042180720 3B2806600001470003039009048607203C0817203B2806 71670FF3480320
%4E68A800042 1A048C12F014EB900041F82588F600002B470FDB052670 80C50021C6D00000E70F
%4E61B800042 1C0B052664A0C5004746C4470003039009048 5A0280000000F00C80000000F0660
%4E60F800042 1E00018700030390090486002800000 00F00C80000000F0671670FD3480320048C
%4E67A800042 2002F014EB900041F82588F6000025670FDB052660 80C500DD46D00002270FEB05
%4E65F800042220660 80C5004746D00001470FCB052676070FDB052675A0C50021C6C547000303
%4E6EB800042240009048 5C0280000000F00C80000000F0660000187000303900904 85E0280000
%4E6EF800042260 00F00C80000000F0672634BCFFFC36BC00082F3CFFFFFFFF4EB9000430AC2F3
%4E6BF800042280FFFFFFFC4EB900041F82508F600001D470FCB052660 80C50021C6D00001270F
%4E606800042 2A0B052660000820C5004746C00007A7000303900904 85C0280000000F00C80000
%4E616800042 2C000F0660000187000303900904 85E0280000000F00C80000000F0674A4A53661
%4E66A800042 2E070FF348032004BC12F014EB900041F82588F6000016E5353700030390090 4AA
%4E62A800042300028000000400670870 07B0536602425330BC0258321348C12F014EB90004B65
%4E6B3800042320588F6000013E4A506C0000C433FCFFFF00904B5870FCB052663A4A53660834B
%4E626800042340FFFF6000008253537000303900904AA602800000400670870 07B0536602425
%4E67F800042360 30BC0258321348C12F014EB90004B654588F60524A5266344AB900904BD6660
%4E68F800042380001E4AB9009048DA660000144AB9009048DE6600000A4AB9009048E2670E4EB
%4E6D88000423A000041E4A42B900904848601A535270FCB052661236BC00082F3CFFFFFFFF4EB
%4E646800042 3C0000430AC588F4A526700009270FCB0526600000A7008B0536600008232 12 48C
%4E643800042 3E02F014EB900041F82588F600000704A526600006A7001B079009040046700005
%4E674800042 4004A39009049366 6544A39009049376 64C4A39009049386 6444A39009049396 63
%4E63EB000424203210 4BC183FC003C484148C14A81662C4879000080004878000148780002321
%4E689800042 44048C183FC003C48C12F014878000E4878000D4EB9000002604FEF00184EB9000
%4E6FD800042 46024684CDF0C0C4E754E7548E70030247C0090494A267C0090495A2F3CFFFFFFF
%4E670800042 4B04EB9000430AC42B900904848487800964EB9000409B64EB900041708303900 9
%4E67D800042 4A049664 8C02F003039009049644 8C02F004EB9000413AA487800034EB900046A9
%4E6F98000424C0257C0000C0E4000C206A000C1010488037400006700025400008254000042 48
%4E657800042 4E0424037400004374000023 68033FC0004009049624FEF00144CDF0C004E75302
%4E64F800042 5000006226F0008206F000C4241600430D95241B2406DF84E7548E73800342F001
%4E626800042 520222F0014226F0018244601A2041548176003610700030 2F001E96804A836C0
%4E65F800042 5407600 32C35244B8426DE24CDF001C4E75302F0006206F000842416004425 8524
%4E634800042 560B2406DF84E754EB900041F02207C00901480424130010640700030C05241701
```

Appendix C - MAIN LOOP GAME PROGRAM
©1985 ATARI GAMES, CORP.

```
%4E62D80004258 0B0416EF02279000001F42079000001DB4240308020790000 01DC308032804E7
%4E6368000425A048E73C00242F0014427900904 93C42443004D040207C009020003204D241227
%4E6F88000425C00090300042433383100032 04D241227C00902B0033831000 3204D241227C009
%4E6078000425E0404633831000 3204D241227C00903800338310003183000052440C4404006DB
%4E6368000426004244300448C0D0802A00068500905FB0204542505244704 0B0446EE6780330C
%4E66A8000426204BC0D080207C00904864427008005 3444A446CEA4279009049 3A2F024EB900C
%4E6108000426 40AD0620427009D1C012107000100 1E84833C00090496470001001 0240000F33C
%4E6078000426600090496620425088121070001001E84833C0009049B4700010010240000F33C
%4E6628000426800090 49B648780020487800014 2A74EB9000441F62F024EB9000415CE7000303
%4E6A48000426A00090493C2F004EB9000450EA4EB9000427084EB900042B544EB900043AF04FE
%4E6588000426C000184CDF003C4E752F02322F000A302F000E34000242001F300148C0721FC0E
%4E6298000426E0EB80D4407020B0426E0000143002D040207C009020000C708000000 0660470F
%4E6348000427006002700024 1F4E7548E73000424342423000248C02F00300348C02F004EB900C
%4E6A6800042720273A508F52427020B0426EE452437020B0436EDA4CDF000C4E754BE73F30342
%4E6408000427400026362F002A0242001F0243001F0679009049B442463802EB44DB433004D04
%4E6028000427602 07C00903800323000007 00AE0693A017006B0416700000107007B045670000C
%4E66C8000427807008B045661A300548C05D802F00300448C02F004EB900041BDA508F600000F
%4E67E8000427A0703BB0456612300448C02F004EB900041C5A588F600000DC703AB04566043C3
%4E6578000427C0300048780004 4EB9000404BA3800E54430034 8C053802F00300248C02F004EE
%4E6498000427E0000426C84A804FEF000C6704064400103003 4BC053802F00300248C052802FC
%4E6598000428004EB9000426C84A80508F6704064400203003 48C02F00300248C052802F004EE
%4E64E8000428200004 26C84A80508F6704064400403003 4BC0EF80D0802040300248C0E380D0E
%4E64C8000428400680009000 00D1C02448300448C0D0802040D1FC0000A5C02248380BC9FC003
%4E6408000428860D8463019D04434802E0A06870000008020473019D0443080204A54883019D04
%4E67B8000428880308 02E0A06870000008220473011D04430804CDF0CFC4E7548E73838342F001
%4E6488000428A0322F0022247C00042B92267C000426C8287C00043B423602EA4338020244001
%4E63F8000428C0703BB0416612300248C02F004EB900041C5A588F600000627006B0416700001
%4E6428000428E07007B0416700000870 08B0416618300148C05D802F00300248C02F004EB900C
%4E65D8000429001BDA508F60324A416700000 8703AB0416616300448C02F00300348C02F004EE
%4E63C8000429200004273A508F601030044 8C02F00300348C02F004E92508F300448C02F0030C
%4E6718000429404 8C02F004E9430044 8C053802F00300348C053802F004E934A804FEF0010671
%4E64B8000429603004 48C053802F00300348C053B02F004E92508F300448C02F00300348C053E
%4E6698000429802F004E934A80508F6726300448C02F00300348C053802F004E9230044 8C02FC
%4E66D8000429A0300348C053802F004E944FEF001060283004 48C02F00300348C053802F004EE
%4E6538000429C00004273A30044 8C02F00300348C053802F004E944FEF001030044 8C052802FC
%4E65E8000429E0300348C053802F004E934A80508F6716300448C052802F00300348C053802FC
%4E6598000042A004E92508F601830044 8C052802F00300348C053802F004EB90004273A508F30C
%4E65B800042A2048C053802F00300348C02F004E934A80508F6724300448C053802F00300348C
%4E660800042A402F004E9230044 8C053802F00300348C02F004E944FEF001030044 8C052802FC
%4E65C800042A60300348C02F004E934A80508F6726300448C052802F00300348C02F004E9230C
%4E65C800042A8048C052802F00300348C02F004E944FEF001060283004 48C052802F00300348C
%4E668800042AA02F004EB90004273A30044 8C052802F00300348C02F004E944FEF001030044 8C
%4E65B800042AC053802F00300348C052802F004E934A80508F6714300448C053802F00300348C
%4E66FB00042AE052802F004E92508F300448C02F00300348C052802F004E934A80508F6724300
%4E6728000042B048C02F00300348C052802F004E9230044 8C02F00300348C052802F004E944FE
%4E6418000042B20001030044 8C052802F00300348C052802F004E934A80508F6714300448C052E
%4E6788000042B402F00300348C052802F004E92508F4CDF1C1C4E7548E73020247C00902000424
%4E6268000042B6042420C5A8006614700030022F00700030032F004EB900042B92508F5242702
%4E68A8000042B80B04262DE52437020B04362D44CDF040C4E7548E73E20342F001E362F0022024
%4E63F8000042BA0001F0243001F3202EB41D2433A39009049B67020B0416F0478016012300 1D04
%4E6218000042BC0207C00903800383000007 00AE06C7038B0446700001070 37B0446700008703
%4E6558000042BE0B04466027A05300348C02F00300248C02F004EB900042C9C3200207C00009C2
%4E6208000042C007000103010003205 48C1C2FC0044D08153B0E580D08006800000A6C02240300
%4E6518000042C2048C0EF80D0802040300248C0E380D08006B000900000D1C02448700 1B04450E
%4E63E8000042C406606323C1000601E7039B0446606323C4000601230044 8C072369081720CE3
%4E60E8000042C6032000641500030 19D04134802C0A06860000008020463019D041308020 4A54E
%4E6578000042C803019D04130B02C0A06860000008220463011D04130804CDF047C4E7548E7382
%4E6448000042CA0362F0016342F001A247C000426C8424430024 8C053802F00300348C053802FC
%4E6768000042CC04E924A80508F6702524430024 8C02F00300348C053802F004E924A80508F67C
%4E65D8000042CE0544430024 8C052802F00300348C053802F004E924A80508F6702584430024 8C
```

```
%4E649800042D0053802F00300348C02F004E924A80508F67025044300248C052802F00300348C
%4E64E800042D202F004E924A80508F67040644001030024 8C053802F00300348C052802F004E9
%4E656800042D404A80508F67040644002030024 8C02F00300348C052802F004E924A80508F670
%4E63C800042D600644004030024 8C052802F0030034 8C052802F004E924A80508F67040644008
%4E675800042D8030044 8C04CDF041C4E752F0A247C0000025A207C009049364A7900904 862660
%4E64B800042DA000E07001B0790090400467000D470FFB0790090496 8670000C84A10660000C
%4E629800042DC04A280001660000BA4A280002660000B24A280003660000AA4879000000004EB
%4E64E800042DE000048064487900008000487900009FBC4878000C487800054E9248790000800
%4E66D800042E004 87900009FD0487 8000D487800054E9248790000800048790000 9FE44878000
%4E665800042E204B7800054E9248790000800048790000 9FF84878000F487800054E924879000
%4E655800042E4080004 8790000A00C4878001048780005 4E9248790000800048790000 9FBC487
%4E664800042E6000114 87800054E92487900000424EB90004806433FC0001009049BC4FEF006
%4E665800042E80245F4E7548E73038247C00904018267C0000025A287C00904016424270 08B07
%4E641800042EA000904004640000 8A4A790090496C66000080740148780034EB9000404BA564
%4E624800042EC033C00090496C321233C1009040007000300 12F004EB900040956301452 40D15
%4E632800042EE00C5200A2508F631E301204400 0A2064000985340348 00C520098660A3014524
%4E61A800042F00024000033880 4EB90004BEC05380D040207C00009E1030300000524033C0009
%4E6C1800042F20484C2F3CFFFFFFFF4EB9000430AC588F207C00905000424142433 0FC8000524
%4E693800042F40701DB0436EF47046D1C05241701EB0416EE64879000000DE4EB9000480644A4
%4E65A800042F60588F670000AA4879000080004879000009D864878000548780001 4EB90000026
%4E64C800042F802F3C00008400487900009D94487 8000B487800054E9348790000800048780 00
%4E66F800042FA0487800027000303900904 84C80FC003C02800000FFFF2F004878000B4878000
%4E664800042FC04EB9000002602F3C00008400487900009DA84878000C487800054E932F3C000
%4E699800042FE0BC0048790000 9DBE4878000E487800074E932F3C00008C0048790000 9DD0487
%4E65D800043000000F487800054E934FEF0068603C4879000080004879000009FAC4EB90000020
%4E6FF800043020487900008000487800014878000370003039009040042F0048780009 4878001
%4E676800043040 4EB9000002724FEF00202F39009049C04EB9000415CE4EB90004AA387000303
%4E644800043060009 04AA602800000400588F660A33FC00B400904B14600833FC009600904B1
%4E677800043080 4CDF1C0C4E752F02207C00905000424242414258524 1701DB0416EF67046D1C
%4E66F8000430A05242701EB0426EE8241F4E7548E73C38302F0022247C00000142287C0090485
%4E620800043 0C0267C0000025A3A0032054A406C000178207C00905000424338037 41D7005B04
%4E634800043 0E066064244064304007 21C425853414A416CF8720C3003064080003 0C053414A4
%4E674800043 1006CF27215425853414A416CF8524453424A426CC80C79009800904000 64122F3
%4E658800043 12000009400487900009F404E92508F601048790000800048790000 9EBE4E92508
%4E620800043 1404879000080004879000 9F1A4E927000303900904AA602800000400508F670
%4E66E800043 160000B4A546C0000DC4879000080004879000 9EF24E924A790090484E508F671
%4E66E800043 1804879000080004879000 9ECC4E92508F601048790000800048790000 9EDE4E9
%4E661800043 1A0508F4A790090484E670E7200323900904AA6701FC2806002721F48790000800
%4E62E800043 1C04878001 4878000 4D281207C0000A21E7000303018002F004878001A4878001
%4E63E800043 1E04EB9000002604A790090484E4FEF00186750700030390090 4AA602800000030
%4E644800043 200E08052803 2003A017001B0416C342F3C00008400487900009EAC4E922F3C000
%4E650800043 2208400487800014878000130054 8C02F004878001B4878001F4EB9000002604FE
%4E61E800043 2400020424572033401600002E6300248C05280ED802200E580D081D0800680009
%4E63C800043 260503A22403002D040207C00009E0838300000720476 0C32C453434A436CF8706
%4E65D800043 280D3C053414A416CEC300448C02F003002E540207C00009F9C2F3000004E92300
%4E666800043 2A048C02F004EB9000435E2300248C02F004EB9000436 3C00248C02F004EB9000
%4E626800043 2C037263602C7FC00055043300220 7C009049360C30000400004FEF00146612300
%4E661800043 2E048C02F004EB900047ED2588F6000024030024 8C0D080207C009048644A70080
%4E608800043 300660000764A546D000070300220 7C009049360C3000020000665E3002D040207
%4E61E800043 32000904A3C30300000B0790090400467484879000080004879000009EA2300348C
%4E63B800043 3402F004B7B001E4E93300448C02F004878001487800037200323900904A702F0
%4E64C800043 36030034 8C02F004878002 74EB9000002604FEF0028600001B830024 8C0D080207
%4E63E800043 380009048644A7008006646 4A546D423002E540207C009048D64AB000006632320
%4E64F800043 3A0D241207C00904AA870FFB0701000672048790000800048790000 9E94300348C
%4E64B800043 3C02F004B7B001D4E934FEF001060000160300 2E540207C009048D64AB00000670
%4E63E800043 3E0000870FDB054663A4A790090484E673270003039009 04AA602800000400660
%4E64E800043 400012E4879000080004879000009E86300348C02F004878001D4E934FEF001060C
%4E618800043 420010E300248C0D080207C009048644A7008006612300 2207C009049360C3000C
%4E637800043 440000066000000A70FDB0546600009C4A790090484E670000927000303900904AA
%4E6FE800043 460028000000300E0803800524430 02D040207C00904A34987000006F00006C70C
```

```
%4E6858000434B0B0446C1E2F3C00009C004B7900009E7830034BC02F004B7B001D4E934FEF001
%4E6878000434A0601C2F3C00009C00487900009E6A30034BC02F004B78001D4E934FEF00102F3
%4E6298000434C000009C00487B000148 7B000130044BC02F00300348C02F00487B00234EB9000
%4E63F8000434E002604FEF001B604630024BC0D080207C009048644A700B0066123002207C009
%4E6368000435004936 0C300002000066000000870FDB054661C2F3C00009C00487900009E5C300
%4E6D18000435204BC02F004B78001D4E934FEF0010 5342B4456C00FD184CDF1C3C4E7570FEB07
%4E61D8000435400090485267000 09A70FFB0790090485267000 08E3239009040060241000330 0
%4E60D8000435602 07C009049360C300004000067000723001E540207C009048D64AB000006 70
%4E6E4800043580006008390002009040076720300120 7C009049D00830000000006710300148C
%4E6198000435A02F004EB9000435E2588F60343001207C009049D00830000100006600001630 0
%4E66A8000435C0E540207C009048D60CB0000000C800006C0E300148C02F004EB9000436 3C588
%4E63D8000435E04E752F02342F000A3002D040207C00009E083030000048C02F004B7800014 87
%4E6498000436000007 3002E540207C009048EE2F300000300248C0C1FC00055E802F004B78001
%4E655B000436204EB900000260300220 7C009049D0023000FE00004FEF0018241F4E7548E7380
%4E62AB000436 40342F001236 02C7FC00055E433002D040207C00009E0838300000300348C0538
%4E6298000436 60ED80D0800680009 0503E22403202D241207C00904B087001B0701000641E300
%4E6148000436 80D040207C00904B083030000006400030064060003 2C032BC8078600432C4328
%4E64B8000436A03002D040207C00904AA83030000048C0720FC08172088 2806F283202D241207
%4E65C8000436C000904AA870FFB0701000671630024 8C0D080207C009048644A700800670438 3
%4E6288000436E08000320448C12F014878000148 7800053002E540207C009048D62F300000320
%4E6408000437004 8C12F014878002 54EB900000260300220 7C009049D0023000FD00004FEF001
%4E6888000437204CDF001C4E7548E73E00362F001A70FDB0790090485267000 0DA42453003E54
%4E6278000437 40207C00009DE622700000320320 7C009048EA700010301000B0456308524532F
%4E6508000437 6098A160E630054BC0720C3803207C009048E6740014304000928 2B0816C12524
%4E65D8000437 803003D040207C00009E0832F0000060D4700CB0456F08524532FCB8A360F2300
%4E63E8000437A0E540207C00009DE62C3000000486000001 8022463003 48C0D080207C00904AF
%4E6E4800043 7C0323008003003D040207C00009E0836300000424530001E2403200080100006 71
%4E6178000437E03005D040207C00009DFC3430000060023403300520 7C00009DF61030000048B
%4E67E8000438 0048C0D0802040D1C9308252457006B0456EC24CDF007C4E75206F000442404A1
%4E6498000438 2067045240 60F848C04E752F02322F000A302F000E3400024200 1F30014BC0721
%4E6098000438 40C081EB80D4407020B0426304700060383002D040207C00902000303000000C4
%4E6678000438 609D1B6404700060200C409D3C6404700160160C409D7C6404700260 0C0C409DA
%4E6648000438 8062047003600270 00241F4E7548E73038247C009049D4267C00008BD42B7C009
%4E60D800043BA049E442433003D040204A3430000067000230300 3D040204C303000004BC0C1B
%4E66A800043BC0B2FC0000C1896D000218C189B2FC0003C1896E00020C22402009224 0D3C0200
%4E6FC800043BE0303B00064EFB000200080088010401843203D241204A0442002031821000702
%4E6DC800043900B042630E3003D040204A4270000060000 1D03002D040207C00902000303000 0
%4E6798000439 2032000C409D7C65140C419DAC620E700030022F004E93588F600001A60C419D1
%4E6328000439 4065200C419D38621A700030022F004E933003D040204C31BC00030000588F600
%4E6E1800043960018030 03D040204A4270000060000 1723203D241204A5242318210000C42040
%4E6D4800043980650E3003D040204A4270000060000 1523002D040207C00902000303000000320
%4E68AB000439A00C409D3C65140C419D6E620E700030022F004E93588F60000128 0C419D18651
%4E625B000439C00C419D38621870003 0022F004E933003D040204C42700000588F60000104300
%4E6FFB000439E0D040204A4270000060000 0F63203D241204A0642002031821000C420400650
%4E6CDB00043A003003D040204A4270000060000 0D43002D040207C00902000303000000320000C4
%4E686B00043A209D7C65140C419DAC620E700030022F004E93588F600000AA0C419D1865200C4
%4E625B00043A409D38621A700030022F004E933003D040204C31BC00010000588F60000084300
%4E6F6B00043A60D040204A4270000060000 0763203D241204A5342318210007020B0426 30C300
%4E6FC800043A80D040204A4270000060563002D040207C00902000303000000320000C409D3C651
%4E693800043AA00C419D6E620C700030022F004E93588F602E0C419D18651E0C419D38621870 0
%4E61F800043AC030022F004E933003D040204C31BC00020000588F600A3003D040204A4270000
%4E66E800043AE05243700 8B0436200FDBC4CDF1C0C4E7548E730007401424370003032F00700
%4E60A800043B0030022F004EB90004382A3200508F671C700030012F00700030032F007000300
%4E6818000 43B202F004EB900043C284FEF000C52437020B04362C452427020B04262BA4CDF000
%4E64C800043B404E7548E73030362F0016342F001A267C0004382A247C00043C280243001F024
%4E62D800043B60001F30024BC053802F00300348C02F004E933200508F671A700030012F00300
%4E6678000 43B804BC053802F00300348C02F004E924FEF000C300248C052802F0030034 8C02F0
%4E6688000 43BA04E933200508F671A700030012F00300248C052802F0030034 8C02F004E924FE
%4E62FB000 43BC0000C300248C02F00300348C053802F004E933200508F671A700030012F00300
%4E66DB000 43BE048C02F00300348C053802F004E924FEF000C300248C02F00300348C052802F0
```

```
%4E65FB00043C004E933200508F671A700030012F0030024BC02F0030034BC0[illegible]4FE
%4E662800043C20000C4CDF0C0C4E7548E73020342F0012362F0016322F001A247C0004382A024
%4E632800043C40001F0243001F7002B041665E700030032F00700030025380 2F004E924A80508
%4E61B800043C606600001870030032F00700030025280 2F004E924A80508F6718700030032F0
%4E62D800043CB0700030022F004EB900043E12508F6000017C700030032F00700030022F004EB
%4E62D800043CA000043F0C508F600001647003B041665E700030035380 2F00700030022F004E9
%4E63C800043CC04A80508F6600001870030035280 2F00700030022F004E924A8050BF6718700
%4E609800043CE030032F00700030022F004EB900043E12508F6000011870030032F007000300
%4E61C800043D002F004EB900044080508F6000010070003003 2F00700030025380 2F004E924A8
%4E626800043D20508F6600001870003003 2F00700030025280 2F004E924A80508F67487000300
%4E60F800043D4053802F00700030022F004E924A80508F6600003270030035280 2F007000300
%4E63E800043D602F004E924A80508F6600001A700030032F00700030022F004EB900044080508
%4E610800043D806000008A7000300353802F00700030022F004E924A80508F660000187000300
%4E62C800043DA052802F00700030022F004E924A80508F6746700030032F007000300253802F0
%4E643800043DC04E924A80508F6600003070030032F007000300252802F004E924A80508F660
%4E61A800043DE00018700030032F00700030022F004EB900043F0C508F6014700030032F00700
%4E691800043E0030022F004EB900043E12508F4CDF040C4E7548E73E20342F001E362F0022247
%4E611800043E200004382A0242001F0243001F4246700030032F007000300253802F004E924A8
%4E63A800043E4050BF67027C017000300352802F00700030022F004E924A80508F67025446700
%4E628800043E6030032F007000300252802F004E924A80508F67025846700030035380 2F00700
%4E65E800043E8030022F004E924A80508F670250463A02EB4DDA433205D241207C00902000300
%4E61E800043EA0D040227C0000A02031B100001000380 5D844207C009028003203700BE169318
%4E61D800043EC040003605D643207C009030003202700BE1690A41F8000641000931813000360
%4E636800043EE0D643207C009040463005D040227C009040463231000002410 3FF3406700AE16
%4E676800043F00D242318130004CDF047C4E7548E73E20342F001E362F0022247C000426CB024
%4E65A800043F20001F0243001F300348C053802F00300248C02F004E924A80508F66047A06604
%4E650800043F4030034 8C055802F00300248C02F004E924A80508F6734300348C053802F00300
%4E676800043F6048C053802F004E924A80508F661C300348C053802F00300248C052802F004E9
%4E666800043F804A80508F66047A0360024245300348C052802F00300248C02F004E924A8050E
%4E661800043FA066045445604830034 8C054802F00300248C02F004E924A80508F6732300348C
%4E660800043FC052802F00300248C052802F004E924A80508F661A300348C052802F00300248C
%4E66F800043FE053802F004E924A80508F660252453C02EB46DC433206D241227C00902000300
%4E601800044000D040207C0000A04033B000001000380 6D844227C009028003003720BE36032C
%4E601800044020D241207C0000A05290701000338040003606D643227C009030003005D040207
%4E60B800044040000A06430300000720BE3620A42F800D04233803000320 6D241227C0090404
%4E625800044060300 6D040207C009040463030000002400 3FF06402800338010004CDF047C4E7
%4E642800044080 48E73E20342F001E362F0022247C000426CB0242001F0243001F300348C02FC
%4E65A8000440A0300248C053802F004E924A80508F66047A06604C300348C02F00300248C055E
%4E674800044 0C02F004E924A80508F6734300348C053802F00300248C053802F004E924A8050E
%4E6558000440E0661C300348C052802F00300248C053802F004E924A80508F66047A036002424
%4E647800044100300348C02F00300248C052802F004E924A80508F66045445604830034 8C02FC
%4E646800044120300248C054802F004E924A80508F6732300348C052802F00300248C052802FC
%4E66C8000441404E924A80508F661A300348C053802F00300248C052802F004E924A80508F66C
%4E629800044160245 3C02EB46DC433206D241207C009020003005D040227C0000A07631B100C
%4E613800044180100003806DB44207C009028003003720BE360318040003606D643207C0090 30C
%4E61E8000441A03005D040227C0000A09A303100003202740BE5610A41F8003405D442227C00C
%4E6188000441C0A08892712000D041318030003206D241207C009040463006D040227C0090404
%4E68F8000441E030310000024003FF06401400318010004CDF047C4E754E56FFFA48E73F3C342
%4E667800044200000A362E000E3C2E00122 87C0090493A2D7C00903800FFFC267C009020004A4
%4E645800044220660E300648C0320248C1D0816000025E426EFFFA60000248 7001B0436700001
%4E634800044240703 9B0436700000870 38B043665E3002D040204B31BC8000000003802D844207
%4E606800044260009028003002720BE36090790000C5AE318040003202D241207C00903000300
%4E654800044280 48C00280000003E00A80000003E0ED8031801000380 2D8442A6EFFFC204D30C
%4E6208000442A0720AE360318040006000 01CE703AB0436700002070 3BB0436700001870 06B04
%4E6118000442C0670000107007B0436700008700 8BB043665E3002D040204B31BC8001000038C
%4E6388000442E0D844207C009028003002720BE36090790000C5AE318040003202D241207C009
%4E63C8000443003000300248C00280000003E00A80000003E0ED8031801000380 2D8442A6EFFF
%4E61F800044320204D3003720AE360318040006000014A7005B0436624 4A790090493C6712700
%4E65A8000443403039009049 3C2F004EB900008BD4588F33C20090493C60000120702BB043662
%4E6658000443603802DB44244B487800034EB9000404BAD080207C0000CBE235B00800400058E
```

```
%4E630800044380601832 02D241204B300348C0D080247C0000C53431B2080010003A02DA45207
%4E6228000443A00090280032 0348C1247C0000C66070001032 1B003802720BE364D044320348C
%4E63D8000443C0D281227C0000C5AC907118003180500038 02D844207C00903000320348C1247
%4E6098000443E00000C62470001032 1800320248C10281000003E00A81000003E0ED81D04131E
%4E6558000444004000380 2D8442A6EFFFC204D3003720AE360318040003202EA415241D241704
%4E6538000444 20B0416E02723F4A416D2A300148C0D0802E00068700905FB020474A50661630C
%4E6368000444404BC05341D0802E00068700905FB02047308260D23002D040207C00904046315
%4E6918000444600000 4A5467103214D2412A6EFFFC204D3002D17010003882524 2526EFFFA3E2
%4E6FC800044480FFFABE466D00FDB2300248C04CDF3CFC4E5E4E7548E73F30362F0026342F002
%4E66C8000444A03A2F002E247C0000C5AC267C0090493C7005B042661E4A53670E700030132FC
%4E6658000444C04EB90000BBD4588F368352433 00348C0600001EE4A42660A5243300348C060C
%4E6248000444E001E03C0342473647600001CA7001B0426700001270 39B0426700000A7038B04
%4E6198000445006600007030064 8C02F004EB900008BD43006D040207C0090200031BC800000C
%4E6238000445203806D844207C00902800320670 0BE161926A00023181400032 06D241207C009
%4E60F8000445403000300648C00280000003E00A80000002E0ED80318010003806D844207C009
%4E6228000445603800320270 0AE161318140005 88F6000013E703AB0426700002270 3BB04267C
%4E6098000445800 01A7006B0426700001270 07B0426700000A7008B0426600007030064 8C02FC
%4E6358000445A04EB90000BBD43006D040207C0090200031BC800100003806DB44207C009028C
%4E6058000445C03206700BE161926A00023181400032 06D241207C00903000300648C00280000C
%4E6318000445E003E00A80000003E0ED80318010003806D844207C00903800320270 0AE16131E
%4E65C8000446004000588F600000A8702BB042661A487800034EB9000404BAD080207C0000CBE
%4E6278000446203270080058 8F601030024 8C0D080207C0000C53432700800 42A7300248C02FC
%4E6F78000446403202 48C1207C0000C62470001030 1800320648C10281000003E00A81000003E
%4E6578000446 60ED81D0812F00320648C1700BE1A1300248C0207C0000C66078001B300B00D2E
%4E6508000446803002 48C0D080204A3030080048C092802F0130094 8C02F0030064 8C02F004EE
%4E6728000446A000008A8433C30090493A4FEF001804460020524BB6C56D00FE34524330034 8C
%4E6A98000446C04CDF0CFC4E7548E73E38342F0026362F002A247C00902000267C0004289828
%4E61E8000446E0009038003A02EA453C020246001F4A43660000B43002D040204A0C708000000
%4E6018000447006740300 2D040204A0C7080010000673230 02D040204A4A7000006726300248C
%4E66F8000447202F004EB900008BD430064 8C02F00300548C02F004EB900043B424FEF000C60C
%4E6E0800044740035630 02D040204A0C708000000067000012300 2D040204A0C7080010000660
%4E60B8000447600336302D643204A3002D040224C4241338100003802DB44227C00903000300
%4E60F8000447803380400032 02D241227C00902800338010003180300042A7300248C02F004E9
%4E6158000447A0508F600002F27001B0436700001270 38B0436700000A7039B0436600000C030C
%4E6188000447C0D040204A0C7080000000673C3002D040204A0C7080010000672E3002D040204
%4E6648000447E04A7000006722300248C02F004EB900008BD4300648C02F00300548C02F004EI
%4E6268000448000043B424FEF000C3002D040204A31BC800000003802DB44207C00902800320
%4E6308000448207003E161300348C0D080227C0000C5AC927108003181400032 02D241207C009
%4E6068000448403000300248C00280000003E00A80000003E0ED80318010003802D844204C320
%4E6408000448607 00AE161318140003 0348C02F00300248C02F004E93508F6000021C703AB04
%4E60F8000448806700002270 3BB0436700001A7006B0436700001270 07B0436700000A7008B04
%4E6138000448A0660000B63002D040204A0C7080000000673C3002D040204A0C7080010000672
%4E63A8000448C03002D040204A4A7000006722300248C02F004EB900008BD4300648C02F00300
%4E66A8000448E048C02F004EB900043B424FEF000C3002D040204A31BC800100003802DB44207
%4E6098000449000090280032 02700BE161927900000C5AE31814000320 2D241207C00903000300
%4E6248000449204 8C00280000003E00A80000003E0ED80318010003802DB44204C3203700AE16
%4E6218000449403181400030034 8C02F00300248C02F004E93508F600001403002D040204A0C7
%4E6EF8000449608000000067000010300 2D040204A0C7080010000662230 02D040204A3802D84
%4E6418000449802 24C4241338140003181000042A7300248C02F004E93508F7005B04366204A7
%4E67A8000449A00090493C6712700030390090493C2F004EB900008BD4588F33C20090493C424
%4E60D8000449C0300348C02F00320348C1227C0000C62470001031180032 0248C10281000003E
%4E6548000449E00A81000003E0ED81D0812F00320248C1700BE1A1300348C0207C0000C66078C
%4E6398000044A0018300800D284300348C0D080207C0000C5AC3030080048C092802F01300348C
%4E63B800044A20D080207C0000C53430300 80048C02F00300248C02F004EB900008A847003B04
%4E687800044A404FEF0018661C4878000230064 8C02F00300548C02F004EB900043C284FEF00C
%4E668800044A6060207004B043661A4878000330064 8C02F00300548C02F004EB900043C284FE
%4E691800044A80000C300648C02F00300548C02F004EB900043B42508F4CDF1C7C4E7548E730C
%4E608800044AA042423002D040207C00904A4C3030000036007201B24066163002E540207C00C
%4E63D800044AC0A2E62F3000004EB90004806458 8F700030390090400672 07C0816700000870C
%4E65D800044AE0B04366367004B04366163002E540207C0000A2F62F3000004EB90004806458
```

Appendix C - MAIN LOOP GAME PROGRAM
©1985 ATARI GAMES, CORP.

```
%4E611800044B004A4367163202D241207C00904A4C3003E340024000073180100052427004B042
%4E6DF800044B206E804CDF000C4E754E56FFFE48E73E3C267C009048D6287C00904862283C009C
%4E62D800044B404BEA700030390090400672 3FC0816600008442433003E540204B4AB000006 70C
%4E62C800044B60006C3003207C009049360C300001000065A300348C0D080207C009048644A7C
%4E6FD800044B8008006748 3003E540204B53B000003003207C009049D00030000200003003E54C
%4E658800044BA0204B0CB0000000C800006C204878000432 0348C12F014EB90004AFF6320348C1
%4E688800044BC02F014EB9000467DC4FEF000C52437004B0436EB0424542433003 48C0D080207C
%4E646800044BE000904B643C3008006700049C3003D040207C009049F84A7000006D0E3003D04C
%4E62F800044C00207C009049F8537000003003E540204B4AB00000660003F67A0130032A44204D
%4E61C800044C204A300000660000 6A42A74878001B720012390000C63F3006D040247C00903 00C
%4E624800044C4074003432000002820000FF80D2822F0174001439 0000C67B3006D040207C009C
%4E62D800044C6028007200323000000 2810000FF80D4812F0230390000C56A48C02F00300648CC
%4E63D800044C802F004EB900008A844FEF001860000B030032A44204D0C300001000066082 03C
%4E647800044CA000000AFC6006203C00001D763D40FFFE30032A44204D0C300001000066047009
%4E6D4800044CC06002701132403003 2A44204D0C300001000066047000600620 3C000002003 04C
%4E60F800044CE032032A44244D700010321000 2F00487800353406 48C20282000003E00AB2000C
%4E661800044D0003E0ED82300948C0D4802F02320648C1700BE1A170001039000 0C695D2803008
%4E6A2800044D2048C092802F01302EFFFE48C02F00300648C02F004EB900008AB44FEF00183203
%4E664800044D404BC12F01340648C22F024EB900045FBA300348C05280D040207C009020004A7C
%4E63C800044D600000508F6720320348C12F014EB900008E90300348C05280D040207C00902 00C
%4E631800044D8042700000588F300348C07219D081D040207C009020004A700000672632 0348C1
%4E648800044DA0741BD2822F014EB900008E90300348C07219D081D040207C00902000427 000C
%4E622800044DC0588F30032A44204D423000003003207C009048E6423000003003207C00904936
%4E62F800044DE0423000003003 48C0D080207C009048644270080030 03D040207C00904B0831BC
%4E659800044E000001000030 03D040207C00904AA831BCFFFF0000300348C0D080207C00904AFE
%4E630800044E2042700800300348C0D080207C00904B0042700800300348C0D080207C00904AFC
%4E673800044E4042700800300348C0D080207C00904BD631BCFFFF0800353470 03B0546612083 9
%4E642800044E600006009048566608003900200009048560C7900980090400065 0E4A54660A33F9
%4E622800044E8000904A7200904000700 8B0790090400462 0E4A54660A33F900904000009040 1C
%4E624800044EA03403E542247C00904A243203D241207C00904A3470003030 10002F003003E54C
%4E650800044EC0207C00904BEE2F3000004EB900040406258020004A93508F660000604AAB0004
%4E6B6800044EE066584AAB000866524AAB000C664C5279009049BE0C7907D0009049BE6F3C700C
%4E61B800044F00303900904AA602800000200067260079800000904AA6700030390090 4AA62F0C
%4E652800044F204878000C4EB9000001C0700123C000904012508F4279009049BE3203D241247C
%4E646800044F4000904A3470003032 10002F00340348C22F024EB90000019C320348C12F014EB9
%4E652800044F60000478AE320348C12F014EB9000430AC3003D040247C0000A2AE3032000048CC
%4E690800044F802F004EB9000404BAE5803203E541207C0000A29ED0B01000588F2A402F154EB9
%4E65F800044FA000048064300 3E540247C0000A2B62F3200004EB9000480644A544FEF00186618
%4E679800044FC04A7900904B24670E33FC000100904B244EB90004B5FC7001B0790090400466 0A
%4E69D800044FE033FC025800904968600E33FC04B0009049684EB900042D8AB67900904B66660C
%4E61A8000450000064EB90004C34A6000007C3003E540204B0CB0000000C800006C00006A320C
%4E630800045020D241207C00904AA83003D040247C00904AA830320000524002407FFF3180100C
%4E60D800045040300 3E540204B22300000EA813001D040247C0000A0AC3032000048C03203D241
%4E64B800045060207C00904AA8343010004 8C2C08266163003E540247C0000A2C62F3200004EB9
%4E65C800045080000480 64588F52437004B0436E00FB4A4A45674E42433003E540204B4AB00000C
%4E62F8000450A067383203D241207C00904B0870003030100032144 8C1D281B081651E7001B054
%4E6218000450C06D04720160063214 48C1D2813003D040207C00904B0831810000524370 04B043
%4E67A8000450E066B44CDF3C7C4E5E4E752F02342F000A223C000001EB300248C00280000003EC
%4E6628000451000A80000003E0E2809280706C92802F01320248C1701FC280E9815981706892 8C
%4E6BD8000451202F014EB9000454D4508F241F4E754E56FFF648E73F38267C00904856247C009C
%4E6308000451404864227C009048624A516700038008130005670 83A3C80013C0560044245 3C05
%4E6F0800045160 3D7C7FFFFFFC3D6EFFFCFFFA3639009040080443009838030644 02003D7C027C
%4E64B800045180FFF83E2EFFF89E790090400A3D47FFF83D6EFFF8FFF6046E0200FFF64247384 7
%4E65A8000451A0300C48C0D080204A4A700800670000DA300C48C0D080207C00904BD64A700800
%4E6DD8000451C06D3A300C48C0D080207C00904BE03D700800FFFE322EFFFE48C1701FC280E98
%4E64E8000451E0340159423 22EFFFE48C10281000003E00A81000003E0E2B130016034300C48C
%4E61D800045200D080204A30300800D040207C00902800343000 00EE4A300C48C0D080204A303C
%4E6178000452200800D040207C00903000030300000EE48B4436C06064202006008B4446D04044 2
%4E66D8000452400200B06EFFF66C06064002006 00AB06EFFF86D0404400200081300056726BA4 2
%4E61B8000452606C023A02BC406C023C003E2EFFFCBE426F043D42FFFC3E2EFFFABE406F0A3D4C
```

Appendix C - MAIN LOOP GAME PROGRAM
©1985 ATARI GAMES, CORP. - Page 11 of 35

```
%4E6B3800045280FFFA6004DA42DC40524C7204B24C6E00FF100813000567223 22EFFFC48C13005
%4E6938000452A048C0D280E2813A01322EFFFA48C1300648C0D280E2813C016014300548C081D1
%4E6618000452C048C03A00300648C081D148C03C00303C01E890463C00300548C02F004EB90004
%4E6518000452E055603A00300648C02F004EB9000455923C0008130006508F660001BE42473847
%4E68A800045300300C48C0D080204A3D700800FFFE6700019E360551433803064400E0302EFFFE
%4E61B800045320D040207C00902800343000 00EE4A300248C0320348C1048100000090B0816C06
%4E6028000453400642020060163002 48C0320448C1068100000090B0816D0404420200B4436D0C
%4E6728000453600006B4446F063A390090400836065143380306440 0EB343C01E8302EFFFED04C
%4E61F800045380207C00903000303000000EE489440300248C0320348C104B10000008CB0816C06
%4E6138000453A00642020060163002 48C0320448C106810000008CB0816D0404420200B4436D0C
%4E65B8000453C00006B4446F063C390090400A300C48C0D080207C00904BD64A7008006D0000DC
%4E6A08000453E03605514338030644 00E0300C48C0D080207C00904BE03D700800FFFE322EFFFE
%4E63BB000454004BC1701FC280E9813401594230024 8C0320348C1048100000090B0816C060642
%4E6FB800045420020060163002 48C032044 8C106810000090B0816D0404420200B4436D000006
%4E68080004544 0B4446F063A390090400836065143380306440 0E8343C01E8322EFFFE48C10281
%4E6098000454600000003E00AB1000003E0E2813001944030024 8C032034BC104B1000008CB081
%4E6178000454806C06064202006016300248C0320448C106810000008CB0816D0404420200B443
%4E6708000454A06D000006B4446F063C390090400A524C7204B24C6E00FE4A300648C02F00320
%4E6C88000454C048C12F014EB9000454D4508F4CDF1CFC4E5E4E752F02322F000A342F000E0B3
%4E6248000454E00003009048566614700 5B0416F047205600A0C4101246F04323C01240839000
%4E62B800045500009048566614700 1B0426F047401600A0C4201186F04343C011B3001024001FF
%4E62B800045520 33C00090400830020240 01FF33C00090400A3039009040084 8C05180EF8033C
%4E65E800045540 00904A6C203C000001083239009040 0A48C19081EF8033C000904A6E241F4E75
%4E61C800045560 2F02322F000A207C00904008044100683410944170 03B0426E0632105541600
%4E64D800045580 70FDB0426D0432105441300148C0241F4E752F02322F000A207C0090400A044
%4E6398000455A0006C3410944170 03B0426E0632105541600A70FDB0426D0432105441300148C
%4E65C800045 5C0241F4E752F0242423002 48C0D080207C009048644A700800670000CC4A79009
%4E6108000455E0485266143002D040207C00904028323000000241001F601E3002E540207C009
%4E6E680004560049 4A2070000008280000000167047000600270 1C3200701CB041660000BA300
%4E6318000456202 07C00904BE64A300000675A33C200904026700030 02E5805E80D080207C000
%4E6118000456 40F14033F008000090402230022 07C00904BE6533000004B7900000264EB9000
%4E65B800045660B0643002 48C02F004EB900043726487900008000300 248C02F004EB90004AFF
%4E6678000456804FEF001060204878001030024 8C02F004EB90004AFF64879000004B4EB9000
%4E6978000456A0B0644FEF000C52427004B0426E00FF1A241F4E7548E73838247C00902000267
%4E6568000456C000904BD6287C0000BE904244300448C0D080207C0090488C4A7008006730300
%4E64B8000456E048C0D080207C0090488C53700800661E30044 8C07211D081D040204A4270000
%4E6618000457003204 48C17010D2802F014E94588F4A446600014630044 8C07219D0815830D04
%4E6018000457 20204A4A700000670001305 26B0008362B0008E243082B000000096600011C700
%4E64D800045740B0436600007E343900904BE8303900904B68D040204A33F0000000904BD4323
%4E6558000457600090 4B6848C12F014EB900008BD433C200904B683002D040204A4270000042A
%4E63C800045780487800 3F320248C10281000003E00A81000003E0ED817012D2802F01320248C
%4E6628000457A0700BE1A10481000002002F01487B1709300248C02F004EB900008A844FEF001
%4E67F8000457C0605C700BB0436618487800043239009 04BEB4BC12F014EB900046070508F603
%4E64D8000457E07010B0436614303900904B68D040204A31B900904BD4000060247016B0436C1
%4E6D58000458004878001C4E94426A003A377CFFFF00084EB90004D98C4EB90004D6A8588F700
%4E6338000458 20B0436F123003D040207C0000A25E3570000003A6022700BB0436E1C7016B04
%4E63C8000458406D1630034BC0720B9081D040207C0000A25E3570000003A30044 8C07219D08
%4E6238000458 60D040204A4A700000670000EE30044 8C0D080204B527008003630080 0E243300
%4E6368000458 048C0D080204B08300000080166 0000CA7005B0436610320448C12F014EB9000
%4E6A5800045 8A0DE90588F605E700BB0436610320448C12F014EB90004DED2588F60487010B04
%4E6868000458C06610320448C12F014EB90004E2AC588F60327016B0436C2C32044 8C17018D28
%4E6828000458E02F014E9430044 8C07219D081D040204A427000003004 48C0D080204B31BCFFF
%4E6458000459000800588F700BB0436F1E30044 8C07219D0813200D241204A3003D040227C000
%4E6478000459 20A25E31B100001000700BB0436E2A7016B0436D2430044 8C07219D0813400D44
%4E62E800045940204A30034 8C0720B9081D040227C0000A25E31B1000020003004 48C0720DD0B
%4E61E800045960D040204A323000006700011C30044 8C0D080207C009048CE527008003630080
%4E6418000459 80E24330044 8C0D080207C009048CE08300000080166 0000F00C4109246D500C4
%4E68E8000459A0095A6E4A700EB0436E2232044 8C1700CD2802F014E9430044 8C0720DD0B1D04
%4E63E8000459C0204A427000005 88F600000BC30044 8C0720DD0813200D241204A3003D040227
%4E66A8000459E00000A0BA31B1000010006000009A0C410EFC6D4E0C4110FC6E487004B0436E2
```

```
%4E653800045A00320448C1700CD2802F014E9430044BC0720DD081D040204A42700000588F6000
%4E611800045A20006630044BC0720DD0813200D241204A3003D040227C0000A0D631B100001000
%4E661800045A4060447004B0436E20320448C1700CD2802F014E9430044BC0720DD081D040204A
%4E646800045A604270000058BF601E30044BC0720DD0813200D241204A3003D040227C0000A0DE
%4E6CD800045AB031B100001000524470048B0446E00FC3E4CDF1C1C4E754E56FFFE48E73E38267C
%4E631800045AA00090300024 7C00902800287C00902000424430044BC0D080207C0090487C4A70
%4E64A800045AC008006710300448C0D080207C0090487C537008005244700 8B0446ED642443004
%4E62B800045AE048C0528032003C013001D040204C4A700000670003E230044BC0D080207C0090
%4E627800045B0048943630080070 08B0446E0000243004D040207C00904A544A7000006D483204
%4E652800045B20D241207C00904A547006B07010006F36320448C12F01340348C22F024EB90004
%4E6DC800045B4007123D40FFFE508F6D1C320448C12F01342EFFFE48C22F024EB90004BC804A8C
%4E615800045B60508F660004447000303900904006320448C1B380080000006600 00CE3004D04C
%4E642800045B80207C00904A54537000003D700000FFFE6C203004D040207C0000A2063204D241
%4E6A7800045BA0227C00904A543D700000FFFE33AEFFFE10007004B0446F3E3606D643204C3004
%4E6B7800045BC048C0E98032044BC1D281227C0090491E3231180048C1E381342EFFFE48C2D282
%4E669800045BE0740FC282D081D080227C0000C6DC31B108003000605270 08B0446F323406D442
%4E68B800045C00204C300448C0D080227C0090491E303108004BC0E380322EFFFE48C1D081D08C
%4E65B800045C20227C0000C4D231B108002000601A3206D241204C302EFFFE48C0D080227C000C
%4E62E800045C40C4F231B108001000300 6D040204A3A3000009A7900904A6C3006D040204B343C
%4E63A800045C600000947900904A6E0C4574006200000080C4278006330320448C12F014EB9000C
%4E604800045C808E903006D040204C427000003006D040204A427000003006D040204B4270000C
%4E647800045CA0588F600003047008B0446E543004D040207C00904A544A7000006644320448C1
%4E66A800045CC02F0134064 8C22F024EB900046116320448C12F014EB900008E903006D040204C
%4E617800045CE0427000003006D040204A427000003006D040204B427000004FEF000C600002AA
%4E6BD800045D00300448C0D080207C0090491E3D700800FFFE7004B0446F603404E742D46EFFFE
%4E621800045D20300448C0D080207C00904AF8083000030801670406420028320 6D241204A3002
%4E621800045D40D040227C0000A0E630310000D17010003A301000EE4D3206D241204B3002D04C
%4E613800045D60227C0000A17630310000D1701000343010 00EE4A600001007008B0446F543606
%4E660800045D80D643204A322EFFFE48C17420D2823001D040227C0000A0E630310000D170300C
%4E68D800045DA03A303000EE4D3606D643204B322EFFFE48C17420D2823001D040227C0000A176
%4E619800045DC030310000D1703000343030 00EE4A600000A636045143300348C0D080207C009C
%4E637800045DE04A96320348C1D281227C00904A8632311800D3700800303008 0048C002800000C
%4E63F800045E00FF803206D241204A740034301000727FC481D0823206D241204A3A003185100C
%4E672800045E203005EE483A00300348C0D080207C00904A9E320348C1D281227C00904A8E3231
%4E61E800045E401800D3700800303008 0048C002800000FF803206D241204B740034301000727F
%4E62A800045E60C481D0823206D241204B3400318210003002EE4834007000300550 80E8803600
%4E608800045E800243001F72003202508102810 00001F00A81000001F0E3813001D640300448C0
%4E66E800045EA0D080207C00904894B6700800670000FA320448C12F014EB900008E90320448C1
%4E680800045EC02F0134034 8C22F024EB900008DC84FEF000C600000D47004B0446F0000CC3004
%4E635800045EE048C0D080207C009048644A700800670000B83004207C009049360C3000080000
%4E61C800045F00670000A64A7900904852661030 04D040207C0090485A303000006014 3004E54C
%4E602800045F20207C0090494A227000003011024000F30800000166000072300448C0D080207C
%4E634800045F4000904AF04A700800665E3004D040207C0090490E4A700000670000223004 48C0
%4E621800045F60D080207C0000C04032300B003004D040227C00904916B27100006C2C3004D04C
%4E654800045F80207C00904916427000003004D040207C0090490E31BCFFFF00003004D040207C
%4E6B3800045FA00090490642700000524470 0CB0446E00FB2E4CDF1C7C4E5E4E7548E73800362F
%4E608800045FC00012342F00163802064400 0D3004D040207C009020004A700000671230024 8C0
%4E656800045FE0720CD0812F004EB900008E90588F3004D040207C0090200031BC092400003204
%4E6F2800046000D241207C00902800300 3D040227C00902800303100000240FF8052403180100C
%4E6E4800046020320 4D241207C00903000300 3D040227C00903000303100000240FF8006400012
%4E6358000460403180100030024 8C02F0032034 8C12F014EB900008D863002 48C0D080207C009C
%4E6AB8000460604 8CE31BCFFFF0800508F4CDF001C4E7548E73800362F0012342F00163802064
%4E6158000460800019 3004D040207C009020004A700000671230024 8C07218D0812F004EB9000C
%4E62B8000460A08E90588F3004D040207C0090200031B90000A25E00003204D241207C00902 80C
%4E6FD8000460C03003D040227C00902800303100000240FF8052403180100 03204D241207C009C
%4E6DF8000460E030003003D040227C00903000303100000240FF8006400012318010003002 48C0
%4E6A58000461002F00320348C12F014EB900008DBA508F4CDF001C4E7548E73C38342F0022382F
%4E6F38000461200026247C00902800267C00903000287C009020003A0402450003064500 0D300S
%4E668800046140D040204C4A700000671030054 8C053802F004EB900008E90588F7208B2446F0E
%4E650800046160 3005D040204C31BC0EFC0000600C3005D040204C31BC1C5C00000C4204006D5C
```

Appendix C - MAIN LOOP GAME PROGRAM
©1985 ATARI GAMES, CORP. - Page 13 of 35

```
%4E601800046180044204007220B2426F060642002060 0A0C4204006F0404420020 3205D241204A
%4E607800046 1A0300448C05280D040224A303100000240FF805240318010003205D241204B3004
%4E616800046 1C048C05280D040224B303100000240FF800640000931B01000600000FC320248C1
%4E635800046 1E0701FC2806642 3205D241204A300448C05280D040224A303100000240FF805240
%4E600800046200318010003205D241204B300448C05280D040224B303100000240FF8006400009
%4E6F680004622031801000600000B03002D040204A720032300000703 8C2807608B6816D223002
%4E6F980004624 0D040204A720032300000002810000FF805281300 5D040224A360133830000 6028
%4E6E680004626 03002D040204A720032300000002810000FF8006810000020052813005D040224A
%4E60A800046280360133830000EE433002D040204B720032300000002810000FF807009D2803005
%4E6478000462A0D040224B3A0133850000EE457220B2426F24320348C15081E8813401024 2001F
%4E6268000462C0300548C050800280000001F00A80000001F0E380D440300448C07603C0832F00
%4E65C8000462E0300248C02F004EB900008D86320448C17003C2802001D080207C009048CE4270
%4E6288000463000800508F4CDF1C3C4E752F0242014242300 2D040207C00903800303000000240
%4E63F800046320FC000C400C00670000080C401000661030024 8C02F004EB900008BD47201588F
%4E6758000463405242 0C42040066C84A01670E4879000000154EB900048064588F241F4E7548E7
%4E6528000463603038247C00904852267C00904936287C00904000 52B900904A744A7900904862
%4E6ED8000463806600023270001 02B00037200122B00027400142B00017600161384B382828081
%4E6EA8000463A008000001670002 0E740034390090202070003039 0090201E720032390090201C
%4E66A8000463C076003639009020 1A828380818480660001E470FDB052662 84EB9000412E44279
%4E66A8000463E000904968 4A7900904B24670001C833FC000100904B244EB90004D5FC600001B6
%4E6288000464004A7900904B146600008E33F900904A700090400432D900904A7238817000300 1
%4E6348000464202F004EB900040984424158BF3001D040207C00904A3C31B9009040040000 5241
%4E6E1800046440700 4B0416EE62F3CFFFFFFFF4EB9000430AC4EB900042E844EB9000417083239
%4E6B1800046460009049664 8C12F013239009049644 8C12F014EB9000413AA0C5400984FEF000C
%4E6348000464806400013248 79000000494EB900048064588F600001205379009 04B144A790090
%4E6438000464A04B1466000110700 1B052663C425270003014 2F004EB9000409E04EB900042E84
%4E6708000464C04EB900041708323900904966 48C12F013239009049644 8C12F014EB9000413AA
%4E63D8000464E04FEF000C600000CE4242300220 4B083000010000670E320248C12F014EB90004
%4E6C88000465006AEE588F52427004B0426EDE4EB900046A444EB9000419C04EB90004C5864EB9
%4E6488000465200004308642790090 4B160C54009865444EB90004BEC022005381 3001E540207C
%4E6318000465400000A2762F3000004EB900048064487800034EB9000404BA22003001E540207C
%4E64E800046560000A306588F2F3000004EB900048 03C508F60407008B0790090400462364878
%4E6628000465800010 4EB9000404BA720DB280588F6C24487800034EB9000404BA22003001E540
%4E6498000465A0207C0000A312588F2F3000004EB900048 03C588F42423002D040207C00904028
%4E6438000465C03030000048C0721FC081721CB280660001AB3002E540207C009048D64AB0000C
%4E6FE8000465E067363202D241207C00904A3470003030100072003239009 04AA602B100000030C
%4E63C800046600E08152B1B08165103002204B4A300000066064A526C0000264A790090484E660C
%4E6238000466203002204B4A300000670000124A790090484E660001444A526C00013E4A79009C
%4E69B800046640484E66224A526C1E4EB900041E4A42B900904848320248C12F014EB900046A9C
%4E6588000466660588F600001144A7900904B146600008C4A52660000864A7900904968 6D00007C
%4E6B68000466B04A7900904862 66604EB900043 0B6700030142F004EB9000409562F3CFFFFFFFF
%4E6788000466A04EB9000430AC4879000000434EB900048064 42B900904B744EB9000415544EB9
%4E6668000466C00004170832390090496648C12F013239009049644 8C12F014EB9000413AA42B9
%4E6838000466E000904A744FEF0014320248C12F014EB900046A9C588F600000804A7900904B14
%4E6748000467006600068 4A790090486 2664E4EB900043 0B642B900904B744A790090484E6634
%4E6548000467204A526D3070003 0142F004EB9000409564EB900041708323900904966 48C12F01
%4E67D8000467403239009049644 8C12F014EB9000413AA4FEF000C42B900904A74320248C12F01
%4E69F8000467604EB900046A9C588F600E320248C12F014EB900046BCA588F52427004B0426E0C
%4E6818000467 80FE364CDF1C0C4E752F02342F000A7001B079009048626700000E0CB900000258
%4E66E8000467A000904A746D0E4879000000654EB900048 03C588F0CB900000258 00904A746D0C
%4E6708000467C000183002E540207C0000A31E2F3000004EB900048 03C588F241F4E7548E73C0C
%4E63E8000467E0362F0016300320 7C009049F44A300000660000D23003D040207C009049F84A7C
%4E64F8000468000006C0000C0320348C1D281207C00904AF8700030301 80072FEC08167464878
%4E6768000468200008 4EB9000404BA7203B280588F6C3442444245320348C1D281207C00904AF8
%4E6408000468407000303018007201 1405E5A1C08167025244524570 08B0456EDA7001B0446C04
%4E6628000468607803600E487B00034EB9000404BA3B00588F300348C0E58022403004E540207C
%4E6598000468800000A37ED3F000002F114EB900048 03C3004E540207C0000A32E2F3000004EB9
%4E6388000468A00004803C3003207C009049F411BC000100003003D040207C009049F831BC0708
%4E6848000468C00000508F4CDF003C4E7548E73820242F0014247C009048524A790090484E6700
%4E6688000468E0000A70FDB0526600007A3002E540207C009048EE42B0000070FDB052663E320
```

```
%4E622800046900E541207C009048D6700030390090 4AA6028000000300E0805240360078003839
%4E6368000469200090 4AA6701FC8803004D040227C0000A21EC6F100002183100060163202E541
%4E61880004694020 7C009048D6700030390000A25C218010003002D040207C00904A3431BC0001
%4E658800046960000 04A52660A2F024EB9000001CC588F7001B0790090 4862670000 0A4A790090
%4E67F8000469804B166F06427900904B163002D040207C00904AA831BCFFFF00003002E540227C
%4E643B000469A00000A2D62F3100004EB9000480647001B0790090 4004588F6700000A4A790090
%4E61BB000469C04B1466103002207C0090493611BC00010000600E3002207C0090493611BC0002
%4E6458000469E000003002207C009049F4423000003002D040207C009049F831BCFFFF00007002
%4E62F800046A00B0790090 4862661842413001207C00904A20423000005241700 4B0416F0E60EA
%4E66A800046A203002207C00904A20423000002F024EB9000430AC2F024EB9000467B8508F4CDF
%4E613800046A40041C4E7548E730004240360034004 8C272033001207C009049360C3000010000
%4E63F800046A60661C3001D040207C00904A34D67000003001E540207C009048EED4B000005341
%4E6A0800046A804A416CCE2202700EE0A130014 8C081C3D139009048584CDF000C4E752F02342F
%4E698B00046AA0000A300248C02F004EB900046AEE4A80588F6736300248C02F004EB9000468CA
%4E64BB00046AC07003B0790090 4862588F6700000C7004B0790090 4862661208390060090 4856
%4E674800046AE0660800390020009048 56241F4E7548E73E20342F001E247C009048624A52660A
%4E62DB00046B003639009049 3C600000C4424630064 8C0D080207C009048643A300B0067000090
%4E60AB00046B2042443004D040207C0000A39E363000003005024003E0D640024303E03004D040
%4E663800046B40227C0000A38E30310000D0450240001FD64030034 8C0721FC081E9805980EF80
%4E61B800046B60907900904A6C0C4070006200003830034 8C00280000003E00A80000003E0E280
%4E685800046B80EF80907900904A6E0C4074006200001632034 8C12F014EB900046D384A80588F
%4E6B1800046BA06600002A52447004B0446E00FF7652467004B0466E00FF5648790000004A4EB9
%4E650800046BC000048064700058 8F6000016830024 8C0E7805880D0B0207C0000C79C3A300B00
%4E630800046BE03002D040207C009048FE31BC00040000320248C12F0142A7300348C002800000
%4E666800046C0003E00A80000003E0ED807212D0812F0038024 8C4700CD880320348C1700BE1A1
%4E638800046C20048100000200D8812F04300548C02F00300348C02F004EB900008A843002207C
%4E63A800046C400090493608300001000 04FEF001866143202 48C12F01300348C02F004EB90004
%4E667800046C605FBA508F30024 8C0D080207C009048643183080030 02D040207C00904A3C31B9
%4E615800046CB000904004000003202D241207C00904A443602D643227C00904A18424033803000
%4E632800046CA03602D643227C00904A0833803000360 2D643227C00904A0033803000360 2227C
%4E604800046CC000904B1018001384300003002D040227C00904A4C760016043383000031831000
%4E67A800046CE03002D040207C00904A1031BC003C000030024 8C0D080207C00904BD631BCFFFF
%4E60E800046D0008003002207C009049361 1BC00010000 52527001B0526612300220 7C000086FE
%4E68D800046D2013F000000090485860064239009048 5870FF4CDF047C4E7548E73E20322F001E
%4E6FD800046D40227C009020007020B0416C0000160C4104006C00000E3001D04020494A700000
%4E605800046D606706700060000 0E83A01700BE1650445020030014 8C00280000003E00A800000
%4E62C800046D8003E0ED803440424630 06D040207C0000A39E383000003001024003E0D8403006
%4E627800046DA0D040207C0000A38E30300000D0410240001FD8407020B0446C000088 0C440400
%4E608800046DC06C0000803004D04020494A700000670000723004D040207C009028007600363 0
%4E6DF800046DE000007000300596803404D4422049700030302000028000008000670604830000
%4E60F800046E0002004A836C062003448026000C83000007C06E00002E3004D040207C00903000
%4E60A800046E2074003430000070003 00A94804A826C062002448024000C82000007C06E04700C
%4E6BC800046E40600C52467008B0466E00FF3E70FF4CDF047C4E7548E72020227C00904A80207C
%4E638800046E600090400A4A7900904862670000 7C303900904008044 00017EF4033C000904A82
%4E638800046E80303C00F99050EF4033C000904A8430104 8C00680000001180280000001F0E68C
%4E63E800046EA048C0D080068000905F8224403012D0403280660A303900905F80D0403280301C
%4E63F800046EC048C051800280000001F0E68048C0D0802400068200905F8220423010 48C02F0C
%4E6A2800046EE04EB900008000588F4CDF04044E7548E73E203A2F001E362F0022342F0026247C
%4E635800046F000090280030024 8C05B80D080207C0090487C31BC003C0B003005D040204A007C
%4E614800046F20001000003C05DC46207C009040463005D040227C009040463031000024003FF
%4E634800046F403803720AE364D0443180600030024 8C05380D080207C009048643185080030 02
%4E64C800046F6048C053B0D080207C0090491E3183080030024 8C053B02800D884207C0000A206
%4E632800046F80320248C153B12001D080227C00904A543C304800338608003005D040204A383C
%4E630800046FA000000244FF803005D040207C009030003A3000000245FFB07009B0426F423003
%4E61A800046FC0D040207C0000A5803030000006400 00DD8403003D040207C0000A590DA70000C
%4E625800046FE03202D241207C009020003003E3404 8C0D080227C0000C4D231B10800100060C
%4E60D800047000300 3D040207C0000A5A0DB7000003003D040207C0000A5B0DA700000300248C
%4E642800047020720990B1D040207C00904A963184000030024 8C072099081D040207C00904A9E
%4E6F1800047040318500003202D241207C009020007000 3006D080227C0000C4F231B10800100C
%4E6DE800047060320 2D241204A300452403180100 03202D241207C009030003005064000093 18C
```

Appendix C - MAIN LOOP GAME PROGRAM
©1985 ATARI GAMES, CORP. - Page 15 of 35

```
%4E62B8000470B010003004EE4838003005EE483A0070003004720CD081E8803600024300 1F7000
%4E6068000470A0300550800280000001F00A80000001F0E380D640320248C12F01700030032F00
%4E6B98000470C04EB900008D94508F4CDF047C4E7548E73F30382F0026362F002A302F002E247C
%4E6678000470E0009049624A79009048526C0A53524A526D1A6000013A34004BC2487800204EB9
%4E6568000471000004BAB480588F6F0001244A79009048526610487800044EB9000404BA3640
%4E6128000471205 88F6004424736473C0B600000F23006D040207C0000A5503A30000030040240
%4E6198000471400 3E0DA40024503E03006D040207C0000A5383030000D0440240001FDA403405
%4E65A8000471604BC22F024EB900046D384A80588F670000AC3006D040207C0000A56834300000
%4E61C8000471804BC22F0230034BC02F00300348C0207C0000C62472001230080030054BC00280
%4E61C8000471A0000003E00A80000003E0ED80D2802F0130034BC0207C0000C66074001430 0800
%4E6178000471C032054BC1700BE1A1048100000200D4812F023006D040207C0000A56832300000
%4E65D8000471E048C130030440000948C081FC000348C0EF80D2802001D080207C0000CBEB3030
%4E64E8000472000800 48C02F00300548C02F004EB900008A8434BC00014FEF001860125246 3006
%4E6AA8000472204 8C0340B48C25082B0826D00FF024CDF0CFC4E752F02302F000A48C081FC0002
%4E60F8000472403200343900904AEE0242000730 02D040207C0000A3BE3030000048C02F003001
%4E655B000472604 8C02F004EB900047280 3002D040207C0000A3AE3030000048C0508F241F4E75
%4E6468000472804 8E73800342F0012362F00164244300448C0D080207C009048BC4A7008006600
%4E6448000472A000A630044 8C0D080207C009048BC31BC003C0800300448C07211D0813200D241
%4E60C8000472C0207C009020003003E540227C0000A3CE31B100021000300448C07211D0813200
%4E6088000472E0D241207C009028003002D040227C009028003031000002 40FF8058403180 1000
%4E6E8800047300300448C07211D0813200D241207C009030003002D040227C009030003031 0000
%4E60A8000473200240FF8006400400064000103180100032044 8C12F0130024 8C02F004EB90000
%4E6BC8000473408D9E508F600A52447004B0446E00FF404CDF001C4E7548E73F38302F002A362F
%4E62F800047360002E207C009028002 47C00904A443200D241227C009040463A311000700AE06D
%4E6658000473803203D241227C009038003671100070 0A3E0BE06F3647320B48C12001C139B2FC
%4E6AB8000473A00009C1896D0002AAC139B2FC0018C1896E00029E224043E9FFF720092240D3C0
%4E6098000473C02009303B00064EFB0002002000260 02C0038003C0040004A004E0052005C005C
%4E63F8000473E0005C0066006A006E0084740A4244600A741478046004741E7808387C01006000
%4E6368000474000068780C60067810600278143 87C02006000021C780C60067810600278143B7C
%4E60B8000474200406000020A781C387C0800600002007 80C60067810600278143B7C10003203
%4E650800047440D241224B0271FFEF1000600001E27818387C20003205D241227C00904A4C0071
%4E63A8000474600001100060000 1C8320348C12F014EB900008BD4320248C12F01340548C22F02
%4E6888000474804EB90004A9A44FEF000C320548C1D281227C0090401A33BC000C18007218B24B
%4E6618000474A06600007C32054 8C1D281227C00904AF82009C189083100051801C18967047438
%4E6198000474C060027418320 5D241224A2009D442207C0000A3F6343020002240D57110003205
%4E64C8000474E0D241224A2009C1890C7100C81000C189632C3205D241224A4271100032054 8C1
%4E68F8000475002F01340348C22F024EB900045FBA320348C12F014EB900008BD44FEF000C3205
%4E6598000475204 8C1D281227C00904AF82009C189083100051801C18967047C2060027C003605
%4E6698000475 40E543227C009048D62009320548C1340448C2D282D286D241207C0000A3F63230
%4E6518000475601000380148C1C18993B13000C1896C0E3205E541227C009048D642B110003205
%4E62F800047580D241227C00904A002009340422 40D57110003204 4BC12F01340C48C22F023005
%4E6708000475A04BC02F004EB90004AFF63205227C009049D000310002100072 09B24B4FEF000C
%4E67E8000475C06E1E720BB24B6D183005E540207C0000A5282F3000004EB900048064588F602A
%4E6688000475E07218B24B6724487800044EB9000404BA22003001E540207C0000A476588F2F30
%4E6618000476000004EB900048064588F320548C12F014EB900047656427900904B224A790090
%4E6538000476204B16588F6F2A427900904B1660223203D241224820 09C189083100051001C189
%4E66D8000476406600FE483203D241224800710020 10004CDF1CFC4E7548E73020362F0012227C
%4E6378000476600090 4A7830034BC0D08020495370080030034BC0D08020494A7008006C603403
%4E6578000476804BC2D4822449 4B7B00084EB9000404BA320030390090 4862D040207C0000A50A
%4E6268000476A0D27000003581280030032 47C0000A5241032000048B048C02F004EB9000404BA
%4E6808000476C0E58022403003E540207C0000A514D3F00000588F2F114EB900048064508F4CDF
%4E6538000476E0040C4E75102F00070C0000416D120C00005A6E0C48804BC0723790816000006E
%4E61C8000477000C0000306D120C0000396E0C488048C0723090816000000560C00000866067032
%4E6118000477206000004A0C00003F66047024603E0C00003B66047027603 40C00002166047028
%4E61E800047740602A0C00002366047029602 00C00003A6604702A60160C00002E6604702B600C
%4E68A8000477600C00002C6604702C600270254E754E56FFF848E73020247C00904AA6487B000C
%4E68A8000477804EB9000001AB3480700030120280000080005 88F672642AEFFF84202486EFFFE
%4E6598000477A042A7100248804BC02F004EB9000001B44FEF000C52020C02000466E04279009C
%4E65F8000477C04002420276FF42A7100248048C02F004EB9000001AE20404A90508F66044203
%4E6588000477E0601C4878000410024 8048C02F004EB9000001AE20404A90508F660276040C03
```

```
%4E6578000478000FF67446036120248 81C2FC0050207C0000BD3C10034880E740D0C148700000
%4E64BB000478201003488048C02F00100248048C02F004EB9000001B44FEF000C52030C03000A
%4E6048000478406 6C4427900904002520 20C0200046600FF747000301202B00000800067160252
%4E6578000478607FFF700030122F004878000C4EB9000001C0508F420310034880E540207C0090
%4E6278000478804ABCD0C022484201100148 8041E9000111BC0041000052010C01000366EA5203
%4E67FB000478A00C03000466D04CDF040C4E5E4E752F02342F000A3002E540207C00904A242F30
%4E62E8000478C00000300248C02F004EB9000001C63202207C00904ACC118010000C00000A508F
%4E66F8000478E06C00006E3002207C00904ACC4A3000006D5E3002E540207C00904ABCD0C02248
%4E62D8000479003002207C00904ABB11BC00A000003002D040207C00904AA831BC0ABC00003002
%4E6148000479 20D040207C00904AB042700000421130022 07C0090493611BC000400000C790708
%4E66B8000479400 9049BE6F1A33FC0708009049BE60103002D040207C00904AA831BC02580000
%4E6D2800047960300248C02F004EB9000430AC588F241F4E754E56FFF848E73E3C342E000A267C
%4E6848000479800904AB02B7C00904AAB2C3C00904ABB3002E540227C00904ABCD2C024491612
%4E6188000479A03002D040204C4A700000670A3002D040204C537000003002D040207C0090485A
%4E6278000479C030300000E8481A0046053002D040204B3B300000120548814BC17009C2806716
%4E6728000479E04A446D0E52440C4400A06F2E383C00A06028424460241205488148C17006C280
%4E67C800047A0067164A446E0E53440C44FF606C0C383CFF6060064244600242443002D040204B
%4E612800047A20318400003002 2A46204D7800183000006702534 44A446600011A1003488041EA
%4E6ED800047A400001123000003002D040204B4A700000670000B43002D040204B4A7000006F04
%4E601800047A605201600253010C01000966047220604 00C01002166047241603 60C01005B660C
%4E63B800047A804A03670472086028722060240C0100076604725A601A0C01001F660C4A036704
%4E61B800047AA07208600C725A60080C01004066027220487900008000100348 8043EA00011381
%4E672800047AC000001001488048C02F004EB9000476E4588F2F00300248C0C1FC00055C805480
%4E662800047AE02F00100348 8048C0E3807224D0812F004EB900000224508F2F004EB900000020C
%4E635800047B004FEF000C600242443002 2A46204D118400003002D040204B4A7000006F1C223C
%4E60A800047B20000000A03002D040204B303000004 8C09280EA8138015044601830 02D040204B
%4E600800047B403230000048C10681000000A0EAB1380150443002 2A46204D118400003002D04C
%4E62C800047B60207C00904028323000004 8C1700FC280700CB0816700001E3002D040207C009C
%4E61E800047B8040303230000048C1700FC280700CB081660000F03002D040204C0C700A14000C
%4E664800047BA06C0000E0300248C0C1FC00055C8054802F00100348 8048C0E3807224D0B12F0C
%4E620800047BC04EB900000224280032 02D241227C00009E0870003031 10002F001003488041EA
%4E651800047BE000011030000048 8048C02F004EB9000476E4588F2F002F044EB900000020C1003
%4E61F800047C00488041EA00010C30000800004FEF0014671052033002D040204C31BC03840000C
%4E643800047C20600253030C0300036C564A036D52300248C0C1FC00055C8054802F001003488C
%4E636800047C4048C0E3807224D0812F004EB900000224280048790000800010034 88043EA0001
%4E67B800047C601031000048 8048C02F004EB9000476E4588F2F002F044EB900000020C4FEF0014
%4E60E800047C801483 3002D040204C4A700000670000A0C0300036600009A3002E540207C009C
%4E665800047CA04A242D700000FFF8420312034 88141EEFFFC100348 8043EA000111B10000100C
%4E662800047CC052030C03000366E2486EFFF83002227C00904ACC1031000048 8048C02F003002
%4E628800047CE048C02F004EB9000001B43002207C00904936423000003002D040207C00904028
%4E6FA800047D003202D241227C00904030424333831000318300003002D040204C31BC0258000C
%4E6F3800047D20300248C02F004EB9000430AC4FEF00104CDF3C7C4E5E4E754E56FFF848E73E2C
%4E62A800047D40247C000001423 23C009733C1009040007000300 12F004EB9000409B64EB90004
%4E66C800047D601708303900904966 48C02F00303900904966 48C02F004EB9000413AA33FC0009
%4E64F800047DB00090400833FC00050090400A4878040048790000BE944E9248780800487900 0C
%4E6C9800047DA0BEA64E9248780C0048790000BEB84E9248781000487900 00BEC84E9242A74879
%4E628800047DC00000BE7C4EB9000002004 2034FEF00340B0300006704701860027002 3C001003
%4E626800047DE04880E2404A4067047013600270033A001003488 0D040207C00009E083830000C
%4E642800047E000444800042021002488048C02F001003488048C02F004EB9000001AE244043EE
%4E667800047E20FFF80C020009508F670412FC002012FC00230C020009660A12FC003112FC003C
%4E605800047E406008100206000031 12C012FC002041EA0004420012D852000C00000366F6421
%4E695800047E60300448C02F00486EFFF81002488048C0320548C1D0812F0030648C02F004EB9
%4E63C800047E800000025A300448C02F004878000148 7800072F121002488048C0320548C1D08
%4E670800047EA02F00320648C17009D2802F014EB9000002604FEF002852020C02000A6600FF4E
%4E6D9800047EC052030C0300046600FF084CDF047C4E5E4E754E56FFFC48E73830342E000A247C
%4E65A800047EE000904ACC3002E540207C00904ABCD0C026483002D040207C00009E083830000C
%4E65C800047F001602C7FC00055C0348790000800048790000BED61003488048C052032F004878
%4E653800047F20001E4EB90000025A4879000080004879 0000BEE41003488048C052032F004878
%4E63F800047F40001D4EB90000025A300448C02F004878001487800073002E540207C00904A24
%4E66C800047F602F300000100348 8048C02F004878001D4EB90000026043EEFFFC3002204A0C3C
```

```
%4E63B800047F80000900004FEF0038670412FC002012FC0023300220 4A0C300009000060A12FC
%4E6FB800047FA0003112FC0030600E3002204A1030000006000031 12C0421148790000800048 6E
%4E67F800047FC0FFFC1003488048C052802F0048780020 4EB90000025A100348804 8C02F00487 8
%4E62F800047FE000244EB900000224260042024FEF0018B4136706300448C06006203C00008000
%4E6468000480002F00100248804 1EB00011030000048804 8C02F004EB9000476E4588F2F002F03
%4E6968000480204EB900000020C58834FEF000C52020C02000366BC4CDF0C1C4E5E4E75122F0007
%4E6098000480407000303900904AA6028000000800660000121001488048C02F004EB9000480 64
%4E6758000480605 88F4E752F02142F000B4A7900904942671210024880 48C02F004EB9000480D4
%4E6598000480805 88F6024100248804 8C02F004EB9000002424A80588F661010024880 48C02F00
%4E66B8000480A04EB900048 0D4588F241F4E754241300120 7C00904AD011BC00FF000052417008
%4E6858000480C0B0416EEA420013C000904ADA13C000904AD84E752F02102F000B227C00904AD8
%4E65F8000480E0141148824 8C2123900904ADA488148C194817207C4817207B2826700001A1211
%4E6168000481004881207C00904AD011801000101152000200000712 80241F4E7548E72020247C
%4E6308000481200090 4ADA4A7900904850660000644A7900904942660000 5A42421012B0390090
%4E6688000481404AD8674C7008B0426F461012488020 7C00904AD0103000004 8B048C02F004EB9
%4E6228000481600000024 24A80588F671A10124880207C00904AD011BC00FF000010125200020 0
%4E6C2800048180000714807004534 04A406CFA524260AA4CDF04044E754E56FFFC48E73E38247C
%4E6488000481A00090491626 7C00902000287C009048FE70FDB0790090485266000130424430 04
%4E6128000481C0D040207C0090495A4A7000006700011230 04D040207C0090495A537000003004
%4E62A8000481E0D040207C0090495A4A700000660000F23004E540207C0090494A54B000003004
%4E6388000482 00E540207C0090494A227000001011140 00C0000FD630000AA0C0200FF663C4878
%4E60E800048220005A4879000080003004E540227C0090494A2071000032104 8C10281000000FF
%4E64E800048240200 1E580207C0000C3B22F3008004EB90000012A4FEF000C60543004E540207C
%4E60A800048260090494A227000001429000102020 0FF700010022F004EB900046A9C70001002
%4E61D800048280D040207C0090495A318000010000720012 02E541207C0090494A70001002E540
%4E6258000482A0227C0000C03021B10000100058 8F3004E540207C0090494A54B000006000FF40
%4E61A800048 2C03204D241207C0090495A3004E540227C0090494A227100001011488031001000
%4E66E800048 2E052447004B0446E00FED64246426EFFFE4243004207C0090493 60C3000040000
%4E6668000483006618320448C12F014EB9000479724EB900042D8A588F6000067430042 07C0090
%4E6EC800048320493 60C3000080006600018430 04D040204A527000003030000048C07203C081
%4E61A800048340660064A30044 8C0D080207C0090486434300800320 4D241204C7004B0701000
%4E6F280004836067523004D040204A427000003204D241204C3004D040224C3031000053400240
%4E6138000483800007318010003602D643204B3004D040224C3031000048C0320448C1E7B12401
%4E62A8000483A0D082D080227C0000C79C31B10800300060000 5DA3204D241204A7020B070100C
%4E6408000483C06E0000AE3004207C0090493611BC0002000032044BC17414D2822F014EB9000C
%4E6508000483E08E90300448C0D080207C0090486442700800537900904862700 3B0790090486 2
%4E6398000484005 88F661208390006009048566608003900200090485670 08B07900904A706426
%4E6688000484204A7900904862661E0C7900980090400064145379009049 6A4A7900904 96C6706
%4E6618000484405379009049 6C0C7900980090400065 0E4A7900904862660 64EB90004BC303204
%4E65E8000484604BC12F014EB9000430AC588F6000051E300448C0D080207C0090486436300 80C
%4E64D800048480D643224B3004D040204A3030000048C0E4B0320448C1E7812401D082D080207C
%4E6198000484A00000C75C33B00B00300060000 4E0300448C0D080207C0090486434300 8006 70C
%4E6838000484C00488320448C12F014EB90004E486300448C0D080207C00904BD64A700800588F
%4E6848000484E06C0004AA3D7C00F0FFFC300448C0D080207C00904B004A7008006734300448C0
%4E61E80004850 0D080207C00904B005370080030044 8C0D080207C00904B004A7008006123004
%4E6708000485204 8C0D080207C00904AF80270FFFE08004A7900904852661430 04D040207C009C
%4E64F800048540485A3A300000526EFFFE60143004E540207C0090494A227000003A11024500FC
%4E64F800048560300448C0D080207C00904AF04A7008006710300448C0D080207C00904AF0537C
%4E6388000485800800300 44B8C0D080207C00904AF04A700800660001A2320430044 8C0D080207C
%4E6088000485A000904AFB083000060801672 5B413001D040207C0000C0583630000030 01D04C
%4E6108000485C0207C0000C07B3430000048C23001D040227C0000C0683031000048C07200323C
%4E6078000485E00090400 6C0B1B4B0640406430080700030050280000000F00C80000000F0674A
%4E6F580004860030 04D040207C0090490E4A7000006700001C3004D040207C0000C0403030000C
%4E6568000486203204D241224AB07110006C1E3404D442204C70003005E88B720FC081D040227C
%4E6ED800048640000C01031B100002000300 4D040207C00904906303000004 8C03204D241224C
%4E6348000486603231100048C190817407C082720 3B2806C0E3004D040207C009049064A70000C
%4E6FF800048680300 4D040207C0090490E4A7000006700001E3004D040207C0000C0403030000C
%4E61A8000486A03204D241224AB07110006C00008A0805000167000082300448C0D080207C009C
%4E6248000486C04AF04A700800660006E3004D040207C009049064A7000006700001 83004D04C
%4E6628000486E0204A3030000048C0720FC0817407B480664433FC000200904ADC427900904B1C
```

```
%4E6668000487007000300052F0034034 8C22F0230044 8C02F004EB9000092523D40FFFC4A790090
%4E64B8000487204B184FEF000C660E3004D040207C00904906427000003004 48C0D080207C0090
%4E6318000487404864343008006700017C3004D040207C009049064A70000674C3602D643204B
%4E6358000487603004D040224A303100004 8C0E2807207C0813204D241224C3431100048C2E782
%4E65C8000487 8032044 8C1ED81D481D082D080227C0000C8DC31B108003000 3004D040204A527C
%4E64A8000487A00000600001200C6E00F0FFFC674C3602D643204B3004D040224A3031000048CC
%4E678B000487C0E4807203C0813204D241224C3431100048C2E582320448C1EB81D481D082D08C
%4E623B000487E0227C0000CADC31B108003000 3004D040204A527000006000 00CC3004D040207C
%4E61C8000488000090490E4A70000067000090 3602D643204B3004D040224A3031000048C0E48C
%4E66C8000488207203C0813204D241224C3431100048C2E582320448C1EB81D481D082D080227C
%4E6EC8000488400000C7DC31B108003000 3004D040204A3430000052700000 3004D040207C000C
%4E66C8000488 60C040B4700000660E320448C12F014EB90004 8A54588F700FB0426D00000E0805
%4E6338000488B000016740700 8B0426C3A3004D040207C0090490E42700000602A3602D643204I
%4E64B8000488A03004D040224C3031000048C0320448C1E7812401D082D080227C0000C79C31B1
%4E6478000488C008003000300448C0D080207C00904AF8083000000801674E4A7900904B246646
%4E6428000488E0300448C0D080207C00904B0030300800EE40D040227C0000BFA03431000048C2
%4E62C8000489007200323900904006C481661A300448C0D080207C009048643030080 0D040224I
%4E6318000489 2033BC1709000032042 07C009048EA700010301000DC403004D040207C00904AE6
%4E6578000489 4031AEFFFC000060443004D040207C00904AA84A7000006D343004D040207C009C
%4E6528000489604AAB537000003004D040207C00904AA84A7000006C164A7900904 8526D0E3204
%4E6CE8000489804BC12F014EB9000430AC588F52447004B0446E00F95E4A6EFFFE670000B04A7
%4E6478000489A000904B166D32527900904B164A466708223C00000A8C6006223C000004B03039
%4E6B7800048 9C000904B1648C0B0816F0E4EB90004630A33FCFFFF00904B16527900904B220C79
%4E65B8000489E02EE000904B226D00006442424 5EB0040603A200A224B90B92200E2892001723F
%4E6468000 48A00C08166064279009040020C528000661A4878000 6220A224B92892001E2882F0C
%4E6B2800048A204EB9000446C6740150BF548A41EB0800B5C865BE4A42670E4879000000 3F4EB9
%4E6A7800048A400004806458 8F427900904B224CDF1C7C4E5E4E7548E73C00362F0016320348C
%4E61B800048A6052813001D040207C009020004A700000660001 5A3203D241207C009048FE300
%4E6488000 48A8048C0D080227C0090491E3A301000338508003003 48C0D080207C00904A54427C
%4E65B800048AA008003203 48C152813801D844207C009020003003 48C0E980340548C2E382720F
%4E6428000 48AC0C481D082D080227C0000C6DC31B108004000 3005D040207C0000BFD03230000C
%4E6278000 48AE048C1300348C0D080227C00904864343 10800D442207C009028007000 30302000
%4E64D800048B0002800000FF80740CD08234034 8C2D082D2803003 48C05280D040207C00902 80C
%4E61F800048B2038013184000003005D040207C0000BFE03230000048C1300348C0D080227C009C
%4E61D800048B4048643431 0800D442207C009030007000 30302000002800000FF807409D082D28C
%4E6208000 48B6030034 8C05280D040207C009030003401318200003004EE483B003002EE48340C
%4E6038000 48B807200320450 81E8810241001F700030025080028000001F00AB0000001F0E38C
%4E668800048BA0D240300348C02F0034014BC22F024EB900008DC83003E540227C0000C0482F3
%4E6908000 48BC000004EB9000480644FEF000C4CDF003C4E7548E73B00302F0012342F0016362
%4E6178000 48BE0001AD040207C009040463830000030 03B0790090403A633C300448C00280000C
%4E6438000 48C002000671830390090403C48C0320248C14481B0816F0670FF60000060300448C
%4E6438000 48C2002800000800670CB4790090403C6F0470FF60463002B0790090403 8633A300
%4E64D800048C4048C002800000100067163039009040 3E48C0320348C14481B0816F0470FF601
%4E6678000 48C6030044 8C002800000400670CB6790090403E6F0470FF600270004CDF001C4E7
%4E6B3800048C804E56FFFE48E73F38382E000A362E000E247C00904B16287C000404BA267C000
%4E6698000 48CA0803C0C4404006D3C340348C22F023C0448C02F004EB900046116340348C22F0
%4E6658000 48CC04EB900008E90320348C15281D241227C009020004271100072FF20014FEF000
%4E64A800048CE060000883204D241227C009038003A311000700AE06D424634037204B2426F1
%4E62B800048D003203D241227C00904AF82009C189083100041001C1896702504232022 7C000
%4E6038000 48D20C3CE1D711000FFFF3E2EFFFE48873D47FFFE3202227C0000C3DA2009C1894A3
%4E6DF800048D401000C1896712487800024E943E2EFFFEDE403D47FFFE588F3404D442227C009
%4E6318000 48D6028002009720022403231200074 0FC282700CB0816E00027E3204D241227C009
%4E6288000 48D8040463C311000700AE06E7204B2436F000102083900000090485667000076320
%4E6648000 48DA0D241227C00904AF00671002810003406D442227C00904AF02009725AC189B27
%4E6538000 48DC02000C1896C103206D241227C00904AF033BC005A10003206D241227C0090490
%4E6568000 48DE042711000300648C0E580207C0000A4762F3008004EB900048064320648C1D28
%4E6438000 48E00227C0090401A33BC000C1800588F6000070C0839000100904856676032 06E54
%4E66E800048E20227C009048D62009C18955B11000C1896C0E3206E541227C009048D642B1100
%4E6388000 48E403206227C009049D000310002100030064 8C0E580207C0000A4762F3008004EB
%4E64E800048E600004806432064 8C1D281227C0090401A33BC000C1800588F600006A24878400
```

```
%4E695800048E8034034 8C22F024EB90004AFF6508F6000068C7208B2436F0000AE3206D241227C
%4E64A800048EA000904AF82009C1890831000510 01C1896704720460027200 3A06E545227C0090
%4E663800048EC048D62009340648C2D481320220 7C0000C3E61230100048B134014 8C1C18993B1
%4E64B800048EE05000C1896C0E3206E541227C009048D642B11000320622 7C009049D000310002
%4E64C800048F001000300648C0E580207C0000A4762F3008004EB90004 806448C22F0248780400
%4E694800048F2030064 8C02F004EB90004AFF632064 8C1D2B1227C0090401A33BC000C18004FEF
%4E63C800048F400010600005D83206D241227C00904AF82009C1890831000510 01C18967047204
%4E65A800048F6060027 2003A06E545227C00904 8D62009340648C2508 2D481320220 7C0000C3E6
%4E66D800048F8012301000 48B134014 8C1C1B993B15000C1896C0E3206E541227C009048D642B1
%4E61A800048FA010003206227C009049D000310002100030064 8C0E580207C0000A4762F30080C
%4E699800048FC04EB9000480644 8C22F0248780B0030064 8C02F004EB90004AFF6320648C1D281
%4E661800048FE0227C0090401A33BC000C18004FEF00106000052A32054 8C12001C189B2FC0003
%4E677800049000C1896D000518C189B2FC003FC1896E00050C2240578920092240D3C020093 03E
%4E681800049020000064EF8000201C001C04F601F001F001F0036003B203CA03AE03BE03EE03AE
%4E66D800049040003BE03EE03AE03BE03FC0400040404320 35A0446045A035A0446045A035A
%4E66A800049060044604 5A035A0446045A035A0446045A04F604F601F604F6029B04F601F00298
%4E664800049080029802980298029802980 1F0010C00D0007A04F601F001F004F604F604F60164
%4E6A98000490A07204B2436F142F3C000400003 4034 8C22F024EB90004AFF6508F7203B26EFFFE
%4E6A48000490C06F000070342EFFFE48C22F0230044 8C02F004EB900041CCC3A04DA45227C0090
%4E6A78000490E03B002009342EFFFE720AE3622240957150005 08F604C7202B26EFFFE6F000034
%4E693800049100342EFFFE48C22F0230044 8C02F004EB900041CCC3A04DA45227C00903B00200 9
%4E689800049120342EFFFE720AE3622240957150005 08F601042A7340448C22F024EB9000446C
%4E66A800049140508F34034 8C22F0230044 8C02F004EB900046116720 4B243508F6F0C4279009C
%4E661800049160 4B224A526F0242523403 48C22F024EB900008E90320348C15281D241227C009C
%4E63C800049180200042711000 72FF2001588F6000003DC7204B2436F00038634034 8C22F02300 4
%4E6A98000491A048C02F004EB900045FBA4EB900040246487801F4340348C22F024EB90004A9A4
%4E67C800049 1C04A524FEF00106F0242523403 48C22F024EB900008E90320348C15281D241227C
%4E648800049 1E0009020004271100072FF2001588F6000037A487802C0487802C0340448C22F02
%4E63E800049 2004EB900048BD24A804FEF000C6600020E700060000356700060000350340 34BC2
%4E67F800049 2202F0230044 8C02F004EB900046116340448C22F024EB900008BD47204B2434FEF
%4E654800049 240000C6F0002D8427900904B224A526F0242524878000234034 8C22F024EB9000 4
%4E69C800049 260AFF64A8058 8F660002B4487800044E944A8058 8F660002A6487800044E944A8C
%4E69E800049 2B0588F661C487800024E94E580207C0000C41E588F2F3008004E93588F6000027E
%4E63A800049 2A03003E540207C0000C4262F3000004E934879000000AD4E93508F60000260340 3
%4E66E800049 2C048C22F0230044 8C02F004EB900046116340448C22F024EB900008BD448790000
%4E661800049 2E000264EB900048064 7204B2434FEF00106F00022A427900904B224A526F02425 7
%4E633800049 300320048C1E5815E81D281227C0000F14033F1180000904022340358 4233C2009C
%4E67B800049 32040264 87B0040340348C22F024EB90004AFF64A8058 8F660001E4487800044E9
%4E69A800049 3404A8058 8F660001D6487800044E944A8058 8F660E4879000000 9D4E93588F600C
%4E64B800049 36001BC3003E540207C0000C4362F3000004E934879000000B14E93508F6000019E
%4E663800049 380427900904B227C0A340348C22F0230044 8C02F004EB900046116720 4B243508E
%4E653800049 3A06E0000207219B2456E0B721BB2456C0000127209B2456E000142721BB2456D0
%4E6AE800049 3C0013A340448C22F024EB900008BD4588F600001287C0560B07C0A7202B26EFFF
%4E609800049 3E06E1860A47C057202B26EFFFE6E0C60987C0A7203B26EFFFE6F8E3204D241227C
%4E693800049 400009028002009342EFFFE2240957110006000 00CE7C057203B26EFFFE6EDC600
%4E61C800049 420FF6874016006740260027 4033204D241227C009028002009C1890831000410 0
%4E6A0800049 440C1896706700060000122 3E2EFFFEBE426C00FF367C0560A27C017204B2436F0
%4E6A2800049 460009A527900904AEE6000009042790090 4B227C0A7202B26EFFFE6E166000FF0
%4E6B7800049 4B0427900904B227C0A7203B26EFFFE6F00FEF83A04DA45227C009038002009342
%4E65E800049 4A0FFFE720AE3622240957150003A04DA45227C0090200020093204D241207C009
%4E613800049 4C0380034301000720AE26A72003202D281207C0000C534224033B01800500060 1
%4E68A800049 4E03A04DA45227C009038002009342EFFFE720AE3622240957150007204B2436F1
%4E69C800049 500302EFFFEC1C62F00300348C02F004EB90004A9A44A52508F6F0242523204D24
%4E653800049 520227C009020002009C1894A711000C1896714340348C22F02300448C02F004EB
%4E647800049 540000461165 0BF340348C22F024EB900008E90320348C15281D241227C0090200
%4E604800049 560427110007 2FF2001588F4CDF1CFC4E5E4E754E56FFFE48E73F3C3B2E000A362
%4E665800049 580000E247C009049062 67C0004A9A4287C009028003203D2412A7C00904AFB200
%4E6E18000495A0C18D083500011001C18D6704700460027 0003D40FFFE3E2EFFFEDE433D47FFF
%4E673800049 5C03204D2412A7C009038003A351000700AE06D320548C12001C18DBAFC0003C18
%4E6B28000495E06D00064AC18DBAFC003FC18D6E00063E2A40578D200D2A40DBC0200D303B000
```

```
%4E6368000496004EFB000200FA00FA062806220622062622046A046A046A013601B6021401360186
%4E66E8000496200214013601B6021402E802EC02F0062804A804F4058E04A804F4058E04A804F4
%4E63C80004964005 8E04A804F4058E04A804F4058E06220622062206220622062206220622
%4E6088000496600622062206220622062206280628062806280622062206280628062800 7A3203
%4E6838000496 80D2412A4A200DC18D4A751000C18D672C340348C22F0230044 8C02F004EB90004
%4E6A28000496A05FBA4EB90004D346487801F4340348C22F024E934FEF0010600003D67201B279
%4E65B8000496C000904ADC662C3403D4422A4A200D3203D241207C009048FE3230100052412A40
%4E6398000496E03BB120003203D2412A7C009049164275100033FC000100904B18600003584878
%4E6938000497000 4C0487B05C034044 8C22F024EB900048BD24A804FEF000C671834034 8C22F02
%4E6708000497203004 48C02F004EB900049C36508F600004FE72FF2001600004F63203D2412A4A
%4E6918000497402 00DC18D4A751000C18D673E4878001934034 8C22F024E93508F340348C22F02
%4E66C8000497603004 48C02F004EB900046116340448C22F024EB900008BD43203D2412A4A4275
%4E62D8000497 8010004FEF000C60000308 3003D040207C0000C406343000004 8C22F024EB90004
%4E69F8000497A004BA3C00302EFFFED040207C0000C3F6DC7000003203D2412A4A200DC18D4A75
%4E6948000497C01000C18D588F67507202B2466F00FF7E340348C22F0230044 8C02F004EB90004
%4E6288000497E061163204D2412A7C00903800047504001000 3204D2412A4C537510004878001 5
%4E6438000498003034 8C22F024E9333FC000100904B184FEF00106000023E3003D040207C000C
%4E68E8000498 20C406343000004 8C22F024EB9000404BA3C00302EFFFED040207C0000C3F6DC7C
%4E6B58000498400000 3203D2412A4A200DC18D4A751000C18D588F67547203B2466F00FEF03403
%4E6638000498604 8C22F0230044 8C02F004EB900046116 3A04DA452A7C00903800200D3406720A
%4E64E8000498 80E3622A4095755000 3204D2412A4C200D34062A4095751000487800193403 48C2
%4E6878000498A02F024E934FEF001060367201B27900904ADC662C3403D4422A4A200D3203D241
%4E6318000498C0207C009048FE3230100052412A403BB120003203D2412A7C00904916427510 0C
%4E62C8000498E033FC000100904B186000016A7A0160067A0260027A033003D040207C0000C406
%4E6778000499003430000048C22F024EB9000404BA3C00302EFFFED040207C0000C3F6DC70000C
%4E6828000499 20BC45588F6D283204D2412A4C200DC18D083500041001C18D66143203D2412A4A
%4E6738000499 40200DC18D4A751000C18D6600FE003204D2412A4C200DC18D083500041001C18D
%4E6498000499 6067443204D2412A4C0275FFEF10003204D241207C009020003004D040227C009C
%4E61C8000499 8040467400343100007 00AE0AA06B2000002002002D080227C0000CBE831B1080C
%4E6588000499A01000600000A83203D2412A4A200DC18D4A751000C18D674C340348C22F023004
%4E6798000499C048C02F004EB900046116 3A04DA452A7C00903800200D3406720AE3622A409575
%4E6738000499E050003204D2412A4C200D34062A4095751000487800193403 48C22F024E934FEF
%4E67C800049A000010604872 01B27900904ADC663E3203D2412A4A200DC18D4A751000C18D662C
%4E62C800049A203403D4422A4A200D3203D241207C009048FE3230100052412A403BB120003203
%4E658800049A40D2412A7C00904916427510003 3FC000100904B184A7900904B166F064279009C
%4E6408000 49A604B16427900904B227000600001C234044 8C22F0230034 8C0D080207C00904864
%4E6748000 49A8030300 8004 8C02F004EB900047356508F4A7900904B166F06427900904B164279
%4E66F8000 49AA000904B2272FF200160000184322EFFFED2412A7C0000C40E3C3510003203D241
%4E6938000 49AC02A4A200DC18D4A751000C18D670000FC34064 8C2487800044EB9000404BAB48C
%4E6D68000 49AE0588F6F0000E64878000A34034 8C22F024E93508F6000FC64322EFFFED2412A7C
%4E6518000 49B000000C40E3C3510003203D2412A4A200DC18D4A751000C18D670000B0340648C2
%4E68C8000 49B20487800044EB9000404BAB480588F6F00009A340348C22F0230044 8C02F004EB
%4E60E8000 49B400004611 63204D2412A7C00903800047504001000 3404D4422A7C00902000200I
%4E6478000 49B60320548C15381D281207C0000C5342A403BB018002000487 8000A340348C22F02
%4E6BD8000 49B04E9333FC000100904B184FEF00106000FEC4322EFFFED2412A7C0000C40E3C3
%4E66B8000 49BA010003203D2412A4A200DC18D4A751000C18D671634064 8C2487800044EB9000
%4E6C68000 49BC004BAB480588F6E00FF6A4A466F543203D2412A4A200DC18D4A751000C18D664
%4E66A8000 49BE07201B27900904ADC66383403D4422A4A200D3203D241207C009048FE3230100
%4E6228000 49C0052412A403BB120003203D2412A7C00904916427510003 3FC000100904B18600
%4E6C1800 049C20FE347000600872FF2001600270004CDF3CFC4E5E4E7548E73E38382F00263 2
%4E6528000 49C40002A247C009048EA267C00904B22287C00048064 3204D241227C009038003A3
%4E6938000 49C601000720AE26D340548C22002C189B2FC0003C1896D000A30C189B2FC0008C18
%4E65D800 049C806E202240578920092240D3C02009303B00064EFB000209B409640A1000CA00C
%4E6008000 49CA000CAC189B2FC0028C1896D0009FAC189B2FC003BC1896E0009EE224043E9FFD
%4E68E800 049CC020092240D3C02009303B00064EFB000206B8069007DA07DA04E404E405BE05F
%4E69D800 049CE005F805FB05F805F805F802F009D609D609D609D6002B005A2F3C00080000320
%4E6AAB00 049D0048C12F014EB90004AFF64A7900904B16508F6F06427900904B164EB900041B6
%4E6748000 49D20425374FF200260000994320348C1D281227C00904BD62009C1894A711800C18
%4E6668000 49D406D067000600009763203 48C12F01300448C02F004EB90004DA64508F6000095
%4E6588000 49D604253B67900904B6666064EB90004C34A3203227C0090493613BC00081000340
```

```
%4E628800049D8048C27215D481D442227C00902800209320 4D241207C00902800323010000441
%4E63D800049DA002000241FF800641000CD2432240338120003403 48C27215D481D442227C009C
%4E6EF800049DC0300020093204D241207C00903000323010000241FF800641001222403381200C
%4E693800049DE0320348C1D281227C00904BD62009C1894A711800C1896D28340348C27215D481
%4E62C800049E00D442227C00902000200932034 8C1D281207C00904BCC224033B018002000603
%4E643800049E20340348C27215D481D442227C00902000200932034 8C1D281207C00904864323C
%4E621800049E401800D241207C00902000224033B01000200032034 8C12F01300448C02F004EB9
%4E662800049E6000008DAC300348C0D080207C00904864323008004 8C12F014EB900008BD4340
%4E62F800049E804BC2D482227C00904864200932030641001522403381280032 03D241227C009C
%4E64C800049EA0491642711000740 6B4454FEF000C6600007C0C79009800904000640000923239
%4E659800049EC00090400452413 3C100904A700C7903E700904A706308047903E000904A7033F9
%4E64D800049EE00090400000904A727B017407B4790090400062 06D8790090400E4A446710527
%4E677800049F0000904A7253444EB90004A9E260EC7407B4790090 4A72663632390090400E524
%4E644800049F200241000733C10090400E602234054 8C25D82E58233C200904A70323900904A7C
%4E65A800049F405341 33C100904A724EB90004A9E20C79009B00904000652E0C39000100904930
%4E63C800049F6067240C39000100904937671A0C39000100904938671 00C39000100904939670
%4E643800049FB042790090484C3203D241227C00904A3C33B900904A7010003003E540207C000C
%4E69B800049FA0C4562F3000004E944A7900904B16588F6F06427900904B1674FF2002600006FE
%4E607800049FC03403227C00904 8E62009720022401231200003403204A700010302000D280700I
%4E672800049FE0B081640000 6A2F3C00200000320348C12F014EB90004AFF64245508F3205E54
%4E66B80004A000227C00904 8D62009C1894AB11000C1896D2E3205227C009049362009C1890C3
%4E61D80004A020000 11000C189661832052 24A2009C1890C31000C1000C1896406700060000671
%4E64480004A0405245740 4B4456EB442536000064A42533003E540207C0000C4762F3000004E9
%4E66680004A0604B780064320348C12F014EB90004A9A442A732044 8C12F014EB900047280320
%4E643800 04A080D241227C00904046323110007 40AE4693A017002B0414FEF0014630C3203224
%4E60280004A0A05231100060000EA7C0C3403224A2009720022401231200 09C413203207C009
%4E62180004A0C048E67000103010009C40BA466F0000B43403224A2009120622 40D33120003A0
%4E63B80004A0E0DA45227C00904046200932067 40AE5612240937150003204D241227C00904 04
%4E6EF80004A100200974002240343110000282 0000FC000C82000004006648 3204D241227C009
%4E61080004A120200033BC0AFC10003204D241227C00902800067102001000 3404D442227C009
%4E6E080004A140300020093204D241207C00903000323010000241FFC00041000922403381200
%4E66280004A16032034 8C12F014EB900043726 4A7900904B16588F6F06427900904B167000600
%4E62A80004A180053C3403224A2009120522 40D3312000320348C12F014EB900043726 4878000
%4E67F80004A1A0320348C12F014EB90004AFF64FEF000C600004E442533403227C00904 8E6200
%4E6F080004A1C07200224012312000340320 4A700010302000D280700BB081640000742F3C002
%4E67A80004A1E00000320348C12F014EB90004AFF6742DB445508F665242453205E541227C009
%4E64F80004A2004BD62009C1894AB11000C1896D2E3205227C00904936 2009C1890C310001100
%4E62F80004A220C1896618320522 4A2009C1890C31000C1000C1896406700060000482524574 0
%4E61B80004A240B4456F00045260B070006000047032032 27C00904 8E6523110003003E540207
%4E646B0004A2600000C4862F3000004E943203 48C12F014EB900043726 4878002032034 8C12F0
%4E68780004A280 4EB90004AFF64FEF0010600004 0A487B002E320348C12F014EB90004B2BA320
%4E63B80004A2A0D241227C00904B0033BC04B010003003E540207C0000C4862F3000004E94425
%4E67A80004A2C04FEF000C600003D0320548C12F01300348C02F004EB90004B2BA3A00508F665
%4E6FE80004A2E03403227C00904 8E6200972002240123120003403204A700010302000D280700
%4E63E80004A300B08163103203227C00904 8E6523110007A01601E7401B4790090486266144 87
%4E67080004A3200064320348C12F014EB90004A9A47A01508F4A456724320348C12F014EB9000
%4E63180004A34037263003E540207C0000C4862F3000004E94425350BF6000033E70006000035
%4E67B80004A3603C39009049B07000300680FC03EB02800000FFFF52802F0030044 8C02F004EB
%4E66580004A380000472 8050 8F603C4878008032034 8C12F014EB90004AFF63203227C00904B1
%4E64D80004A3A0523110007C640C79009800904000508F640002E442A7320448C12F014EB9000
%4E64E80004A3C07280508F7401B4790090486267 0E3203D241227C00904B085471100032 03D24
%4E63580004A3E0227C00904B08200974002240343110003239009048 6248C1D281B481631A34C
%4E63680004A400D442227C00904B08200932390090486 2D241224033812000424 5BA43674A32C
%4E66180004A420E541227C00904 8D62009C1894AB11000C1896734320 5D241227C00904B0820C
%4E63D80004A4407401C189B4711000C189641C3205D241227C00904B085371100032 05227C009
%4E63380004A46049D00031000210005245740 4B44566AA3003E540207C0000C4862F3000004E9
%4E63380004A4B0320648C12F01300348C02F004EB90004A9A4320322 7C009049D000310002 10C
%4E65580004A4A042534FEF000C600001EE3203227C00904A202009C1894A311000C1896750320
%4E62780004A4C0227C00904A2052311000320322 7C00904A202009C1890C31000A1000C189665
%4E66380004A4E07401B4790090486 26C483003E540207C0000C4462F3000004EB90004B03C487
```

```
%4E62380004A500000000B94EB90004803C508F602442453205227C00904A204231100052457404
%4E64F80004A520B4456EEC3203227C00904A2013BC000110003203E541227C009048D620097464
%4E65180004A5402240D5B110003203E541227C009048D62009C1890CB1000000C81000C1896D1C
%4E66180004A5603203D241227C00904AA833BCFFFF10003203227C009049F4423110003203227C
%4E64980004A580009049D00031000210004878002 04EB9000404BA721DB280588F6C343003207C
%4E66480004A5A00000C4CE1030000048048C02F004EB9000404BAE5803203E541207C0000C4BE
%4E66480004A5C0D0B01000588F22402F114E94588F60123003E540207C0000C4662F3000004E94
%4E67880004A5E0588F4878000132034 8C12F014EB90004AFF64253508F6000009E3203224A2009
%4E62280004A600C1894A311000C1896606700060000 0AE4253320322 4A53311000320348C12F01
%4E65880004A6204EB900043726487800043203 48C12F01300448C02F004EB90004A6C24879000C
%4E65A80004A64000154E944FEF0014604C3203224A2009C1894A311000C1896604700060 5E425
%4E62880004A6603203224A53311000320348C12F014EB900043726487800033203 48C12F01300
%4E69780004A68048C02F004EB90004A6C24879000000154E944FEF00144A7900904B166F0C427
%4E69280004A6A000904B16600470006012320448C12F014EB900008BD474FF2002588F4CDF1C7
%4E67A80004A6C04E7548E73820362F0016342F001A322F001E247C009049E4227C009049D4300
%4E64A80004A6E0D040207C0090200000C709D7C000065463002 48C0D0803800D8442049300248C
%4E6F780004A700D08052803200D2413003338010003180400030024 8C0D080D040204A4270000
%4E60D80004A720300248C0D0805280D040204A31BC00020000600000CE3003D040207C0090200
%4E64B80004A7400C709D3C000065483002 48C0D0803800D8442049300248C0D0805280320 0D24
%4E60380004A7603003338010003180400030024 8C0D080D040204A31BC00030000300248C0D08
%4E60DB0004A7805280D040204A31BC00010000600000744244700 4B0416636300448C02F00300
%4E66780004A7A048C02F0030034 8C02F004EB90004A80E48C02F0030024 8C02F0030034 8C02F0
%4E67080004A7C04EB90004A8D838004FEF0018603430044 8C02F0030024 8C02F0030034 8C02F0
%4E69F80004A7E04EB90004A8D848C02F0030024 8C02F0030034 8C02F004EB90004A80E38004FE
%4E69280004A800001 84EB90004388C4CDF041C4E7548E73E00382F001A362F001E342F00223A0
%4E66880004A820EA453C040246001F7002B0426F4C320648C12F01300548C053802F004EB9000
%4E65B80004A840382A4A80508F6734300348C0D080320248C1D081D040207C009049D43184000
%4E64E80004A860300348C0D080320248C1D081D040207C009049E4427000005242700 2B0426F4
%4E66E80004A880320648C12F01300548C052802F004EB90004382A4A80508F6734300348C0D08
%4E64D80004A8A0320248C1D081D040207C009049D43184000030034 8C0D080320248C1D081D04
%4E67C80004A8C0207C009049E431BC00020000524230024 8C04CDF007C4E7548E73E00382F001
%4E67280004A8E0362F001E342F00223A04EA453C040246001F7002B0426F4E320648C153812F0
%4E66980004A900300548C02F004EB90004382A4A80508F6734300348C0D080320248C1D081D04
%4E65780004A920207C009049D43184000030034 8C0D080320248C1D081D040207C009049E431B
%4E64480004A940000300005242700 2B0426F4E320648C152812F01300548C02F004EB90004382
%4E64F80004A9604A80508F6734300348C0D080320248C1D081D040207C009049D431840000300
%4E66280004A98048C0D080320248C1D081D040207C009049E431BC00010000524230024 8C04CD
%4E66D80004A9A0007C4E7548E73000342F000E362F00123002E540207C009048EE3202D241227
%4E61E80004A9C000904B0832311000C2C3D3B00000300220 7C009049D00030000100004CDF000
%4E67780004A9E04E752F0A247C00904A727007B052660634B9009040104EB90004FED47000301
%4E65080004AA00E5802040D1F9000380004A906700000870 72B052641E7072B052640E34BC000
%4E68980004AA20700123C00090401260025252 4EB90004FED460C8245F4E7548E73F3C267C009
%4E65E80004AA404004287C00048 03C227C000404BA2A097C0F4244083900000090485667262F3
%4E66E80004AA60000088004879000 0D49E4EB9000001424A44508F663C48790000009E4E94780
%4E65D80004AA80588F602E0839000100904B5667242F3C00008400487900 00D4D84EB90000014
%4E6A480004AAA04A44508F660C4879000000AC4E947801588F4A790090496A66447008B053623
%4E66C80004AAC02F3C00008C004879000 0D4624EB900000142760048780004 2A454E954A8057C
%4E6A280004AAE0440374004A4457C24402C6824FEF000C670C4879000000AE4E947801588F083
%4E64A80004AB00000600904856673 22F3C00009000487900 00D50C4EB9000001424A44508F661
%4E69480004AB2048780004 2A454E954A80588F660C4879000000AF4E947801588F7008B053630
%4E6FC80004AB4000F2700030390090 4AA602800000040067000127001B0536700000A7007B05
%4E63480004AB60660000D0700030135380E540207C0000D43A247000003812360448C32F032F2
%4E69080004AB800002340648C252462F02741D2F2A00024EB900043189480E282588F2F024EB
%4E66780004ABA00000025A4AAA00064FEF001067303604 48C32F032F2A0006340648C252462FC
%4E6AF80004ABC0741D2F2A00064EB900043189480E282588F2F024EB90000025A4FEF00104AA
%4E63C80004ABE0000A6718700030390090 4AA602800000040066082 46A000A6000FF7C7005B05
%4E67C80004AC00620000FE487800042A454E954A80588F660000EE760036135B833003E540207
%4E62D80004AC200000D4562F3000004E947801588F600000D00C7900980090400064000 0C470C
%4E62580004AC40303900904AA602800000040066000 2B2487800082A454E95260030033640E54
%4E65A80004AC60207C0000D3FA22300000300BE540207C0000D41A247000004A81588F672C487
```

```
%4E67A80004AC80000080002F0136064BC352462F03741D2F014EB90004381894B0E282588F2F02
%4E6B980004ACA04EB90000025A4FEF0010CF8A4A87CF8A672A48790000B0002F0A360648C32F03
%4E6AA80004ACC0741D2F0A4EB900043818948 0E282588F2F024EB90000025A4FEF00104A44662C
%4E6E780004ACE0487800042A454E954A80588F6612CF8B4A47CF8B660A48790000009F4E94588F
%4E6AA80004AD004CDF3CFC4E7548E73B30246F0018267C000441F6204A700AD1C013D000904B1A
%4E67380004AD20204A700BD1C013D000904B1C204A700CD1C013D000904B1E204A700DD1C013DC
%4E63A80004AD4000904B20760016390 0904B1C7420720ED5C1CC4204006C00029870001 01A380C
%4E62E80004AD600244001F7200320002810000000C02041B0FC00806D066E16600001AEB0FC000C
%4E67180004AD806DD06E026012B0FC004066C6602AB0FC00C066BE6000020A360048780001700C
%4E66280004ADA03003723FC0812F00300248C02F004E9334004FEF000C609A720032007030C28C
%4E6F880004ADC0E8813001E540207C0000D800207000007600161072003203028100000C02041
%4E6AE80004ADE0B0FC00806D066E1C600000CCB0FC00006D00FF606E026018B0FC00406600FF54
%4E64080004AE006000007CB0FC00C06600FF486000000E070001003900904B1EB0436700000E700C
%4E63E80004AE20103900904B20B043662C70003004720FC08152802F0072003203703FC2802F01
%4E67A80004AE403002 48C02F004EB90004449434004FEF000C6000FEFE70003004720FC08152 8C
%4E67180004AE602F0072003203703FC2802F0130024BC02F004E9334004FEF000C6000FED6700C
%4E64680004AE803004720FC08152B02F0042A730024BC02F004E9334004878000170003003723F
%4E67680004AEA0C0812F00300248C02F004E9334004FEF00186000FE9F4878000170003003723F
%4E65080004AEC0C0812F00300248C02F004E9334007000300472 0FC08152802F0042A730024 8C0
%4E66480004AEE02F004E9334004FEF00186000FE6670003004720FC08152802F0048780001300 2
%4E64880004AF0048C02F004E9334004B780001700030037 20FC0812F00300248C02F004E93340C
%4E65180004AF204FEF00186000FE2C0800000 5674E0800000467267000300472 0FC08152802F0C
%4E66E80004AF4048780001300248C02F004EB90004449434004FEF000C6000FDFA70003004720F
%4E66880004AF60C08152802F0048780001300 24BC02F004E9334004FEF000C6000FDD870003004
%4E67780004AF8052802F0072003203703FC2802F0130024BC02F004E9334004FEF000C6000FDB4
%4E64480004AFA0080000005672E700030045 2802F0042A73202 48C12F014E9334004878000148 7E
%4E64C80004AFC0000130024BC02F004E9334004FEF00186000FDB0700030045 2802F0042A73202
%4E61980004AFE048C12F014E9334004FEF000C6000FD644CDF0C1C4E754E56FFFE49E73F3C362E
%4E64980004B000000A242E000C382E0012247C00904B30287C00904B2E227C0000025A2A09426E
%4E65F80004B020FFFE2039009048 48C0826706700060000 2824A7900904B24670E33FC0001009C
%4E65880004B0404B244EB90004B5FC2002 81B900904848 4246700112 06E3A0C0826600000A5246
%4E63080004B0607020B0466EEC700030390 0904AA6028000000400670000 0A4A7900904B526C1C
%4E64880004B0B03006E540207C0000DE2026700000600E3006E540207C0000DE7826700000CF8E
%4E65080004B0A04A87CF8B66067000600002083006E540207C0000E01C4AB00000671C3006E54C
%4E69080004B0C0207C0000E01C2F3000004EB900048 03C7E013D47FFFE588F4AAB000467047001
%4E63B80004B0E0600270004AAB0008670472016002720056 40D0413 3C000904B2C2F134EB90004
%4E64E80004B100381833C000904B2A300348C0D080207C00904 8644A700800588F6710300348C0
%4E6E380004B1202F004EB90004B4A4588F600E2F3CFFFFFFFE4EB90004B4A4588F700030122F0C
%4E62180004B140700030142F004EB900000224 23C0C00904B2642465 08F6010300620 7C00904B32
%4E64080004B16011BC002000005246BC7900904B2A6DE830062 07C00904B32423000003C3C800C
%4E62D80004B180300648C02F0048790090 4B327000301252522F00700030142F002A454E953006
%4E64080004B1A048C02F002F137000301252522F00700030142F002A454E950C82000001004FEF
%4E60A80004B1C000206544 0C82000020006 23C3203D241207C00009E0870003030100 02F00487E
%4E63280004B1E000014878000230044 8C02F007000301253802F007200321470 0FD2802F014EB9
%4E62880004B200000002604FEF00184AAB000467203006 48C02F002F2B000470003012 52522F0C
%4E65280004B220700030142F002A454E954FEF00104AAB000867203006 48C02F002F2B000B700C
%4E64B80004B240301252522F00700030142F002A454E954FEF001030064 8C02F0048790090 4B32
%4E62580004B260700030122F00700030142F002A454E957000303900904AA6028000000 4004FEF
%4E64D80004B280010660A33FC009600904B24600833FC007800904B243003E540207C0000E07C
%4E6FF80004B2A02F3000004EB900048064302EFFFE48C0588F4CDF3CFC4E5E4E7548E73B3B362F
%4E64580004B2C0001E382F0022247C00904B30267C00904B2E287C0000025A0444002E3004D04C
%4E63D80004B2E0227C0000D810323100004 8C1340348C2D482207C00904AF870003030280 0C28C
%4E65680004B300670670006000019 84A7900904B24670E33FC000100904B244EB90004B5FC3003
%4E63A80004B32048C0D080227C00904AF83204D241207C0000D810323010008371080033FC0016
%4E63580004B34000904B2A700030390 0904AA6028000000400660A33FC000400904B2C600833FC
%4E63A80004B360000300904B2C300348C02F004EB90004B4A4700030122F00700030132F004EB9
%4E61580004B380000002242 3C000904B263003D0402 27C00009E083431000030024 8C02F004875
%4E61580004B3A00000DED070003012 52522F00700030132F004E9470003039 00904AA60280000C
%4E65F80004B3C004004FEF001C66483003E540207C0000D81E2F3000004EB90004803C300248C0
%4E62C80004B3E02F003003E540207C0000DFF02F3000007000301252522F00700030132F004E94
```

```
%4E64280004B4004879000000A04EB90004803C4FEF0018300248C02F003004E540207C0000E00(
%4E61FB0004B4202F300000700030125252 2F0070003013 2F004E943004E540207C0000D82E2F3(
%4E6278 0004B44000004EB90004803C300248C02F004879000 0DED0700030122F0070003013 2F0(
%4E64280004B4604E943003E540207C0000E07C2F3000004EB90004806470003039009 04AA6028(
%4E66D80004B4800000004004FEF0028660A33FC009600904B24600833FC007800904B2470014CDF
%4E69080004B4A01C1C4E754BE73030322F0016227C00904B2E247C00904B30267C00904B2A70FF
%4E65C80004B4C0B041670000D2300148C0D080207C00904BD64A7008006D4630014BC0D080207(
%4E66C80004B4E000904BE0363008003003 48C0741FC082E980323900904004 8C190815980E68(
%4E62B80004B500328030034 8C0028000000 3E0E2803439009040 0A48C29082E6803480605830 01
%4E62980004B52048C0D080207C00904864363008003203D241207C00902800700030301000EE8E
%4E64380004B540323900904004 8C19081E6883280203C000001E834390090400A48C29082340(
%4E63880004B560D442207C00903000720032302000EE899081E6803480025100 3F0252003F701(
%4E66680004B580B051650000 8701DB052641232BC000E34BC000F600832BC000E34BC000F700F
%4E63A80004B5A0B052630458 52600A303900904B2C5240915230 13E240B051641C70003011741I
%4E64280004B5C0321348C15281E2819481B082640830 13E240915160207000301174 1D32134BC1
%4E68880004B5E05281E2819481B082650B701C905332B0600432BC00014CDF0C0C4E7548E7300(
%4E64080004B600207C00904B244A5067445350 4A50663E4242603242406 00E207C00904B26225(
%4E67A80004B620549042515240B07900904B2A6DEA704032390090 4B2A48C19081D0802600D7B5
%4E68980004B64000904B265242B47900904B2C6DC64CDF000C4E7548E73030362F0016267C000(
%4E61F80004B660025A323C009733C100904000700030012F004EB9000409B6207C00905000 4242
%4E69B80004B680588F424130FC80005241701DB0416EF47046D1C05242701EB0426EE64EB90004
%4E67C80004B6A017083439009049664 8C22F023039009049644 8C02F004EB9000413AA4A43508F
%4E67380004B6C0660A4EB90004B984600002B47008B043660A4EB90004B9AE600002A470073403
%4E65A80004B6E048C29082C0FC003C207C0000E500D0C0244833D20090400833EA00020090400A
%4E64980004B7007001B0436652701972153601EB43D64042A74878003F340348C20282000003EC
%4E63580004B7200A82000003E0ED827012D4802F0232034 8C1700BE1A10481000002002F013035
%4E66E80004B7400000D2F043C02F0030034 8C02F004EB900008A844FEF0018207C00905522740A
%4E68280004B760721142585241701DB0416EF67068D1C05242700FB0426EE84879000080002F2A
%4E68A80004B780000442A7740E2F2A00044EB900043189480588F2F024EB90000026C76044AAA
%4E68480004B7A000084FEF0010671A4879000080002F2A000834034 8C252432F0242A74E934FEF
%4E68080004B7C000104AAA000C671A4879000080002F2A000C340348C252432F0242A74E934FEF
%4E66C80004B7E000104AAA0010671A4879000080002F2A0010340348C252432F0242A74E934FEF
%4E65880004B80000104AAA0014671B4879000080002F2A0014340348C22F0242A74E934FEF0010
%4E66680004B820487900008 0002F2A0018487800 0B74112F2A00184EB900043B189480588F2F02
%4E67D80004B8404E9348790000 80002F2A001C4878000D74112F2A001C4EB900043B189480588F
%4E69F80004B8602F024E9348790000 80004 8790000E08C4878000F42A74E93760F4AAA00204FEF
%4E65180004B880003067 1C4879000080002F2A0020340348C252432F02487800124E934FEF0010
%4E64F80004B8A048790000 80004 8790000E09C4878001242A74E93761348790000080002F2A0024
%4E65280004B8C0340348C252432F02487800014E9348790000080002F2A0028340348C252432F02
%4E66F80004B8E0487800014E9348790000 80002F2A002C340348C252432F02487800014E934AAA
%4E66C80004B90000304FEF0040671A4879000080002F2A0030340348C22F02487800014E934FEF
%4E66580004B9200010487900008 0004 8790000E0A8487800 1842A74E9376194AAA00344FEF0010
%4E67080004B940671C4879000080002F2A003434034 8C252432F02487800014E934FEF00104AAA
%4E67B80004B9600038671A4879000080002F2A003834034 8C22F02487800014E934FEF00104CDF
%4E64D80004B9800C0C4E7548790000 80004 8790000E3764EB9000001422F3C000088004 8790000
%4E6A880004B9A0E4F44EB9000001424FEF00104E7548E7302033FC011400904008 33FCFFFC0090
%4E67880004B9C0400A207C009051AE72037417425852427 01DB0426EF67074D1C05241701CB041
%4E68780004B9E06EE8487900008 0004 8790000E0C242A7740E48790000E0C24EB900043B189480
%4E66280004BA00588F2F024EB90000026C247C0000E0CA700030390090 4AA6028000004004FEF
%4E64F80004BA200010670624 7C0000E1DC76054A926720487900008 0002F1A340348C252432F02
%4E6A780004BA4042A74EB90000025A52434FEF001060DC4CDF040C4E7548E72038247C000404BA
%4E67780004BA60287C00904B54267C00904B524A7900904B14660001B64A7900904 84C670001AC
%4E63C80004BA804A7900904 852660001A20C7900980090400065000196537900904 84C70003039
%4E65980004BAA00090484C80FC003C484002800000FFFF4A8066000160487900008000048780001
%4E66280004BAC0487800027000303900904 84C80FC003C02800000FFFF340048C02F0048780002
%4E67280004BAE0487800224EB900000272700AB0424FEF0018662642534254487B00104E924AB0
%4E67680004BB00588F66167032B0790090400464 0C487B00044E9252403880588F4A5367065353
%4E67480004BB20600000F24A54675A7006B0426E5430024 8C05D80E580321448C15381E541207C
%4E65280004BB400000EE08D0B0100022402F114EB9000480647006B042588F660000BA48780002
%4E68880004BB604E92E580207C0000EE18588F2F3008004EB900048064 36BC00014254588F6000
```

```
%4E6878 0004BB8000947006B042663A487800044E924A80588F662E487800044E923400E540207C
%4E65F8 0004BBA00000EE30588F2F3000004EB90004803C3002D040207C0000EE4036B000000588F
%4E6298 0004BBC060524A426632700030390090 4AA6028000000800670470006008487800044E92
%4E67E8 0004BBE0588FE540207C0000EE202F3000004EB900048064588F601C700AB0426D163002
%4E68E8 0004BC00E540207C0000ED8C2F3000004EB90004B064588F4A790090484C660E4A790090
%4E6EB8 0004BC2048626706 4EB90004BC304CDF1C044E754E56FFFC48E73E38247C00904936287C
%4E6228 0004BC4000000260267C0000025A4879000000484EB90004B06433F900904A7200904000
%4E6CD8 0004BC6033F900904A700090400433FCFFFF00904B6C427900904B6833FCFFFF00904B52
%4E6BB8 0004BC802F3CFFFFFFFF4EB9000430AC207C00905000424250 9F424130FCB0005241701D
%4E6AB8 0004BCA0B0416EF47046D1C05242701EB0426EE64EB90004BEC03A00CAFC006442423002
%4E627 8 0004BCC0D040207C00009E083C30000036027C7FC00055C433002204A0C30000200006700
%4E60F8 0004BCE00010300220 4A0C30000800006600014C3002D040207C00904A343B300000C8C5
%4E6618 0004BD003002207C00904B1010300000024000FFC0C42D40FFFC3002E540207C009048EE
%4E6358 0004BD20222EFFFCD3B000003002207C009049D000300001000030064 8C02F0048790000
%4E64F8 0004BD40ED6032034 8C12F0148780007 4E9330064 8C02F0048780001487800037000 3005
%4E63F8 0004BD602F00300348C02F0048780007 4E9430064 8C02F0048780001487800057000 3004
%4E66F8 0004BD802F00300348C052432F0048780016 4E9430064 8C02F0048790000ED6C320348C1
%4E6438 0004BDA02F0148780009 4E9330064 8C02F0048780001487800043202207C00904B107000
%4E6558 0004BDC0103010002F00300348C052432F0048780017 4E9430064 8C02F0048790000ED78
%4E6948 0004BDE0320348C12F0148780001 4E9330064 8C02F0048780001487800062F2EFFFC3203
%4E6428 0004BE0048C12F0148780015 4E943002204A0C30000800004FEF00906600006E3002204A
%4E6518 0004BE2011BC000200003002 48C07214D0812F004EB90000BE90588F604E3002204A0C30
%4E6458 0004BE4000010000664230064 8C02F0048790000ED80320348C152812F0148780004 4E93
%4E6588 0004BE60300248C0D080207C00904864303008004 8C02F004EB90000BBD43002204A11BC
%4E6348 0004BE80000200004FEF0014300248C0D080207C00904864427008005242700 4B0426E00
%4E6C08 0004BEA0FE1E4279009048623 3FC0001009048523 3FC012C00904B144CDF1C7C4E5E4E75
%4E6088 0004BEC02F02227C00904936424242413001204 90C300008000066025242524170 04B0416ECE3002
%4E6078 0004BEE000020006700000E300120490C300008000066025242524170 04B0416ECE3002
%4E6908 0004BF004BC0241F4E7548E73E3023FC0000EE5000904B6042790090 4B5C207C00904B60
%4E6618 0004BF202250549033D100904B5E33F90000EE4A00904B5A33FC00010090 4B5642433003
%4E6A48 0004BF4048C0E980D0800680009102002240701CD3C032BCBFFF52437009B0436EE03C3C
%4E68C8 0004BF60AB80247C0000EE5E742022 7C00905FA842443A3C008032C242433039 0000EE5E
%4E6148 0004BF80321A3641B0416730300 2D040207C00902000318B00003202D241207C00902800
%4E6FB8 0004BFA03004D0453180100030 02D040207C00903000318600005242064504005243 7029
%4E6748 0004BFC0B0436EB604460400524 47009B0446EA2558953424243602B6516D163203D241
%4E64A8 0004BFE0207C00903800300353403180100053 4360E6328255893403524470 09B0446ED6
%4E6218 0004C000300248C05260D040207C00903800320252413181000033F90000EE4800904B58
%4E6B68 0004C0204CDF0C7C4E7548E72030247C00904B5C207C00904B56227C00904B5870FEB079
%4E65C8 0004C0400090485266000 0CC4A516D0000C653514A516C0000BE32B90000EE48227C0091
%4E6598 0004C0600204267C00910206424242413 2DB52417007B0416EF67010D7C032DB7010D3C0
%4E6B18 0004C08052427009B0426EE2537900904B5A4A7900904B5A6C00006A33F90000EE4A0090
%4E6608 0004C0A04B5A3010D1523012B0790000EE4E6F1034B90000EE4E30104BC0448030B06040
%4E6598 0004C0C03012B0790000EE4C6C3634B90000EE4C30104BC0448030B03010D152207C0090
%4E6658 0004C0E04B602250549033D100904B5E207900904B604A50660A23FC0000EE5000904B60
%4E66E8 0004C1003012720CE360D07900904B5E33C0009103124CDF0C044E7548E72020247C0090
%4E6408 0004C1204B6C4A52660000FC303900904B7E3400D040207C009020004A700000660000DE
%4E68B8 0004C140300248C02F004EB900046D384A80588F670000CA33FC000800904B6A42A74878
%4E62C8 0004C160003F30024BC00280000003E00A80000003E0ED807212D0812F00320248C1700B
%4E6478 0004C180E1A1048100000 2002F013039000006BC48C02F00300248C02F004EB900008AB4
%4E66B8 0004C1A0303900904B664BC02F00320248C12F014EB900045FBA300233C000904B6833C0
%4E6C28 0004C1C000904B7234BCFFFF23FC00007D2900904B7842790090 4B6E427900904B7C33FC
%4E6AA8 0004C1E0000100904BA433FCFFFF00904BDE42B900904B7448780008300248C02F004EB9
%4E6798 0004C2000004C7344EB90004D6A8487900000041 4EB9000480644FEF002C600C34BC0078
%4E6BD8 0004C22060064A526F0253524CDF04044E754E56FFF848E7300042433003D04041EEFFF8
%4E61B8 0004C240427000003003207C009049364A300000670000B23003E540207C00904BD64AB0
%4E6368 0004C260000067000A0300348C0D080207C009048644A700800670000BC3403D44241EE
%4E6748 0004C280FFF83203 48C1D281227C00904AF870003031180072FEC081E9B0318020003203
%4E65B8 0004C2A0D24141EEFFF83403227C009048E6700010312000C1FC0003D17010003203D241
%4E6638 0004C2C0207C00904B087001B0701000641A3203D24141EEFFF83003D040227C00904B08
%4E6488 0004C2E030310000D17010003203D24141EEFFF83403227C009048EA700010312000E348
```

```
%4E6B580004C300D17010005243700 4B0436E00FF2C33FCFFFF00904B6642414[illegible]041E
%4E66C80004C320FFF8B27000006C123003D04041EEFFF83230000033C300904B6652437004B04
%4E69D80004C3406ED84CDF000C4E5E4E75207C00904B684A5067000074700 1B07900904B6E670
%4E66080004C360006833FC000100904B6E4A7900904BA06706537900904BA03010B07900904B7
%4E67A80004C38066084EB90004D6A86046301 0B07900904B72662810390090 4BA648804 8C0588
%4E68180004C3A07207C0812F00301048C02F004EB90004C7344EB90004D6A8508F601433F9009
%4E6C380004C3C04B7000904B72600833FCFFFF00904B6C4E7548E73C30362F001E227C00904B7
%4E67280004C3E0267C00904AF8247C00904B084A7900904B6E6600000A0C9100007D296706700
%4E65C80004C4006000017E33C300904B6633FC000200904B6E427900904BA83003207C009048E
%4E61680004C42078001830000 0C9FC00033003D040204A3A300000300320 7C009048EA7400143
%4E63A80004C4400000E34A320348C1D281204B7001B0701800640642406000004 0B8426F08B84
%4E69D80004C4606F04702D6032BA446F08BA426F0470296026B4456F08B4446F047035601A4A4
%4E65780004C4806704702D60124A4567047029600A4A4267047035600270294 8C02040B0FC002
%4E66680004C4A06D066E1C600000 6EB0FC00006D0000AE6E026016B0FC0029660000A26000007
%4E64280004C4C0B0FC00356600009 6605C702D228078073203 48C1D281204B700030301800720
%4E65480004C4E01404E5A1C08167243003 48C0D080204B72011404E5A14641C3700800320348C
%4E68580004C5002F014EB9000430AC588F605053444A446F4A60BC702D22803003207C009048E
%4E6FE80004C5205330000060367035228030032 07C009048EA533000006024320 3D241204A700
%4E63E80004C54030301000C1FC03E8ED807229D08122803003D040204A31BC000100003203 48C
%4E68080004C5602F014EB9000430AC2F3C000100003203 48C12F014EB90004AFF670014FEF000
%4E6CF80004C5804CDF0C3C4E7548E73030247C00904B66267C0090400433FCFFFF00904B6C427
%4E66F80004C5A000904B6E4A79009048526D0000DE7008B053620000D674003413E68A4878000
%4E69680004C5C04EB9000404BAB480588F630000BE4EB90004C22E70FFB052670000B0301248C
%4E64A80004C5E0D080207C00904864303008003 3C000904B6433C000904B7E361351437064B04
%4E62780004C6006C0276643003E2403600703290433 6003012E540207C009048EE223000007001
%4E64B80004C620E0A924013012D040207C00904A3484F00000700FB0426C02740F320248C17006
%4E66380004C640D280300348C0D2802F014EB9000404BA72149242D041E5403200E9409041 33C
%4E66280004C66000904B6C427900904BA2427900904BA04243588F3003D040207C00904B80427
%4E67B80004C68000005243701 0B0436EEA4CDF0C0C4E7548E72020342F000E302F0012247C009
%4E64580004C6A04B64B07900904B66660000347001B07900904B6E6700002830024 8C02F003012
%4E6C980004C6C048C02F004EB90004D9DE508F2F00301248C02F004EB90004C6E4348250BF4CDF
%4E65F80004C6E004044E7548E73000342F000E122F0013700030028 0FC002C4840028000 00FFFF
%4E64C80004C7007600360286FC002C02830000FFFF2403EF8206820090505 4D08220401001520C
%4E62F80004C7200200000F1210020100F0D00110804CDF000C4E7548E73000342F000E122F0013
%4E66F80004C7407000300280FC002C4840028000 00FFFF7600360286FC002C02830000FFFF2403
%4E63E80004C760EF8206820090505 4D08220404A7900904B6E661E7000101002800 00000F06612
%4E63380004C7807000100152 60E98012100201000FD00110804CDF000C4E752F02322F000A700C
%4E68880004C7A0300180FC002C4840028000 00FFFF7400340184FC002C02820000FFFF2202EF81
%4E63180004C7C00681009050 54D08120404A7900904B6E670C1010E8080200000F53006008101C
%4E67080004C7E00200000F53004A006C02700848804 8C0241F4E7548E73030247C00904B68267C
%4E67480004C80000904B6A227C00904B724A526700027E70FFB07900904B66670002724A79009C
%4E65780004C8204BDE6C000268700 2B07900904B6E66000088361 2D643207C009020003013 48CC
%4E67F80004C840E780227C00904BA832114 8C15251E4817407C282D081D080227C0000D37A31B1
%4E66F80004C86008003000701FB07900904BA86C00021E4EB90004C34A487800024EB9000404BA
%4E65F80004C88022003001340 04B0E580227C0000F9C8588F2F3108004EB90004B064300248CC
%4E6BE80004C8A0E580227C0000F9D02F310B004EB90004B03C508F600001D64A7900904BA4663E
%4E61580004C8C03412D442207C00902800301272 0BE360044002003 1802000341 2D442207C009C
%4E6FE80004C8E03000321248C10281000003E00A81000003E0ED8130010640001231 8020007 20E
%4E66180004C9003012B051671A321148C12F01341248C22F024EB90004D9DE3200508F600000A4
%4E65280004C92030114 8C0721FC081E9803400594230124 8C0721FC08166143012D040207C009C
%4E60380004C9402800 4A7000006C0406420200301 2D040207C00902800303000000EE4894403011
%4E6F480004C96048C00280000003E00AB0000003E0E2803600301 2D040207C00903000303000 0C
%4E69380004C980EE4896407201700 3B0426D0870FDB0426E0242417003B0436D0870FDB0436E02
%4E64E80004C9A0720270FDB0426D0A700890410240000732007 0FDB0436D0A700C904102400007
%4E64180004C9C03200368130 01D040207C0000F9DB3230000042790090 4BCA700030012F004EB9
%4E66780004C9E00004CA922400320230013 3C100904BA4588F6D0000984A7900904B7C67343612
%4E66380004CA00D643207C00902000301 348C0E780227C00904BA8321148C15251E4817407C282
%4E66680004CA20D081D080227C0000D2FA31B108003000605A4A40673A7008B0536F343612D643
%4E65D80004CA40207C00902000301348C0E580227C00904BA8321148C15251E4817403C282D081
%4E63180004CA60D080227C0000C69C31B108003000601C3212D241207C00902000301348C0D08C
```

```
%4E6C880004CAB0227C0000D2E831B1080010004CDF0C0C4E754E56FFEC48E73F38362E000A247C
%4E64E80004CAA00090280026 7C00903000287C0004D2E242443C3900904B683006D040204A3D70
%4E65880004CAC00000FFEC3006D040204B3D700000FFEE08030004660001743006D040204A0670
%4E6B480004CAE0018000002F3CFFFFFF0048522F3C000406AC4E943A004FEF000C6C0678016000
%4E6F380004CB0002BA3005D040207C009020000C70800000006700001630 05D040207C00902000
%4E62480004CB200C70B0010000660000C80C7902000090403A630000BC320548C1300648C05280
%4E65080004CB40741FC0823D46FFFA2E2EFFF848C72D47FFF87420D5AEFFF802AE000003E0FFF8
%4E6AF80004CB60D0AEFFF8B2806632080300006672C3006D040204B0670008000002F3CFFFFFF80
%4E67280004CB8048532F3C000404C24E944A804FEF000C6C00050E7801600005083205 48C13006
%4E67B80004CBA048C05280741FC0823A0648C574209A82028500000 3E0D085B280660001FE0803
%4E63F80004CBC00007670001F63006D040204B0470008000004878008048532F3C0004053E4E94
%4E65180004CBE04A804FEF000C6C0004B8780160000 4B23005D040204A72003230000070 0FC280
%4E63D80004CC00740CB4816E0001D478013205D241207C00904046700030301000720AE2A82F00
%4E68D80004CC204EB90004C3D24A80588F6700018E3006D040204A31AEFFEC00003006D040204B
%4E62C80004CC4031AEFFEE0000600001720803000566 0016A3006D040204A0470018000004878
%4E65D80004CC60018048522F3C000406464E943A004FEF000C6C0678016000014230 05D040207C
%4E6DF80004CC8000902000 0C70800000006700001630 05D040207C00902000 0C70800100006600
%4E68C80004CCA000C80C7902000090403A630000BC320548C1300648C05380741FC0823D46FFFE
%4E66B80004CCC02E2EFFFC48C72D47FFFC7420D5AEFFFC02AE000003E0FFFCD0AEFFFCB2806632
%4E68280004CCE00803000667 2C3006D040204B0670008000002F3CFFFFFF8048532F3C000404C2
%4E67980004CD004E944A804FEF000C6C0003967801600003903205 48C1300648C05380741FC082
%4E63F80004CD203A0648C574209A82028500000 3E0D085B2806600008608030007670000 7E3006
%4E66A80004CD40D040204B0470008000004878008048532F3C0004053E4E944A804FEF000C6C00
%4E63880004CD60034078016000033A3005D040204A72003230000070 0FC280740CB4816E3C7801
%4E66580004CD803205D241207C00904046700030301000720AE2A82F004EB90004C3D24A80588F
%4E67980004CDA06718 3006D040204A31AEFFEC00003006D040204B31AEFFEE00000B0300066600
%4E66080004CDC00172 3006D040204B0470016000004878018048532F3C0004053E4E943A004FEF
%4E60A80004CDE0000C6C0678016000028 83005D040207C00902000 0C70800000006700001630 05
%4E60B80004CE00D040207C00902000 0C70800100006600 00C80C7902000090403863000 0BC3205
%4E61B80004CE2048C1300648C05380741FC0823D46FFF22E2EFFF048C72D47FFF07420D5AEFFF0
%4E67C80004CE4002AE000003E0FFF0D0AEFFF0B2806632080300056 72C3006D040204A06700080
%4E6BC80004CE6000002F3CFFFFFF8048522F3C000406AC4E944A804FEF000C6C00022678016000
%4E66680004CE800220320548C1300648C05280741FC0823A0648C57420DA82028500000 3E0D085
%4E62880004CEA0B280660001FC0803000467 0001F43006D040204A0470008000004878008048 52
%4E66E80004CEC02F3C000406464E944A804FEF000C6C0001D0780160000 1CA3005D040204A7200
%4E63880004CEE032300000700FC280740CB4816E0001B278013205D241207C00904046700030 30
%4E6A880004CF001000720AE2A82F004EB90004C3D24A80588F6700018C3006D040204A31AEFFEC
%4E62880004CF2000003006D040204B31AEFFEE0000600001700803000766000168 3006D040204B
%4E6AD80004CF4006700180000002F3CFFFFFF0048532F3C000404C24E943A004FEF000C6C067801
%4E6FC80004CF606000013E3005D040207C00902000 0C70800000006700001630 05D040207C0090
%4E61780004CF8020000C70800100006600 00C40C7902000090403863000 0B8320548C1300648C0
%4E62180004CFA05380741FC0823D46FFF62E2EFFF448C72D47FFF4742095AEFFF402AE000003E0
%4E6BE80004CFC0FFF4D0AEFFF4B2806632080300056 72C3006D040204A06700080000002F3CFFFF
%4E6A880004CFE0FF8048522F3C000406AC4E944A804FEF000C6C0000AC7801600000A63205 48C1
%4E65180004D000300648C05280741FC0823A0648C574209A82028500000 3E0D085B2806600008 2
%4E60780004D020080300046700007A3006D040204A0470008000004878008048522F3C00040646
%4E65D80004D0404E944A804FEF000C6C5678016052 3005D040204A72003230000070 0FC280740C
%4E64A80004D060B4816E3C78013205D241207C00904046700030301000720AE2A82F004EB90004
%4E6A680004D080C3D24A80588F6718 3006D040204A31AEFFEC00003006D040204B31AEFFEE0000
%4E65480004D0A03006D040204A36300000EE4B3006D040204B3E300000EE4F3847320348C1700C
%4E63880004D0C0D280E8813A010245001F340C48C250820282000001F00A82000001F0E3823002
%4E6A380004D0E0DA40302EFFEC0240FF803206D241204A323010000241FF8090413D40FFEC302E
%4E6D080004D100FFEE0240FF803206D241204B323010000241FF8090413D40FFEE0C6EFF00FFEC
%4E6D380004D1206D00001E0C6E0100FFEC6E000140C6EFF00FFEE6D00000A0C6E0100FFEE6F06
%4E66F80004D140427900904B7C4A7900904BCA6600017CBC45675C3005D040207C009020004A70
%4E66480004D160000066 4C300548C02F0034064 8C22F024EB900008B9E33C500904B6830390090
%4E67F80004D1804B72B07900904B68508F662410390090 4BA648B04BC058807407C0822F003039
%4E67580004D1A000904B6848C02F004EB90004C734508F303900904B72B07900904B686600010C
%4E67080004D1C032054 8C1701FC280E9813401594232390090 4B684BC1701FC280661430390090
%4E62180004D1E04B68D040204A4A7000006C0406420200300390423400 6C0830024BC044803400
```

```
%4E62880004D200300C320548C102B1000003E00A81000003E0E2819041A406C044BC044807203
%4E65280004D220B2426D0000A67203B2406D00009E303900904B7EB07900904B70670000863039
%4E66C80004D24000904B7EB07900904B6866000076720 1B27900904B6E6600006A0CB900007D29
%4E65680004D26000904B78672223F900904B7800904B742F3C00020000303900904B6648C02F00
%4E69B80004D2804EB90004AFF6508F303900904B6648C02F0034390090 4B6848C22F024EB90004
%4E6B080004D2A05FBA303900904B6848C02F004EB900008BD4427900904B6872FF20014FEF000C
%4E6B480004D2C060184EB90004D6A87801323900904B7C48C1300448C0D28020014CDF1CFC4E5E
%4E669B0004D2E04E7548E73C00222F0014242F0018362F001E3A3900904B6830054 8C02F002041
%4E68E80004D3004E903800588F6D3630044 8C02F004EB90004D4264A80588F662430054 8C0D080
%4E65980004D3202040D1C2300548C0D0802240D3C23011D0430240FF3F308030044 8C0600270FF
%4E69E80004D3404CDF003C4E7548E73C003A3900904B68427900904B68427900904B6E38390090
%4E63080004D3604B7A0244003F3205D241227C009020003044 8C0D080207C0000C53433B00800
%4E60980004D38010003405D442227C00903000320448C1207C0000C62470001030180032054 8C1
%4E61F80004D3A002810000003E00A81000003E0ED81D04133802000360 5D643227C009028003204
%4E63580004D3C048C1207C0000C66070001030180034057 20BE362D042320448C1D281207C0000
%4E64580004D3E0C5AC907018003380300034 05D442227C00903800300472 0AE3603205D241207C
%4E62680004D40000903800323010000241 03FFD04133802000203900904B78EC8033C0009049B0
%4E69080004D4204CDF003C4E7548E73820362F0016247C00904B7C207C00904BA83003D040227C
%4E6FE80004D440009038003831000070 0AE06C3403D442227C00902800220970002241303120 00
%4E66680004D460740FC082720CB2806E00011A7001B07900904B6E660001084A52670000F6700F
%4E65980004D4B0B0506C0000FA0CB900007D2900904B78670000EC3003D040227C009040463831
%4E66180004D4A00000700AE06C300448C0D080227C00904AF82209C3890831000508 01C3896704
%4E63780004D4C0700460027000360 4E543227C009048D62209340448C2D4803002D040207C0000
%4E67180004D4E0F98830300004 8C0C38991B13000C3896C0E3004E540227C009048D642B10000
%4E64580004D5003004227C009049D00031000200004 87800104EB9000404BA4A80588F66264878
%4E65880004D52000034EB9000404BA24003002E540207C0000F9BC588F2F3000004EB900048064
%4E67280004D540588F6018300448C0E580207C0000A4762F3008004EB900048064588F300448C0
%4E63380004D560D080227C0090401A33BC000C08004252600C303900904B6A5240348042507000
%4E65A80004D5806000012070 3BB0446612340348C22F024EB90004D798588F600001087009B044
%4E69080004D5A06E507027B0446D4A4A526734700FB0506C3A343900904B6648C22F0232034 8C1
%4E69180004D5C02F014EB900046116340348C22F024EB900008BD4425270FF4FEF000C600000C4
%4E64880004D5E0303900904B6A5240348042507000600000B2300448C02200C389B2FC0003C389
%4E69380004D6006D00009EC389B2FC0008C3896E202241578922092241D3C12209323B10064EFB
%4E69580004D6201002007E007E007E007E007E007EC389B2FC0018C389660460000066C389B2FC
%4E6C280004D6400027C3896D5AC389B2FC003AC3896E50224143E9FFD922092241D3C12209323B
%4E6F580004D66010064EFB100200280028002800280028002800280028002800280028002800280028
%4E66680004D68000280028003A003A003A003A003A340348C22F024EB900008BD470FF588F6002
%4E69A80004D6A070004CDF041C4E7548E7203B247C00904BA6267C00904B68287C00904B723213
%4E66C80004D6C04BC12F014EB90004C798146033D400904B7010124880D040207C0000F9983030
%4E62280004D6E00000D0530240001F12124881D241207C0000F9AA3430100032130241 03E0D441
%4E65180004D700D04238800B120000588F66000086321448C12F014EB90004C79834007008B042
%4E65880004D720588F6700006E101248804 8C0320248C1B3807203C0817202B280665612124881
%4E62780004D740D2424A4266080C1200066700000C4A1266087006B0426602504130 01E2401480
%4E61A80004D76010124880D040207C0000F99830300000D0530240001F12124881D241207C0000
%4E68D80004D780F9AA3430100032130241 03E0D441D04238804CDF1C044E7548E73838342F001E
%4E66B80004D7A0247C00904BA0287C00902800267C00904B684A526D000036B47900904B726600
%4E62180004D7C0002C301248C0D080207C00904B80383008006700001830 04D040204C72003230
%4E64980004D7E00000700FC280700CB0B16E0670006000019630 12B07900904BA26D127210B252
%4E62680004D800660C4EB90004C34A7000600001 7A3004D040207C009020004A700000670E3004
%4E69180004D8204BC02F004EB900008BD4588F33FC000100904BCA4A7900904B6E661430125252
%4E64480004D8404BC0D080207C00904B8031930800601230125352 48C0D080207C00904B804270
%4E65F80004D860080048780004300248C02F004EB900046070427900904BDE33C400904BE83004
%4E60C80004D880D040207C0090200031BC000100003604D643204C3004720BE360044002003204
%4E61A80004D8A0D241224C32311000024 1007FD04131803000360 4D643207C00903000300448C0
%4E60D80004D8C00280000003E00A80000003E0ED803204D241227C00903000323110000241007F
%4E62480004D8E0D04131803000 3B133604D643204C3002720BE360044002003204D241224C3231
%4E6F980004D900100002410 07FD04131803000360 4D643207C00903000300248C00280000003E0
%4E60A80004D9200A80000003E0ED803204D241227C00903000323110000241007FD04131803000
%4E65C80004D9404B79000000404EB90004B0643013B07900904B704FEF000C6728303900904B70
%4E69580004D9604BC02F00301348C02F004EB90004D9DE508F2F00301348C02F004EB90004C734
```

```
%4E6A780004D980508F72FF20014CDF1C1C4E754A7900904B6E66000048303900904BA048C05380
%4E65680004D9A0D040207C00904BAA30300000033C000904B7248C02F00303900904B6848C02F00
%4E6CB80004D9C04EB90004D9DE508F2F00303900904B6848C02F004EB90004C734508F4E7548E7
%4E64A80004D9E03C00342F0016322F001A38020244001F36010243001F4A44660C701FB0436606
%4E62780004DA0006440020600E4A43660A701FB0446604064300203A039A443601024303E03002
%4E62C80004DA20024003E0964072014A4566024241 4A43660272024A456C0A7008904102400007
%4E65080004DA4032004A436F0A700C904102400007320 04A4566064A436602720830014BC04CDF
%4E6CE80004DA60003C4E754E56FFF448E73F38362E000A382E000E267C00904A6C247C00904A6E
%4E67480004DA803003D040207C009028007E002D47FFFC3D700000FFFF3003D040207C00903000
%4E6DA80004DAA07C003C300000426EFFF42D7C000000B0FFF6426EFFFA600000F0302EFFFA48C0
%4E69380004DAC0D080207C0090496E30300B003840B640670000D23A0C48C5701FCA80E9855985
%4E64780004DAE0EF85300590530C407000620000B8340C48C20282000003E00A82000003E0E2B2
%4E62880004DB00EF82300290520C407400620000981439009048564082024200083000C0240001F
%4E63080004DB2032030241001FB0416306 3A009A4160043A019A404A42670C7010D04562067020
%4E67880004DB4090453A00300CEA403203EA41B0416306 3C009C4160043C019C40202EFFF67200
%4E65580004DB60320574003406D282B0B16200001C202EFFF6720032057400 3406D282B0816624
%4E61980004DB804A79009040446C1C7E002D47FFF63D45FFF870003006 2E2EFFF6DE802D47FFF6
%4E64180004DBA03D4CFFF4526EFFFA3E2EFFFABE79009049AE6D00FF064A6EFFF4660670006000
%4E60980004DBC002C84243426EFFFA302EFFFA4BC0D080207C0000F9983870080 0D8EEFFF42E0C
%4E6A180004DBE00247001F3847302EFFFA48C0D080207C0000F9AA30300800322EFFF4024103E0
%4E69680004DC00D041D8C03A0C48C5701FCA80E9855985EF85300590530C407000620000523 40C
%4E62280004DC204BC20282000003E00A82000003E0E282EF8230029052 0C407400620000323204
%4E69780004DC4048C12F01340C48C22F024EB90004E2264AB0508F660000183 20C4BC12F014EB9
%4E6E580004DC600004E39C4AB0588F6700000452435 26EFFFA7008B06EFFFA6E00FF4E7201426E
%4E6DE80004DC80FFFA302EFFFA207C009049364A300000673C302EFFFAE540207C009048D64AB0
%4E6DE80004DCA00000672A302EFFFAD040207C00904BEA3E2EFFF4BE700000661 4302EFFFAD040
%4E6CD80004DCC0207C00904BD64A700000 6D025241526EFFFA7004B06EFFFA6EA8B6416C067000
%4E66380004DCE0600001A6320448C12F01300448C0D080207C009048643430080 048C22F024EB9
%4E69080004DD000004607030 04D040207C00904BEA31AEFFF40000B87900904B66508F66284A79
%4E68A80004DD2000904B6E6620700FB07900904BA26D16303900904BA248C0D0B0207C00904BAA
%4E65880004DD4031AEFFF408003004D040207C00904BD642700000487900000404EB900048064
%4E67E80004DD603D7900904008FFFE2E2EFFFC48C72D47FFFC7068D1AEFFFC700B2E2EFFFCE1A7
%4E6B280004DD802D47FFFC04AE00000200FFFC3C390090400A48C6706CDC800286000001F00A86
%4E60B80004DDA0000001F0EF8642AEFFF64243426EFFFA588F302EFFFA4BC0D080207C0000F998
%4E6D380004DDC03870080 0D8EEFFF42E0C0247001F3847302EFFFA4BC0D080207C0000F9AA3030
%4E6D280004DDE00800322EFFF4024103E0D041D8C03A0C48C5701FCA80E9855985EF8530059053
%4E62D80004DE000C407000620000643 40C48C20282000003E00A82000003E0E282EF8230029052
%4E64A80004DE200C407400620000443005906EFFFE320048C12A016C06200544802A0030029046
%4E6AA80004DE40320048C124016C0620024480240020 05D0B22E2EFFF6BE806C102D45FFF62E2E
%4E62E80004DE60FFF6DE822D47FFF6360C526EFFFA7009B06EFFFA6E00FF3C3004D040207C0090
%4E6BD80004DE804BE0318300007 0FE4CDF1CFC4E5E4E752F02302F000A3200D241207C00904BCC
%4E60B80004DEA048C0D080227C00904864303108003400D040227C0090200031B1000010003002
%4E68180004DEC0D040207C00902000 31BC17090000241F4E7548E73E38342F0026247C0004E2DE
%4E63380004DEE0267C00904B66287C00904B643002D040207C0090485A7200323000000 2810000
%4E64E80004DF0000F00C81000000F066104B7800084EB9000404BA3A00588F60243002D040207C
%4E64080004DF200090485A72003230000 0E889700FC2802001D080227C0000BFF03A3108003002
%4E63480004DF40D040207C00904BEA3C300000424430042 07C0000F9EA72001230000 0D2450241
%4E64E80004DF60000730014BC0D080207C0000F99836300800D6460243001F30014BC0D080227C
%4E62E80004DF800000F9AA30310800320602410 3E0D041D6407220B2436E0002100C4304006C00
%4E67C80004DFA0020830034BC0721FC081E9805980EF8090790090 4A6C0C407000620001EC3003
%4E65D80004DFC048C002800000003E00A80000003E0E280EF8090790090 4A6E0C407400620001CA
%4E66680004DFE0300248C02F00300348C02F004EB90004E2264A80508F660001B0300348C02F00
%4E66080004E0004EB90004E39C4A80588F6700019C3002D040207C00904BE0318300002F3C0010
%4E69480004E020000030024 8C02F004EB90004AFF6B453508F662A4A7900904B6E6622720FB279
%4E64180004E04000904BA26D18207C00904BA2301052504BC0D080227C00904B8033830800 3002
%4E65680004E0604BC0D080224C303108004BC02F004EB900008BD4300248C0D080204C31830800
%4E64580004E0803003D040207C009020004A700000588F6756300248C02F0030034BC02F004EB9
%4E67680004E0A000049C364A80508F66103003 48C02F004EB90004E36C588F602E3002207C0090
%4E62F80004E0C049360C300008000066 1E3203D241207C009020003002D040227C00904BCC31B1
%4E6F680004E0E000001000600001 3A30024BC02F0042A7300348C00280000003E00A80000003E0
```

```
%4E64380004E100ED807212D0B12F00320348C1700BE1A104810000020070 0CD2B0300248C0D280
%4E66980004E1202F014878170930034 8C02F004EB900008A84300248C02F00300348C02F004EB9
%4E62C80004E14000046070300248C02F00300348C02F002F3C000404C24E92300248C02F003003
%4E66780004E1604BC02F002F3C0004053E4E92300248C02F00300348C02F002F3C000406464E92
%4E66E80004E180300248C02F00300348C02F002F3C000406AC4E92B4534FEF005066000 8433C3
%4E66580004E1A000904B646000007A52447208B2446E00FD9E3202D241207C00904BE0300248C0
%4E63480004E1C0D080224C30310800360031801 0002F3C001000003002 48C02F004EB90004AFF6
%4E68080004E1E0300248C02F00300348C02F004EB900046070B4534FEF0010661C4A7900904B6E
%4E64FB0004E200661430390090 4BA248C0D080207C00904B8042700800B453660633C300904B64
%4E64780004E2204CDF1C7C4E7548E73800322F0012342F00163001D040207C00902000038300000
%4E60FB0004E2403001D040207C00903800363000007 00AE06B0C4480006700004870 01B0446700
%4E62380004E2600040D241207C00902800700030301000720FC081720CB2806F000026703BB043
%4E61D80004E2806700001E7004B0436700000870 03B0436612300220 7C009048EA4A3000006604
%4E64FB0004E2A0700160027000 4CDF001C4E752F02342F000A300248C0D080207C00904864323 0
%4E640B0004E2C00800D241227C00902000300 2D040207C00904BCC33B000001000241F4E7548E7
%4E66380004E2E03C00282F0014362F001A342F001E30034 8C02F0020444E903A00588F6D000068
%4E62D80004E3003005D040207C00902800720032300000700FC280700CB0816F4C3005D040207C
%4E6E880004E320009020000C708001000067 3A3005D040207C009020000C7080000000067283002
%4E6B580004E3404BC02F0030054 8C02F004EB900049C364A80508F6698300548C02F004EB90004
%4E6BC80004E360E36C588F60884CDF003C4E75302F0006B07900904B686616427900904B6833FC
%4E60B80004E380FFFF00904B6C33FCFFFF00904B6648C02F004EB900008BD4588F4E7548E73E00
%4E62680004E3A0342F001A3802700BE164044020030024 8C00280000003E00A80000003E0ED80
%4E63480004E3C03C00424530054 8C0D080207C0000A39E36300800300202 4003E0D6403005 48C0
%4E63380004E3E0D080207C0000A38E30300800D0420240001FD6407020B0436C00007A0C430400
%4E61FB0004E4006C0000723203D241207C00902800700030301000720FC081720CB2806E563003
%4E6FE80004E420D040207C00902800720032300000700030049 2804A816C062001448022000C81
%4E6F480004E440000007C06E00002E3003D040207C00903000720032300000700030069 2804A81
%4E65A80004E4606C062001448022000C81000007C06E04700060 0C52457008B0456E00FF4870FF
%4E69580004E4804CDF007C4E7548E7303B342F001A247C00904A10267C00904A08287C00904A18
%4E60980004E4A03002D040204A4A7000006F0001443002D040204A537000003002D040204A4A70
%4E61980004E4C00000660001 4C3002D040204C527000003002E540207C009048D60CB0000001F4
%4E63580004E4E000006C423002D040207C00904A003030000048C0E5803202E541227C009048D6
%4E66380004E500B0B110006F204878000430024 8C02F004EB90004AFF6300248C02F004EB90004
%4E64C80004E52067DC4FEF000C3202D241207C00904A007014B07010006C383002D040204B3202
%4E60E80004E540D241227C00904A0032311000D37000003002D040204B0C707D0000006F0000B2
%4E60880004E5603002D040204B31BC7D000000600000A23002D040224B3031000048C03202D241
%4E63180004E580204C81F010003600705 0B0436C463202D241204C7003B07010006C3848780002
%4E68780004E5A04EB9000404BAE580227C0000F9F2588F2F3108004EB90004803C3002D040204A
%4E66780004E5C031BCFDAB00003002D040204B427000005 88F603C703CB0436F363002D040204C
%4E6E880004E5E0427000003002D040204B4270000060203002D040204A527000003002D040204A
%4E60080004E6004A700000660A3002D040204C427000003002D040204A4A700000661A3002D040
%4E63D80004E620204A31BC003C00003002D040207C00904A00427000004CDF1C0C4E7500904A00
%4E6B180004E640427000004CDF1C0C4E753A03EA4D3802EA4C0B39000400904BB167223005908 4
%4E6D480004E6600C8000000010630606440020601030049 0850C8000000010630406450020340 4
%4E63580004E680944572014A46660242414A42660272024A466C0A700890410240000732004A42
%4E65980004E6A06F0A700C904102400007320 04A4666064A42660272087000300 14CDF007C4E75
%4E67880004E6C048E73C38382F0022342F0026247C00904B8A267C000478722 87C009049443004
%4E64480004E6E0D040207C009038003A300000720AE26D36050C4300016D0007C20C4300106E2A
%4E65680004E700D643363B30044EFB3002009C07B007B007B007B007B007B007B0005600560056
%4E64680004E720076007 3A07B001400140 0C4300316D00078A0C43003E6E000782D643363B30A4
%4E68880004E7404EFB300204C6077604AC05CE05CE02E602E6013403A203D603F20404040A00D8
%4E69880004E760300548C02F004EB90004D8004A80588F670A48790000003F4E93588F2F3C0080
%4E65D80004E780000030024BC02F004EB9000493044A7900904890508F6F0642790090489042 52
%4E66F80004E7A072FF6000072A42A7300448C02F004EB90004364A3002D040207C00904AFC3202
%4E65E80004E7C0D241227C0000FD483602D643247C009049FE3231100035813000 48C144B13181
%4E60480004E7E000003002D040207C00904964427000003002D040207C0090401E31BC00120000
%4E64F80004E8002F3C040000003002 48C02F004EB90004930472FF4FEF0010600006B43002D040
%4E65180004EB20207C00904B8C4A7000006D04600006 8C300248C02F0030044 8C02F004EB90004
%4E65680004E840C7422200508F6000068642523005 48C02F00300448C02F0048C22F024EB90004
%4E68C80004E860D37A4A7900904890 4FEF000C6F0642790090489060 00FF2A3002207C00904940
```

Appendix C - MAIN LOOP GAME PROGRAM
©1985 ATARI GAMES, CORP.

```
%4E6FB80004E8807200123000003602700010343000D280700BB08164522F3C020000003002480
%4E65F80004E8A02F004EB900049304424550 8F3005E540207C009049304AB000006D1E3005207C
%4E60C80004E8C00090495 80C3000010000660E30050C34000C00006404600005E252450C450004
%4E65480004E8E06DCA4252600005C442523002E540207C0000FD502F3000004E93487800643002
%4E66D80004E9004BC02F004EB90004F19642A7300448C02F004EB900046A903004D040207C0090
%4E62980004E9204056303000007 20AE26832005 5404FEF00146C0A3002523400006000000CA700C
%4E61D80004E9403A02760016345000904 33A02227C00904940760016315000904 3B2406F0000A2
%4E62F80004E9603602120 0D3343000360 4D643207C009040564 8C0720AE3A0917030003004D040
%4E60380004E980207C009040567200323000000281 0000FC000C81000004006646 3004D040207C
%4E61B80004E9A00090200031BC0AFC00003004D040207C00902800067002000003604D643207C
%4E61080004E9C000903000D844227C00903000720032314000028 10000FFC07009828031813000
%4E68280004E9E0300248C02F004EB9000465604A7900904890588F6F06427900904890600004BC
%4E63C80004EA003002D3340000300248C02F004EB900046560487800083002 48C02F004EB90004
%4E60880004EA2093044FEF000C60000482425230022 07C00904940720012300000360270001034
%4E63A80004EA403000D280700BB08164000005C2F3C020000003002 48C02F004EB9000493040C45
%4E65A80004EA600037508F663C42453005E540207C009049304AB000006D1E3005207C00904958
%4E600B0004EAB00C3000010000660E30050C34000C00006404600004265 2450C4500046C00040C
%4E61780004EAA060C66000041630022 07C00904940523000003002E540207C0000FD902F300000
%4E68480004EAC04E9330024 8C02F004EB900046560487800203002 48C02F004EB9000493044FEF
%4E65680004EAE00010600003C648780006300248C02F004EB9000495CA3002D040207C0090489A
%4E65080004EB0031BC04B00000E542207C0000FD902F3020004E9342526000FF0A487800073002
%4E66F80004EB2048C02F004EB9000495CA3002D040207C009048A260CA4878000830024 8C02F00
%4E64880004EB404EB9000495CA60BE4878000960EC3004D040207C00902000720032300000481
%4E65C80004EB6000001700E4812F01300248C02F004EB9000495CA3A00508F664C3002207C0090
%4E6FE80004EB8049407200123000003602700010343000D280700CB08163103002207C00904940
%4E64F80004EBA0523000007A01601E0C79000100904 8BC66144878006430024 8C02F004EB90004
%4E68E80004EBC0F1967A0150BF4A45672230024 8C02F004EB900046560E542207C0000FD902F30
%4E65080004EBE020004E934252508F600002C0600002CC363900904B087000300380FC03E80280
%4E65E80004EC000000FFFF52802F00602E4878008030024 8C02F004EB900049304300220 7C0090
%4E66380004EC2049FA5230000076640C7900980090400050 8F6400027642A7300448C02F004EB9
%4E63F80004EC4000046A90508F0C79000100904 8BC670E3002D040207C00904892547000003002
%4E64080004EC60D040207C00904892720032300000303900904 8BC48C0D080B28063183002D040
%4E67280004EC80207C00904892323900904 8BC48C1D2813181000042 45BA42673E3005E540207C
%4E62880004ECA0009049304AB00000672E3005D040207C009048920C7000010000631C3005D040
%4E61F80004ECC0207C00904892537000003005207C0090488C00300002000052450C45000466B6
%4E65B80004ECE03002E540207C0000FD902F3000004E93300348C02F00300248C02F004EB90004
%4E63280004ED00F196207C0090488C00300002200006000FE043002207C00904AB04A300000674A
%4E60C80004ED203002207C00904AB0523000003002207C00904AB00C30000A000066520C790001
%4E66F80004ED4000904BBC6F483002E540207C0000FD702F3000004EB90004784A4879000000B9
%4E66180004ED604EB90004784A508F6024424530052 07C00904AB0423000005 2450C4500046DEC
%4E61A80004ED803002207C00904AB011BC000100003002E540207C009049307264D3B000003002
%4E67E80004EDA0E540207C009049300CB0000000C800006D1C3002D040207C009049D031BCFFFF
%4E6F680004EDC000003002207C00904A8442300000300220 7C0090488C00300002000048780020
%4E67C80004EDE04EB9000405F0721DB280588F6C303002207C0000FDD81030000048804 8C02F00
%4E67A80004EE004EB9000405F0E5803202E541227C0000FDC8D0B11000588F28402F14600E3002
%4E66C80004EE20E540207C0000FD802F3000004E93588F4878000130024 8C02F004EB900049304
%4E62980004EE406000FDA230024A3400006604600000 6C4252300253340000300248C02F004EB9
%4E60380004EE600004656048780 0D602230024A3400006602604642523002533400003002 48C0
%4E68E80004EE802F004EB900046560487800 0C300248C02F00300448C02F004EB90004EED64879
%4E655B0004EEA0000000154E934FEF00144A79009048906F0C4279009048906004720060103004
%4E6D980004EEC048C02F004EB90000E4B672FF588F20014CDF1C3C4E7548E73820362F0016342F
%4E65C80004EEE0001A382F001E247C00904A40227C00904A303003D040207C009020000C709D7C
%4E62080004EF000000653A300248C0D080D040320248C1D2815281D2413383100033830000 3002
%4E62280004EF2048C0D080D0404272000030024 8C0D0805280D04035BC000200006000000B83003
%4E65380004EF40D040207C009020000C709D3C0000653C300248C0D080D040320248C1D2815281
%4E62480004EF60D2413383100033830000300248C0D080D04035BC000300003002 48C0D0805280
%4E63780004EF80D04035BC000100006000006A4241 0C44000D662E48C12F01300248C02F003003
%4E68980004EFA048C02F004EB90004F000320048C12F01300248C02F0048C32F034EB90004F0CA
%4E66D80004EFC0602C48C12F0130024 8C02F00300348C02F004EB90004F0CA320048C12F013002
%4E6B380004EFE048C02F0048C32F034EB90004F00032004FEF00184EB9000429504CDF041C4E75
```

```
%4E66880004F00048E73E00382F001A362F001E342F00223A04EA453C040246001F0C4200026C4C
%4E66A80004F020320648C12F01300548C053802F004EB9000428F44A80508F6732300348C0D080
%4E63780004F040320248C1D081D040207C00904A30318400003003 48C0D08032024 8C1D081D040
%4E63180004F060207C00904A404270000052420C4200026C4E320648C12F01300548C052802F00
%4E67180004F0804EB9000428F44A80508F673430034 8C0D080320248C1D081D040207C00904A30
%4E62180004F0A0318400003003 48C0D080320248C1D081D040207C00904A4031BC000200005242
%4E69C80004F0C030024 8C04CDF007C4E7548E73E00382F001A362F001E342F00223A04EA453C04
%4E66A80004F0E00246001F0C4200026C4E320648C153812F01300548C02F004EB9000428F44A80
%4E63B80004F100508F6734300348C0D080320248C1D081D040207C00904A30318400003003 48C0
%4E63080004F120D080320248C1D081D040207C00904A4031BC000300005242 0C4200026C4E3206
%4E66B80004F14048C152812F01300548C02F004EB9000428F44A80508F6734300348C0D0803202
%4E64880004F16048C1D081D040207C00904A30318400003003 48C0D080320248C1D081D040207C
%4E65FB0004F18000904A4031BC000100005242300248C04CDF007C4E7548E73800362F0012382F
%4E63980004F1A000163203E541207C00904948 3403D442227C00904892700030312000C0C4D1B0
%4E65280004F1C01000207C00904 88C003000013 0004CDF001C4E7548E73000322F000E48C1302F
%4E65280004F1E0001248C0EB80D081D08041F90090200043F900903800363C0040383C08004282
%4E60780004F200064000400240 07FEB0436D18323000000C41800066123231 00000241FC000C41
%4E60FB0004F220FC0067040642001004400080024007FEB0436D18323000000C41800066103231
%4E625B0004F24000000241FC000C41FC0067025042320055400240003E024107C0D041B0436D18
%4E6FC80004F260323000000C41800066103231 00000241FC000C41FC0067025242064000 40B043
%4E60A80004F2806D18323000000C41800066103231 00000241FC000C41FC0067025442064000 40
%4E62B80004F2A0024007FEB0436D18323000000C41800066103231 00000241FC000C41FC006702
%4E61480004F2C0584232005840024 0003E024107C0D041B0436D18323000000C41800066123231
%4E61180004F2E000000241FC000C41FC0067040642008004400040B0436D18323000000C418000
%4E62180004F300661232310000 0241FC000C41FC0067040642004004400040024007FEB0436D18
%4E60EB0004F320323000000C41800066123231 00000241FC000C41FC0067040642002020024CDF
%4E67E80004F340000C4E7548E73E38382F0026362F002A247C00904964267C00904890287C0004
%4E62880004F36005F03003D040207C009049B8083000020001 67047A0460027A00DA433004D040
%4E62580004F380207C00903800 3C300000700AE06E30060C4000016D0005120C40003E6E00050A
%4E6CF80004F3A0D040303B00044EFB000203A804FE04FE04FE04FE04FE04FE04FE03A803A803A8
%4E68D80004F3C000A800A8007C03A803A800E001A801A801A8014C04FE01A800E004FE00E004FE
%4E68C80004F3E0027A02AE0338027A02AE0338027A02AE0338027A02AE0338027A02AE033804FE
%4E6A180004F40004FE04FE027A02AE033803A803AE03A803A803A803A803A803A803A803A803A8
%4E65F80004F42003A803A803A83003D0404A720000671230034 8C02F004EB90004BC1E588F6000
%4E64180004F44000A60C79000100904BB0660001C0600001964878 04C0487805C0300448C02F00
%4E6B680004F4604EB9000484024A804FEF000C6718300348C02F00300448C02F004EB90004E6C0
%4E63F80004F4802400600002F6600002CA30044 8C02F00D643207C00904 8BE3030300048C02F00
%4E68580004F4A04EB900046B6674FF600002D0487800193003 4BC02F004EB90004F196508F3003
%4E69180004F4C048C02F00300448C02F004EB900044EDA30044 8C02F004EB90000E4B6D6434272
%4E65780004F4E030004FEF000C4A536F02425342790090488A6000025E3004D040207C00902800
%4E62280004F5000830000400016 74A3004D040207C00902800027 0FFEF00003204D241207C0090
%4E6FE80004F5202000D844227C00904056740034314000700AE0AA3002740034000 68200000200
%4E60680004F540D482227C0000B91231B128001000600000BC3003D0404A720000670000803003
%4E67180004F560D040207C0000FDEC3430000048C22F024E9432003005D040227C0000FDDCD271
%4E6EC80004F58000003004D040207C00902800937000003430000002420 00F300648C0227C0000
%4E65F80004F5A0B2027200123108009441544257425 88F6400FEFA30034 8C02F00300448C02F00
%4E68B80004F5C04EB900044EDA4878001930034 8C02F004EB90004F1964FEF001060300C790001
%4E63780004F5E000904BB066263003D0403203D241227C00904 95C3431100048C2528235820000
%4E65A80004F600D643207C00904974427030000 33FC0001009049B64A536F02425342790090488A
%4E61280004F62060000286300 5D040207C0000FDF43A3000003003D0404A720000670000D03405
%4E68380004F6404 8C2487800044E94B480588F6F0000BE4878000A6000FE5A3005D040207C0000
%4E66D80004F660FDF43A3000003003D0404A720000670000 9C340548C24 87800044E94B480588F
%4E65B800Q4F6806F00008A300348C02F00300448C02F004EB900044EDA3004D040207C00903800
%4E62780004F6A0047004000000D844207C00902000340648C25382D482227C0000B24231B12800
%4E66680004F6C040004 878000A300348C02F004EB90004F19633FC0001009049B64FEF00106000
%4E65880004F6E0FF343005D040207C0000FDF43A3000003003D0404A720000671234054 8C24878
%4E67F80004F70000044E94B480588F6E00FF7A4A456F3E3003D0404A720000663 40C7900010090
%4E64280004F7204BB0662A3003D0403203D241227C0090495C3431100048C2528235820000D643
%4E63980004F740207C00904974427030006000FEC06000015874FF600001543003207C00904944
%4E63580004F7604A300000661A2F3C0800000030034 8C02F004EB900049304740050 8F6000012C
```

```
%4E63E80004F7803003207C009049445330000030034BC02F004EB900046560300348C0E580207C
%4E65280004F7A00000FD502F3008004EB9000478723003D040207C009049FE31BC001E00003003
%4E69A80004F7C048C02F0030044BC02F004EB900044D74343900904BBC48C2D48250822F024E94
%4E66E80004F7E03A000C4500014FEF001466047A1B60280C4500036C047A38601E0C4500076C04
%4E63E80004F8007A3360140C4500076700000B0C45000966047A3660027A3442A7300548C02F00
%4E60580004F820320548C1207C0000B1C27000103018003204 48C10281000003E00A81000003E0
%4E64280004F840ED81D0812F0030548C0227C0000B2027400143108003204 48C1700BE1A13005
%4E64780004F86048C0D080207C0000B144303008004BC09280D4812F02300548C0D080207C0000
%4E68D80004F880B2423030080048C02F004BC42F044EB90000E36642790090488A4A534FEF0018
%4E6C180004F8A06F0242536000000027400200 24CDF1C7C4E75F0F0F0F0F0F0F0F4F0F0F0F0F0F0
%4E61F80004F8C0F0F0F0F0F0F0F0F0F0F0F0F070F0F0F0F0F0F0F0F0F0F0F0F0F0F0F0F0F0F0F0F0
%4E62980004F8E0F0F0F0F0F0F0F0F0F0F0F0F0F0F0F0F0F0F0F0F0F0F0F0F0F0F0F0F0F0F0F0F0F0
%4E61080004F9002F5D0F0AE1F070F0F0F0F0F0F0F0F0F0F0F0B3F0E0F0F0F0F0D0F0F0F0F0F0
%4E61D80004F920F0F0F0F0F0F0F0F0F0F0F0F0F0F0F0F0F0F0F0F0F0F0F0F0F0F0F0F0F0F0F0E0F0F0F0F0
%4E61480004F940F0F0F0F0F0F0F0F0F0F0F8F0F0F0F0F0F0F0F0F0E0F0F0F0F070F040F0F0F0F0
%4E62280004F960F0F0F0F0F0F0F0F0F0F0F0F0F0F0F0F0F0F0F0F0F0F0F0F0F0F0F0F0F0F0F0F0F0F0F0F0
%4E62380004F980F0F0F0F0F0F0F0F0F0F0F0F0E0F0F0F0F0F0F0F0F0F0F0F0F0F0F0F0F0F0F0F0F0F0F0
%4E61D80004F9A0F0F0F070F0F0F0F0F0F0F0E0F0F0F0F0F0F0F0F0F0F0F0F0F0F0F0F0F0F0F0F0F0
%4E62B80004F9C0F0F0F0F0F0F0F0F0F0F8F0F0F0F0F0F0F4F0D0B1F0F0F0F0F0F0B0F0F0F0
%4E62580004F9E0F0F090F0F0F0F0F0F0F0F0F0F0F0F0F0F0F0F0F0F0F0F0F080F0F8F0
%4E62C80004FA008ADE8F07F0F0F0F0F0F0F0F0F0F0F0F0F0F0D0F0F0F0F0F4F0D0F0F0F0F0
%4E61A80004FA20F0F0F060F0F0F0F0F0F0F0F0F0F0F0F0F8F0B0F0F0F0F0F0F0F0F0F0F0F0F0
%4E62180004FA40F0F0F0F0F0F0F0F0F0F0F0F0F0F0F0F0F0F0F0F0F0F0F0F0F0F0F0F0F0F0F0F0F0F0
%4E62180004FA60F0F0F0F0F0F0F0F0F0F0F0D0F0F0F0F0F0F0F0F0F0F0F0F0F0F0F0F0F0F0F0F0
%4E62780004FA80F0F1F0F0F0F0F0F0F0F0F0F0F0F0F0F0F0F0F0F0F0F0F1F0F0F0F0F0F0F0F0F0F0
%4E62D80004FAA0F0F8F0F0F0F0F0F0F0F2F0B0F0F0F0F0F0F0F0F0F0F0F0F0F0F0F0F0F0F0F0
%4E62980004FAC0F0F0F0F0F0F0F0F0F0F0F0F0F0F0F0F0F0F0F0F0F0F0F0F0F0F0F0F0F0F0F0F0
%4E62D80004FAE0F0F0F0F0F0F0F0F0F0F0F0F0F0F0F0F0F0F0F0F0F0F0F0F2F0F0F0F0F0F0F0F0F0F0
%4E62580004FB000E9F0FAD60F07CF0F0F2F0F0F0F0F0F0F0F0F0F0B0F0B2F0F0F0F0F0F0F0F0F0
%4E62980004FB20F0F0F0F0F0F0F0F0F0F0F1F0F0F0F0F0F0F0F8F0F0F0F0F0F0F0F0F0F0F0F0F0
%4E60F80004FB40F0F4F0F0F0F0F0F0F0F0F0F0F0F0F0F0F0F0F0F0B0F0F0F0F038F000F0F0F0F0
%4E62280004FB60F0F0F0D0F0F0F0F0F0F0F0F0F0F0F0F0F0F0F0F0F0F0F0F0F0F0F0F0F0F0F0F0F0F0
%4E62780004FB80F0F1F0F0F0F0F0F0F0F0F0F0F0F0F0F0F0F0F0F0F0F0F0F0F0F0F0F0F0F0F0F0F0F0
%4E62680004FBA0F0F4F0F0F0F0F0F0F0F4F070F0F0F0F0F0F0F0F0F0F0F0F0F0F0D0F0F0F0F0
%4E62B80004FBC0F0F0F0F0F0F0F0F0F0F0F1F0F0F0F0F0F0F0F0F0F0F0F8F0F0F0F070F0F0F0
%4E62A80004FBE0F0F0E0F0F0F0F0F0F0F0E0F0F0F0F0F0F0F0F0F0F0F0F0F0F0F0F0F0F0F0F0F0F0
%4E6FC80004FC004F554F03F0F0F0F0F0F4F030F0F0F0F0F0F0F060F0F0F0F0F0F0F060F0F0F0F0
%4E63180004FC20F0F0F0F0F0F0F0F0F0F8F0B0F0F0F0F0F0F0F0F0F0F0F0F0F0F0F0CF0F0F0F0F0F0
%4E62580004FC40F0F1F0F0F0F0F0F0F0F0F0E0F0F0F0F0F0F0F0F0F0F0F0F0F0F0F2F0F0F0F0F0F0
%4E62580004FC60F0F0F0F0F0F0F0F0F0F0F0F0F0F0F0F0F0F0F0F0F0F0F0F0F0F0F0F0F0F0F0F0F0F0
%4E62F80004FC80F0F0F0F0F0F0F0F0F0F0F0F0F0F0F0F0F0F0F0F0F0F0F0F0F0F0F0F8F0F0F0F0F0F0
%4E62A80004FCA0F0F1F0F0F0F0F0F0F0F0F0F0F0F0F0F0F0F0F0F0F0F0F0F0F0F0F0F0F0F0F0F0F0F0
%4E63180004FCC0F0F0F0F0F0F0F0F0F0F4F0F0F0F0F0F0F0F0F0F0F0F0F0F0F0F2F0F0F0F0F0F0
%4E62D80004FCE0F0F0F0F0F0F0F0F0F0F0F0F0F0F0F0F0F0F0F0F0F0F0F0F0F0F0F0F0F0F0F0F0F0F0F0
%4E62380004FD000B0F6F1D24F0FBF0F0F2F0F0F0F0F0F0F0F0D060F0F1F0F0F8F0F0F0F0F0F0
%4E61A80004FD20F0F0F0F0F0F0F0F0F0F0F070F0F0F0F0F0F0F0F0F0F0F0F0F0F0F0F0F0F0F0F0F0F0
%4E61280004FD40F0F0F0E0F0F0F0F0F0F0F0F0F0F0F0F0F0F0F0F0F0F0F0F0F0F0F074F020F0F0F0F0
%4E62680004FD60F0F2F0D0F0F0F0F0F0F0F0E0F0F0F0F0F0F0F0F0F0F0F0F0F0F2F0E0F0F0F0F0
%4E61C80004FD80F0F0F0D0F0F0F0F0F0F0D0F0F0F0F0F0F0F0F0F0F0F0F0F0F070F0F0F0F0
%4E62B80004FDA0F0F0F0F0F0F0F0F0F0F0F0B0F0F0F0F0F0F0F0F0F0F0F0F0F0F2F0F0F0F0F0F0
%4E64180004FDC0F0F1F0F0F0F0F0F0F0F0F0B0F0F0F0F0F0F0F0F0C2F0FDF0F0F6F0F0D0F0F8F0
%4E626B0004FDE0F0F0F0F0F0F0F0F0F0F0F0F0F0F0F0F0F0F0F0F0F0F0F0F0F0F0F0F0F060F0F1F0
%4E61A80004FE00432F4F2CF0F0F0F0F0F0F0F0F0F0F0B0F0F0F0F0F0F0F0F0F0F0F0F0F0F0F0F0F0
%4E62280004FE20F0F1F0B0F0F0F0F0F0F1F0F0F0F0F0F0F0F0F0F0F0F0F0F0F0F1F0F0F0F0F0F0
%4E62580004FE40F0F0F0F0F0F0F0F0F0F0F0F0F0F0F0F0F0F0F0F0F0F0F0F0F0F0F0F0F0F0F0F0F0F0
%4E62580004FE60F0F0F0F0F0F0F0F0F0F0F0F0F0F0F0F0F0F0F0F0F0F0F0F0F0F0D0F0F0F0F0
%4E63080004FE80F0F0F0F0F0F0F0F0F0F0F0D0F0F0F0F0F0F0F0F0F0F0F0F0F8F0F1F0F0F0F0F0F0
%4E62D80004FEA0F0F0F0F0F0F0F0F0F0F0F0F0F0F0F0F0F0F0F2F0F0F0F0F0F0F0F0F0F0F0F0F0F0
%4E6C480004FEC0F0F0F0F0F0F0F0F0F0F0F0F0F0F0F0F0F032904E7540C046FC270033C000038000
%4E65780004FEE033C00003804046C04E7540C046FC270033C00003800033C00003807046C04E75
```

```
%4E61B80004FF0033C00003B0003180000 04E7533C0000380006JBC33C00003800033C00003FB2A
%4E60880004FF2031800004E7548E73E0042001400120016017000100128 3C0003800042454279
%4E60C80004FF4000803100204410107200 3205E9897040D2803C0132067000300620 40D1C41010
%4E60280004FF602044D61020445288D41070003001 2040D1C41010720242790080310070003001
%4E64A80004FF802040D1C4D61070003001 52802040D1C4D4105441 0C41200065DC52457204B245
%4E64F80004FFA0629C42400C0300FF66080C0200FE66027001427900803100720032007010E1A9
%4E6AB80004FFC070001003E18876001602D083D28020014CDF007C4E75F0F0F0F0F0F090F0D0F0
%4E61080004FFE0F0F0F0D0F0F0F0F0F0F0F0F0F0F0F0F0F0F0F0F0F0F0F0F0F0F0F0F0F0F0F00000
%0A81640000
tra
```

What is claimed is:

1. A video game comprising:

a central processing unit;

a video display;

a plurality of sets of controls coupled to said central processing unit;

sofware means run by said central processing unit and coupled to said controls, and to said video display for reading player input from said controls and generating, storing, changing and outputting data for causing said video display to display a maze populated by a plurality of different kinds of characters each having attributes, said maze also being populated by a plurality of attribute-affecting entities including monsters, each said character having attributes including longevity and abilities including the ability to fight and to move, said attributes defined by stored data, said longevity attribute defined by stored data and decreasing over time and when that character is damaged by a monster, and including means for displaying different types of resources having characteristics defined by stored data and displayed on said video display throughout said maze in quantities and loctions established by said software means, said resources increasing the longevity attribute or otherwise affecting the attributes of the first character which is displayed to have obtained possession of them, and for causing said video display to display action by said characters and said monsters in accordance with rules of said game implemented by the following included means:

first means for allowing a plurality of players to each simultaneously and independently control the movements and actions of one of said plurality of characters in the video game via said controls;

second means for allowing any one of said plurality of players to enter the game at any time and simultaneously and independently control the movements and actions of one of said characters independently of when the other players started playing or when any other said player or players stops playing; and third means for encouraging the players to cooperate during play by displaying on said video display only a window portion of said maze which is related to the relative positions of all the characters being active in that they are controlled by a player at that time and by not allowing any active character to move outside the bounds of said window portion and by moving the window portion to display different portions of said maze only so long as all the active characters are contained in said window portion.

2. The apparatus of claim 1 further comprising means for independently changing the stored data regarding the attributes of each character based upon events which happen to that character and actions taken by that character during the game.

3. The apparatus of claim 1 wherein characters which are under control of any player are active characters and further comprising means in said software means for reading player command inputs indicating a desire to cause the character under that player's control to appear on said video display to shoot and for causing the appropriate active character to appear to shoot, and if the character appearing to shoot is displayed on said video display as pointing at other characters or any said limited resource or a monster, for causing the video display to show the character appearing to shoot the other character or said limited resource or monster being pointed at and for causing the stored data corresponding to the other character, monster or limited resource so shot to be altered and to drive said video display according to said altered data so that said limited resource or said monster that was shot appears to be altered or the longevity attribute of the character which was shot is altered.

4. The apparatus of claim 1 further comprising fourth means in said software means for allowing any of said plurality of players to stop playing at any time regardless of whether the other players are or are not still playing.

5. The apparatus of claim 4 wherein said software means includes means for displaying limited resources and means for reading player control inputs controlling the corresponding character is a manner to appear to take possession on said video display of one or more of said displayed limited resources where taking possession occurs when said character is displayed to have entered an area around the displayed location of said limited resource, and further includes means to alter the stored data associated with that character's attributes by increasing the character's longevity or by otherwise affecting the character's attributes in a positive manner to help avoid reduced longevity of that character resulting from attacks from said monsters, and wherein these effects may be the same on each character which possesses that limited resource, and further comprises means for altering the data associated with said limited resource to alter the availability of said limited resource to other characters who attempt to take possession of said limited resource.

6. The apparatus of claims 5 wherein said software means includes means for displaying a window portion of at least one maze occupied with attribute-affecting entities including said monsters or other entities and for causing said attribute-affecting entities to appear on said video display to attack and otherwise harm said characters by altering the stored data associated with the longevity attribute of each character so attacked or harmed thereby shortening the longevity attribute of any character which is affected by said attribute-affecting entity, and further comprising means in said software means for driving said video display in such a manner as to display only said window portion of said maze, said windown portion selected to encourage the players which are controlling the characters which are active in the game to cooperate with each other to avoid the effect of said attribute-affecting entities by not allowing a player to move his or her controlled character outside the bounds of the currently displayed window portion and by selecting the portion of said maze which will be displayed as said window portion as a function of the collective positions of all the players such that said window portion cannot be moved to encompass the area in said maze where said limited resources are located until all the characters are moved on said video display such that said window portion can encompass all said characters and said limited resource or any other object in the maze which the players desire their characters to be able to reach, wherein said software means moves a character under player control by altering stored data defining the character's position on said video display in accordance with player control inputs indicating the direction to move the controlled character, and wherein said software means includes means for altering the stored longevity data to increase the longevity of any character which first obtains possession of at least one type of said limited resources.

7. The apparatus of claim 6 further comprising means for allowing each player to control his character to either cooperate or compete with the other characters independently of the actions of the other characters in either cooperating or competing with each other.

8. The apparatus of claim 7 further comprising collision means in said software means for allowing a first player to hinder the progress of a second player's character which may independently be attempting to obtain possession of said limited resources or otherwise attempting to move through said maze, said hindrance caused by reading the control inputs of the first player to move the first player's character into the path of the second player's character or to such a position that a wall portion of the maze and the first player's character together block the path of the second player's character, including means to check for collisions between the second player's character and another character or a wall of the maze and to prevent movement of the second player's character if such movement would cause such a collision, said collision means also for allowing one player to impede free movement of the other player's characters throughout the displayed maze by refusing to move so that said window portion cannot move to display another portion of the maze thereby letting the other players move their characters into said other portion of the maze until said first player chooses to move his character so as to allow the window portion to both display said portion of said maze as well as all active characters within the perimeter of said window portion.

9. The apparatus of claim 4 wherein said fourth means includes means to independently calculate said longevity attribute data for each character based at least upon events which happen in the game to each character and wherein said events may include the receipt of new coins for a character, said fourth means also responding to the receipt of new coins for a particular character by increasing that character's longevity attribute.

10. The apparatus of claim 9 further comprising means in said software means for reading each player inputs from said controls indicating that the player desires, the character being controlled to take possession of a limited resource displayed on said video display and to cause said video display to depict a scene wherein said character appears to have taken possession of the limited resource and for causing said attribute data defining the ability to fight and to move for the character taking possession of said limited resource to be altered upon appearing to gain possession of one or more of said limited resources and further comprising means in said software means for establishing multiple levels of maze between which the characters may move.

11. The apparatus of claim 9 further comprising means for independently changing the stored data defining the attributes of each character based upon events which happen to each character and actions taken by each character during the game.

12. The apparatus of claim 9 wherein said software means drives said video display to display at least one maze occupied with entities including said monsters and includes means for altering the longevity data associated with characters attacked by said monsters by shortening the longevity attributes of any character which is affected by any said attribute-affecting entity, and further comprising means in said software means for driving said video display in such a way as to encourage the players which are active in the game to move their characters so as to cooperate with each other to avoid the effect of said displayed attribute-affecting entities in attempting to get to move their characters to an area in said displayed maze where said resources which increase longevity are displayed, but for allowing each player to independently attempt to move his or her character through said displayed maze and avoid the effect of said attribute-affecting entities in an effort to first obtain possession of said resource where possession occurs when the player moves his or her character on the display so to enter an area around the displayed location of said resource.

13. An apparatus as defined in claim 12 further comprising means for displaying at least one exit door and at least one key in said maze for unlocking said exit door.

14. The apparatus of claim 13 further comprising means for allowing each player to control his character to either cooperate or compete with the other characters in performing actions in the game including, for example, defeating monsters, obtaining possession of limited resources or moving through the maze independently of the actions of the other players in controlling their characters to either cooperate or compete with the other active characters.

15. A video game comprising:

control means including one set of controls for each of a plurality of characters for generating signals in response to player manipulation of said controls;

means for displaying a maze, limited resources in said maze and the movements and actions of a plurality of characters in a maze;

movement means for receiving player inputs from said control means and for causing said display means to display said maze, limited resources in said maze and one or more characters in said maze, each character with different attributes in terms of ability to move, shoot and otherwise fight in said maze and for independently calculating a longevity attribute and recording same in the form of stored longevity data for each character which decreases with time and decreases with damage from entities and increases with obtaining possession of said limited resources where obtaining possession of a limited resource means moving a character into an area including said limited resource within its perimeter and for causing said display means to stop displaying movement and actions by each said character when said longevity attribute for that character reaches zero, and for causing each said character to move in said maze displayed on said means for displaying in response to player input from a corresponding set of said controls, and including means for controlling said means for displaying to display only a window portion of said maze related to the position of all the characters in said maze, and for restricting movement on said display means of each said character to the bounds of said window portion as determined by the positions of all said characters;

coin accepting means corresponding to each said character and coupled to said movement means for the corresponding character for accepting coins which bring the corresponding character to life by increasing its longevity in the game and allowing said movement means to move said character on said display means in response to player inputs on the corresponding set of controls;

first means in said movement means and coupled to said control means for responding to a plurality of players each having his or her own controls so that each player may independently, simultaneously control the movements and actions of at least one of said plurality of characters in the video game each of which has a longevity attribute independently calculated for that character based upon at least the events which happen in the game affecting that character and for responding to any player who wishes to join the game and control an unused character at any time regardless of when the game started or to leave the game when the player's character's longevity attribute decreases to zero or at any other time;

maze means in said movement means for driving said display means to display said maze through which said characters move and in which are displayed said limited resources in quantities and locations determined by said maze means which affect at least the longevity attribute of any character having said limited resources in its possession, and further driving said display means to display a plurality of different types of entities in said maze which shorten the longevity attributes of said characters if not avoided by said characters; and second means in said movement means for driving said display means in a limited fashion such that players whose characters have non zero longevity attributes in the game may either cooperate or compete in avoiding said entities to reach the area of said maze where said limited resources are displayed including means for causing possession of the same type of limited resource to affect the attributes of different characters differently, and means for allowing any character to appear on said video display to push any other character to change that character's position on said display means to move said character in said maze against the wishes of the player whose character has been pushed.

16. The apparatus of claim 15 further comprising means in said second means for driving said display means in a limited fashion such that said players are encouraged to manipulate their characters so as to cooperate for the good of the group of characters to defeat the entities in said maze until they reach the area of any one or more of said limited resources, but to drive the display means in such a manner as to allow the players to independently decide to manipulate their characters so as to either cooperate or compete with each other to obtain possession of said limited resources when the manipulated character group successfully reaches the location of said limited resources including means for allowing any player's character to destroy the limited resources sought by another character by appearing to shoot said limited resources where said movement means maintains stored data defining the attributes and location of said limited resources and where the movement means includes means to modify the attribute data of any limited resources which have been shot by a character to alter the limited resources in some way such as by rmvoing said limited resources from the displayed maze, and means in said movement means for shortening the longevity on said display means of any character which appears to have been shot or otherwise attacked by any other character by altering stored longevity data defining the longevity attribute corresponding to the character which appears to have been shot or otherwise attacked.

17. The apparatus of claim 15 further comprising means for allowing any player to enter an unused character in the game or withdraw a character controlled by a player at that time from the game independently of when the game started, and independently of how many other characters are in the game and further comprising means for allowing any character to independently stay in the game as other characters are placed in or withdrawn from the game.

18. A video game subsystem for providing a facility for game play of a video game involving multiple displayed characters each of which has a set of attributes and each of which may be separately controlled by one of a plurality of players and each of which has a separate longevity attribute in said game defined by corresponding longevity data, comprising:

a computer system including a plurality of control sets each of which corresponds to one of said characters, a display and a plurality of coin receiving mechanisms each of which corresponds to one of said plurality of characters, each of said plurality of control sets, said display and said plurality of coin receiving mechanisms being coupled to a CPU;

software means controlling said CPU for reading player control inputs from said control sets and from said plurality of coin receiving mechanisms and for driving said display to control said game play by displaying a maze and said characters and by moving said characters through said maze and by changing the appropriate longevity data stored for each said character including the following elements:

first means for responding to the control inputs from said plurality of control sets where each said control set is manipulated by one of a plurality of players and where each said player has a separate control set, and for responding to control inputs generated by dropping a coin into any of said plurality of coin receiving mechanisms by altering stored longevity data corresponding to the characater assigned to the coin receiving mechanism in which said coin was dropped, said first means also for driving said display so that each said player may appear to bring a character to life on said display so as to respond to player control commands entered via the corresponding one of said control sets by dropping a coin into a coin receiving mechanism corresponding to the character to be controlled by said player, said first means also for responding to said control inputs from said control sets and from said coin receiving mechanisms so that each player may independently and simultaneously control the displayed movements and actions of a character in said video game and for driving said display such that each said character is displayed as having a plurality of different attributes defining the ability of each said character to move through, fight and shoot in said maze and for separately calculating a longevity attribute for each character based upon at least the events which happen affecting that character in the game and automatically decreasing over time and for appropriately altering said stored longevity data in accordance with said calculation, and for driving said display means so as to display actions by said character only so long as said longevity attribute is satisfying a predetermined criterion;

maze means for driving said display means so as to display a maze through which said characters move and in which are displayed one or more limited resources which affect the displayed attributes of any character having a sought after one of said limited resources in its possession where possession is defined as movement of a characater into an area of the display wherein said sought after one of said limited resources is displayed, and for driving said display means such that possession of said sought after one of said limited resources appears to affect the attributes of different characters differently, and for further driving said display to show entities in said maze which shorten the longetivy attributes of said characters if not avoided by said characters; and means for driving said display means in such a fashion that the characters displayed are encouraged to cooperate to maximize their longevity attribute to move through the maze until they reach the area of any of said limited resources, said encouragement including driving said display to display only a window portion of said maze, which portion is related to the positions of all the characters, while not allowing any character to move outside the bounds of said window portion, but for driving said display in such a manner as to allow said characters to either cooperate or compete with each other to obtain possession of any of said limited resources by driving said display so as to allow any character to shoot and destroy said limited resources or shoot any other character when the characters collectively move so that said window portion can be moved so as to allow the limited resource being sought to be displayed in said window portion thereby allowing any of said characters to individually reach the area of said maze displayed in said window portion where said limited resource being sought is displayed;

means for driving said display so as to establish different attributes for each character defining each character's characteristics and abilities to move and fight in said maze when manipulated by the player;

means for independently changing the attributes of each character on said display based upon events which happen to each character and actions taken by each character during the game; and means for driving said display for allowing any player to enter an unused character in the game being displayed or withdraw a player controlled character from the game independently of when the game started, and independently of how many other characters are in the game, and to allow any player to independently stay in the game as other characters are placed in or are withdrawn from the game as long as the player's character still has a longevity attribute which satisfies a predetermined criteria.

19. A video game subsystem for providing a facility to display video game action by a plurality of characters each of which has a changeable longevity attribute which determines how long that character may be manipulated by a player to perform action on a displayed playfield having one or more limited resources displayed thereon comprising:

means for displaying said playfield having resources thereon, the quantities and locations of which are automatically predetermined by said means for displaying;

multiple control means each corresponding to a particular character and each allowing any player manipulating said control means to control the movements and actions of the corresponding character, each said control means for allowing a player manipulating said control means to control the movements and actions of a corresponding character on said display;

means for driving said display means so as to allow each of a plurality of players to join the game and to appear to bring one of a plurality of characters selected by the player to life on said display means at any time by providing a predetermined control input thereby allowing control of the corresponding selected character on said display means, each of said characters having different attributes on said display means including a longevity attribute which decreases automatically with time, and said means for driving also for responding to player inputs from one of said control means by controlling the character corresponding to said control means on said display means simultaneously with control of other characters by other players through manipulation of their respective control means;

means for limiting said display means so that it display only a portion of said playfield at any particular time in a window and for causing said display means to move the window across the playfield in response to the movements of said characters; and means for driving said display means so as to force all the currently player controlled characters with non zero longevity attributes to remain visible in said window all the time when said game is played and only allowing a character to obtain one or more of said limited resources if a sought after one of said limited resources is showing in said window and for causing the attributes of the first character obtaining the resource to be affected by obtaining possession thereof.

20. A video game subsystem including a display comprising:

first means for allowing a plurality of players to simultaneously and independently control the movements and actions of a plurality of characters each of which has one or more attributes defining said character in a maze in said video game;

second means for allowing any one of said plurality of players to enter the game at any time and to simultaneously and independently control the movements and actions of one of said characters independently of when the other players started playing or when any other said player or players stop playing;

third means for forcing the players to cooperate during play by not allowing any character to move outside a window portion of said maze and by allowing the window to move only in response to the collective positions of all the players, and for providing a facility by which any player may manipulate his or her character to appear to move any other player's character by appearing to push said other player's character on the display and for providing a facility by which a first player's character may appear to damage the character of another player by appearing to shoot and other character on said display, said third means also for causing said display to display one or more limited resources in said maze which alter the attributes of any said character having one or more of said limited resources in the possession of said character, where possession occurs when said character is moved on said display into an area on said display containing one or more of said limited resources, but said third means allowing any said character to take possession of a limited resource only when the sought after limited resource is visible in said window portion; and coin accepting means for receiving coins for each character in the game and for adding longevity to any character for which coins are received in proportion to the amount of money received.

21. A method of operating a video game having a display and controls comprising the steps of:

displaying a playfield containing different kinds of monsters and one or more characters having attributes including a longevity attribute which characters may be moved on said playfield by players manipulating said controls and displaying predetermined amount of different limited resources on said playfield;

limiting the displayed portion of the playfield in accordance with the collective positions of all said characters which are active in that they have longevity attributes which allow said characters to be moved on said playfield by said players by manipulation of said controls, said limitation of the displayed portion of the playfield being such that all the characters must be visible at all times in the displayed portion of said playfield;

reading control inputs from multiple control mechanisms and controlling the movements and actions of said multiple characters each of which has different attributes including the ability to fight and move and each of which responds to control inputs from a corresponding set of control mechanisms;

reading start data from multiple start mechanisms at the beginning of said game and during said game so as to allow new players to join the game at any time and begin controlling an unused character; and forcing the players to cooperate during play of the game by limiting the life of each character by decreasing said longevity attribute automatically over time or when the character is damaged by said monsters and by allowing a character to increase its longevity attribute by taking possession of predetermined types of said limited resources where taking possession of any said limited resource is accomplished when a character enters the area on said display where said limited resource is displayed, but only allowing a character to take such possession of a limited resource when the limited resource is showing in the window of said playfield which is currently displayed based upon the collective positions of all the active characters and by not allowing any active character to move to a position on said playfield outside the bounds of the currently displayed portion.

*22. A system for multi-player competition, comprising:*

*a video display;*

*means for allowing a plurality of players to simultaneously and independently control the movement of a plurality of characters in a playfield displayed on the video display; and*

*computer means, connected to the video display and the allowing means, for encouraging the players to cooperate during play to reach predetermined objectives on the playfield, the means for encouraging including means for displaying on the video display only a portion of the playfield at any one time, and wherein the portion of the playfield that is displayed is determined by the relative positions of all the characters on the playfield and wherein the characters are restricted from moving outside the bounds of the displayed portion of the playfield.*

*23. A computerized system for competition, comprising:*

*a video display;*

*means for allowing a plurality of players to simultaneously and independently control the movements of a plurality of characters in a playfield displayed on the video display; and*

*computer means, connected to the video display and the allowing means, for encouraging the players to cooperate during play to reach predetermined objectives on the playfield, the means for encouraging including means for displaying on the video display only a window portion of the playfield which is smaller than the playfield and which has a position on the playfield that is determined by the relative positions of all the characters on the playfield and wherein the position of the window is changed only when all of the characters are simultaneously contained in the window.*

*24. The system defined in claim 23, further comprising means for allowing any of the plurality of players to start playing at any time by selecting a character to control which is not being controlled by another player.*

*25. The system defined in claim 23, further comprising means for independently calculating attributes, including a longevity attribute, for each character based at least upon events affecting each character, the means for independently calculating also for responding to longevity increasing events relating to a particular character by increasing the character's longevity attribute.*

*26. The system defined in claim 25, further comprising means for displaying a limited resource on the playfield when the position of the limited resource is within the window, and wherein possession of the limited resource by a character changes at least one of the character's attributes.*

*27. The system defined in claim 26, further comprising means for providing on the playfield at least one maze occupied with negative entities for hindering the characters by shortening the longevity attribute of any character which is affected by the entity, and further comprising means for encouraging the players to compete with each other to avoid the effect of the negative entities by allowing each character to independently attempt to move through the maze and avoid the effect of the negative entities while seeking to obtain possession of the limited resource.*

*28. The system defined in claim 25, further comprising at least one limited resource positioned on the playfield, and wherein the limited resource increases the longevity of a character affected thereby.*

*29. The system defined in claim 28, wherein the means for encouraging players to cooperate includes means for encouraging competition among the players by preventing character access to the limited resource unless all characters move so that the limited resource is within the window, and the means for encouraging players to cooperate also including means for increasing the longevity attribute of any character which first obtains possession of the limited resource.*

*30. The system defined in claim 23, further comprising means for establishing different attributes for each character including characteristics and abilities which are controlled by a player.*

*31. The system defined in claim 30, further comprising means for independently changing the attributes of each character based upon events affecting each character or actions taken by each character.*

*32. The system defined in claim 30, further comprising attribute affecting entities for affecting the characters by changing an attribute of a selected character.*

*33. The system defined in claim 23, wherein the playfield comprises a maze.*

*34. The system defined in claim 33, further comprising means for displaying at least one key in the maze for unlocking at least one exit from the maze.*

*35. A multi-player competitive system using a video display, the system comprising:*

*means for allowing a plurality of players, each player having separate controls, to independently and simultaneously control the movements of a plurality of characters; and*

*computer means, coupled to the allowing means, comprising:*

*means for providing on the video display a playfield through which the characters move and in which are placed limited resources; and*

*means for restricting movements of all the characters to a window portion of the playfield and for moving the*

*window portion based upon the collective positions of all the characters, thereby encouraging the players to cooperate to move the characters through the playfield until they reach positions such that the limited resources are displayed within the window portion, thereby allowing the players to independently decide to either cooperate or compete with each other in moving their characters to obtain possession of the limited resources.*

*36. The system defined in claim 35, wherein each character has a set of attributes.*

*37. The system defined in claim 36, further comprising means for independently changing the attributes of each character based upon events affecting the character or actions taken by the character.*

*38. The system defined in claim 36, wherein at least one of the limited resources affects at least one of the attributes when one of the limited resources is possessed by one of the characters.*

*39. The system defined in claim 38, further comprising entities on the playfield which affect at least one of the attributes of the characters if the entity is not avoided by the characters.*

*40. The system defined in claim 35, further comprising means for establishing different attributes for each character which determine a limited range for each character's movement and other abilities of the characters which are controlled by the players.*

*41. The system defined in claim 35, further comprising means for allowing any player to enter a character on the playfield or withdraw a character from the playfield independently of when any other player started playing, and independently of how many other characters are on the playfield, and for allowing any player to independently stay on the playfield as other characters are placed on or withdrawn from the playfield.*

*42. A computerized system for competition, comprising:*

*means for displaying a playfield;*

*multiple control means each for allowing a player to control the movements of a corresponding character on the playfield; and*

*a computer coupled to the display means and the allowing means, comprising:*

*means for displaying attribute affecting entities and resources on the playfield;*

*means for displaying only a portion of the playfield at any particular time in a window and for moving the window across the playfield in response to the movements of the characters; and*

*means for forcing all currently active characters to remain visible in the window at substantially all times when the game is being played by preventing characters from leaving the window and by preventing movement of the window until the collective position of all characters is such that the window may be moved without causing a character to pass outside a pre-determined area and for not allowing any character to take possession of a resource unless the resource is visible within the window.*

*43. The system as defined in claim 42, further comprising means for allowing characters to enter the playfield at any time, and for bringing an unused character to life and for beginning control of the character simultaneously with continuing control of other characters already on the playfield.*

*44. A video game comprising:*

*a video display;*

*first means for allowing a plurality of players to simultaneously and independently control the movement of a plurality of characters on the video display; and*

*a computer, coupled to the video display and the first means, comprising:*

*second means for allowing any one of the plurality of players to enter the game at any time and to simultaneously and independently control the movements of one of the characters on the video display independently of when the other players started playing or when any other player stops playing; and*

*means for populating a playfield, a window portion of which is displayed on the video display, with resources which affect the characters, and for restricting movements of the characters such that no character can enter any portion of the playfield which is outside the window portion, and for moving the window portion over the playfield as a function of the position of the characters, and for not allowing any character to obtain possession of any resource or reach any other objective on the playfield unless the resource or objective is visible in the window portion, thereby encouraging the players to cooperate during play to reach predetermined objectives.*

*45. A method of operating a video game having a computer, a video display, multiple control mechanisms and multiple start mechanisms, the method comprising the steps of:*

*reading control inputs from the control mechanisms;*

*controlling the movements of multiple characters each of which responds to control inputs from the corresponding control mechanisms and each of which is displayed on the video display;,*

*reading start data from the start mechanisms at the beginning of the game and during the game so as to allow new players to join the game at any time and select an inactive character simultaneously with control of other characters by other players;*

*encouraging the players to cooperate during play of the game by displaying on the video display only a portion of the playfield in a window which can be moved by the computer to display different portions of the playfield;*

*restricting movement of the characters such that no character can venture outside the window; and*

*moving the window as a function of the positions on the playfield of all active characters.*

*46. The method as defined in claim 45, wherein the encouraging step includes populating the playfield with entities which negatively affect at least one of the characters and with resources which positively affect at least one of the characters when the position of at least one of the characters is in a predetermined relationship to that of one or more of said entities or resources, and allowing each character to be in said predetermined relationship with said resource or entity only when the positions of all the active characters on the playfield are such that the window portion encompasses resource or entity.*

*47. The method as defined in claim 45, further comprising the steps of:*

*providing each character with certain attributes; and*

*providing attribute affecting entities in the playfield which will change at least one of the attributes of each character if the character collides with any one of the entities.*

*48. The method as defined in claim 45, further comprising the steps of:*

*providing a longevity attribute for each character that controls how long that character may be active in the game;*

*providing limited longevity enhancing resources in the game which may be possessed by each character to thereby increase that character's longevity; and*

*providing longevity decreasing entities on the playfield which will decrease the longevity of each character if not avoided by the character.*

*49. A video game, comprising:*

*a display;*

*a plurality of controls by which a plurality of players may control the movements and other attributes of a plurality of corresponding characters shown on the display; and*

*a computer having a memory and coupled to the display and to the controls, comprising a software program executed by the computer for generating data to drive the display and to read the controls and create the characters in the memory, each character having various attributes wherein the program creates in the memory a playfield populated by attribute affecting entities such as at least one limited resource which affects one or more attributes of any character, and wherein the program drives the display of a window portion of the playfield and at least two characters in the window portion, and provides for simultaneously controlling the displayed movements of all the characters in accordance with the manipulations of the corresponding controls, and provides for moving the window portion in accordance with the positions of the characters and restricting the movements of the characters such that no character can travel to any position of the playfield not displayed in the window portion.*

*50. The video game defined in claim 49, wherein the software program includes means for preventing each character from obtaining possession of a selected limited resource unless the limited resource is displayed in the window portion and for restricting the movement of the window portion to display other portions of the playfield such that the window portion may be moved only to the extent that all characters having a selected attribute status may be simultaneously displayed within the window portion and such that the window portion moves over the playfield subject to the restriction on movement of the characters.*

*51. The video game defined in claim 49, wherein the software program includes program code which defines in the computer memory a playfield having multiple mazes or levels connected by exits on each level, and wherein cooperation of players is forced by restricting movement of each character to a different level until all characters have been moved such that the window portion is over the exit on any particular level of the maze and all characters have been moved through the exit.*

*52. The video game defined in claim 49, wherein the software program includes program code which changes a selected attribute of each character which collides with or is successfully attacked by any one of a plurality of attribute affecting entities.*

*53. The video game defined in claim 49, wherein one of the attributes is character longevity and the software program includes program code to automatically decrease the longevity attribute of each character at selected times.*

*54. The video game defined in claim 53, wherein the software program includes program code to allow characters to increase their longevity attributes by taking possession of certain limited resources, wherein all the players cooperate by moving their characters such that the window portion can be moved to include the limited resource within the perimeter of the window portion.*

*55. A video game, comprising:*

*a video display;*

*a plurality of controllers, each controller independently operable by a player; and*

*a computer having a memory, the computer connected to the video display and the controllers, the computer comprising program means, stored in the memory, for displaying a window portion of a playfield populated by at least two characters, and for moving the characters over the playfield in response to manipulation by at least two players of the corresponding player controls, and permitting all characters to be simultaneously and independently controlled and to enter and leave the game at will, but restricting the movements of the characters and the window portion over the playfield such that no character can move outside the bounds of the window and such that the window moves with the characters thereby allowing movement of the window to be blocked by any player who refuses to move their character with the other characters.*

*56. The video game definedin claim 55, wherein each character has a set of attributes including a longevity attribute and wherein the playfield is further populated by a limited number of positive attribute affecting entities which increase the longevity attribute or enhance other attributes of any character affected by one or more of the positive attribute affecting entities, and further populated by negative attribute affecting entities which adversely affect the longevity or other attribUtes of any character affected by one or more of the negative attribute affecting entities.*

*57. The video game defined in claim 56, wherein the program means includes means for calculating and displaying a score for each character and for establishing and updating data defining the status of all attributes for each character based upon events affecting each character during operation of the game.*

*58. The video game defined in claim 56, wherein the program means includes means for restricting the action of the positive attribute affecting entities from affecting any character until the position of the positive attribute affecting entity is within the window portion.*

*59. The video game defined in claim 56, wherein the program means includes means for storing and displaying data defining multiple different levels of the playfield which are connected by at least one path from one level to a different level.*

*60. The video game defined in claim 59, wherein the program means includes means for causing at least some of the negative attribute affecting entities to seek out and attack any character active in the game and further includes means to restrict the movement of one character through a path to another level of the playfield until all the characters have moved to positions on the playfield such that the window portion includes the path within its perimeter.*

*61. The video game defined in claim 56, wherein the program means includes means for selectively increasing the longevity attribute of any character.*

*62. The video game defined in claim 55, wherein each character has a longevity attribute and the program means includes means for automatically decreasing the longevity attribute over time or when a character is affected by a negative attribute affecting entity and means for increasing the longevity attribute of any character taking into its possession a positive attribute affecting entity.*

* * * * *